(12) United States Patent
Olsen

(10) Patent No.: US 9,395,952 B2
(45) Date of Patent: Jul. 19, 2016

(54) PRODUCT SUMMATION APPARATUS FOR A RESIDUE NUMBER ARITHMETIC LOGIC UNIT

(71) Applicant: Eric B. Olsen, Las Vegas, NV (US)

(72) Inventor: Eric B. Olsen, Las Vegas, NV (US)

(73) Assignee: Olsen IP Reserve, LLC, Henderson, NV (US)

( * ) Notice: Subject to any disclaimer, the term of this patent is extended or adjusted under 35 U.S.C. 154(b) by 0 days.

(21) Appl. No.: 14/730,063

(22) Filed: Jun. 3, 2015

(65) Prior Publication Data

US 2015/0339103 A1 Nov. 26, 2015

Related U.S. Application Data

(63) Continuation of application No. 13/475,979, filed on May 19, 2012, now Pat. No. 9,081,608.

(51) Int. Cl.
*G06F 7/72* (2006.01)
*G06F 7/483* (2006.01)
*G06F 9/30* (2006.01)

(52) U.S. Cl.
CPC ............... *G06F 7/483* (2013.01); *G06F 7/729* (2013.01); *G06F 9/30025* (2013.01)

(58) Field of Classification Search
CPC .................................. G06F 7/72; G06F 7/729
See application file for complete search history.

(56) References Cited

U.S. PATENT DOCUMENTS

| | | | | |
|---|---|---|---|---|
| 4,281,391 A * | 7/1981 | Huang | ..................... | H03M 7/18 341/83 |
| 4,910,699 A * | 3/1990 | Capps | ..................... | G06E 1/065 708/191 |
| 5,107,451 A * | 4/1992 | Houk | ..................... | G06F 7/729 708/191 |
| 5,117,383 A * | 5/1992 | Fujita | ..................... | G06F 7/729 708/491 |
| 2006/0184600 A1* | 8/2006 | Maruo | ..................... | G06F 7/729 708/491 |
| 2011/0231465 A1* | 9/2011 | Phatak | ..................... | G06F 7/729 708/235 |

\* cited by examiner

*Primary Examiner* — Chuong D Ngo
(74) *Attorney, Agent, or Firm* — Lightbulb IP, LLC

(57) ABSTRACT

Methods and systems for residue number system based ALUs, processors, and other hardware provide the full range of arithmetic operations while taking advantage of the benefits of the residue numbers in certain operations. In one or more embodiments, an RNS ALU or processor comprises a plurality of digit slices configured to perform modular arithmetic functions. Operation of the digit slices may be controlled by a controller. Residue numbers may be converted to and from fixed or mixed radix number systems for internal use and for use in various computing systems.

6 Claims, 99 Drawing Sheets

$21845_{10} = (1, 2, 0, 5, 10, 5)_{RNS} = ((((((((9)*11)+5)*7)+0)*5)+0)*3)+2)*2)+1 = 950021_{MR}$

| | Primary Control Steps (figure 13A) | Operation Description | Register value | Modulus $M_0=2$ $D_0$ | Modulus $M_1=3$ $D_1$ | Modulus $M_2=5$ $D_2$ | Modulus $M_3=7$ $D_3$ | Modulus $M_4=11$ $D_4$ | Modulus $M_5=13$ $D_5$ | Modulus $M_6=17$ $D_6$ | Modulus $M_7=19$ $D_7$ | Value (decimal) |
|---|---|---|---|---|---|---|---|---|---|---|---|---|
| 1330 | Step 1201, 1202, 1204 | Start | Dividend | 0 | 0 | 2 | 2 | 7 | 9 | 10 | 16 | 282 |
| | | | Divisor | 1 | 2 | 4 | 3 | 4 | 7 | 8 | 2 | 59 |
| 1331 | Step 1205, 1206, 1207 | After divisor decrement | Dividend | 0 | 0 | 2 | 2 | 7 | 9 | 10 | 16 | 282 |
| | | | Divisor | 0 | 1 | 3 | 2 | 3 | 6 | 7 | 1 | 58 |
| 1332 | Step 1211 | After divide by $M_0$ | Dividend | * | 0 | 1 | 1 | 9 | 11 | 5 | 8 | 141* |
| | | | Divisor | * | 2 | 4 | 1 | 7 | 3 | 12 | 10 | 29* |
| 1333 | Step 1212 | After Base Extend | Dividend | 1 | 0 | 1 | 1 | 9 | 11 | 5 | 8 | 141 |
| | | | Divisor | 1 | 2 | 4 | 1 | 7 | 3 | 12 | 10 | 29 |
| 1334 | Step 1205, 1206, 1207 | After divisor decrement | Dividend | 1 | 0 | 1 | 1 | 9 | 11 | 5 | 8 | 141 |
| | | | Divisor | 0 | 1 | 3 | 0 | 6 | 2 | 11 | 9 | 28 |
| 1335 | Step 1208, 1209, 1210 | Dividend subtracted by $D_0$ | Dividend | 0 | 2 | 0 | 0 | 8 | 10 | 4 | 7 | 140 |
| | | | Divisor | 0 | 1 | 3 | 0 | 6 | 2 | 11 | 9 | 28 |
| 1336 | Step 1211, 1228, 1229 | After divide by $M_0$ | Dividend | * | 1 | 0 | 0 | 4 | 5 | 2 | 13 | 70* |
| | | | Divisor | * | 2 | 4 | 0 | 3 | 1 | 14 | 14 | 14* |
| 1337 | Step 1205, 1206, 1208, 1209, 1211 | After divide by $M_3$ | Dividend | * | 1 | 0 | * | 10 | 10 | 10 | 10 | 10* |
| | | | Divisor | * | 2 | 2 | * | 2 | 2 | 2 | 2 | 2* |
| 1338 | Step 1228, 1212 | After Base Extend | Dividend | 0 | 1 | 0 | 3 | 10 | 10 | 10 | 10 | 10 |
| | | | Divisor | 0 | 2 | 2 | 2 | 2 | 2 | 2 | 2 | 2 |
| 1339 | Step 1205, 1206, 1208, 1209, 1211 | After divide by $M_0$ | Dividend | * | 2 | 0 | 5 | 5 | 5 | 5 | 5 | 5* |
| | | | Divisor | * | 1 | 1 | 1 | 1 | 1 | 1 | 1 | 1* |
| 1340 | Step 1228, 1212 | After Base Extend | Dividend | 1 | 2 | 0 | 5 | 5 | 5 | 5 | 5 | 5 |
| | | | Divisor | 1 | 1 | 1 | 1 | 1 | 1 | 1 | 1 | 1 |
| 1341 | Steps 1212 thru 1221 | Decrement at post processing | Dividend | 0 | 1 | 4 | 4 | 4 | 4 | 4 | 4 | 4 |
| | | | Divisor | - | - | - | - | - | - | - | - | - |

RNS Integer Divide Number Sequence Example (Dividend / Divisor)

Figure 13B

| | Primary Control Steps (figure 13A) | Operation Description | Register value | Modulus $M_0=2^5$ $D_0$ | Modulus $M_1=3^2$ $D_1$ | Modulus $M_2=5^2$ $D_2$ | Modulus $M_3=7$ $D_3$ | Modulus $M_4=11$ $D_4$ | Modulus $M_5=13$ $D_5$ | Modulus $M_6=17$ $D_6$ | Modulus $M_7=19$ $D_7$ | Value (decimal) |
|---|---|---|---|---|---|---|---|---|---|---|---|---|
| 1330 | Step 1201, 1202, 1204 | Start | Dividend | 11010 | 12 | 7 | 2 | 7 | 9 | 10 | 16 | 282 |
| | | | Divisor | 11011 | 5 | 9 | 3 | 4 | 7 | 8 | 2 | 59 |
| 1331 | Step 1205, 1206, 1207 | After divisor decrement | Dividend | 11010 | 12 | 7 | 2 | 7 | 9 | 10 | 16 | 282 |
| | | | Divisor | 11010 | 4 | 8 | 2 | 3 | 6 | 7 | 1 | 58 |
| 1332 | Step 1211 | After divide by $2^1$ | Dividend | *1101 | 6 | 16 | 1 | 9 | 11 | 5 | 8 | 141* |
| | | | Divisor | *1101 | 2 | 4 | 1 | 7 | 3 | 12 | 10 | 29* |
| 1333 | Step 1212 | After Base Extend | Dividend | 01101 | 6 | 16 | 1 | 9 | 11 | 5 | 8 | 141 |
| | | | Divisor | 11101 | 2 | 4 | 1 | 7 | 3 | 12 | 10 | 29 |
| 1334 | Step 1205, 1206, 1207 | After divisor decrement | Dividend | 01101 | 6 | 16 | 1 | 9 | 11 | 5 | 8 | 141 |
| | | | Divisor | 11100 | 1 | 3 | 0 | 6 | 2 | 11 | 9 | 28 |
| 1335 | Step 1208, 1209, 1210 | Dividend subtracted by 1 | Dividend | 01100 | 5 | 15 | 0 | 8 | 10 | 4 | 7 | 140 |
| | | | Divisor | 11100 | 1 | 3 | 0 | 6 | 2 | 11 | 9 | 28 |
| 1336b | Step 1211, 1228, 1229 | After divide by $2^2$ | Dividend | **011 | 8 | 10 | 0 | 2 | 9 | 1 | 16 | 35* |
| | | | Divisor | **111 | 7 | 7 | 0 | 7 | 7 | 7 | 7 | 7* |
| 1337 | Step 1205, 1206, 1208, 1209, 1211 | After divide by $M_3$ | Dividend | **101 | 5 | 5 | * | 5 | 5 | 5 | 5 | 5* |
| | | | Divisor | **001 | 1 | 1 | * | 1 | 1 | 1 | 1 | 1* |
| 1340 | Step 1228, 1212 | After Base Extend | Dividend | 00101 | 5 | 5 | 5 | 5 | 5 | 5 | 5 | 5 |
| | | | Divisor | 00001 | 1 | 1 | 1 | 1 | 1 | 1 | 1 | 1 |
| 1341 | Steps 1212 thru 1221 | Decrement at post processing | Dividend | 00100 | 4 | 4 | 4 | 4 | 4 | 4 | 4 | 4 |
| | | | Divisor | - | - | - | - | - | - | - | - | - |
| | RNS Integer Divide Number Sequence Example with Power Based Modulus ($2^5$, $3^3$, $5^2$, 7, 11, 13, 17, 19) | | | | | | | | | | | |

Figure 13C

| Primary Control Steps (figure 13A) | Operation Description | Register value | Modulus $M_0=2^5$ $D_0$ | Modulus $M_1=3^3$ $D_1$ | Modulus $M_2=5^2$ $D_2$ | Modulus $M_3=7$ $D_3$ | Modulus $M_4=11$ $D_4$ | Modulus $M_5=13$ $D_5$ | Modulus $M_6=17$ $D_6$ | Modulus $M_7=19$ $D_7$ | Value (decimal) |
|---|---|---|---|---|---|---|---|---|---|---|---|
| 1330 Step 1201, 1202, 1204 | Start | Dividend | 11010 | 110=12 | 12 =7 | 2 | 7 | 9 | 10 | 16 | 282 |
| | | Divisor | 11011 | 012=5 | 14 =9 | 3 | 4 | 7 | 8 | 2 | 59 |
| 1331 Step 1205, 1206, 1207 | After divisor decrement | Dividend | 11010 | 110 =12 | 12 =7 | 2 | 7 | 9 | 10 | 16 | 282 |
| | | Divisor | 11010 | 011 =4 | 13 =8 | 2 | 3 | 6 | 7 | 1 | 58 |
| 1332 Step 1211 | After divide by $2^1$ | Dividend | *1101 | 020 =6 | 31 =16 | 1 | 9 | 11 | 5 | 8 | 141* |
| | | Divisor | *1101 | 002 =2 | 04 =4 | 1 | 7 | 3 | 12 | 10 | 29* |
| 1334 Step 1205, 1206, 1207 | After divisor decrement | Dividend | *1101 | 020 =6 | 31 =16 | 1 | 9 | 11 | 5 | 8 | 141* |
| | | Divisor | *1100 | 001 =1 | 03 =3 | 0 | 6 | 2 | 11 | 9 | 28* |
| 1335 Step 1208, 1209,1210 | Dividend subtracted by 1 | Dividend | *1100 | 012 =5 | 30 =15 | 0 | 8 | 10 | 4 | 7 | 140* |
| | | Divisor | *1100 | 001 =1 | 03 =3 | 0 | 6 | 2 | 11 | 9 | 28* |
| 1336b Step 1211, 1228, 1229 | After divide by $2^2$ | Dividend | ***11 | 022 =8 | 20 =10 | 0 | 2 | 9 | 1 | 16 | 35* |
| | | Divisor | ***11 | 021 =7 | 12 =7 | 0 | 7 | 7 | 7 | 7 | 7* |
| 1337 Step 1205, 1206, 1208, 1209, 1211 | After divide by $M_3$ | Dividend | ***01 | 012 =5 | 10 =5 | * | 5 | 5 | 5 | 5 | 5* |
| | | Divisor | ***01 | 001 =1 | 01 =1 | * | 1 | 1 | 1 | 1 | 1* |
| 1340 Step 1228, 1212 | After Base Extend | Dividend | 00101 | 012 =5 | 10 =5 | 5 | 5 | 5 | 5 | 5 | 5 |
| | | Divisor | 00001 | 001 =1 | 01 =1 | 1 | 1 | 1 | 1 | 1 | 1 |
| 1341 Steps 1212 thru 1221 | Decrement at post processing | Dividend | 00100 | 011 =4 | 04 =4 | 4 | 4 | 4 | 4 | 4 | 4 |
| | | Divisor | - | - | - | - | - | - | - | - | - |
| RNS Integer Divide Number Sequence Example with Power Based Modulus ($2^5$, $3^3$, $5^2$, 7, 11, 13, 17, 19) and advanced delayed extension | | | | | | | | | | | |

Figure 13D

|  | Modulus Value | | | | | | | | |
|---|---|---|---|---|---|---|---|---|---|
|  | 23 | 19 | 17 | 13 | 11 | 7 | 5 | 3 | 2 |
| Operation | $I_1$ | $I_2$ | $I_3$ | $I_4$ | $F_1$ | $F_2$ | $F_3$ | $F_4$ | $F_5$ | Equivalent Value |
| A + B | 8 | 7 | 7 | 5 | 0 | 1 | 0 | 0 | 0 | 1/7 |
|  | 2 | 6 | 3 | 7 | 0 | 0 | 2 | 0 | 0 | 1/5 |
| = | 10 | 13 | 10 | 12 | 0 | 1 | 2 | 0 | 0 | 12/35 |

Figure 14A

|  | Modulus Value | | | | | | | | |
|---|---|---|---|---|---|---|---|---|---|
|  | 23 | 19 | 17 | 13 | 11 | 7 | 5 | 3 | 2 |
| Operation | $I_1$ | $I_2$ | $I_3$ | $I_4$ | $F_1$ | $F_2$ | $F_3$ | $F_4$ | $F_5$ | Equivalent Value | Decimal Equiv. |
| A + B | 2 | 7 | 16 | 5 | 5 | 3 | 2 | 1 | 1 | 577 / 2310 | 0.2498 |
|  | 13 | 4 | 0 | 3 | 3 | 2 | 4 | 1 | 1 | 289 / 2310 | 0.1251 |
| = | 15 | 11 | 16 | 8 | 8 | 5 | 1 | 2 | 0 | 866 / 2310 | 0.3749 |

Figure 14B

|  | Modulus Value | | | | | | | | |
|---|---|---|---|---|---|---|---|---|---|
|  | 23 | 19 | 17 | 13 | 11 | 7 | 5 | 3 | 2 |
| Operation | $I_1$ | $I_2$ | $I_3$ | $I_4$ | $F_1$ | $F_2$ | $F_3$ | $F_4$ | $F_5$ | Equivalent Value |
| A + B | 15 | 2 | 1 | 6 | 0 | 1 | 0 | 0 | 0 | 3 & 1/7 |
|  | 13 | 18 | 4 | 1 | 0 | 0 | 2 | 0 | 0 | 8 & 1/5 |
| = | 5 | 1 | 5 | 7 | 0 | 1 | 2 | 0 | 0 | 11 & 12/35 |

Figure 14C

| Range Description | Range Symbol | Range Equation | Decimal Range | RNS Digits | Equivalent binary bits |
|---|---|---|---|---|---|
| Fractional Range | $R_F$ | 2*3*5*7*11*13*17 | 510510 | 7 | 18.96 |
| Integer range | $R_W$ | 19*23*29*31 | 392863 | 4 | 18.58 |
| Usable range | $R_Y$ | $R_F * R_W$ | 2.0056E+11 | 11 | 37.55 |
| Usable range$^2$ | $R_Y^2$ | $R_Y * R_Y$ | 4.02245E+22 | N/A | 75.09 |
| Positive range | $R_P$ | $R_Y / 2$ | 1.0028E+11 | 11 | 36.55 |
| Intermediate positive range | $R_{PI}$ | $(R_P * R_F)$ | 5.11941E+16 | N/A | 55.51 |
| Extended range | $R_E$ | 37*41*43*47*53*59*61 | 5.84803E+11 | 7 | 39.09 |
| Machine range | $R_M$ | $R_F * R_W * R_E$ | 1.17288E+23 | 18 | 76.63 |
| Unity$^2$ | $R_F^2$ | $R_F * R_F$ | 2.6062E+11 | N/A | 37.92 |
| MAC range | $R_{MAC}$ | $R_Y^2 + (R_F * R_Y)$ | 4.02246E+22 | N/A | 75.09 |
| Operand width | Q | $\lfloor \log_2(61) \rfloor + 1$ | 6 | N/A | 6.00 |

Figure 15E

Example problem:
3 17 / 7 * 8 1/5 = 902/35
Where $R_F = 2 * 3 * 5 * 7 * 11 * 13 * 17 = 510510_{10}$

Figure 15F

| Figure 15B Control Step | Extended Digits | | | | | | | Integer Range | | | | | | Fractional range | | | | | | | Sign Flags | | Description | Machine Value | Interpreted Value |
|---|---|---|---|---|---|---|---|---|---|---|---|---|---|---|---|---|---|---|---|---|---|---|---|---|---|
| | 61 | 59 | 53 | 47 | 43 | 41 | 37 | 31 | 29 | 23 | 19 | Digit Modulus | | 17 | 13 | 11 | 7 | 5 | 3 | 2 | SM | SV | | | |
| | $E_7$ | $E_6$ | $E_5$ | $E_4$ | $E_3$ | $E_2$ | $E_1$ | $I_4$ | $I_3$ | $I_2$ | $I_1$ | | | $F_7$ | $F_6$ | $F_5$ | $F_4$ | $F_3$ | $F_2$ | $F_1$ | Mag | Valid | | | |
| Step 1500 | 38 | 14 | 44 | 21 | 1 | 7 | 29 | 24 | 6 | 3 | 5 | | | 0 | 0 | 0 | 4 | 0 | 3 | 2 | X | 0 | Operand A | 1604460 / $R_F$ | 3.1428 |
| Step 1500 | 57 | 14 | 30 | 33 | 3 | 0 | 2 | 4 | 3 | 21 | 7 | | | 0 | 0 | 2 | 0 | 0 | 0 | 0 | X | 0 | Operand B | 4186182 / $R_F$ | 8.2000 |
| Step 1510 | 31 | 19 | 48 | 35 | 3 | 0 | 21 | 3 | 18 | 17 | 16 | | | 0 | 0 | 0 | 0 | 0 | 0 | 0 | X | 0 | Intermediate product | 6716561571720 | |
| Steps 1520, 1522, 1525 | 0 | 0 | 0 | 0 | 0 | 0 | 33 | 15 | 4 | 13 | 3 | | | 0 | 0 | 0 | 0 | 0 | 0 | 0 | X | 0 | Mixed Radix Equiv. (MRN) | 6716561571720 | |
| Step 1530(a) | 0 | 0 | 0 | 0 | 0 | 0 | 33 | 15 | 4 | 13 | 3 | | | 0 | 0 | 0 | 0 | 0 | 0 | 0 | X | 0 | Truncated MRN | 131156572 | |
| Step 1530(b) | 31 | 44 | 11 | 3 | 34 | 0 | 1 | 17 | 26 | 20 | 3 | | | - | - | - | - | - | - | - | X | 0 | Truncated MRN to RNS | 131156572 / $R_F$ | 25.7714 |
| Steps 1532, 1540b | 31 | 44 | 11 | 3 | 34 | 0 | 1 | 17 | 26 | 20 | 3 | | | 0 | 0 | 0 | 2 | 2 | 0 | 0 | 0 | 1 | Set Sign Flags | 131156572 / $R_F$ | +25.7714 |

Figure 15G

Approximates calculation of:
8 1/16 * 3 1/4 + 1/3
Actual calculation is:
4115987/R_F * 1659157/R_F = 13376954/R_F
Where R_F = 2*3*5*7*11*13*17 = 510510

| Figure 15B Control Step | Extended Digits | | | | | | | Integer Range | | | | Fractional range | | | | | | | Sign Flags | | Description | Machine Value | Interpreted Value |
|---|---|---|---|---|---|---|---|---|---|---|---|---|---|---|---|---|---|---|---|---|---|---|---|
| | 61 | 59 | 53 | 47 | 43 | 41 | 37 | 31 | 29 | 23 | 19 | 17 | 13 | 11 | 7 | 5 | 3 | 2 | SM | SV | | | |
| | $E_7$ | $E_6$ | $E_5$ | $E_4$ | $E_3$ | $E_2$ | $E_1$ | $I_4$ | $I_3$ | $I_2$ | $I_1$ | $F_7$ | $F_6$ | $F_5$ | $F_4$ | $F_3$ | $F_2$ | $F_1$ | Mag | Valid | | | |
| | | | | | | | | | | Digit Modulus | | | | | | | | | | | | | |
| Step 1500 | 12 | 29 | 7 | 9 | 27 | 38 | 33 | 24 | 17 | 22 | 17 | 15 | 5 | 7 | 1 | 2 | 2 | 1 | X | 0 | Operand A | 4115987 / $R_F$ | 8.0625 |
| Step 1500 | 18 | 18 | 45 | 10 | 2 | 10 | 3 | 6 | 9 | 6 | 1 | 8 | 6 | 5 | 3 | 2 | 1 | 1 | X | 0 | Operand B | 1659157 / $R_F$ | 3.25 |
| Step 1510 | 33 | 50 | 50 | 43 | 11 | 11 | 25 | 20 | 8 | 17 | 17 | 1 | 4 | 2 | 2 | 3 | 1 | 1 | X | 0 | Intermediate product | 6629068642959 | |
| Steps 1520, 1522, 1525 | 0 | 0 | 0 | 0 | 0 | 0 | 34 | 1 | 15 | 20 | 3 | 17 | 2 | 9 | 4 | 1 | 2 | 1 | X | 0 | Mixed Radix Equiv. (MRN) | 6629068642959 | |
| Step 1530 | 0 | 0 | 0 | 0 | 0 | 0 | 34 | 1 | 15 | 20 | 3 | 12 | , | , | , | , | , | , | X | 0 | Truncated MRN | 13376953 | |
| Step 1530 | 19 | 1 | 18 | 1 | 40 | 6 | 10 | 19 | 7 | 15 | 3 | 10 | 5 | 7 | 2 | 3 | 1 | 1 | X | 0 | Truncated MRN to RNS | 13376953 / $R_F$ | 366929 > (510510 / 2) |
| Steps 1532, 1533 | 20 | 2 | 19 | 2 | 41 | 7 | 11 | 20 | 8 | 16 | 4 | 11 | 6 | 8 | 3 | 4 | 2 | 0 | X | 0 | Round up (add one) | 13376954 / $R_F$ | |
| Step 1540b | 20 | 2 | 19 | 2 | 41 | 7 | 11 | 20 | 8 | 16 | 4 | 11 | 6 | 8 | 4 | 4 | 2 | 0 | 0 | 1 | Set Sign Flags | 13376954 / $R_F$ | +26.2031 |

1608: Approximates calculation of:
$(8\,{}^{1}/_{16} * 3\,{}^{1}/_{4}) + (8\,{}^{1}/_{5} * 3\,{}^{1}/_{7})$
Actual calculation is:
$(4115987/R_F * 1659157/R_F) + (1604460/R_F * 4186182/R_F) = 26533526 / R_F$
Where $R_F = 2^3 * 5 * 7 * 11 * 13 * 17 = 510510$

| | Extended Digits | | | | | | | Integer Range | | | | | Fractional range | | | | | | | Sign Flags | | | | |
|---|---|---|---|---|---|---|---|---|---|---|---|---|---|---|---|---|---|---|---|---|---|---|---|---|---|
| | 61 | 59 | 53 | 47 | 43 | 41 | 37 | 31 | 29 | 23 | 19 | 17 | 13 | 11 | 7 | 5 | 3 | 2 | | | | | 1580 | 1585 | 1590 |
| Figure 16C Control Step | $E_7$ | $E_6$ | $E_5$ | $E_4$ | $E_3$ | $E_2$ | $E_1$ | $I_4$ | $I_3$ | $I_2$ | $I_1$ | $F_7$ | $F_6$ | $F_5$ | $F_4$ | $F_3$ | $F_2$ | $F_1$ | SM | SV | Description | Machine Value | Interpreted Value |
| | | | | | | | | | Digit Modulus | | | | | | | | | | Mag | Valid | | | |
| Step 1602 | 12 | 29 | 7 | 9 | 27 | 38 | 33 | 24 | 17 | 22 | 17 | 15 | 5 | 7 | 1 | 2 | 2 | 1 | X | 0 | Operand A | 4115987 / $R_F$ | 8.0625 |
| Step 1602 | 18 | 18 | 45 | 10 | 2 | 10 | 3 | 6 | 9 | 6 | 1 | 8 | 6 | 5 | 3 | 2 | 1 | 1 | X | 0 | Operand B | 1659157 / $R_F$ | 3.25 |
| Step 1602 | 57 | 14 | 30 | 33 | 3 | 0 | 2 | 4 | 3 | 21 | 7 | 0 | 0 | 0 | 0 | 0 | 0 | 0 | X | 0 | Operand C | 4186182 / $R_F$ | 8.2 |
| Step 1602 | 38 | 14 | 44 | 21 | 1 | 7 | 29 | 24 | 6 | 3 | 5 | 0 | 0 | 0 | 0 | 0 | 0 | 0 | X | 0 | Operand D | 1604460 / $R_F$ | 3.1428 |
| Step 1606, 1610-1625 | 33 | 50 | 50 | 43 | 11 | 11 | 25 | 20 | 8 | 17 | 17 | 1 | 4 | 2 | 1 | 4 | 2 | 1 | X | 0 | Intermediate Product 1 | 6829068642959 | |
| Step 1630, 1610-1620 | 31 | 19 | 48 | 35 | 3 | 0 | 21 | 3 | 18 | 17 | 16 | 0 | 0 | 0 | 0 | 0 | 0 | 0 | X | 0 | Intermediate product 2 | 6716561571720 | |
| Step 1625, 1630 | 3 | 10 | 45 | 31 | 14 | 11 | 9 | 23 | 26 | 11 | 14 | 1 | 4 | 2 | 3 | 4 | 0 | 0 | X | 0 | Intermediate Sum of products | 13546630214679 | |
| Steps 1520, 1522, 1525 | 0 | 0 | 0 | 0 | 0 | 1 | 30 | 16 | 20 | 10 | 6 | 12 | 2 | 9 | 1 | 4 | 2 | 1 | X | 0 | Mixed Radix Equiv. (MRN) | 13546630214679 | |
| Step 1530 | 0 | 0 | 0 | 0 | 0 | 1 | 30 | 16 | 20 | 10 | 6 | 0 | 0 | 0 | 0 | 0 | 0 | 0 | X | 0 | Truncated MRN | 26533525 | |
| Step 1530 | 50 | 45 | 29 | 4 | 31 | 6 | 11 | 5 | 4 | 12 | 6 | 10 | 5 | 7 | 4 | 0 | - | - | X | 0 | Truncated MRN to RNS | 26533525 / $R_F$ | |
| Steps 1532, 1533 | 51 | 46 | 30 | 5 | 32 | 7 | 12 | 6 | 5 | 13 | 7 | 11 | 6 | 8 | 5 | 1 | 2 | 1 | X | 0 | Round up (add one) | 26533526 / $R_F$ | 366929 > (510510 / 2) |
| Step 1540b | 51 | 46 | 30 | 5 | 32 | 7 | 12 | 6 | 5 | 13 | 7 | 11 | 6 | 8 | 5 | 1 | 2 | 0 | 0 | 1 | Set Sign Flags | 26533526 / $R_F$ | +51.9745 |

| Register | Cycle 0 | Cycle 1 | Cycle 2 | Cycle 3 | Cycle 4 | Cycle 5 | Cycle 6 | Cycle 7 | Cycle 8 | Cycle 9 |
|---|---|---|---|---|---|---|---|---|---|---|
| 2080 → $M_0$ | 1 | 2 | 3 | 5 | 7 | 1 | 1 | 1 | 1 | 1 |
| 2081 → $M_1$ | 1 | 1 | 2 | 3 | 5 | 7 | 1 | 1 | 1 | 1 |
| 2082 → $M_2$ | 1 | 1 | 1 | 2 | 3 | 5 | 7 | 1 | 1 | 1 |
| 2083 → $M_3$ | 1 | 1 | 1 | 1 | 2 | 3 | 5 | 7 | 1 | 1 |
| 2084 → $A_0$ | 5 | A | E | 6 | A | A | A | A | A | A |
| 2085 → $C_1$ | 0 | 0 | 1 | 4 | 2 | 0 | 0 | 0 | 0 | 0 |
| 2086 → $A_1$ | 5 | 5 | A | F | F | B | B | B | B | B |
| 2087 → $C_2$ | 0 | 0 | 0 | 1 | 4 | 6 | 0 | 0 | 0 | 0 |
| 2088 → $A_2$ | 5 | 5 | 5 | A | F | F | F | F | F | F |
| 2089 → $C_3$ | 0 | 0 | 0 | 0 | 1 | 4 | 6 | 0 | 0 | 0 |
| 2090 → $A_3$ | 5 | 5 | 5 | 5 | A | F | F | F | F | F |
| 2091 → $C_4$ | 0 | 0 | 0 | 0 | 0 | 0 | 0 | 4 | 0 | 0 |
| 2092 → $A_4$ | 0 | 0 | 0 | 0 | 0 | 0 | 1 | 9 | 5 | 5 |
| 2093 → $C_5$ | 0 | 0 | 0 | 0 | 0 | 0 | 0 | 0 | 4 | 0 |
| 2094 → $A_5$ | 0 | 0 | 0 | 0 | 0 | 0 | 0 | 0 | 0 | 4 |

Example Apparatus Configuration:
Q = 4 bits (hex digits)
J = 4 digits (16 bits)
K = 2 digits (8 bits)
F = 4 RNS fractional digits
Clocks = J + K + F = 10

Round up Detection:
Since $FFBA_{16} > 8000_{16}$
Then round up = 1

Example Values:
Binary Input: $5555_{16}$
$(5555_{16}/10000_{16}) = .33333$
Output = $45_{16} = 69_{10}$
69 + 1 = 70
70/210 = .33333

Figure 20E

| Register | Cycle 0 | Cycle 1 | Cycle 2 | Cycle 3 | Cycle 4 | Cycle 5 | Cycle 6 | Cycle 7 | Cycle 8 |
|---|---|---|---|---|---|---|---|---|---|
| 2130 → $M_x$ | 0 | 7 | 5 | 3 | 2 | 1 | 1 | 1 | 1 |
| 2132 → $M_{x+1}$ | X | 0 | 7 | 5 | 3 | 2 | 1 | 1 | 1 |
| 2134 → $M_{x+2}$ | X | X | 0 | 7 | 5 | 3 | 2 | 1 | 1 |
| 2136 → $M_{x+3}$ | X | X | X | 0 | 7 | 5 | 3 | 2 | 1 |
| 2138 → $D_x$ | 4 | 5 | 1 | 2 | 0 | 0 | 0 | 0 | 0 |
| 2140 → $B_0$ | X | 4 | 1 | 6 | 4 | 8 | 8 | 8 | 8 |
| 2142 → $C_1$ | 0 | 0 | 2 | 0 | 1 | 0 | 0 | 0 | 0 |
| 2144 → $B_1$ | X | X | 0 | 2 | a | F | E | E | E |
| 2146 → $C_2$ | 0 | 0 | 0 | 0 | 0 | 0 | 1 | 0 | 0 |
| 2148 → $B_2$ | X | X | X | 0 | 0 | 0 | 1 | 3 | 3 |
| 2150 → $C_3$ | 0 | 0 | 0 | 0 | 0 | 0 | 0 | 0 | 0 |
| 2152 → $B_3$ | X | X | X | X | 0 | 0 | 0 | 0 | 0 |

2153

Example Apparatus Configuration:
- Q = 4 bits (hex digits)
- K = 4 digits (16 bits)
- F = 4 RNS fractional digits
- Clocks = K + F = 8

Example Values:
- Mixed Radix Input: 45120
- Mixed Radix Modulus = {2,3,5,7}
- Binary Output = $03E8_{16}$

Figure 21D

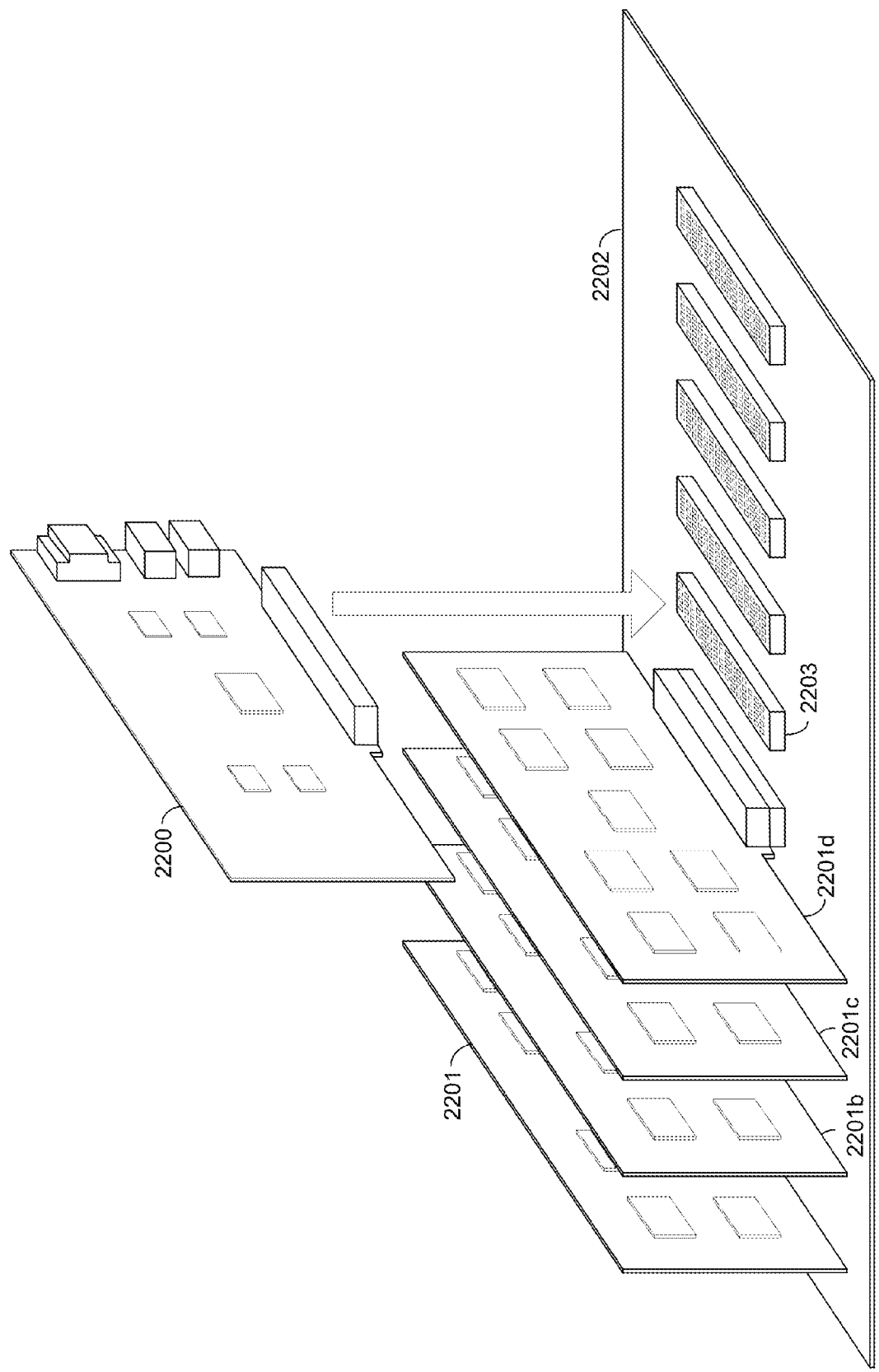

| Category | Neumonic | Operands | Notes |
|---|---|---|---|
| Arithmetic primitives | AddD | Dig# | (add digit to accumulator, operand is crossbar) |
| | SubD | Dig# | (subtract digit from accumulator, operand is crossbar) |
| | MultM | Dig# | (multiply accumulator by digit, operand is crossbar) |
| | ModdivM | Dig# | (divide accumulator by digit, operand is crossbar) |
| | AddW | Reg# | (add register word, operand is register file) |
| | SubW | Reg# | (subtract register word, operand is register file) |
| | MultW | Reg# | (multiply register word, operand is register file) |
| | ModdivW | Reg# | (ModDiv register word, operand is register file) |
| Power Digit Arithmetic primitives | AddPD | Dig#, Pwr | (optional) |
| | SubPD | Dig#, Pwr | (operand is crossbar, source digit is gated by Pwr) |
| | MultPD | Dig#, Pwr | (operand is crossbar, multiplier is modulus^Pwr) |
| | ModdivPM | Dig#, Pwr | (operand is crossbar, divisor is base modulus^Pwr) |
| | ResPower | | |
| Power Digit Arithmetic primitives (digit) | DecPower | Dig#, N | |
| | GetPower | Reg#, Dig# | (return the power of the selected digit) |
| | SetPower | Dig#, Reg# | (set power of the selected digit) |
| | Truncate | Dig# | (truncate digit based upon leadig zeros) |
| | GetTrunc | Reg#, Dig# | (get the truncation value, and store in reg) |
| | SetTrunc | Dig#, Reg# | (set truncation from register) |
| LIFO Based Arithmetic Primitives | PopAdd | | (pops operand from LIFO to crossbar, adds to accum) |
| | SubPush | Dig# | (gate digit to crossbar, subtract, push to LIFO) |
| | PopMult | | (pops operand from LIFO to crossbar, adds to accum) |
| | DivPush | Dig# | (gate modulus to crossbar, multiply, push to LIFO) |
| Move, Set and Clear Operations | LoadD | Reg#, Dig# | (load register with digit value) |
| | LoadD | Dig#, Reg# | (store digit value to register) |
| | LoadW | A, Reg# | (load the accumulator from register location) |
| | LoadW | Reg#, A | (store the accumulator at some register location) |
| | LoadW | Hold#, Reg# | (load holding register from register) |
| | SetSkip | Dig# | (set digit as skipped) |
| | Clear | A | (clear the accumulator) |
| | ClearSkips | | (clear all skip digit flags) |
| | SetSign | N/P | (set sign of the accumulator) |
| | SetSignValid | T/F | (set sign valid of the accumulator) |
| Digit and Sign Extension | BaseExtend | A | Base extend all skipped digits |
| | SignExtl | A | Sign extend the accumulator (integer) |

Figure 22D

| Operations Category | Operation/operand |
|---|---|
| LUT Select Function | a. ADD |
| | b. SUB |
| | c. MULTIPLY |
| | d. DIVISION |
| Digit Validation operations | a. Set Skip Flag @ digit |
| | b. Clear all skips (all digits) |
| | c. Decrement Power Valid count @ Digit |
| | d. Restore Power Valid Count (all digits) |
| | e. Set or truncate Power Valid Count |
| Crossbar Gate Enabled and LUT Operand Select | a. Gate to crossbar |
| |    i) Accumulator to crossbar |
| |    ii) Holding register to crossbar x N |
| |    iii) Register to crossbar |
| | b. Select LUT operand: |
| |    i) Crossbar |
| |    ii) Register File |
| Register File Read and Write Control | a. Read Register @ Location (all digits) |
| | b. Write Register @ Location (all digits) |
| | c. Read Register @ Location @ Digit |
| | d. Write Register @ Location @ Digit |
| Register Loading and Moving | a. Load Accumulator from LUT result |
| | b. Load Accumulator from Register File |
| | c. Latch Accumulator to Register File |
| | b. Latch Holding Register x N from Register File |
| | c. Latch Compare Register from Register File |
| Status Signals and Flags | a. All Digits Zero |
| | b. All Digits one |
| | c. Zero @ digit |
| | d. A/B comparator all set EQUAL |
| | e. A/B comparator set =, >, or < @ Digit |
| | f. Local comparator all set EQUAL |
| | g. Local comparator set =, >, < @ Digit |
| | h. Skip Digit @ Digit |
| | i. Power Valid count @ Digit |

Figure 22E

| Category | Basic Arithmetic Instructions | Operands |
|---|---|---|
| Add | Add | <integer>,<integer> |
| | Add | <fixfraction>,<fixfraction> |
| | Add | <fixfraction>,<integer> |
| | Add | <slptfraction>,<slptfraction> |
| | | |
| Subtract | Sub | <integer>,<integer> |
| | Sub | <fixfraction>,<fixfraction> |
| | Sub | <fixfraction>,<integer> |
| | Sub | <slptfraction>,<slptfraction> |
| | | |
| Multiply | Mult | <integer>,<integer> |
| | Mult | <fixfraction>,<fixfraction> |
| | Mult | <slptfraction>,<slptfraction> |
| | Mult | <fixfraction>,<integer> |
| | | |
| Divide | Div | <integer>,<integer> |
| | Div | <fixfraction>,<fixfraction> |
| | Div | <fixfraction>,<integer> |
| | Div | <slptfraction>,<slptfraction> |
| | | |
| Invert | Inv | <fixfraction>,<integer> |
| | Inv | <fixfraction> |
| | Inv | <slptfraction> |
| | | |
| Compare | Cmp | <integer>,<integer> |
| | Cmp | <integer>,<constant> |
| | Cmp | <fixfraction>,<fixfraction> |
| | Cmp | <fixfraction>,<integer> |
| | Cmp | <fixfraction>,<ffconstant> |
| | | |
| Convert | Cvt | <fixfraction>,<integer> (opt) |
| | Cvt | <fixfraction>,<slptfraction> |
| | Cvt | <constant>,<integer> |
| | Cvt | <ffconstant>,<fixfraction> |
| | Cvt | <slptconstant>,<slptfraction> |
| | | |
| Sign Extend | Ext | <integer> |
| | Ext | <fixfraction> |
| | Ext | <slptfraction> |

Figure 22F

| Category | Symbol/Neumonic | Operand(s) | Returns | Description |
|---|---|---|---|---|
| Digit based Status Micro-operation | ZeroD | Digit_# | True/False | Tests if the selected digit is zero |
| | ZeroPwrD | Digit_# | Power_valid_cnt | Tests if the selected power based digit has a (LSB) zero(s) |
| | CompD | Hold_Reg#, Digit_# | >, <, =, END | Returns the result of a digit comparison with digit compare 1 |
| | IsSkip | Digit_# | True/False | Tests if the selected digit is skipped |
| | GetPower | Digit_# | N | Returns the current power of the selected power based digit |
| Word Based Status micro-operation | Equal1W | | True/False | Returns true if all non-skipped digit accumulators match compare 1 |
| | Equal2W | | True/False | Returns true if all non-skipped digit accumulators match compare 2 |
| | ZeroW | | True/False | Returns true if all non-skipped digits are zero, else false. |
| | OneW | | True/False | Returns true if all non-skipped digits are one, else false. |
| | IsSignValid | | True/False | Returns true if the accumulator sign is value, else false. |
| | GetSign | | Negative/Positive | Returns the value of the accumulator sign magnitude flag. |
| | AnyZero | | Digit_# | Returns first digit# of any non-skipped digit equal to zero, else false. |
| | DivByZero | | True/False | Set to True if the ALU attempts a divide by zero. |

Figure 22G

| Range Description | Range Symbol | Range Equation | Decimal Range | RNS Digits | Equivalent binary bits |
|---|---|---|---|---|---|
| Fractional Range | $R_F$ | 2*3*5*7*11*13*17 | 510510 | 7 | 18.96 |
| Integer range | $R_W$ | 19*23*29*31 | 392863 | 4 | 18.58 |
| Usable range | $R_Y$ | $R_F * R_W$ | 2.0056E+11 | 11 | 37.55 |
| Usable range² | $R_Y^2$ | $R_Y * R_Y$ | 4.02245E+22 | N/A | 75.09 |
| Positive range | $R_P$ | $R_Y / 2$ | 1.0028E+11 | 11 | 36.55 |
| Positive range² | $R_P^2$ | $(R_Y / 2)^2$ | 1.00561E+22 | N/A | 73.09 |
| Extended range | $R_E$ | 37*41*43*47*53*59*61 | 5.84803E+11 | 7 | 39.09 |
| Machine range | $R_M$ | $R_F * R_W * R_E$ | 1.17288E+23 | 18 | 76.63 |
| Unity² | $R_F^2$ | $R_F * R_F$ | 2.6062E+11 | N/A | 37.92 |
| MAC range | $R_{MAC}$ | $R_Y^2 + (R_F * R_Y)$ | 4.02246E+22 | N/A | 75.09 |
| Operand width | Q | $\|\log_2(61)\|+1$ | 6 | N/A | 6.00 |

Figure 22H

PRODUCT SUMMATION APPARATUS FOR A RESIDUE NUMBER ARITHMETIC LOGIC UNIT

CROSS-REFERENCE TO RELATED APPLICATION

This application is a continuation of U.S. patent application Ser. No. 13/475,979, filed May 19, 2012.

BACKGROUND OF THE INVENTION

1. Field of the Invention

The invention relates to general purpose arithmetic logic units (ALUs), and in particular to an ALU utilizing a residue number system in performing arithmetic operations.

2. Related Art

The binary number system is the most widely used number system for implementing digital logic, arithmetic logic units (ALU) and central processing units (CPU). Binary based computers can be used to solve and process mathematical problems, where such calculations are performed in the binary number system. Moreover, an enhanced binary arithmetic unit, called a floating point unit, enhances the binary computers ability to solve mathematical problems of interest, and has become the standard for most arithmetic processing in science and industry.

However, certain problems exist which are not easily processed using binary computers and floating point units. One such class of problems involves manipulating and processing very large numbers. One example is plotting the Mandelbrot fractal at very high magnification. In order to plot the Mandelbrot fractal at high magnifications, a very long data word is required. Ideally, the Mandelbrot fractal plotting problem necessitates a computer with an extendable word size.

The main issue is that any real computer must be finite in size, and consequently the computer word size must be fixed at some limit. However, closer analysis reveals other contributing problems. One such problem is the propagation of "carry" bits during certain operations, such as addition and multiplication. Carry propagation often limits the speed at which an ALU can operate, since the wider the data word, the greater the path for which carry bits are propagated. Computer engineers have helped to reduce the effect of carry by developing carry look-ahead circuitry, thereby minimizing, but not eliminating, the effects of carry.

However, even the solution of implementing look-ahead carry circuits introduces its own limitations. One limitation is that look-ahead carry circuits are generally dedicated to the ALU for which they are embedded, and are generally optimized for a given data width. This works fine as long as the CPU word size is adequate for the problems of interest. However, once a problem is presented which requires a larger data width, the CPU is no longer capable of using its native data and instruction formats for direct processing of the larger data width.

In this case, computer software is often used to perform calculations on larger data widths by breaking up the data into smaller data widths. The smaller data widths are then processed by the CPU's native instruction set. In the prior art, software libraries have been written specifically for this purpose. Such libraries are often referred to as "arbitrary precision" math libraries. Specific examples include the arbitrary precision library from the GNU organization, and the high precision arithmetic library by Ivano Primi.

However, software approaches to processing very large data widths have significant performance problems, especially as the processed data width increases. The problem is that software processing techniques tend to treat the smaller data widths as digits, and digit by digit processing leads to a polynomial increase in execution time as the number of digits increases. In one example, an arbitrary precision software routine may take four times as much time to execute when the data width is doubled. When using arbitrary precision software solutions, the amount of processing time often becomes impractical.

One possible solution is to build a computer which is not based on binary arithmetic, and which does not require carry propagation logic. One candidate number system is the residue number system (RNS). Residue number addition, subtraction and multiplication do not require carry, and therefore do not require carry logic. Therefore, it is possible that RNS addition, subtraction and multiplication be very fast, despite the word size of the ALU. These facts have provided some interest for RNS based digital systems in the prior art; unfortunately, prior art RNS based systems are only partially realized, and have failed to match the general applicability of binary based systems in essentially every instance. This fact is evident from the lack of practical RNS based systems in the current state of the art.

The reasons for the failure of RNS based systems to displace binary systems are many. Fundamental logic operations, such as comparison and sign extension, are more complex in RNS systems than traditional binary systems, and require more logic circuitry and execution time. For many experts, it is often assumed the difficulty of RNS comparison, RNS to binary conversion, and RNS sign and digit extension make RNS based processors and ALUs impractical for general purpose processing.

In addition to the problems noted above, the lack of a practical RNS integer divide further restricts the applicability of RNS based systems of the prior art. Also, the lack of general purpose fractional number processing has (severely) restricted the usefulness of RNS based digital systems of the prior art. In summary, prior art RNS systems cannot process numbers in a general purpose manner, and this has relegated such systems to little more than research subjects.

SOME NEEDS OF THE PRESENT INVENTION

The method and apparatus disclosed herein provide a general purpose RNS arithmetic logic unit (ALU). The new RNS ALU addresses the many issues confronted and exposed in the prior art. The RNS ALU of the present invention is extensible, and provides a solution to the time complexity problem involving arithmetic processing of very wide data. For very long data widths, the RNS ALU may outperform many prior art binary systems.

In terms of general purpose processing, the RNS ALU provides performance advantages over very wide width binary systems, even if such binary systems exhibit a run time that is linear with respect to increasing bits (resolution). The reason is the RNS ALU can complete many operations in near constant time, such as adding, subtracting, and multiplying integers. The RNS ALU can also add and subtract fractional values in constant time, as well as multiply integers by fractions in near constant time. Therefore, if the problem of interest can take advantage of such single clock operations, the RNS ALU may provide results faster than an equivalent binary system, which must handle carry for all arithmetic operations of all data formats.

It is anticipated that the RNS ALU of the present invention find application in problems involving very large numbers, such as encryption and decryption. Other example applications are found in research, such as prime number searching and fractal analysis. Often, these applications involve very long word lengths, including binary word widths greater than 1024 bits. When dealing with very long word widths, numbers are broken down to smaller chunks for processing, and therefore arithmetic operations are processed digit by digit. In this context, the RNS ALU can effectively compete with binary systems, since RNS operations do not require carry.

The method and apparatus of the present invention is also applicable to fractal analysis. For example, consider the case of the analysis of the Mandelbrot set, or Mandelbrot fractal. In order to observe the fractal at increasingly greater magnification, the processing system requires increasingly greater numeric resolution. If one uses a standard binary floating point unit, there comes a point during magnification of the fractal image for which the floating point unit will be unable to render the fractal. In this case, a larger word size is needed, as well as the required operations of fractional multiplication, addition and compare on the larger word size.

The method and apparatus of the present invention can be used to create a very wide word ALU. The ALU will support fractional multiplication and addition of very long word values at theoretically greater speed then would be the case if a conventional binary floating point unit was extended to support the same word size.

The method of the present invention provides an ALU apparatus with superior fractional representation. The fractional representation of the RNS ALU provides many more denominators than does a binary representation covering the (approximately) same range. This provides more accurate representation of many more commonly used ratios. This high precision of the RNS ALU competes favorably with the precision of many binary formats, including extended precision floating point (when comparisons are made of ALUs of approximately the same effective word width).

In addition, the RNS ALU of the enclosed invention is very fast. For example, the theoretical performance of the RNS fractional multiply of the enclosed invention is approximately linear with respect to the number of equivalent binary bits (wide) of the data processed. This relation accounts for the increase in memory table lookup time as the binary width of the most significant digits increase. In practice, the performance of the RNS fractional multiply is closer to n/log(P), where n is the effective word width in bits, and P is the equivalent number of RNS digits.

Interestingly, if look-up table speed is assumed to be fixed, and other basic assumptions are made, the theoretical time for RNS fractional multiply is better than linear. This assumption is particularly valid within intervals for which a given (binary) look-up table supports a plurality of digit modules; for example, a look-up table supporting 8 bit wide operands supports up to 54 RNS digits, whereas a lookup table supporting 9 bit operands supports up to 97 RNS digits. The difference in supported digits is 97−54=43 digits. Therefore, assuming 9 bit look-up tables (LUT) are employed, up to 43 digits worth of number extension is possible without any increase in LUT size or speed. It should be noted this analysis compares "equivalent binary width", and not RNS digit length. When using conventional memory to support look-up tables, higher density memory is also faster; therefore, the assumption of a fixed delay look-up table holds as long as this technology trend and the system memory requirements match.

In terms of RNS digit length, the time complexity analysis for fractional multiply versus RNS digit length is linear, again assuming a fixed LUT speed.

The performance of the RNS ALU compares favorably with binary processing systems, which may exhibit a polynomial increase in processing time with respect to an increasing number of bits (wide) of the data. For the multiply and divide operations, the RNS ALU will typically exceed the performance of a similarly sized (wide) binary ALU at some given data width. The point of crossover is to be determined based on actual implementations and technologies. For many types of arithmetic calculations, and in many cases, the RNS ALU will significantly outperform an equivalently sized binary ALU. For integer operations of addition, subtraction and multiplication, the RNS ALU theoretically outperforms the binary ALU at any bit width. In practice, the actual performance depends on many other real world factors, such as implementation technology and circuit topology.

Additionally, the sliding point operation of the RNS fractional multiplication supports a novel implementation of Goldschmidt division and Newton-Raphson reciprocal. The Newton reciprocal algorithm provides quadratic convergence, and is ideally suited for systems requiring fast division of fractional quantities. Using the fractional multiplication method to implement either the Goldschmidt or the Newton-Raphson technique provides a very fast division for fractional RNS values. (It should be noted the RNS integer division method of the present invention may also be used achieve fractional division without using Newton-Raphson or Goldschmidt).

The analysis and discussion above does not include the time to convert results back to binary, and this is partially justified. Some problems suitable for the method and apparatus of the present invention will require many iterative calculations to be performed. Using the apparatus and methods of the present invention, this will be accomplished entirely in RNS format. Once the final arithmetic result is ready, it is converted to binary. If the conversion time of the final result can be neglected, then the RNS multiplier's better than linear performance with respect to the number of binary digits may be realized. Furthermore, in the case of the Mandelbrot fractal problem, the results of repetitive calculation may only be a "yes" or "no" answer, which does not require conversion back to binary. In yet another case, if allowable, RNS results may be truncated, and converted with less resolution to shorten conversion time.

However, many arithmetic problems will not require repetitive calculations on one set of values, such as calculations involving matrixes. In this case, the speed of converting RNS results back to binary is more significant. Fortunately, the method of the present invention includes a new and unique apparatus for high speed conversion of RNS values to binary. The performance of the RNS to binary conversion is approximately linear with respect to RNS digits, given the assumption that LUT access time is fixed. Using the methods of the present invention, conversion of RNS to binary is on the order of the time required to perform a fractional RNS multiplication, and is therefore practical. Moreover, the conversion apparatus and method is extensible, and does not suffer from increasing carry propagation delay as data width is increased. Equally important is the fact the novel conversion apparatus is extendable to a pipelined architecture, capable of performing a conversion every clock cycle.

Another need and advantage of the disclosed invention is its potential application to other forms of computational processing. For example, optical computers may benefit from digit by digit isolation due to their large size; therefore, the method of the present invention is ideal. Additionally, new technologies, such as optical computing and quantum computing, can use the method of the present invention to perform digital arithmetic operations using hardware which has more states than Boolean logic, i.e., more than two states.

In hindsight, RNS systems have numerous embodiments and alternate methods that can be employed and exploited; therefore, in foresight, it is anticipated the ALU of the present invention be a new fundamental baseline, and therefore be further modified and enhanced in the future.

SUMMARY OF THE INVENTION

A complete and well rounded residue based ALU is defined herein. This ALU allows complete arithmetic processing of both integer and fractional values in residue number format. The ALU can operate on residue numbers directly, providing a result directly in residue number format. The ALU can compare residue numbers directly, and perform branching as a result of a residue compare operation. The ALU is extensible; that is, extending the word size of the ALU is straightforward. The ALU also provides conversion instructions for converting RNS to binary and binary to RNS, thereby transferring processed data to and from the I/O or host computer system.

This disclosure includes four parts. The first part discloses an integer Arithmetic Logic Unit (ALU) which operates on operands in a residue number format representing integers. The second part discloses a fractional ALU which operates on operands in a residue format representing fractional values. The two ALUs are combined together with additional special functions, such as compare, negate, and sign extend. The resultant ALU is capable of general purpose number processing. The resulting ALU may be used in novel and un-expected ways to increase arithmetic processing performance. For example, a sum of products algorithm is contemplated which essentially performs in the same amount of time as a single multiply plus a clock cycle for each product term, regardless of data width.

The third part discusses conversion of binary to RNS, and more importantly, RNS to binary. The applicability of the present invention is greatly enhanced by the addition of a fast RNS to binary conversion apparatus. Without it, conversion rates may approach $O(n^2)$, thereby restricting the usefulness of the ALU. The fourth part discusses an actual RNS ALU called Rez-1, and some of the important criteria and implications of its design.

Included with the integer ALU is a method and apparatus for dividing any two integers represented in residue number format, and providing a resultant quotient and remainder in residue number format. The method and apparatus of the enclosed invention may be extended to support numbers of any size or magnitude. Additionally, several key and novel features are disclosed which enhance the execution speed of the integer RNS division method.

The RNS based ALU supports the basic arithmetic operations, such as addition, subtraction, multiplication and division. Furthermore, complex RNS operations, such as digit extension and number comparison, are supported in a practical and extensible manner. Signed values, sign detection and sign extension are supported. The integer division method disclosed also provides a basis for supporting an efficient fractional RNS representation, including the associated operations of converting to and from RNS fractional representations, also defined herein.

Included within the fractional ALU is a new method and novel apparatus for multiplying any two arbitrary RNS values in fractional RNS format. Like its integer counterpart, the fractional RNS ALU supports addition, subtraction, multiplication and division of arbitrary fractional values. The fractional RNS ALU also supports mixed format operations, such as addition, subtraction, multiplication and division of a fractional value by an integer value.

The fractional RNS ALU supports at least two types of fractional representations, 1) fixed fractional resolution, i.e., "fixed point", and 2) variable fractional resolution, i.e., "Sliding Point" RNS values. Furthermore, the fractional RNS ALU supports fractional number comparison, sign extension, digit extension, and operation with signed values.

RNS ALU Background

To facilitate the disclosure of the many innovations and inventions to follow, it is necessary to introduce a basic structure for one embodiment of the RNS ALU. One such basic structure is herein referred to as a "dual ALU, digit slice RNS architecture".

As a brief review, the following figures are provided to establish a foundation and enhance the understanding of the dual ALU, digit slice RNS architecture. Prior art concepts are included to help the reader gain a basic understanding.

In 1945, John Von Neumann helped to clarify fundamental concepts of digital computer apparatus. In his publication, a basic arithmetic logic unit (ALU) was proposed. Today, an ALU is often depicted using a "V" shaped symbol 100, as shown in FIG. 1A. The basic ALU accepts up to two data operands, A 110 and B 111, as inputs. The ALU is instructed to perform a specific arithmetic operation using a control input 113. Example operations include addition, subtraction and multiplication. In response to the control input 113, the ALU outputs an arithmetic result 112. In addition, the ALU may also output an operation result status 114, such as overflow on result or zero on result.

In FIG. 1B, the ALU of FIG. 1A is expanded on by adding an accumulator 101 and a registered operand 102. The accumulator 101 is provided to store the output 112 of the ALU 100. The registered operand 102 is provided to store the operand until the ALU is ready. In FIG. 1B, a special data path 103 is provided which routes the accumulator value (output) back to be used as an operand of the ALU. This data path gives meaning to the term accumulator, since the value in the accumulator can be accumulated, or continually summed with operands, for example.

In FIG. 1C, the ALU of FIGS. 1A and 1B is advanced by the addition of a register file 102. The register file allows a plurality of operands to be stored, via a plurality of registers, and each accessed as an operand to the ALU 100. The data path 103b feeding back from the accumulator 101 to the input of the register file 102 indicates the result of the accumulator may be stored in any selected register in the register file.

FIG. 1D advances the previous concepts by combining two such ALU structures into one. In FIG. 1D, a pair of ALUs is illustrated, ALU A 100A and ALU B 100B. Also, two accumulators are provided, accumulator A 101A and accumulator B 101B. While most everything is duplicated, register file 102 is shared. The shared register file means that both ALU A and ALU B may access items contained in the register file. Also, each ALU may write its accumulator to the register file, provided they don't write to the same register at the same time.

In FIG. 1E, both ALU symbols are grouped using a block diagram 301, and then in FIG. 1F, the ALU symbols are replaced with a dual port look up table (LUT) 301. The LUT 301 is commonly implemented as random access memory (RAM), and is shown as being dual ported, a common resource in modern field programmable gate arrays (FPGA's) and very large scale integration (VLSI) integrated circuits. Since the RAM is dual ported, it may be shared between the two ALUs. The LUT table performs arithmetic functions by routing the operands into the LUT address inputs. The correct result is contained in the resulting addressed location, and is output to the accumulator 101a and 101b. Each ALU may access different locations of the LUT 301 simultaneously, and therefore operate independently.

One subtle detail of FIG. 1F is the "digit accumulator". Because of the nature of RNS numbers, each digit may be operated on independently of the others, and therefore each digit may support its own ALU, or "digit ALU". This differs from the concept of an N bit binary ALU, for example, which is usually thought of as having a single ALU operating on operands of N bits wide. The RNS computer architecture dividing an ALU into digit groups is herein referred to as "digit slice architecture", since each digit slice includes its own set of ALU logic circuitry, and since each digit slice may be cascaded to form a wider ALU. FIG. 1G illustrates a plurality of such digit ALUs, which taken together represents a P digit sized RNS ALU.

RNS ALU Overview

One basic RNS ALU structure of the present invention is surprisingly simple given it can support nearly all RNS operations. FIG. 2A illustrates this basic structure using an ALU with P number of digits. As shown in FIG. 2A, a control unit 200 is coupled to a plurality of digit slice ALU's 215, 210, & 205. The control unit coordinates the primitive operations within and between each digit slice ALU to perform the desired function(s). This is analogous to microcode within a binary CPU, which coordinates the required primitive operations for each machine instruction. Operations within the RNS ALU may occur for all digits simultaneously, and may also occur in sequence, in a digit by digit fashion.

In the prior art, basic binary ALUs are based upon simplicity and economy. For example, it is common that a binary ALU be fed data from two registers. It is common that one of the registers is an accumulator, and the other register is selected from a set of general purpose registers. After the binary ALU performs an arithmetic operation, such as addition, the result of the operation is stored in the accumulator. The RNS ALU of the present invention supports a similar structure, but with several key modifications.

In one embodiment, the RNS ALU of the present invention supports a dual accumulator. This architecture is advantageous for several reasons. For one, some basic RNS operations, such as compare and divide, require two RNS numbers to be processed in parallel. Another advantage of a dual accumulator RNS architecture is that logic function Look-Up Tables (LUTs) can be stored in dual port memory, a common resource in modern FPGA's. Therefore, the RNS ALU may share the same memory LUT between both accumulators in a single digit wide function block. Both accumulators will also share the same modulus (p).

A dual ALU digit slice shares common resources but operates on two digits in an independent manner. Another way to visualize the dual ALU is simply two independent RNS ALU's operating side by side. A dual RNS ALU enhances performance while conserving critical hardware resources. In one embodiment, the method and apparatus of the present invention utilizes a dual accumulator ALU to enhance the performance and efficiency of critical operations. It should be noted that a single ALU structure is also possible, as is a quad ALU using quad port memory, for example.

Digit Slice Architecture

The ALU of the present invention is extensible. By adding successive ALU digits with unique (pair-wise prime) modulus p, the overall ALU word size can be increased without affecting the general architecture. In one embodiment of the present invention, and as shown in FIG. 2A, a "digit slice" ALU architecture is employed.

With respect to binary based systems, digit slice architectures are not new in the prior art. For example, binary processors have been organized as bit-slice processors, such as the Texas Instruments SN74AS888 integrated circuit (IC) device. In this device, the processor is organized as eight bit slices; these 8 bit slice ICs can be cascaded to create a processor having any desired data width.

With respect to RNS based systems, the digit slice architecture is a new concept. The concept implies the ALU can be extended by adding additional digits to the word size. It also implies that each digit is separated from each other by the fact each digit is contained in its own "digit ALU". In one embodiment of the RNS ALU of the present invention, a new and novel RNS based digit slice architecture is contemplated, and is herein referred to as a "digit slice" RNS architecture.

In the prior art, binary bit slice ALU architectures fell out of favor when ALU design techniques were developed that were not suitable for bit slice architectures. Much of the reasoning behind this has to do with handling carry logic in a more efficient manner, i.e. all within a single IC chip. However, residue number arithmetic does not require carry, and hence, the digit slice architecture is well suited for the implementation of the present invention. It should be noted that other embodiments for the present invention exist, and that the present invention is not limited to the digit slice architecture.

The digit slice architecture for an RNS ALU of the present invention also differs from prior art binary systems. For one, each RNS digit slice must support a unique pair-wise prime modulus. As shown in FIG. 2A, within the RNS digit slice architecture, each digit slice 215, 210, 205 is essentially its own "mini ALU". Each digit ALU modulus must be pair-wise prime with respect to one another, which implies that each LUT of each digit ALU support a different modulus, p. For example, the digit slice ALU 215 supports a modulus of p=2, while the digit slice ALU 210 supports a modulus of p=3.

In one embodiment of the ALU, as shown in FIG. 2A, a common data bus 319 is connected to each digit slice 215, 210, 205. The common data bus 319 allows the controller 200 to inspect the contents of any digit slice 215, 210, 205. The common data bus 319 routes the data from any one digit ALU to all other digit ALUs. While this may seem similar to carry logic, it is not. The routed data is transmitted to each digit slice at once, and without waiting for the results of any particular digit to complete and propagate. In another embodiment, multiple data paths 319, 318 are present to increase bandwidth, and facilitate other design objectives such as a dual accumulator architecture.

In the embodiment shown in FIG. 2A, an ALU control system 200 coordinates the functions of all RNS digits, one such digit 215 having the modulus p=2. Each digit incorporates the necessary LUT functions for modulo addition, subtraction, multiplication, and division (i.e., inverse multiplication). These operations are fundamental building blocks for all other operations. Hence, RNS addition, subtraction and multiplication can be completed with a single LUT access within each digit ALU simultaneously. These RNS operations are fast and can complete in one clock cycle.

In contrast, operations such as RNS comparison, base extension, and arbitrary division will consist of a series of operations within the ALU, such operations generally requiring multiple and sequential LUT accesses. In FIG. 2A, a micro-coded control system 200 processes data within the ALU to perform complex operations, such as RNS compare, digit extension, and division. These operations are essentially digit by digit, and are hence regarded as slow operations.

These operations may be invoked with a machine instruction, or they are incorporated as low level operations in other RNS ALU machine instructions.

Overview Summary

The RNS ALU of the present invention is unique, as it allows general purpose arithmetic processing in RNS representation. In one embodiment, enhanced digit-slice architecture is employed. Additionally, the digit-slice architecture is beneficial for explaining the unique and novel control methods of the present invention. This disclosure will return to the discussion of the digit slice architecture and its associated control methods later; however, next, we will provide a broader understanding of the present invention, and how it relates to its practical use and need.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 7B is a block diagram illustrating exemplary RNS to mixed radix conversion using a LIFO;

FIG. 8B is a block diagram illustrating exemplary mixed radix to RNS conversion using LIFO;

FIG. 9B is a block diagram illustrating an exemplary RNS value to RNS value comparison;

FIG. 10B is a block diagram illustrating exemplary base extension using LIFO;

FIG. 13B is a block diagram illustrating an exemplary RNS integer divide number sequence;

FIG. 13C is a block diagram illustrating an exemplary RNS integer divide number sequence with power based modulus;

FIG. 13D is a block diagram illustrating an exemplary RNS integer divide number sequence with power based modulus and advanced delayed extension;

FIG. 14A is a block diagram illustrating exemplary addition of two fixed point RNS numbers represented exactly;

FIG. 14B is a block diagram illustrating exemplary addition of two fixed point RNS numbers represented approximately;

FIG. 14C is a block diagram illustrating exemplary addition of two fixed point RNS numbers, each number containing a whole part and a fractional part;

FIG. 15E is a block diagram illustrating exemplary range definitions for fractional multiplication;

FIG. 15F is a block diagram illustrating an exemplary fractional multiplication with truncation rounding;

FIG. 15G is a block diagram illustrating an exemplary fractional multiplication with round up;

FIG. 16B is a block diagram illustrating an exemplary fractional multiply accumulate;

FIG. 16D is a block diagram illustrating an exemplary sum of fractional products;

FIG. 18C is a block diagram illustrating exemplary sliding point fractional scaling;

FIG. 18D is a block diagram illustrating exemplary sliding point fractional scaling;

FIG. 20E is a block diagram illustrating exemplary binary to RNS pre-scalar timing and value propagation;

FIG. 21D is a block diagram illustrating exemplary RNS to binary timing and value propagation;

FIG. 22A is a perspective view of an exemplary backplane, controller card, and digit cards;

FIG. 22D is a list of RNS ALU micro-coded operations.

FIG. 22E is a list of RNS ALU low level hardware operations;

FIG. 22F is a list of RNS ALU machine instructions;

FIG. 22G is a list of RNS ALU micro-coded status test operations;

FIG. 22H is a list of RNS ALU value ranges;

DETAILED DESCRIPTION OF THE PREFERRED EMBODIMENTS

RNS ALU Introduction

Figure 4A:
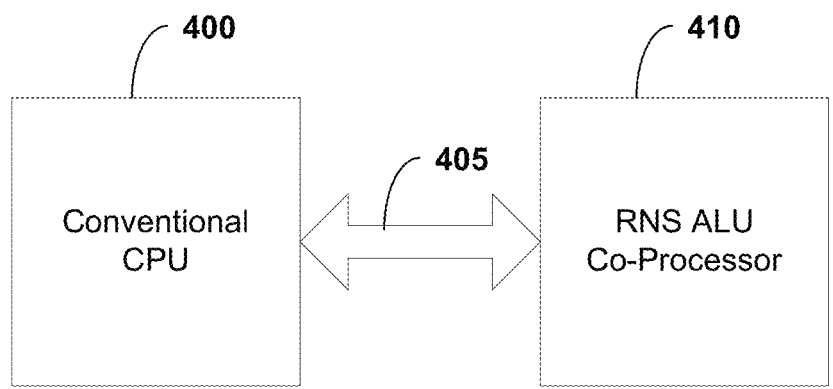
FIG. 4A is a block diagram illustrating an exemplary environment of use for a RNS ALU co-processor.

In one embodiment, as shown in FIG. 4A, the RNS ALU 410 serves as a math co-processor for a conventional binary CPU 400. A data path 405 connects the conventional CPU to the RNS ALU to transfer data and/or instructions between the two subsystems. The application of an RNS ALU co-processor serves to capitalize on the advantages of the RNS system, but uses a binary CPU for more conventional tasks, such as driving I/O, and performing other required control and processing activities. The diagram of FIG. 4A is expanded in FIG. 4B to illustrate this organization.

Figure 4B:
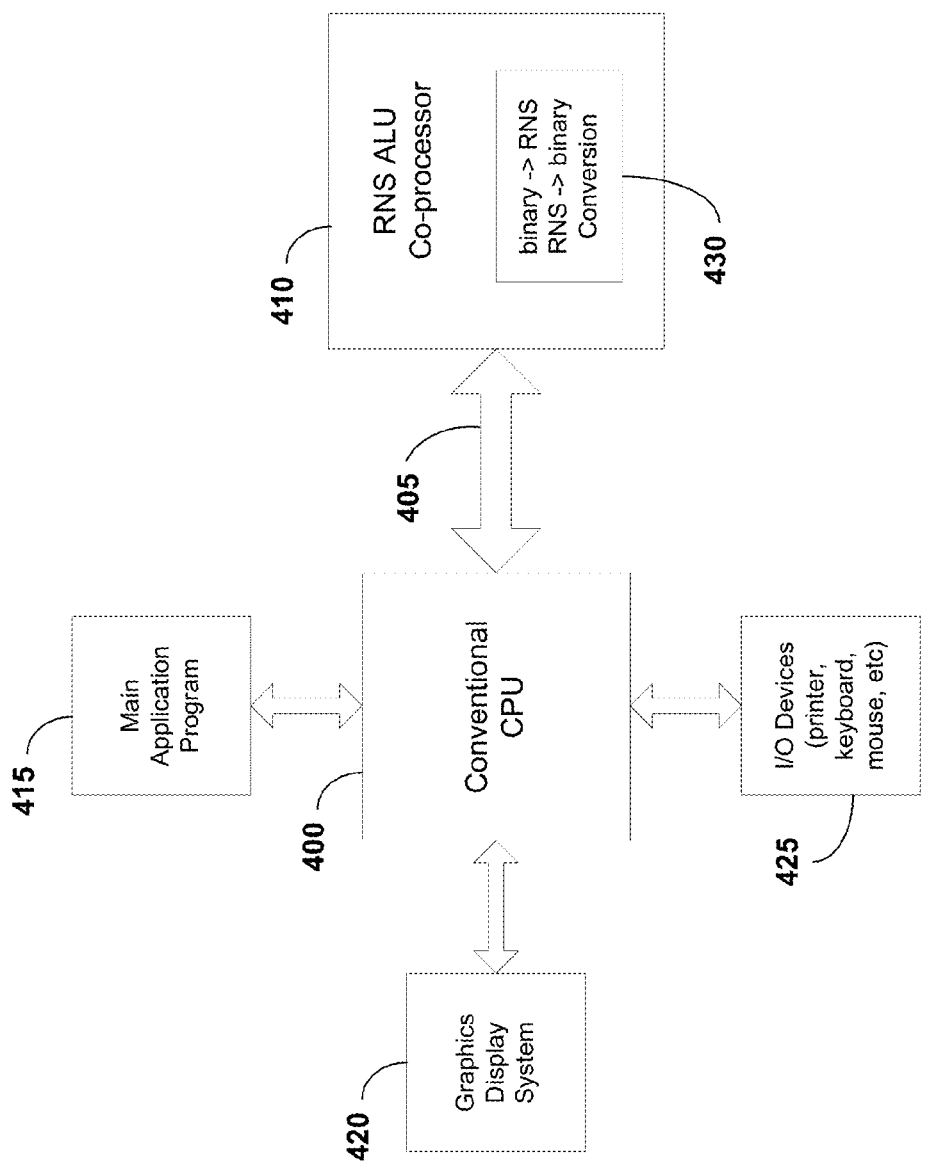
FIG. 4B is a block diagram illustrating an exemplary environment of use for a RNS ALU co-processor.

In FIG. 4B, the conventional CPU 400 is shown performing a basic computer host role; it drives the main system I/O, including a graphics display subsystem 420 and keyboard and mouse 425. The conventional CPU is also tasked with executing the main application program 415, which helps to coordinate the activities of the user interface and the results of the RNS ALU 410.

Shown in FIG. 4B is a conversion function 430 contained within (or alongside) the RNS ALU. The conversion of binary to RNS and RNS to binary is performed mainly by RNS calculations and optionally special hardware. The reason is that the word lengths are very long, and the standard CPU is at a disadvantage in terms of the required calculations. Therefore, in one preferred embodiment, the conversion calculations are performed on the RNS side of the system. This arrangement mirrors that of conversion from decimal to binary and binary to decimal in conventional computers; in most cases, this conversion is made using binary calculations.

Figure 4C:
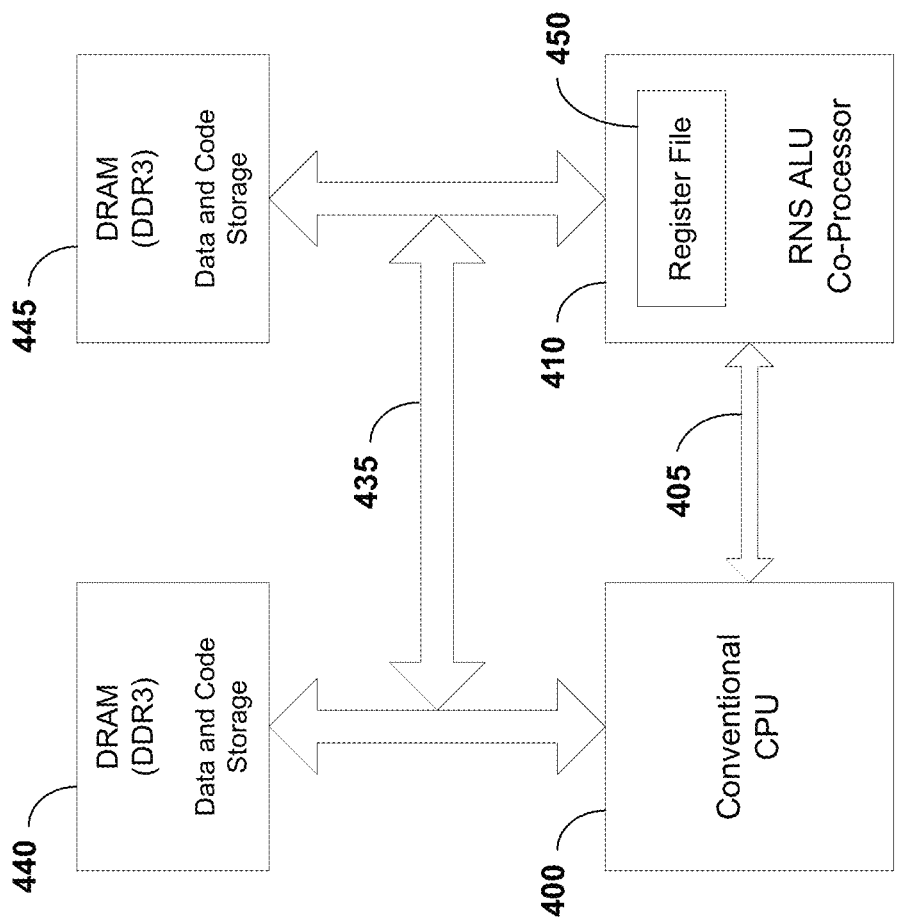
FIG. 4C is a block diagram illustrating an exemplary environment of use for a RNS ALU co-processor.

The diagram of FIG. 4B is again expanded in FIG. 4C to illustrate one embodiment providing basic data processing flows. In FIG. 4C, the RNS ALU 410 is coupled to a high speed DDR3 DRAM memory system 445. The DDR3 DRAM memory contains both data and control instructions for the RNS ALU. FIG. 4C further shows a conventional CPU 400 coupled with its own DRAM memory system 440, which holds data and control instructions for the conventional CPU. A high speed data interconnection 435 between both memory systems is illustrated. The high speed data bus serves to transfer data to and from the conventional system and the RNS ALU. Like most ALU's, the RNS ALU of FIG. 4C contains its own set of high speed registers, designated by the register file block 450. To maintain highest performance, the system must deliver data to the RNS ALU registers for processing, and then transfer arithmetic results from the ALU registers back to either the conventional CPU memory or the RNS memory depending on the specific algorithm executed.

While many details and variations exist, the details of such are standard concepts to those skilled in the art.

Functional ALU Description

Figure 4D:
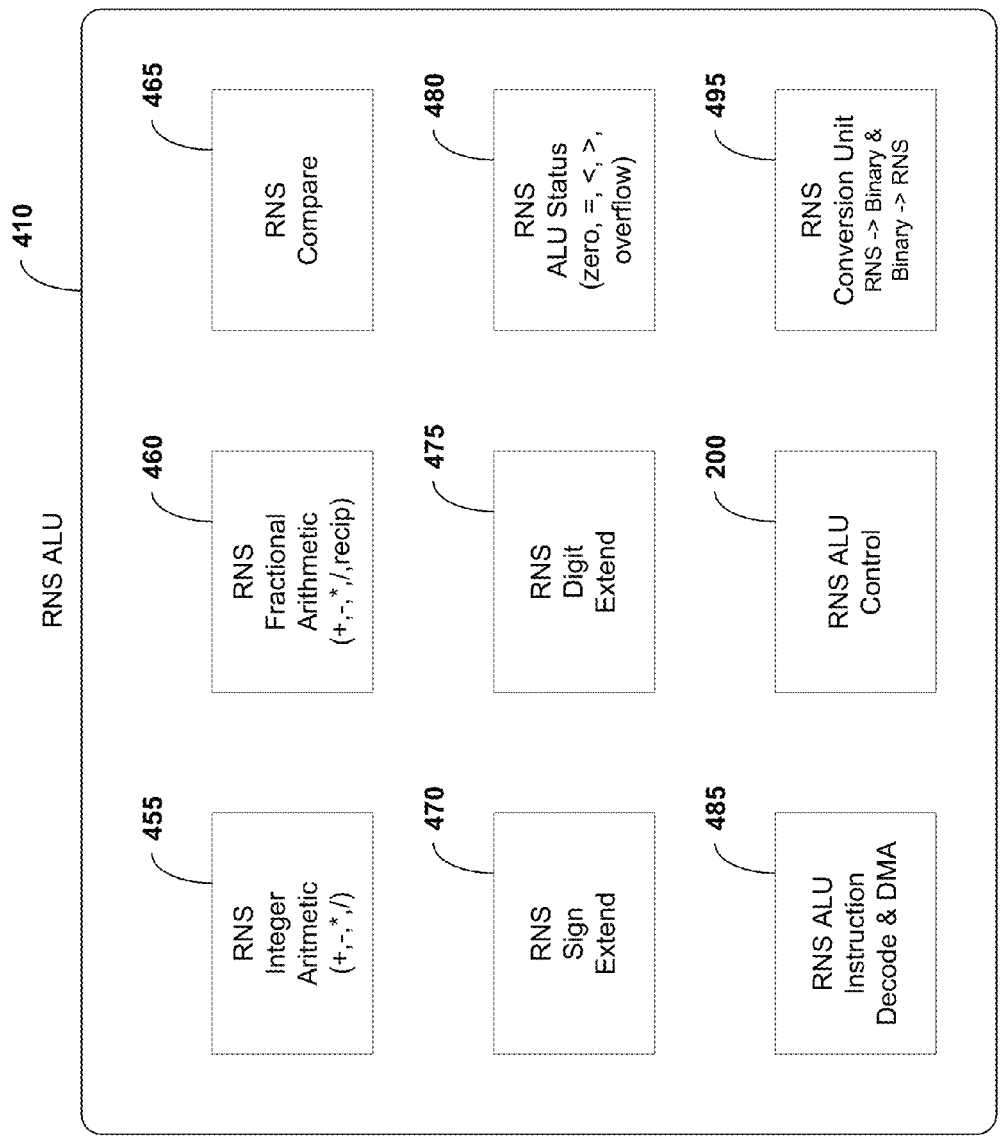
FIG. 4D is a block diagram illustrating an exemplary RNS ALU.

The RNS ALU 410 of FIG. 4A is again expanded in FIG. 4D to illustrate some of its basic functional components. FIG. 4D describe basic features and capabilities of one embodiment of an RNS ALU by grouping common features together for the purposes of illustration; however, in some embodiments of the present invention, it is common that many of the functional components share common resources.

RNS Integer Unit

In FIG. 4D, the RNS ALU 410 supports integer arithmetic functions as illustrated by the RNS integer arithmetic unit 455. The basic arithmetic functions supported are signed addition, subtraction, multiplication and division. RNS integer addition, subtraction and multiplication are straightforward since only a single, simultaneous LUT access is required to complete the operation. In terms of mathematics, these RNS operations are fundamental and familiar; many embodiments exist for these operations, and simple examples are often cited in one form or another in the prior art and academic texts.

However, the RNS integer division method is new, and several innovative techniques and apparatus are disclosed herein for the first time. RNS integer division is categorized as slow, since this operation is executed in a digit by digit fashion. As in the case of many conventional binary CPU's, the RNS integer division hardware is typically more complex and more resource intense than the hardware for addition, subtraction and even multiplication.

Additionally, the RNS integer arithmetic unit supports signed values and signed computation. The innovative techniques used to efficiently process signed values is disclosed later.

RNS Fractional Arithmetic Unit

The RNS ALU 410 contains a fractional arithmetic unit 460. The fractional arithmetic unit operates on operands that represent both whole and fractional quantities. This is analogous to fixed point and/or floating point representations in binary.

The fractional arithmetic unit of the RNS ALU supports several types of fractional RNS formats, including a "fixed point" RNS format, and a "sliding point" RNS format. The fractional arithmetic unit supports operations of signed addition, subtraction, multiplication, division and reciprocation on fixed point RNS operands, or sliding point RNS operands. Additionally, the RNS fractional unit supports several mixed type operations, including the addition, subtraction, multiplication and division of fractional types by integer types.

The operation of fractional multiply is of particular importance. The method of the present invention provides disclosure of a novel and unique method for multiplying fractional numbers in RNS format. Special modifications to the novel ALU structure provide for a practical multiplier which supports result rounding and signed values, among other features. The disclosed RNS fractional multiplier provides high precision, general purpose operation.

Fractional division can be supported in several ways. In one embodiment, the integer divide apparatus is used to provide a fractional divide. In another embodiment, a divide routine such as Goldschmidt division is used, which is composed of fractional multiply and subtraction operations.

Another key feature and invention of the present invention involves the manner in which fractional RNS values are scaled for use by Goldschmidt or Newton-Raphson division techniques. Scaling RNS fractions for optimized divide performance is an advanced and novel feature of the method of the present invention.

RNS Comparison Unit

The RNS ALU 410 of FIG. 4D supports RNS number comparison via an RNS compare unit 465. RNS number comparison is required to make decisions based on the result of arithmetic calculation. Moreover, RNS value comparison is required to implement other primitive RNS ALU functions, including sign extension and integer divide.

The most generalized ALU RNS compare unit includes the ability to compare all RNS formats that are supported by the ALU. However, in other embodiments, there also exist special RNS compare units for handling certain tasks, such as being dedicated to the integer divide unit, for example. A high performance RNS ALU may include more than one RNS compare unit. In some cases, there are opportunities to use more than one RNS compare unit simultaneously, thereby increasing performance and throughput.

In one embodiment, the RNS compare unit is based on Mixed Radix Conversion (MRC). However, the methods and apparatus of the present invention use the mixed radix conversion principle in novel ways, which are often surprising and non-typical.

Mixed radix number (MRN) formats are supported in the RNS ALU; one MRN format is an intermediate number format used during base extension and comparison. Another MRN format is for storage of constant values, which enables more efficient comparison of an arbitrary RNS number to a constant value. Constants are well known as stored numbers whose value does not change.

The method of the present invention enhances RNS comparison using a dual accumulator, shared LUT architecture in one embodiment. The RNS comparator converts two numbers into MRN format simultaneously, while comparing the same mixed radix digit (of the same digit position) at each step of the conversion process. The MRN digits are compared essentially least significant first, one at a time; however, the results of each digit comparison is stored and forwarded to the next digit comparison step, while the MRN "digits" themselves are discarded. In this manner, the RNS value is implicitly converted to MRN format, but the mixed radix number itself is not stored or even handled in its whole.

The enhanced RNS comparison method and technique supports other enhancements; for example, the comparison checks for early end of conversion, which signals that one operand is at least one (converted) digit shorter than the other, thereby determining a comparison based on mixed radix digit length alone. The comparison unit of the present invention also handles signed values; by performing a check of the sign magnitude and sign valid bits first, it may be possible to return the result of comparison early.

However, if the sign valid bit indicates the sign is not available, a secondary and integrated compare against the positive range (constant) of the RNS number format provides the sign of the value. This "side effect" feature is integrated within the compare operation such that a values sign bit may be restored during a compare operation. In one embodiment, the RNS comparison unit also doubles as an RNS to mixed radix number converter, which can be used to create mixed radix (RNS) constants before or during program execution.

In another embodiment of the RNS comparison unit, support is provided for handling skipped, or invalid, RNS digits. This type of RNS comparison unit finds use within the integer divide unit, for speeding the divide process by delaying the last base extension before result comparison.

The comparison unit of the present invention supports several different operand formats, including but not limited to integer RNS, fractional RNS, and a special constant in two related MRN formats, one derived from RNS integer format, and the other from RNS fractional format.

RNS Sign Extend Unit

The RNS ALU 410 contains an RNS sign extend unit 470. The RNS sign extend unit processes an RNS number and extracts the sign of the RNS value. The result of the sign extension operation is used during certain arithmetic operations, and is used to set the sign bit of the RNS value, thereby saving future sign extension operations.

In one embodiment, the RNS ALU tracks the sign of a value using two bits, a conventional (sign magnitude) sign bit and an extra bit, called a "sign valid" bit. In order for the system to use the sign bit to indicate the sign of the value, the sign valid bit must be true. If the sign valid bit indicates false, the ALU may invoke a sign extend operation before performing a subsequent operation. An RNS numbers "sign valid" bit is set to true upon sign extension. The sign valid bit may be set to false after certain arithmetic operations, thereby requiring a sign extension at some other time.

More than one RNS sign extend unit may exist in a high performance RNS ALU. Additionally, an ALU may support combined functions, such as a combined sign extend and value comparison unit, for example. In one embodiment, a sign extension is performed as an integrated function and in tandem to fractional multiplication.

RNS Digit Extend Unit

The RNS ALU 410 contains an RNS Digit Extend unit 475, also referred herein as a base extension unit. This function is actually a primitive function for both the integer divide and fractional multiply. In one embodiment of the RNS ALU, all completed arithmetic operations result in a value that contains all valid RNS digits, i.e., all digits have been extended.

The RNS digit extend unit is specially designed and adapted to perform high performance RNS operations. For example, for integer divide, the base extend unit is specially adapted to support delayed digit extension through the use of "digit skip" flags. As another example, in high performance integer and fractional division units, the digit extension unit is adapted to support variable power based modulus, whereas the variable power is controlled using "valid power" flags, or a "power valid" register. These valid flags are assigned to each sub-digit of each power based modulus of the divider. (Note: a "digit valid" flag should not be confused with "sign valid" bit or flag.) More about this subject will be discussed later.

For the fractional RNS multiply, the base extend unit is also specially adapted and specially designed to allow high speed fractional multiplication. For example, the operations of digit base extend and range divide occur in the same operation during fractional multiply.

Because of the importance of specialized base extend units for divide and multiply, in one embodiment, more than one base extend unit can exist. In another embodiment, a high performance single base extend can be shared by both the integer and fractional arithmetic units. In yet another embodiment, a single scalar ALU performs digit extension as well as all other required functions.

Base extend units require LUT and hardware resources similar to an entire scalar RNS ALU. The base extend unit must support all basic LUT operations along with specialized enhancements. In some embodiments, the base extend function may be broken up and executed on different functional units, such as a RNS to mixed radix converter (decomposer) and a smaller base extend unit (re-composer).

RNS ALU Status Register

Operations within the RNS ALU may result in the ALU setting various status flags, or status bits 480. For example, an RNS compare operation may result in setting either the "greater than" or "lesser than" status bits. An arithmetic operation which ends in zero might also cause the ALU to set the zero status bit. Status registers and status bits are not new, and in fact, are critical elements to most ALU designs. Status bits that are supported under the RNS ALU include a zero flag, an equal flag, a greater and/or less than flag, and an overflow/underflow detection flag. The ALU of the present invention is not limited to this set of status registers and/or status flags.

In later sections, more details are given to typical logic circuits which support the detection, transmission and storage of status information. For example, FIG. 5B illustrates an example Word Status Register 500 and basic logic diagrams representing how such status are detected. The word status register 500 stores the status of the ALU as a whole. In another example, FIG. 5C shows the transmission of status information to the Digit Status Register 510. The digit status register stores the status of a single selected digit ALU.

RNS ALU Instruction Decode

In many embodiments of the RNS ALU of the present invention, an RNS ALU instruction decode unit 485 is present. The instruction decode unit provides a means for the RNS ALU to support its own instruction set, and allows the RNS ALU to execute its own algorithms. This is important. The RNS ALU may execute an arithmetic task while its host CPU is preparing for the next problem. However, this is not a restriction, since RNS ALU operation which is under full control of the host CPU is possible. In this alternate embodiment, the host CPU triggers an RNS ALU operation, and then checks the result of the operation and status register to determine the appropriate action(s). Furthermore, an RNS ALU instruction unit comprises an RNS based central processing unit (CPU), by definition.

Instruction decode is well understood by those practiced in the design of digital computer systems and is therefore not dealt with in detail herein.

RNS ALU Control Unit

The RNS ALU of the present invention contains an ALU control unit 200. The ALU control unit is responsible for all low level control and primitive operations required for each ALU instruction. A basic control unit is present in any ALU, regardless of number format. However, for the RNS ALU, and for many of its embodiments, the control unit has special significance since RNS digit slice data structures are similar between most ALU functional units. This means the RNS ALU control unit determines to a large degree the functionality of any given ALU functional unit, while the data structure being controlled remains structurally similar, or even the same. This provides a great deal of flexibility in terms of RNS ALU architecture.

For example, in one embodiment, the RNS ALU supports a single bank of RNS digit slices, all under the control of a master control unit 200, the master control unit providing all required operations for the entire system. In this case, the RNS digit bank supports a minimum set of registers, LUT's and comparators to support all required instructions and operations. In another embodiment, the RNS ALU control 200 is sub-divided and partitioned across the ALU, such that sub-controllers act together to coordinate the required control functions.

In another embodiment, the RNS ALU supports a plurality of banks of RNS digit slices, each bank capable of operating on an RNS number. Therefore, an RNS ALU control unit connects each bank of RNS digit slices, and forms a coherent operating strategy between them. For example, one bank of (dual accumulator) RNS digit slices act as a comparator. Another bank of RNS digit slices act as a general accumulator or ALU, while yet another bank serves as a sign extension unit. In this manner, RNS operations can be processed in parallel where allowable. This disclosure discusses some forms of parallel RNS operation used for speeding the integer divide unit, for example. High performance scalar RNS ALU architectures require performing as many low level ALU operations in parallel as feasible.

Furthermore, RNS digit slice architecture may be partitioned in other unique ways due to the parallel nature of RNS numbers. In one embodiment, the word size is increased by adding additional digit slices to each supported digit slice bank of the RNS ALU. Digit slices may be added as partitioned digit groups. The digit groups are added using circuit boards in one case. Each circuit board supports a fixed number of digits, such as thirty two digits for example, and may include other partitioned circuits as well, including the partitioned ALU control circuitry required to perform the operations on the RNS digit group. RNS digit slices are implemented as digit function blocks in one embodiment.

RNS Conversion Unit

The RNS Conversion unit 495 is optional, since it may be replaced by RNS software algorithms executing within the RNS ALU. However, generally some provision exists for expediting the conversion of binary to residue, and the conversion of residue to binary. It should be noted that other conversions may be warranted as well, such as RNS to decimal, but for purposes of this disclosure, conversion to binary suffices to represent the requirements for most RNS to fixed radix conversions.

In a high performance scalar RNS ALU, the RNS conversion unit is implemented in hardware. In such an embodiment, an entire ALU is devoted to conversion tasks, thereby creating a parallel system of two ALU's, one that is performing arithmetic calculations in RNS, and another that is performing number system conversions.

Still other embodiments find a solution somewhere between dedicating a complete ALU for conversion and using software controlled conversion. In particular, specialized conversion hardware is disclosed in the method of the present invention. ALU conversion instructions are supported to perform a conversion using such hardware.

Conversion of a binary integer to an RNS integer is straightforward, since each bit shifted into the RNS ALU can be added, and a value of two can be multiplied to the result. To speed the conversion, a power based two's digit modulus is supported in the RNS ALU; the digit's width defines the number of bits that may be converted in one ALU conversion iteration. In either case, a shift register-like conversion is supported which operates in linear time with respect to the binary bits converted.

Conversion of a binary fraction to an RNS fraction is more difficult, since a conversion from binary fractional range to RNS fractional range is required. The present invention introduces several techniques to convert the fractional binary quantity to a fractional RNS quantity, including a hardware conversion pre-scale unit that allows conversion in linear time with respect to binary digits.

Conversion from RNS to binary is even more important, since final results will be generated in RNS format but may be usable only in binary format. The present invention includes a hardware and control apparatus which converts RNS numbers to binary numbers in linear time with respect to RNS digits. The apparatus is extensible, and provides a means to assemble very wide binary values at high speed, and without slowing due to increased carry propagation.

Conversion of fractional RNS to fractional binary requires a scaling from RNS fractional range to binary fractional range. In this case, the RNS ALU itself may perform the scaling operation, since the RNS ALU can perform the reverse conversion calculations more efficiently, i.e., that is, divide by the RNS fractional range.

To maximize the number of applications, a high speed, hardware assisted conversion from binary to RNS, and from RNS to binary is generally required. Providing a high speed conversion means the number of suitable applications for the ALU significantly increases.

Detailed RNS ALU Description

Figure 3A:
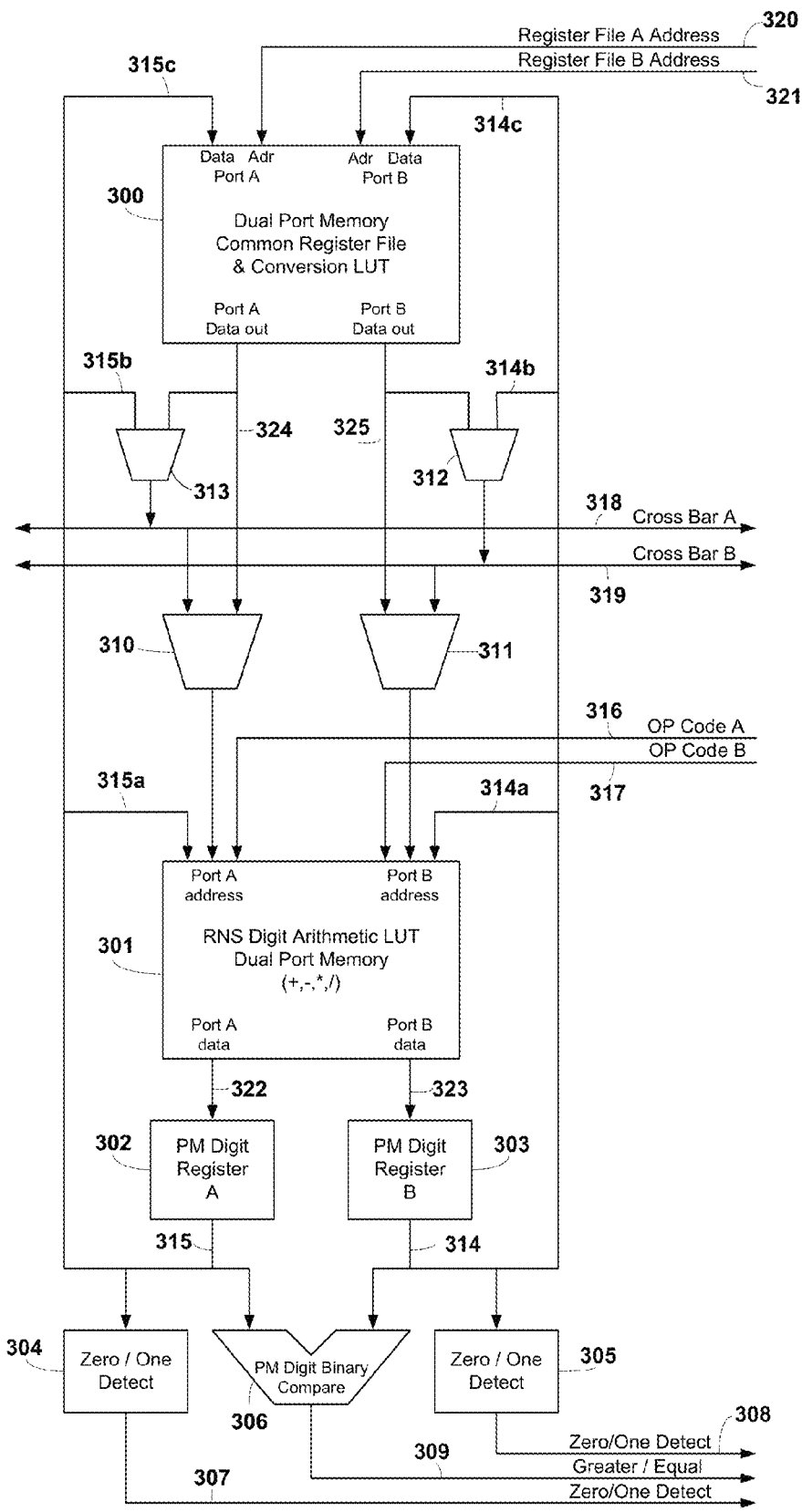
FIG. 3A is a block diagram illustrating an exemplary RNS dual digit accumulator.

In FIG. 3A, the basic architecture of a single RNS digit of the ALU of the enclosed invention is disclosed. The digit ALU, referred as a digit function block, is of dual accumulator design; however, this is not a restriction.

Figure 2A:
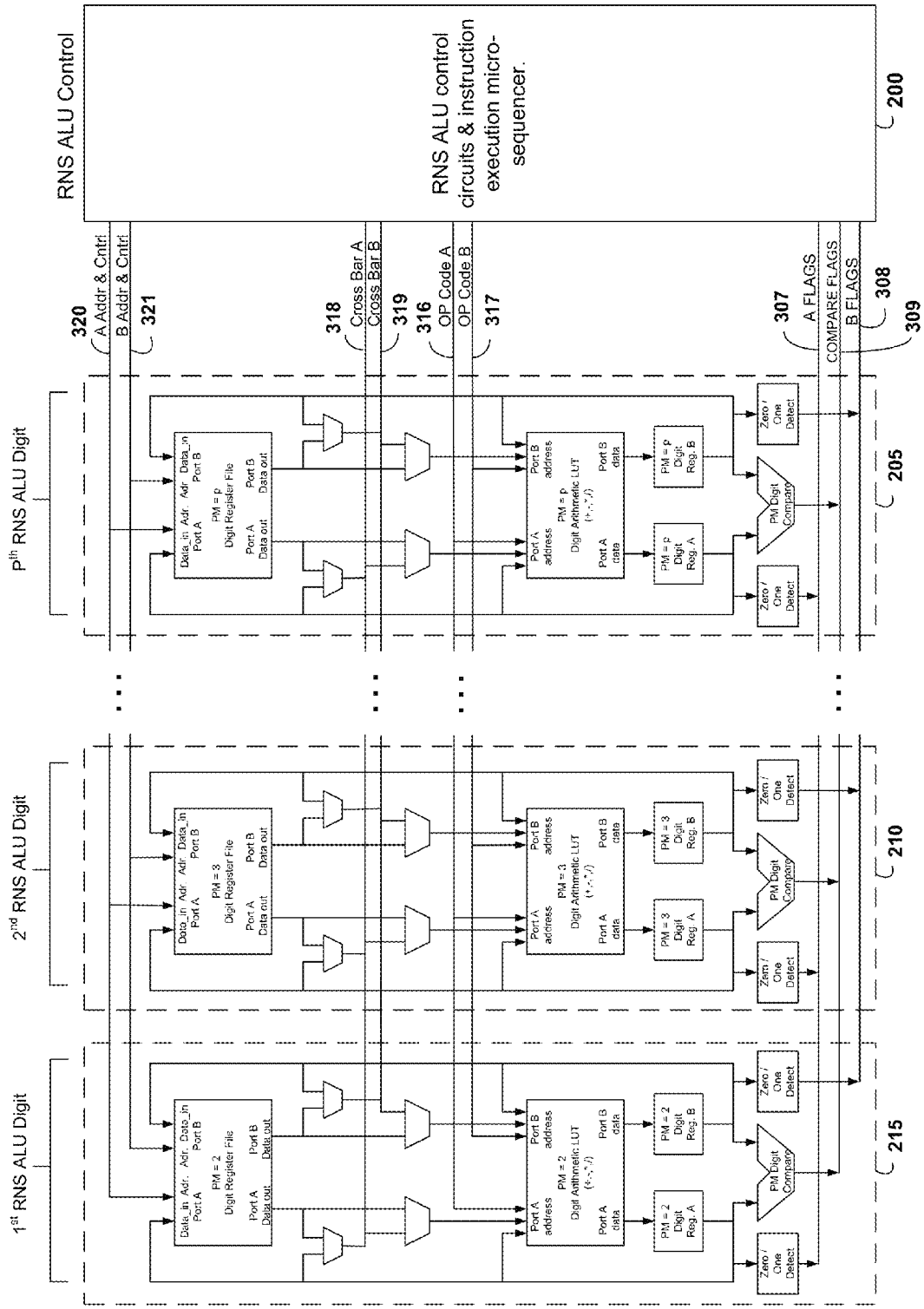
FIG. 2A is a block diagram illustrating an exemplary p-digit RNS ALU architecture.

As a review and shown in FIG. 2A, an RNS ALU is shown, consisting of a plurality of digit function blocks, such as digit function blocks 215, 210, and 205, each interconnecting to an RNS ALU control block 200. As FIG. 2A implies, an RNS ALU supporting P digits would support P number of digit function blocks 215. Each function block supports a unique digit modulus which is pair-wise prime to all other digit function blocks.

In FIG. 3A, a single digit function block 215 is shown in detail. The main components inside a digit function block 215 are: the register file 300, the arithmetic LUT 301, the digit A accumulator 302, and the digit B accumulator 303. The digit function block 215 supports two separate digit ALUs, denoted A and B, each ALU sharing the same arithmetic LUT 301 and register file 300. The background for this arrangement was discussed previously using FIGS. 1A through 1F.

FIG. 3A is general for all digits; in practice, each digit function block 215 will be configured for a unique modulus, since values contained in their LUTs are unique to each digit modulus.

General Purpose ALU Registers

Many modern and prior art approaches to ALU design use general purpose registers. In most cases, the contents of a general purpose register can be used as an operand in arithmetic instructions. It is common that arithmetic instructions imply the accumulator as the second operand, especially arithmetic type instructions. This was illustrated in FIG. 1B.

The RNS ALU of the present invention uses a similar concept with several key modifications. For one, general purpose ALU registers can store RNS numbers; each RNS register is broken into digit slices, where each digit slice of the RNS register is stored separately in its associated digit function block. When the ALU control unit 200 accesses a register, it sends the same address to each ALU digit block register file 300, so that each digit register 302 and 303 receives its corresponding modulus digit data. Therefore, the process of loading a full word into the accumulator occurs when all digit ALU's latch their corresponding chunk of data.

Figure 1A:
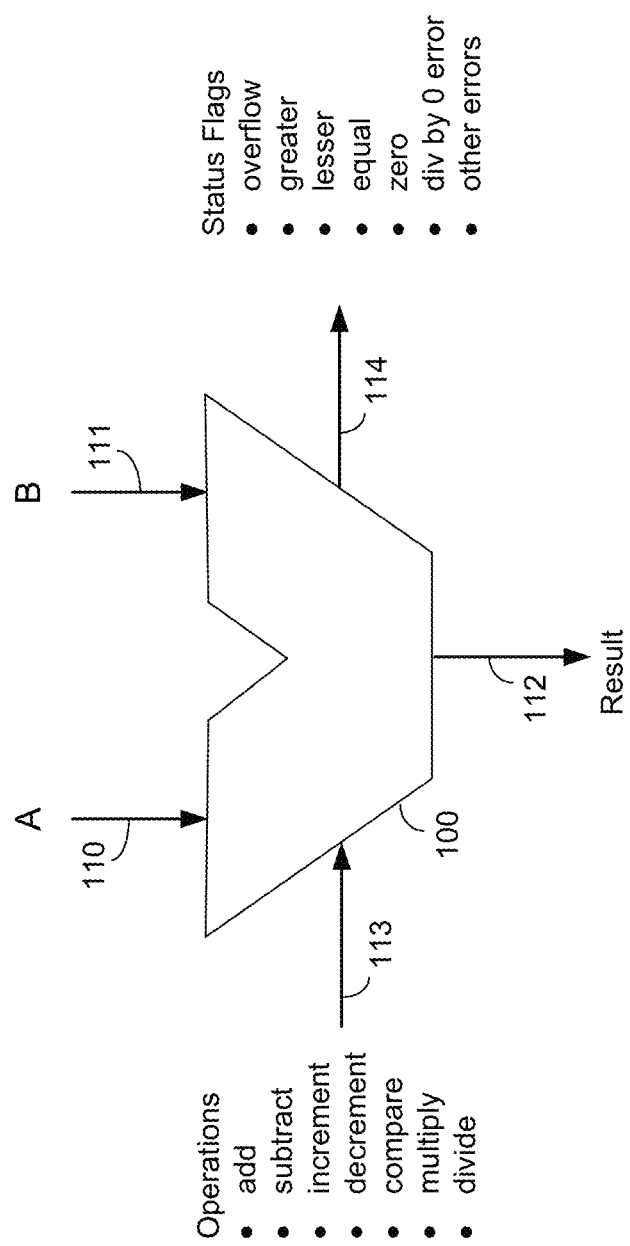
FIG. 1A is a block diagram illustrating an exemplary basic ALU.
Figure 1B:
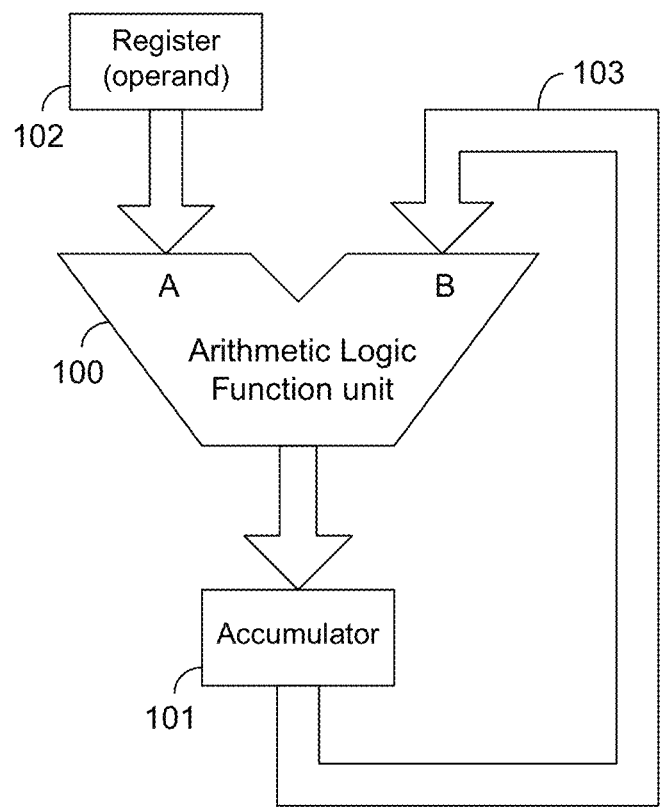
FIG. 1B is a block diagram illustrating an exemplary accumulator based ALU with register based operands.
Figure 1C:
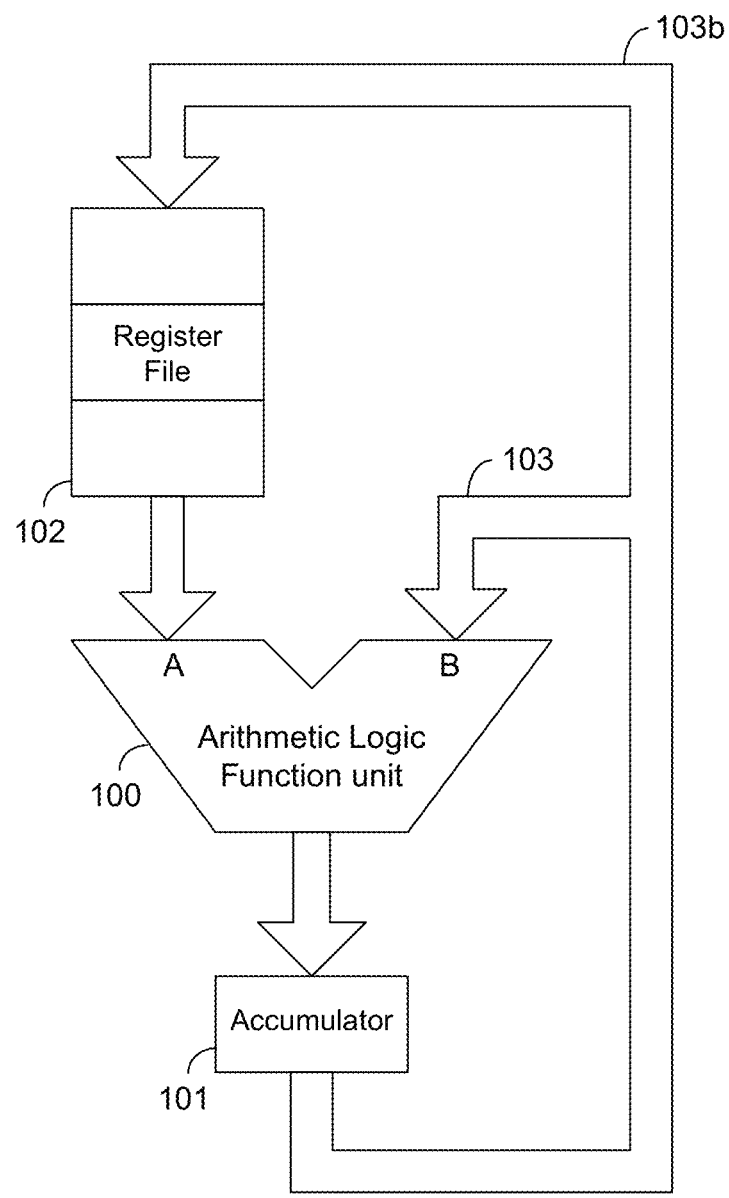
FIG. 1C is a block diagram illustrating an exemplary ALU showing register file and basic data paths.
Figure 1D:
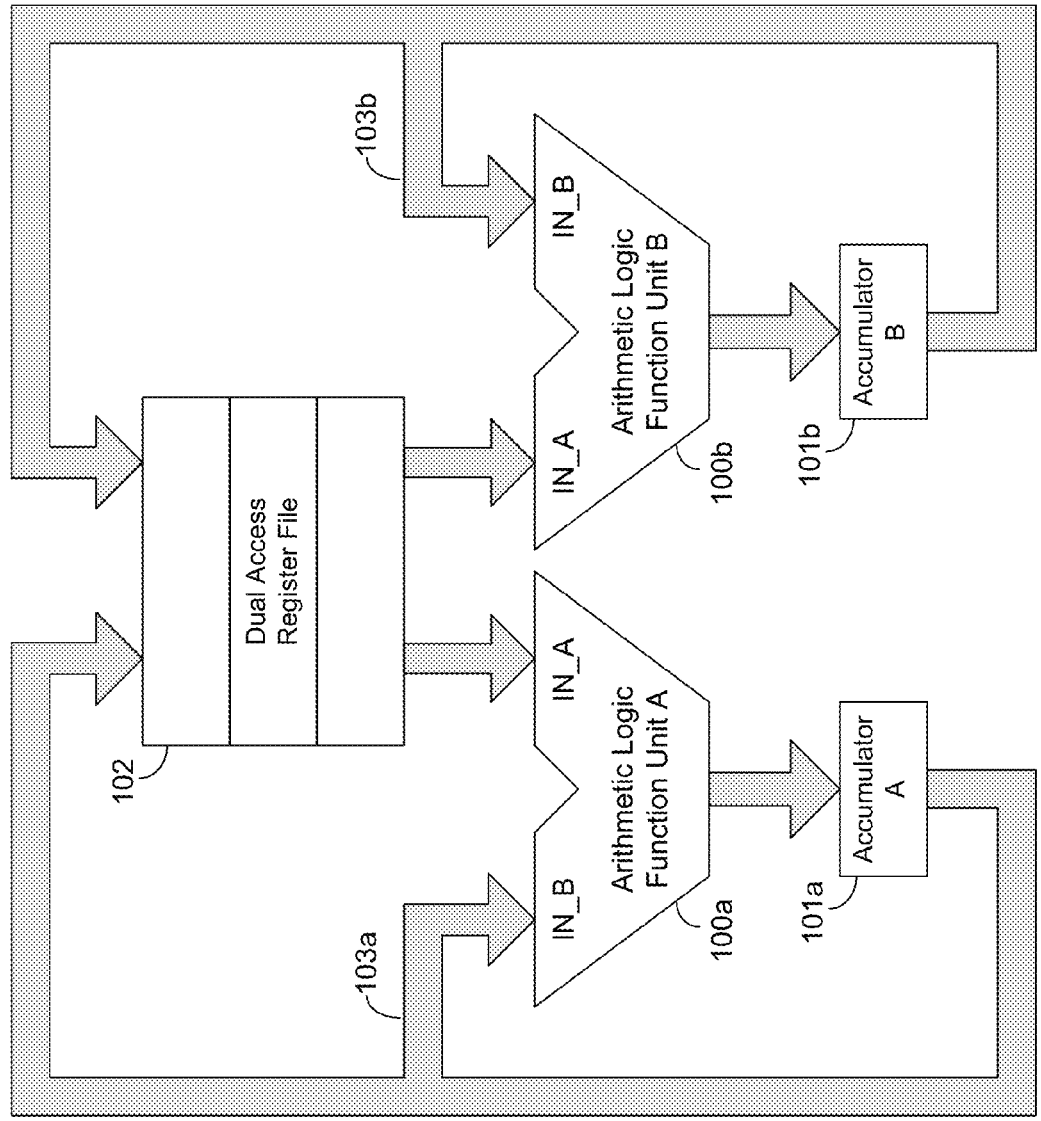
FIG. 1D is a block diagram illustrating an exemplary dual ALU with shared register file.
Figure 1E:
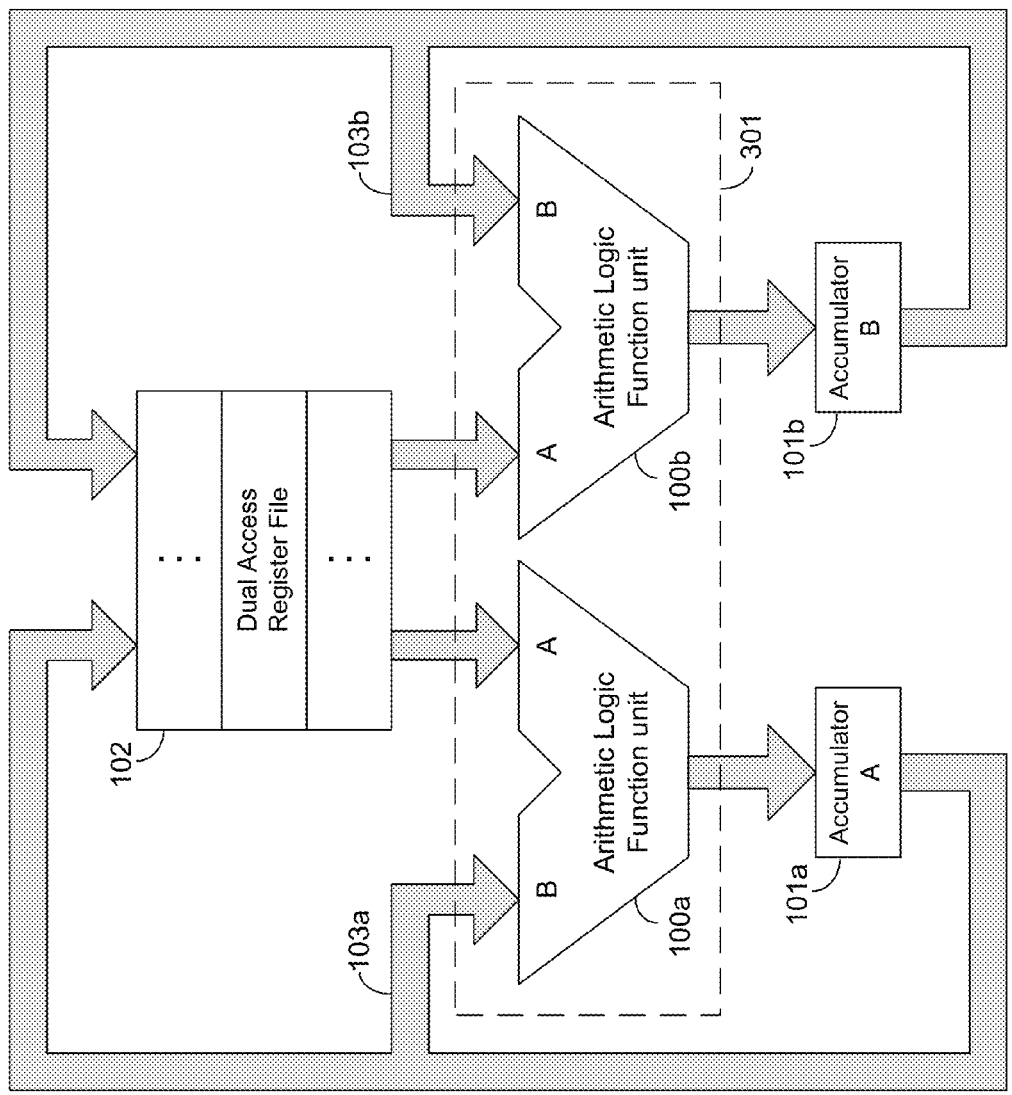
FIG. 1E is a block diagram illustrating an exemplary dual ALU with shared register file.
Figure 1F:
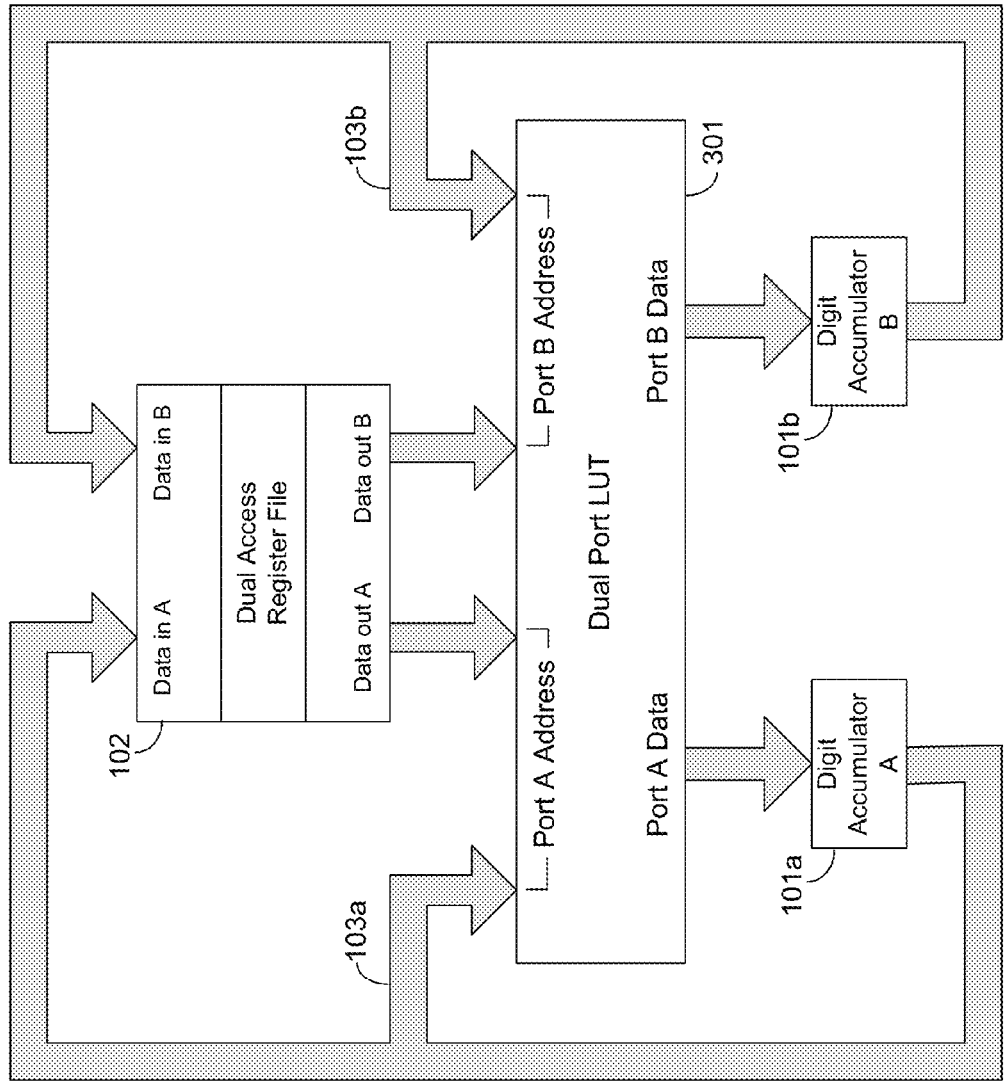
FIG. 1F is a block diagram illustrating an exemplary dual digit ALU with dual port arithmetic LUT and dual port register file.
Figure 1G:
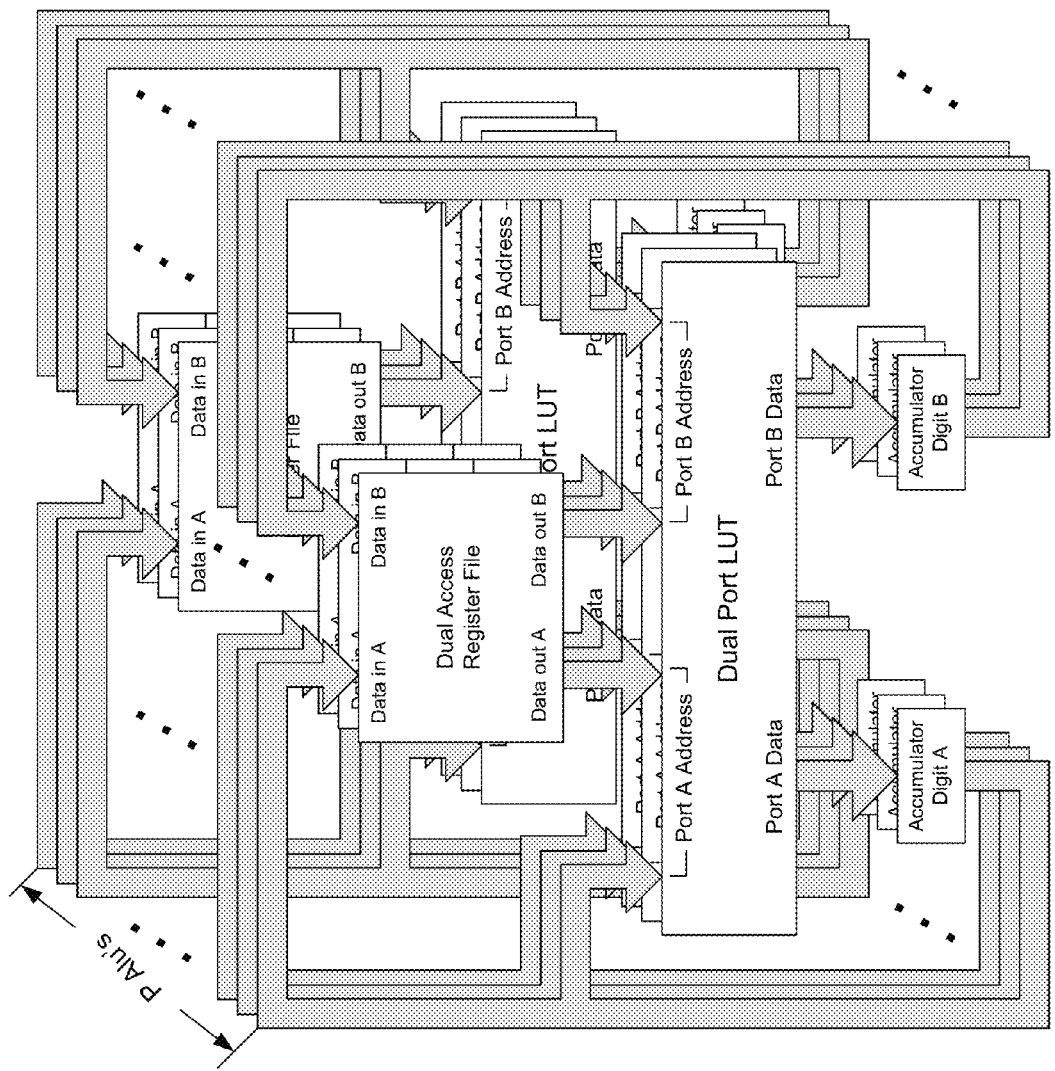
FIG. 1G is a block diagram illustrating an exemplary plurality arrangement of dual ALUs.

In one embodiment, as disclosed in FIGS. 1F and 3A, registers 300 are dual port, so that RNS digit register A 302 and B 303 access the same register set. Dual port memory allows separate control lines 320 for port A and control lines 321 for port B. Thus, ALU A is free to access registers independently of ALU B. The number of registers supported varies; however, in one embodiment, a large number of registers are supported. For RNS processors, there is a need to store basic constants, common conversion factors, and intermediate results, as well as provide for general purpose registers for programming needs.

In another embodiment not shown in FIG. 3A, the register file 300 is tri-ported or quad ported. For example, a tri-ported register file allows two ALU's to operate independently, while allowing a host processor or DMA controller to move data into and out of the register file at full speed. A quad-port register file memory can also be used to support a quad ALU, for example.

In FIG. 3A, port A output 324 of register file 300 directly feeds a selector 310. Using selector 310, control circuitry gates the port A output 324 directly to the address input of the arithmetic LUT 301. Therefore, any value contained in register file 300 may be moved to, and used as an operand for arithmetic LUT 301. Likewise, port B output 325 of register file 300 directly feeds selector 311. The register value can be gated to the LUT 301 port B address for operation with digit register accumulator B 303.

The output of digit register A 302 and digit register B 303 are fed back to the input of the register file 300, via data paths 315c and 314c respectively. These connections allow the results of an operation, stored in digit accumulator 302 and 303, to be moved into register file 300.

In many embodiments, the register file 300 stores the values of important constants, such as the values of all supported digit modulus. This provides a means by which a control circuit 200 can read a given value of modulus from a known location of register file 300, and use this value as an operand to the LUT(s). For every digit function block of FIG. 2A, register file output 324 feeds selector 310 which is selected to steer the output to the LUT 301 input.

For example, when a common modulus value divides each digit register, the control circuit 200 sets the appropriate address to the register file address bus 320. The value is accessed via the data output 324 and steered to the LUT address input via selector 310. Since each digit slice ALU accesses its own register file with digit modulus p, the values of the digits may differ from digit slice to digit slice.

Figure 6A:
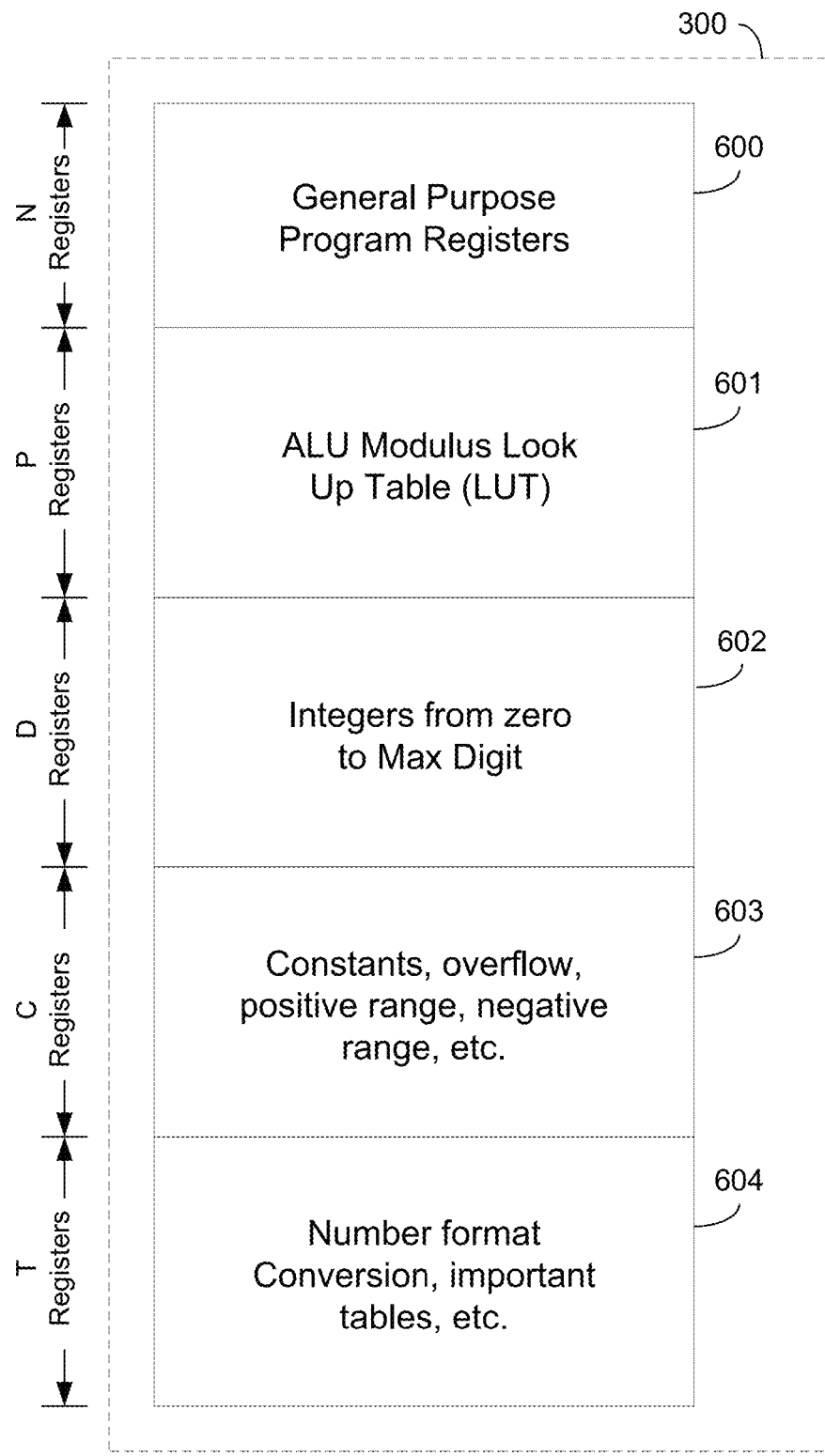
FIG. 6A is a block diagram illustrating an exemplary register file layout.
Figure 6B:
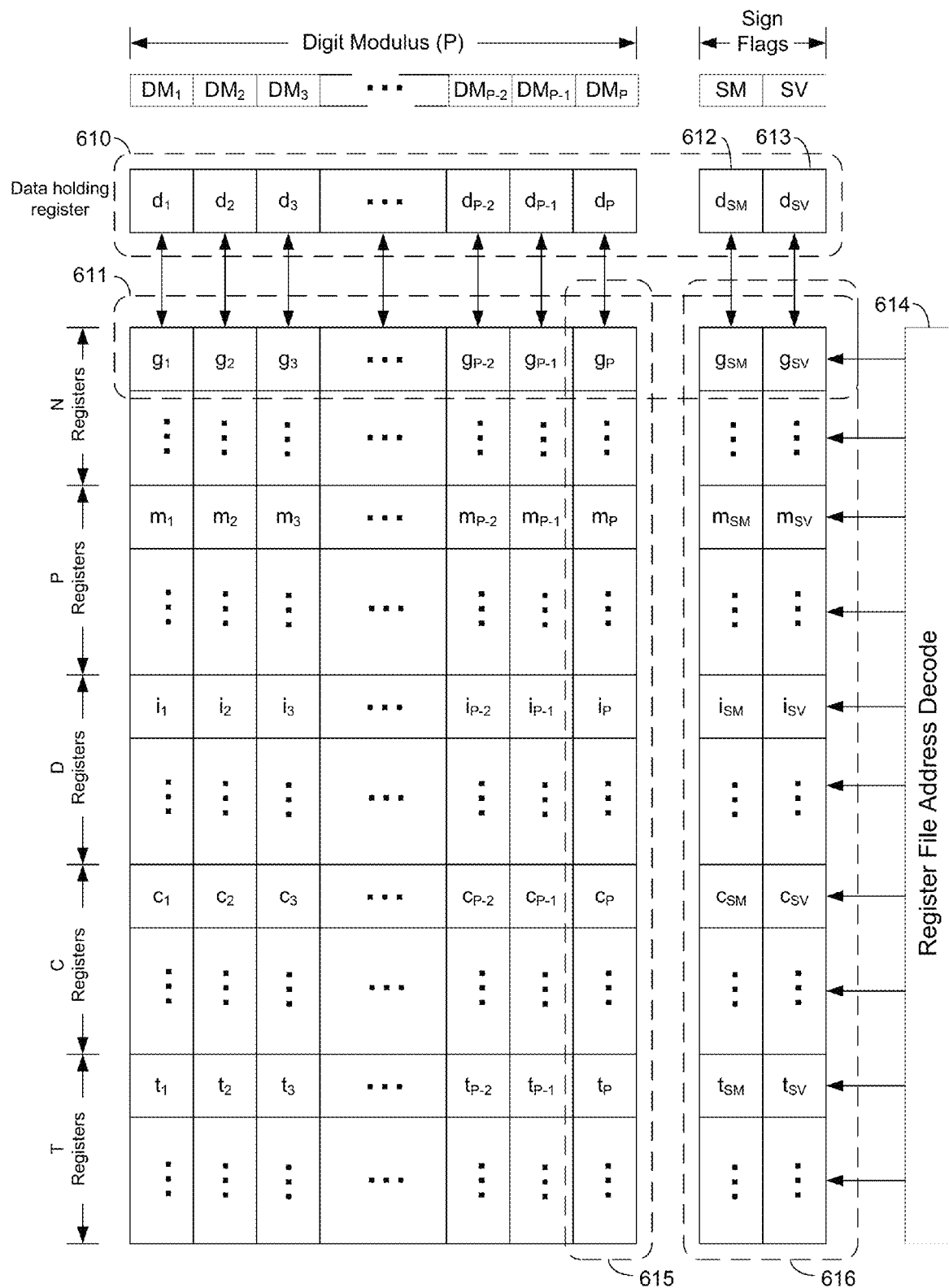
FIG. 6B is a block diagram illustrating an exemplary register file by digit.

In FIG. 6A, a sample register file 300 layout is shown. A portion of the dual ported register memory 300 is dedicated to general purpose register 600 use. Also, P number of register space is reserved for ALU Modulus LUT 601 storage. Other subdivisions of the register memory 300 may be reserved for constants 603 and conversion tables 604. FIG. 6B shows the register file 300 of FIG. 6A in terms of individual digit registers. Because the RNS ALU may be organized as a digit slice processor, the register file 300 may also be organized by digit slice 615. Also relevant to FIG. 6B is the existence of sign bits 612 and sign valid bits 613. These bits are associated to each stored RNS value, such as RNS value stored in the location 601.

Arithmetic LUT and Digit registers

In one embodiment, as in FIG. 3A, LUT 301 is used to perform arithmetic operations on digit register A 302 and digit register B 303. Each register function block has its own LUT 301, which is configured to support modulo operations of a specific modulus=p. Other embodiments are possible, as long as basic digit modulus operations are supported. For instance, LUTs may be replaced with dedicated logic.

In the method of the dual digit slice ALU, dual ported RAM and/or ROM memory may be used. This has the advantage of allowing dual access to the LUT 301, which allows a dual ALU to be supported in one embodiment. Alternatively, tri-ported or quad-ported memory may be used for LUT 301. In this case, a triple-ALU or quad-ALU may be supported. The additional ALU's allow additional conversion and processing to be performed simultaneously. The additional increase in performance is achieved without increasing LUT memory, only the "ports" to that memory. Dual ported memory is a common resource in modern FPGA's which may be used to implement an RNS ALU; this disclosure will generally focus on explanations for a dual ALU RNS configuration because of its novel and efficient design and balance.

In the embodiment of FIG. 3A, a brute force LUT approach is disclosed. The number of entries of LUT 301 for modulus (p) is given by:

$$\text{LUT depth}=p^2 \times (\text{number of operations}) \qquad (\text{eqn. 2})$$

$$\text{LUT width}=[\log_2(p)]+1 \qquad (\text{eqn. 3a})$$

Where [ ] denotes the "floor integer" function, i.e., integer part of $\log_2(p)$.

The RNS ALU of the present invention supports four basic operations, so the last term of equation 2 could be 4, implying enough memory to support modulo addition, subtraction, multiplication and division LUTs. In one embodiment, each digit function block 215 is assigned a LUT, each LUT having a size given by equation 2. The data width of the LUT needs to be wide enough to store the largest digit of the given modulus, and when encoding in binary, is given by equation 3a.

The depth of most standard memory technology is a power of two. This means that a LUT built using standard memory technology will need a memory size larger than theoretically required according to equation 2. To account for the size required using standard memory technology, equation 3b is provided:

$$\text{LUT std. depth}=2^{2W} \times (\text{number of operations}) \qquad (\text{eqn. 3b})$$

where W=LUT width=$[\log_2(p)]+1$

Consider the modulus p=7. The width of the modulus in binary is three bits, since three bits is required to store all digit values zero (0) through six (6). The number of LUT entries for each operation is seven times seven (7*7), but binary memory sizes force a configuration that is eight times eight (8*8=64), since 3 binary address bits are needed, and $2^3=8$.

In order to support four separate operations using the same LUT, the concept of "memory pages" is adopted, so a total of sixty four times 4 pages (64*4), or 256 entries are required in our example. The data width is three bits, so a total of 768 bits of memory is required in a modern FPGA. The digit register accumulator itself need only consist of three bits.

The LUT of this example assumes all operands are modulo 7, since the range of the operand input is so bounded. Otherwise, the LUT size would be greater, since one input of the LUT may require the width of the maximum modulus of the ALU. For example, if the maximum digit value width is 8 bits, and given the example of modulus p=7, the input address width of the LUT is 8+3+2=13 bits. In this case, the LUT depth is $2^{13}=8192$, and for a 3 bit wide operand, this requires 24,576 bits of memory. If the largest LUT operand is 8 bits wide, then the input address width for the largest digit LUT is 8+8+2=18 bits, which requires a memory depth of $2^{18}=262,144$ entries, and a memory size of 2 megabits. Again, this is a brute force technique, and other techniques exist to reduce memory requirements of the LUT 301.

The contents of LUT 301 are arranged to perform the required arithmetic operations; the organization of the LUT contents further considers the mapping and format of the address inputs, which represents the arithmetic operands. Referring to the input address for port A of LUT 301, the address is shown as a combination of three sources in FIG. 3A. Two sources are the LUT operands, and the third source is the LUT function control input, which selects the desired operation, or LUT page. The function control input is fed by Op Code A 316 for ALU A and Op Code B 317 for ALU B.

Taking the case of ALU A, and for a given operation code 316, the output of LUT 301 is a function of two operands, one operand selected by selector 310, and operand 315a which is sourced by digit register A 302. After the proper delay time, the LUT 301 result is stored; port A output 315 of LUT 301 feeds digit register A 302 which is clocked to store the result. It can be seen that digit register A acts as a "digit slice accumulator", capturing LUT 301 results, and storing results for use as an operand in future operations. Port B ALU works the same.

In one embodiment, LUT 301 performs arithmetic operations on operand A and operand B in accordance to equations tabulated in Table 1.

TABLE 1

| | OpCode | LUT Function Operands | Function Description |
|---|---|---|---|
| Modulo Addition | 0 | (A + B) | $F(A, B) = (A + B) \bmod m_p$ |
| Modulo Subtract | 1 | (A − B) | $F(A, B) = (A - B) \bmod m_p$ |
| Modulo Multiply | 2 | (A * B) | $F(A, B) = (A * B) \bmod m_p$ |
| Inverse Modulo Multiply (MODDIV) | 3 | (A/B) | F(A, B) = C; where (B * C) Mod $m_p$ = A | where $m_p$ = modulus of $p^{th}$ digit

In table 1 column 2, a simple binary op code is assigned to each of four LUT operations. For example, to activate the modulo subtraction function, an op code value of one (1) is used. The desired op code is placed on the op code select lines 316, 317 during the required LUT operation.

The third column of Table 1 illustrates operand order, since the LUT 301 supports two operands, input A fed by digit accumulator 302 and input B fed by either the crossbar 318 or digit register 300. For the case of addition and multiplication, operand order is not important; therefore, table entries for both operand orders (A,B & B,A) are the same. (This fact can be used to reduce table size by one half by steering the lowest value of any operand pair to operand A, for example.) Both operations may produce a result which "wraps around", but there is no carry to other digits. This is another way of referring to the operation as modulo $m_p$, where $m_p$ is the modulus of the specific digit. Operations described herein as "modulo" refer to the fact that the LUT result must map to one of the digit values supported by the modulus, and no carry is ever generated as a secondary result.

For the operation of subtraction and division, operand order is important, and therefore there is no such symmetry. In the case of subtraction, the operand B is subtracted from the value of operand A. Since operand A is fed by the digit accumulator 302, the subtraction operation subtracts a value from the accumulator. The value subtracted may be fed by the crossbar 318, or alternatively, from the register file 300 via selector 313 in the case of ALU A. The subtraction "wraps around", but there is no borrow; that is to say the subtraction is modulo $m_p$, where $m_p$ is the modulus of the specific digit.

In the case of the last operation of Table 1, MODDIV, which is defined herein, the digit accumulator 302 is routed to LUT 301 operand A, which is then "divided" by the LUT 301 operand B. To be exact, the MODDIV operation is the inverse operation of Modulo Multiply, with operand A acting as the product, and operand B acting as an multiplicand; when the MODDIV operation is activated, the LUT 301 output 322 returns the missing multiplicand. The MODDIV operation is therefore a means to reverse the modulo multiply of Table 1.

The LUT operations of table 1 are used in a number of ways. For one, complete integer operations can be performed using P simultaneous LUT accesses. For example, if the value of accumulator is to be incremented, the value of one is added to all digits simultaneously. If the accumulator represents an integer quantity, another integer quantity can be summed by adding each digit of each operand using modulo p addition, via LUT 301, without carry.

Table 2A is provided to show an example of two RNS numbers, or integers, added together. The RNS numbers consist of six modulus {2, 3, 5, 7, 11, 13}.

TABLE 2A

| | RNS Integer (direct) Addition | | | | | | |
|---|---|---|---|---|---|---|---|
| Operation | 13 $I_6$ | 11 $I_5$ | 7 $I_4$ | 5 $I_3$ | 3 $I_2$ | 2 $I_1$ | Equivalent Value |
| A + | 8 | 1 | 6 | 4 | 1 | 0 | 34 |
| B | 2 | 4 | 1 | 0 | 0 | 1 | 15 |
| = | 10 | 5 | 0 | 4 | 1 | 1 | 49 |

In table 2A, the value of thirty four is summed with the integer value fifteen. Each digit of each operand is added together, and wraps around if the result exceeds the modulus of the digit position. For example, in the two's modulus digit position, a value of zero is added to a value of one, which equals one. However, in the seven's modulus position, the value of six is added to the value of one, which is seven, but for the digit of modulus seven, the result wraps around to a value of zero. It can be seen in table 2A that the integer addition in RNS is very fast, since despite the digit width of the number, the time to complete the operation remains theoretically constant.

Table 2B is provided as an example of integer subtraction in RNS:

TABLE 2B

RNS Integer (direct) Subtraction

| Operation | 13 $I_6$ | 11 $I_5$ | 7 $I_4$ | 5 $I_3$ | 3 $I_2$ | 2 $I_1$ | Equivalent Value |
|---|---|---|---|---|---|---|---|
| A − | 8 | 1 | 6 | 4 | 1 | 0 | 34 |
| B | 2 | 4 | 1 | 0 | 0 | 1 | 15 |
| = | 6 | 8 | 5 | 4 | 1 | 1 | 19 |

In table 2B, the same operands as Table 2A are now subtracted. In this case, order of operands is significant. In Table 2B, the B operand is subtracted from the A operand. Therefore, the B digit value is subtracted from the A digit value, for each digit position. If the subtraction is impossible, it is because a reverse wrap around is required, so that the subtraction is modulo subtraction. For example, the digit value of 4 in the modulus p=11 position is subtracted from a value of one. The result of digit subtraction is the digit position value of one wraps backwards four positions, which settles on a digit value of eight, in this case.

In table 2C, an example of integer RNS multiplication is shown:

TABLE 2C

RNS Integer (direct) Multiplication

| Operation | 13 $I_6$ | 11 $I_5$ | 7 $I_4$ | 5 $I_3$ | 3 $I_2$ | 2 $I_1$ | Equivalent Value |
|---|---|---|---|---|---|---|---|
| A * | 8 | 1 | 6 | 4 | 1 | 0 | 34 |
| B | 2 | 4 | 1 | 0 | 0 | 1 | 15 |
| = | 3 | 4 | 6 | 0 | 0 | 0 | 510 |

RNS integer multiplication, also referred to herein as direct multiplication, occurs when two RNS values are directly multiplied, digit for digit. Each digit of each digit position is multiplied together using a modulo-p multiplication, where p is the modulus of the digit, and where such operation is implemented using LUT 301 in one embodiment.

Table 2C illustrates two RNS integers directly multiplied. One operand is the value thirty four (34), the other value is fifteen (15). The result of the integer multiply generally occurs in one simultaneous LUT cycle, and in case of the example, results in the value five hundred ten (510). Note the value of each digit column is multiplied modulo p, without carry. For example, the digit whose modulus is p=13 has the digit value eight multiplied by two (8×2); the resulting value is three (3), since 8×2=16→16% 13=3.

The last common arithmetic operation needed within the ALU of the present invention is the so called MODDIV operation. This operation is essentially a multiplication in reverse, with the A operand acting as the product, and the B operand acting as a multiplicand. The result of the MODDIV operation is to return the missing multiplicand. In terms of processing, the MODDIV operation is frequently used in converting RNS to mixed radix.

There are other ways to view the MODDIV operation. For example, the MODDIV operation can be thought of as a "divide by a modulus" operation. That is, if the digit position defining the modulus to divide by is zero, the RNS integer may be divided by the modulus value. In this case, the reverse multiplication operation (MODDIV) is performed on a digit by digit basis in parallel, and will return the correct result of the divide. Therefore, this simple divide may be accomplished very quickly, since each digit function block LUT access may be performed simultaneously.

Table 2D illustrates this specific case of the MODDIV operation by showing an example case of an integer being divided by a digit modulus:

TABLE 2D

RNS (direct) Divide by Modulus

| Operation | 13 $I_6$ | 11 $I_5$ | 7 $I_4$ | 5 $I_3$ | 3 $I_2$ | 2 $I_1$ | Equivalent Value |
|---|---|---|---|---|---|---|---|
| A/ | 3 | 4 | 6 | 0 | 0 | 0 | 510 |
| B | 5 | 5 | 5 | 0 | 2 | 1 | 5 |
| = | 11 | 3 | 4 | * | 0 | 0 | 102 |

In table 2D, the integer value five hundred ten (510) is to be divided by the modulus value five (5). Because the integer value 510 is evenly divisible by the modulus value five, the MODDIV operation can be used, each digit of the dividend being divided by the corresponding digit of the divisor, where such operation is performed for each digit pair simultaneously using P number of arithmetic LUTs, and which may complete in a single clock cycle. In the case of dividing by a digit modulus value, the RNS number system offers an advantage; that is, if the divisor digit, in the position of the modulus value to be divided, is zero, the integer divisor is evenly divisible by the modulus value. This fact forms the basis for the MODDIV operations of the present invention. The asterisk in the result of the modulus five column indicates that the digit is now undefined, or "skipped" as defined herein, as a result of dividing by its modulus. The actual value of the lost digit position can be recovered using a base extension operation not shown.

MODDIV may also be used to reverse multiply two arbitrary RNS integers. This operation is effectively integer division, however, it is only valid if the values divide evenly, and in most cases, this fact is not known. Therefore, MODDIV cannot be used for arbitrary division of integers. To accomplish this task in RNS, a complex series of operations is generally required; the complex arbitrary integer divide method will be disclosed later, where one finds the MODDIV operation being used as a primitive operation.

MODDIV may be used to test the property of being evenly divisible using the system of the present invention. To factor a composite, semi-prime number, a series of test divisions may be required. Using the method of the present invention, the conventional division test case may be converted in to a MODDIV trial (single clock) and an RNS comparison. It is possible the RNS comparison is faster than division, providing a means for fast factorization.

It should be noted that special memory can be designed to support the various theoretical LUT sizes, but the use of standard memory is generally less expensive. Also, there are various coding schemes that may reduce memory LUT size. For example, the MODDIV operation commonly uses only modulus values as possible B inputs. This reduces the theoretical amount of arithmetic LUT 301 memory required by the MODDIV operation.

Other means may be used to implement arithmetic operations in lieu of look-up tables (LUTs), such as LUT 301. For example, special hardware may perform modulo addition and modulo subtraction. Hardware solutions for modulo multiplication also exist. The most difficult LUT operation to replace is MODDIV; however, there are means to iterate a correct answer for this function as well. However, since high performance is typically required, the LUT implementation is attractive since results of the MODDIV function may be stored a prior, and accessed in a single cycle.

Direct Loading of Accumulator

Most embodiments require the digit accumulator 302 for ALU A and the digit accumulator 303 for ALU B to be loaded from a source other than LUT 301 output 322 and 323. For example, most CPU's allow the accumulator to be directly loaded with a value from the register file 300. As another example, the contents of digit accumulator B 303 may need to be transferred to digit accumulator A 302.

Loading the digit accumulator is needed to initialize the accumulator prior to performing an operation via LUT 301. Generally, the loading operation occurs for all digit ALU's simultaneously, and is regarded as a single clock operation.

Hardware data paths that directly interconnect from the register file 300 to digit accumulator, or from accumulator A to accumulator B, are not shown in any figures provided for sake of clarity. However, one embodiment may embed a "Load" function within the LUT function block 301, for example. In this case, an operation code may be added to Table 1, and assigned the function of "load operand B to accumulator". Such hardware connections and their details are presumed obvious to those skilled in the art of digital hardware design.

Crossbar Data Bus

Each digit function block of the enclosed method is isolated from every other digit stage with the exception of a common "crossbar" bus, and common control and status lines that connect to each digit. As shown in FIG. 2A, the crossbar bus 318, 319 is a data bus interconnected to all RNS digits and is generally used to forward a common value to one or more digit function blocks 205, 210 & 215 simultaneously.

The crossbar buses 318, 319 are depicted in FIG. 2A interconnecting a plurality of digit ALUs, such as ALU 205, to an RNS ALU control unit 200. In FIG. 3A, the crossbar busses are shown in more detail, as crossbar bus A 318 and crossbar bus B 319. Crossbar bus A 318 services ALU A, while crossbar bus B 319 services ALU B, each in an independent manner depending on the requirements of the control unit 200. Generally speaking, the crossbar buses 318, 319 are bi-directional, but this is not a limitation of the present invention.

Many primitive ALU operations require the use the crossbar bus. Referring to FIG. 2E, if the value of a given digit register 302*b* is to be subtracted from all other digit registers (of different digit modulus), the crossbar bus A 318 may be used. In this case, the crossbar bus gate 313*b* is enabled, and the value contained within the digit register A 302*b* is gated to the crossbar bus A 318. All other digit ALU's can then gate the value on the crossbar bus 318 to the LUT operand input via the crossbar data selector 310.

FIG. 2E shows a highlighted path for the data flow to and from the crossbar bus 318 in this case. In FIG. 2E, digit register 302*b* is sourcing its digit accumulator to the crossbar bus 318 via selector 313*b*. Also shown is the crossbar A 318 sourcing data to other digit function blocks via selector 302 and 302*c*. Next, a global subtraction command is transmitted via Op Code A bus 316 to all affected digit ALU's; in response, each digit ALU performs a modulo P subtraction of the crossbar data, where P is the modulus of the particular digit ALU.

The remaining operations of addition, multiplication and digit division may also use the crossbar bus as an operand source. For example, if the entire ALU A word is to be divided by the value of a particular modulus, that modulus is gated to the crossbar bus. All other digit slices then choose the crossbar bus as its operand (control lines not shown) via selector 310 to be used as an operand for LUT 301. All LUTs of the ALU are instructed according to OP-code control lines 316. In this case, the OP-code will indicate a divide, or MODDIV operation. Each LUT is also fed from its digit register A 302. The result for each digit slice LUT is stored in digit register 302 in the case of ALU A.

In certain low level ALU operations, the value of a specific digit is subtracted or added to the (entire) ALU. In other operations, the value of a digit modulus is used to multiply by or divide by the entire ALU. In any case, if there is a need to transmit a digit value or digit modulus to all other digit ALU's, the crossbar bus is typically used.

Many sequential operations of the ALU use the crossbar bus. For example, when converting an RNS value to a mixed radix number, each digit of the RNS number may be processed. The value of the first selected digit is tested for zero, and if non-zero, is gated to the crossbar bus so that it may be subtracted from all valid digits. After subtraction, all other digits must be divided by the value of the first digit modulus. Thus, the value of the selected modulus is gated onto the crossbar via ALU controller 200 in one embodiment. The ALU then instructs all LUTs to perform a divide LUT operation. Each digit is processed in a similar manner until the RNS value is exhausted.

The source for data which is gated to the crossbar bus A 318 and crossbar bus B 319 may vary. For example, a data path from the register file 300 to the crossbar source selector 313 is typically provided. In this case, a digit modulus may be accessed via digit register file 300 and gated to the crossbar, and then used as an operand for all other digit LUTs. This is an alternative to the ALU supplying a data value directly, although both design schemes are similar and require the ALU to divide all valid digits by a given modulus value supplied from a known source. It should be understood that other sources of data may gated to the crossbar bus that are not shown or described herein.

Figure 3B:
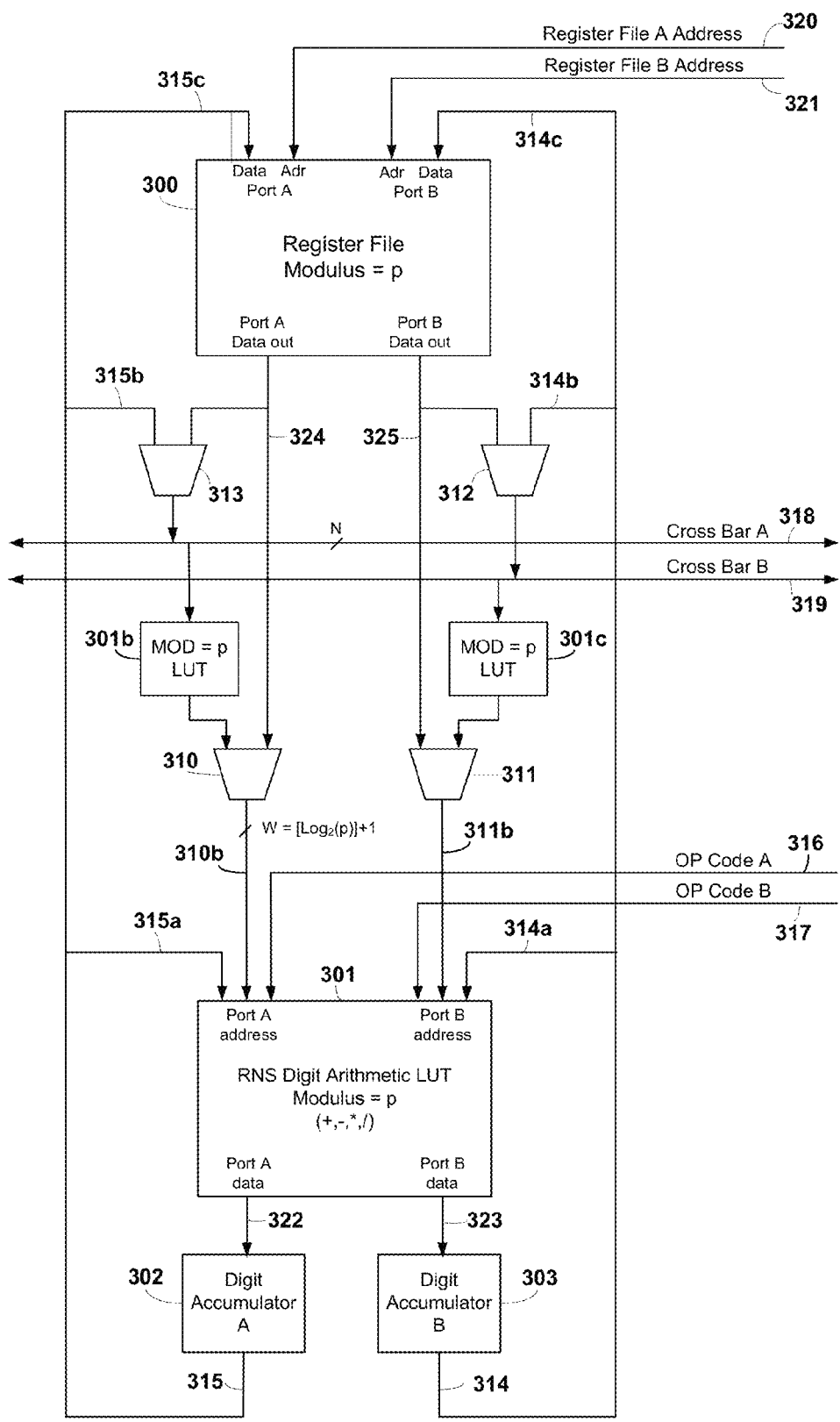
FIG. 3B is a block diagram illustrating an exemplary RNS dual digit accumulator modulus LUT pre-scalar to digit arithmetic LUT.

In one embodiment, the crossbar bus 318, 319 is as wide as (the width) of the largest digit modulus of the ALU. In one embodiment, this maximum width is depicted by Q, which represents the binary width of the largest digit modulus. In this embodiment, the design architecture extends a data path of width Q to the input (B) of all digit LUT's 301, regardless of the width of the specific ALU digit modulus. This technique avoids performing a "modulo digit" operation on the crossbar data itself, (such as that shown in FIG. 3B with modulus pre-scale LUT 301*b* and 301*c*). This ensures that LUT 301 input directly supports operations on data from any larger digit modulus. Of course, such a technique may waste storage as a result of LUT size and redundancy, but may execute faster than using digit modulus LUT 301*b* pre-scale unit of FIG. 3B.

Crossbar data is generally sent and received in a common format, but not necessarily in a format directly used by the LUT or digit accumulator register. One embodiment includes a special variation depicted in FIG. 3B. A LUT 301*b* or other hardware function performs a conversion of data from the crossbar 318 for ALU A; LUT 301*c* is used for ALU B. In this embodiment, the ALU arithmetic LUT 301 input B need only support MOD p data width, since any value exceeding p−1 is converted using the MOD p LUT before being routed to the LUT 301 input. This conserves memory space, by supporting smaller LUT input size, but may sacrifice speed, by cascading the digit modulus LUT function 301*b* with that of the arithmetic LUT 301.

Figure 3C:
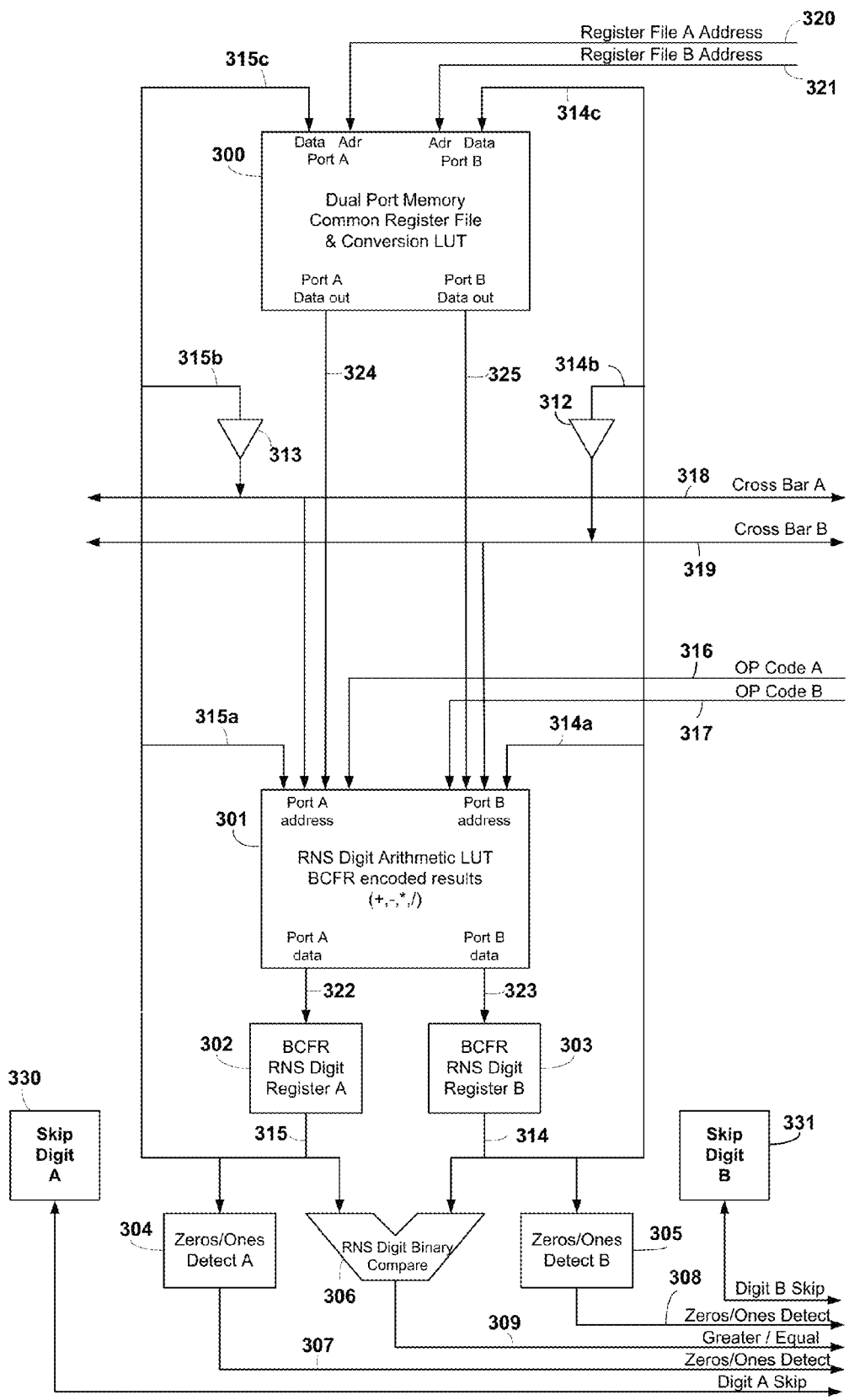
FIG. 3C is a block diagram illustrating an exemplary RNS dual digit accumulator.
Figure 3D:
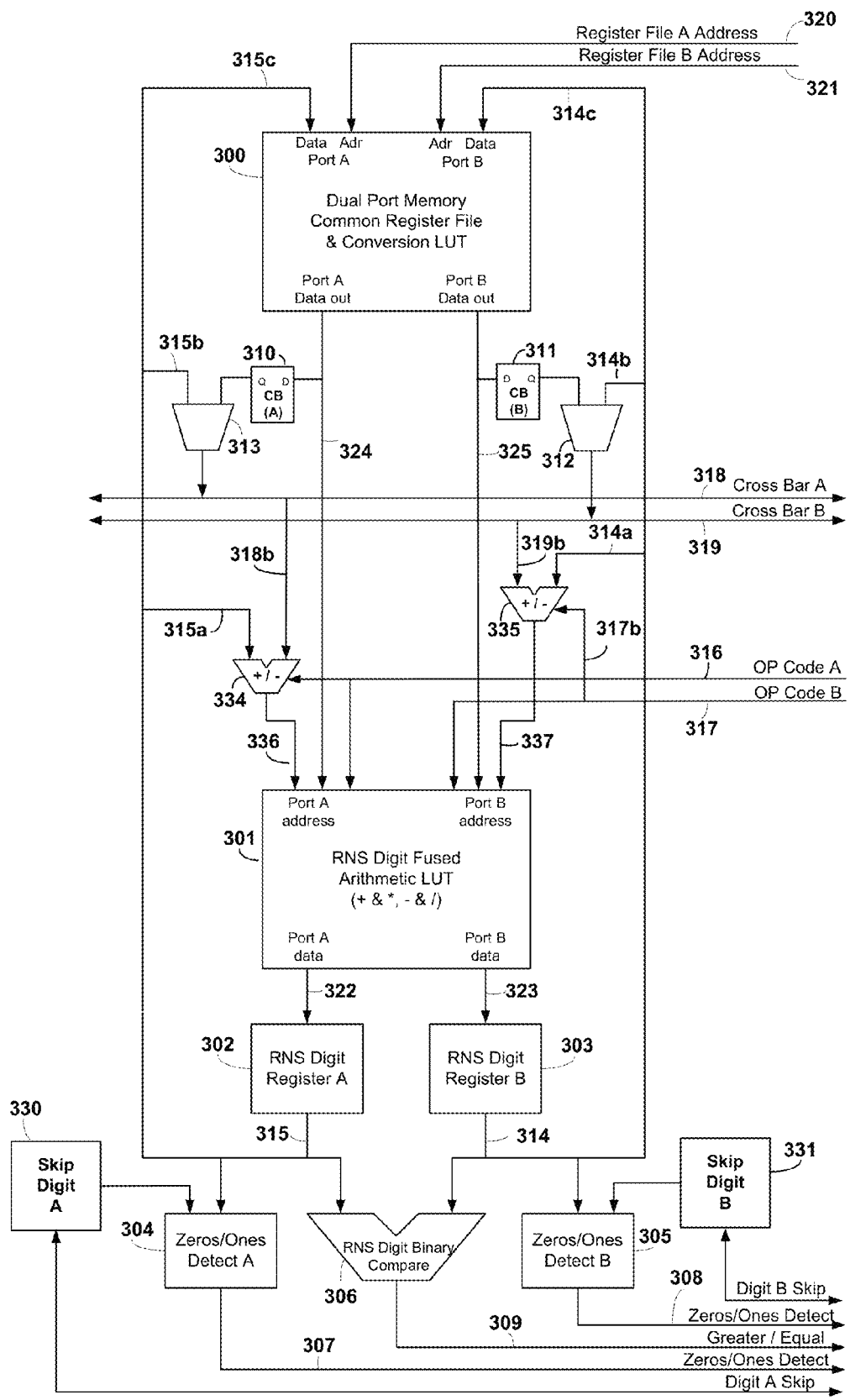
FIG. 3D is a block diagram illustrating an exemplary RNS dual digit accumulator.
Figure 3E:
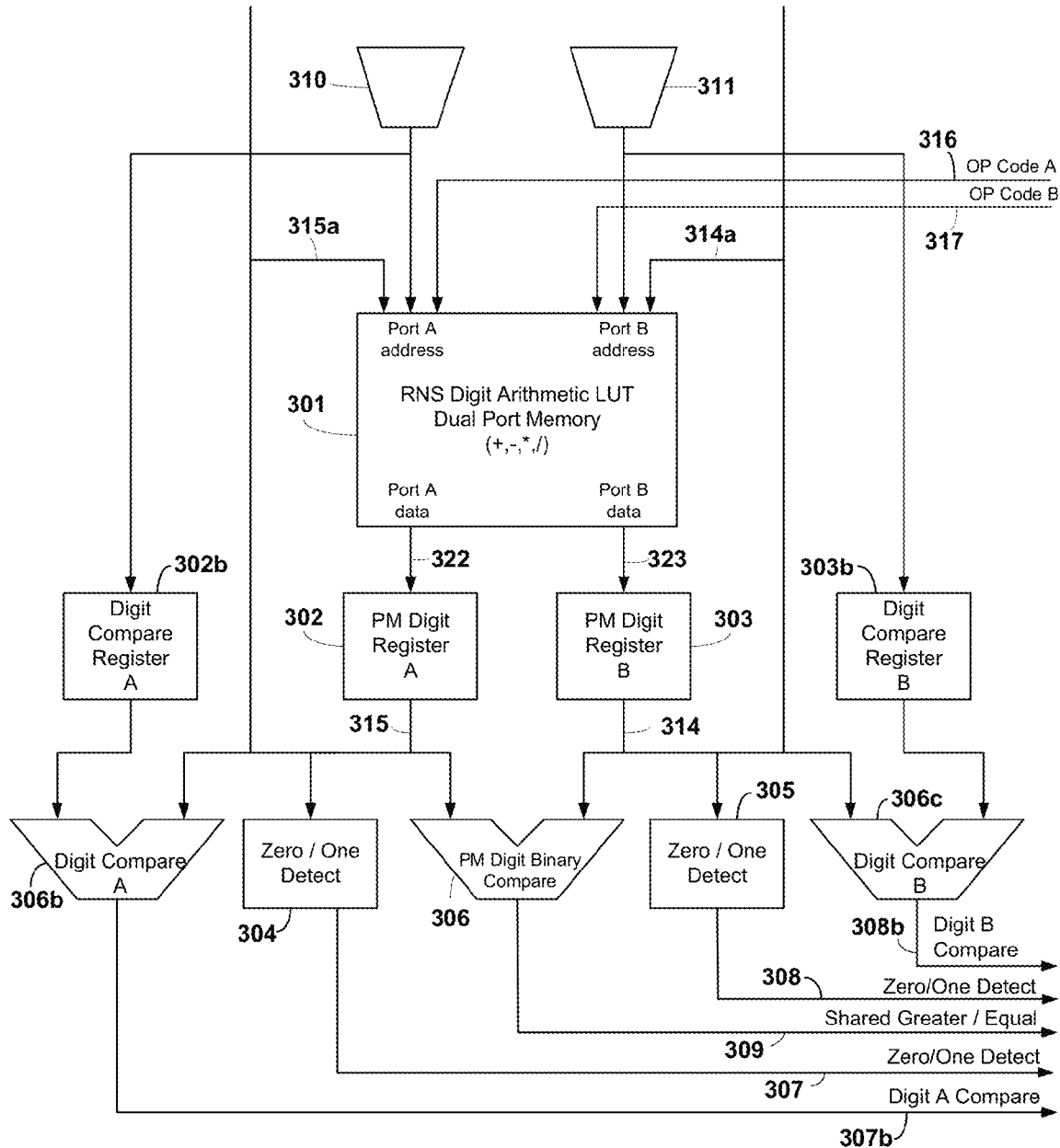
FIG. 3E is a block diagram illustrating an exemplary RNS dual digit accumulator with embedded digit compare registers and digit comparators in detail.

The crossbar bus may also support a different data format than some or all digits of the ALU. For example, a power based digit modulus is implemented for the purpose of creating a fast and balanced ALU. In one embodiment, the digit accumulator of the power based digit is encoded as a binary coded fixed radix (BCFR) number. Therefore, in this case, the BCFR formatted value may require a conversion to binary before being gated to the crossbar bus 318. FIG. 3G depicts a digit ALU with a BCFR to binary conversion unit 326 placed between the digit accumulator 302 and the crossbar bus gate 313. This advanced topic is discussed in the integer division method in the section regarding power based digit modulus.

Typically, at least two crossbar buses 318, 319 are provided for a dual accumulator. This allows each ALU to operate independently, and also in tandem. In one embodiment not shown, the ability to cross gate values from crossbar bus A 318 to crossbar B 319 is provided; these types of enhancements are design specific, and do not add significantly to our explanations of the basic operation of the present inventions.

Crossbar LIFO Hardware Stack

Figure 2B:
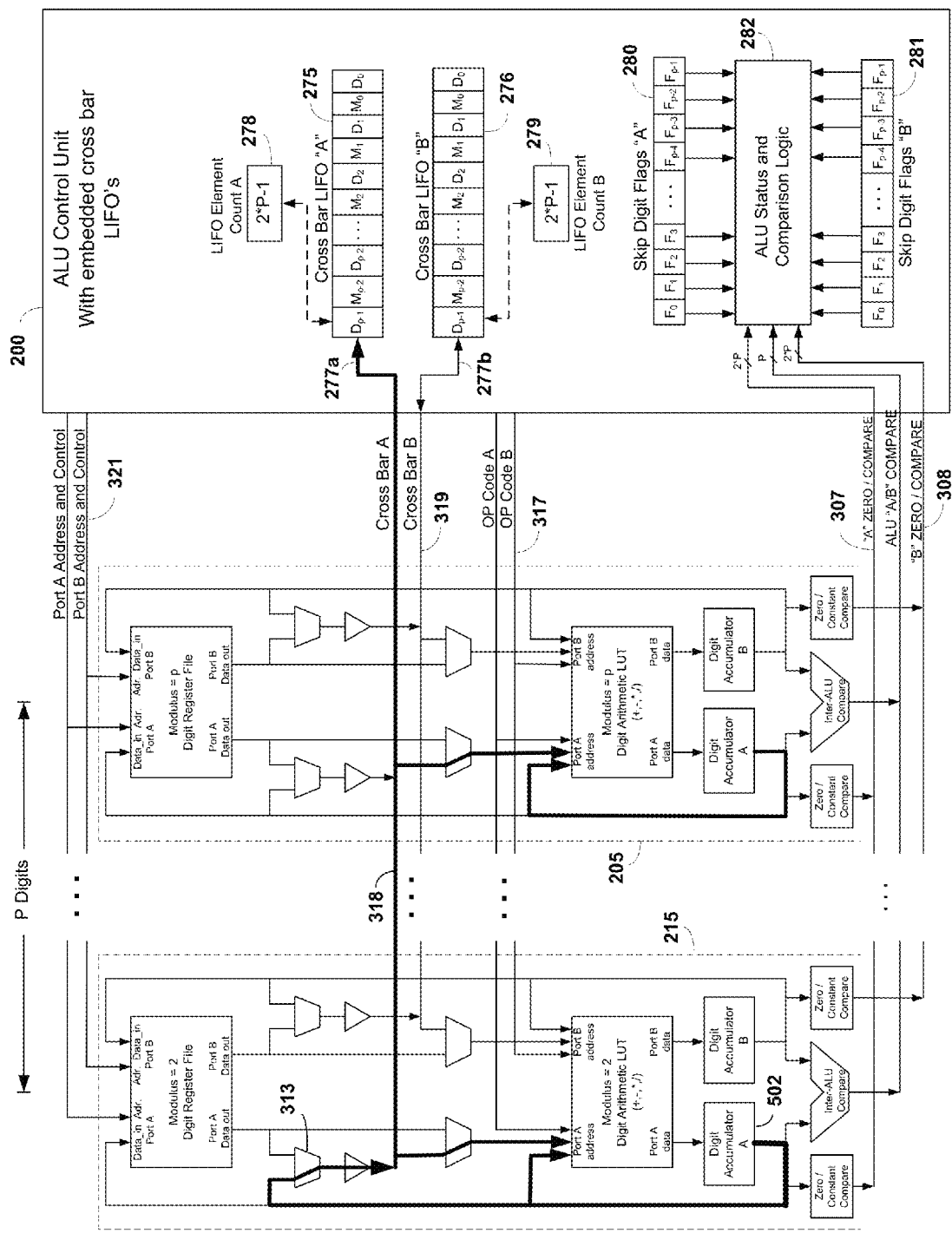
FIG. 2B is a block diagram illustrating an exemplary p-digit RNS ALU architecture.

One optional, but particularly useful data structure connected to the crossbar bus A 318 and B 319 is the crossbar last-in first-out (LIFO) hardware stack 275 and 276 respectively, as depicted in FIG. 2B. The LIFO interconnects to the crossbar of each ALU using selector and bi-directional gate represented as a double arrow 277*a* and 277*b* for crossbar A and B respectively. Each crossbar LIFO is capable of being loaded from the crossbar data bus using a "push" type operation. Likewise, the crossbar LIFO may source data to the crossbar bus using a "pop" type operation.

During residue to mixed radix conversion, LIFO 275 data structure provides a means for high speed storage of both modulus values and digit values in one embodiment. During the conversion of RNS to MRN, the LIFO is pushed alternately with digit values and modulus values. A LIFO element count 278 tracks the number of data elements added to the LIFO 275. During MRN to RNS conversion, the LIFO 275 is operated in reverse. Digit values are sourced to the crossbar bus and added to the ALU accumulator during a LIFO pop operation; likewise, the ALU is multiplied by modulus values sourced from the LIFO when they are popped. FIG. 2B depicts the digit values $D_X$ and Modulus values $M_X$ contained in the hardware LIFO stack 275.

The LIFO 275 structure offers several advantages. For one, the LIFO helps to simplify the ALU control logic within the ALU control unit 200. For example, tracking skipped digits is implicitly handled by the FIFO, and therefore reduces control logic. If the LIFO is not used, control circuitry may use the register file 300 to store and retrieve modulus and digit values. This creates additional burden on the control circuit to track digits that have been skipped or modulus order that has changed, for example. The LIFO 275 is very useful in the present invention for managing numbers of variable modulus and radix sets.

The LIFO stack structure can also play a key role in the conversion of RNS to binary. In FIG. 21B, the LIFO stack 275 is interconnected to parallel to serial register 2100 and 2101. Parallel to serial register 2100 latch the modulus values contained in LIFO 275. Parallel to serial register 2101 latch the digit values contained in LIFO 275. Values contained in each parallel to serial converter are shifted in tandem to a plurality of K binary digit stages 2102, 2103, 2104. After a sufficient number of clock cycles, the binary conversion result appears in digit registers $B_0$ 2111 through $B_K$ 2114.

Status Registers and Status Register Data Bus

ALU control circuitry 200 makes decisions based upon the status of each digit ALU. In the embodiment of FIG. 2A, each ALU provides a plurality of status signals 307, 308, & 309 back to ALU control circuitry 200. Basic status signals from ALU A are set after the result of an operation and generally reflect the state of the value contained in the digit accumulator 302 register. The ALU flags consist of a zero (0) flag, a one (1) flag, and comparison flag indicating the outcome of comparison with digit register 303 accumulator B. Each ALU A and B transmit status signals to the control circuit; each set of zero and one detect flags are unique from each ALU. Generally, status signals such as the zero (0) and one (1) status signal are wired in parallel, so that control circuitry 200 can immediately establish whether a zero value exists in all digit accumulators 302, 303 simultaneously.

A single shared set of compare status signals 309 are shown in FIG. 3A; these compare flags indicate the outcome of a digit by digit compare between ALU A and ALU B. This ALU architecture is useful for enhancing the speed of number comparison in the ALU of the present invention. The comparator 306 may support both "equal" as well as "less than" and "greater than" status conditions. Status signals 309 from each digit comparator 306 may be provided in parallel to control circuitry 200 in FIG. 2A. This allows an apparatus for fast equality check (i.e. identical value check). Alternatively and in addition, a shared set of comparator status signals 309 may support comparison on a digit by digit fashion. A mixture of status bus design is generally used depending on how the RNS ALU is packaged and partitioned.

In some embodiments, an RNS number comparison operation is performed digit by digit. The ALU control unit 200 has the ability to select any digit within the ALU, and therefore a means to address any particular digit ALU to receive its status.

For example, two RNS operands are loaded, one in digit register A 302, and the other in digit register B 303. Comparison is performed by reducing each RNS value into a mixed radix number (MRN) simultaneously. A digit modulus is selected, and a mixed radix digit is obtained and stored in each digit register 302 and 303. The digits are compared 306, and a comparison signal 309 indicates the outcome of the digit comparison to control circuitry 200 of FIG. 2A. The comparison signal is routed via control and status lines 309 to ALU control 200, which then stores an updated comparison result.

Next, another digit modulus is selected, and another comparison is made between digit registers A and B. The new result of the digit comparison overrides the previous comparison unless the new digits are equal. RNS comparison using mixed radix conversion compares least significant digit to most significant digit. A comparison code indicates equality, greater than, or less than as each digit is processed. If the conversion length of the mixed radix is equal, then the comparison code is used to indicate the comparison result. Otherwise, if the conversion length is different, the number having more digits is greater than the other, assuming both values are positive quantities.

Other control signals may exist that are not shown in FIGS. 2A and 3A. Such additional control signals may provide enhancements to the ALU architecture for faster processing.

Status Flags and Status Register Data Bus Details

Figure 5A:
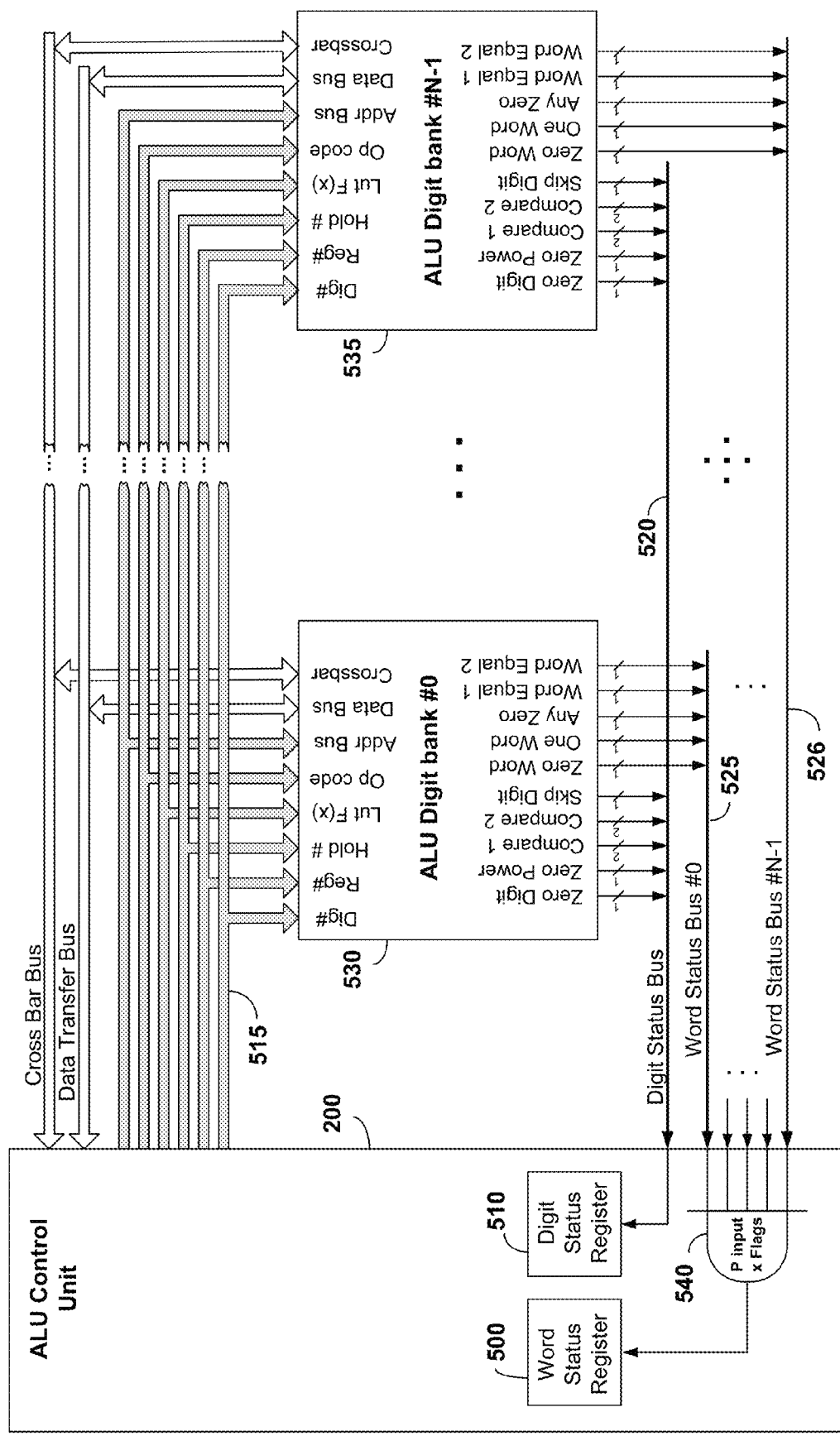
FIG. 5A is a block diagram illustrating exemplary ALU status logic using digit banks.
Figure 5B:
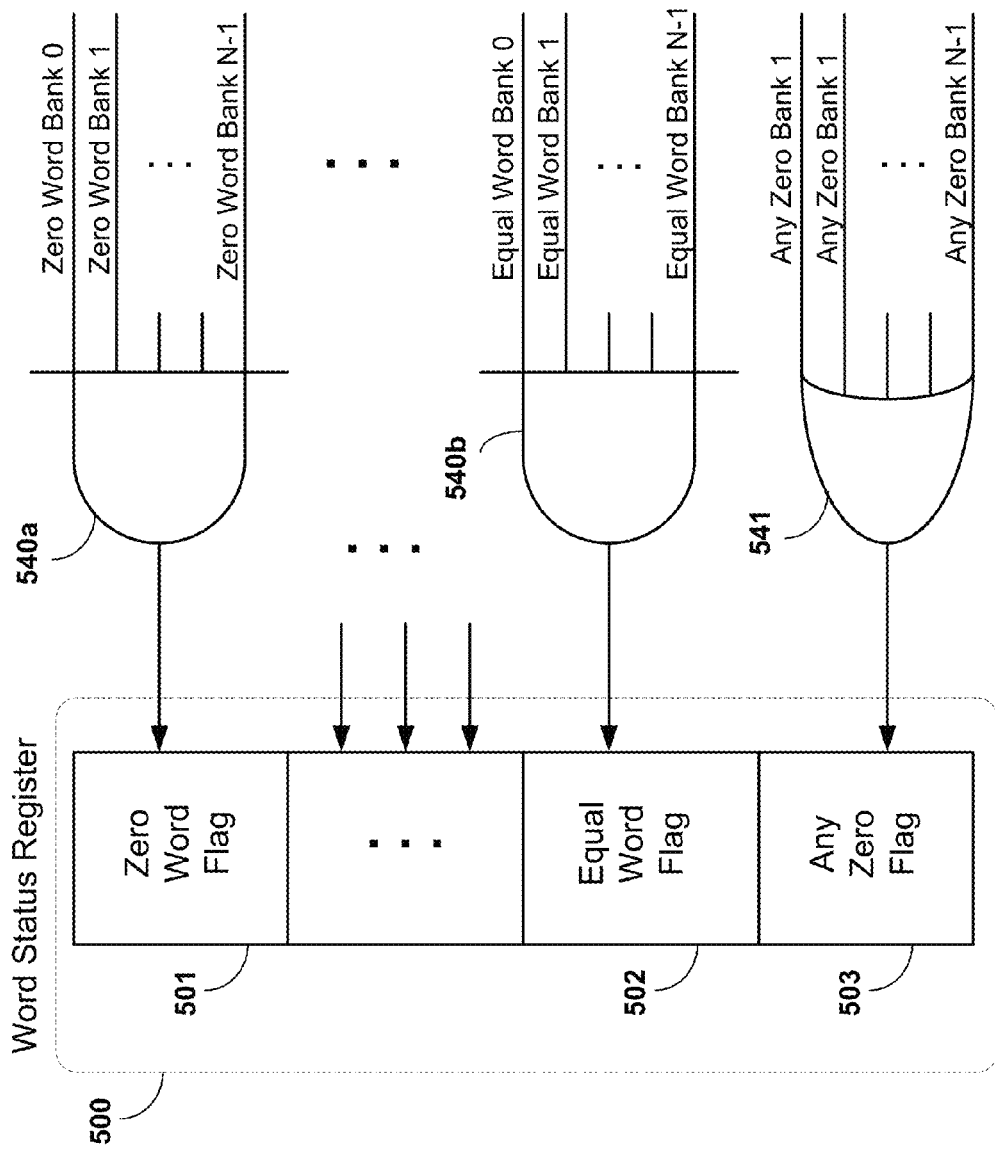
FIG. 5B is a block diagram illustrating exemplary world status logic for digit bank organization.
Figure 5C:
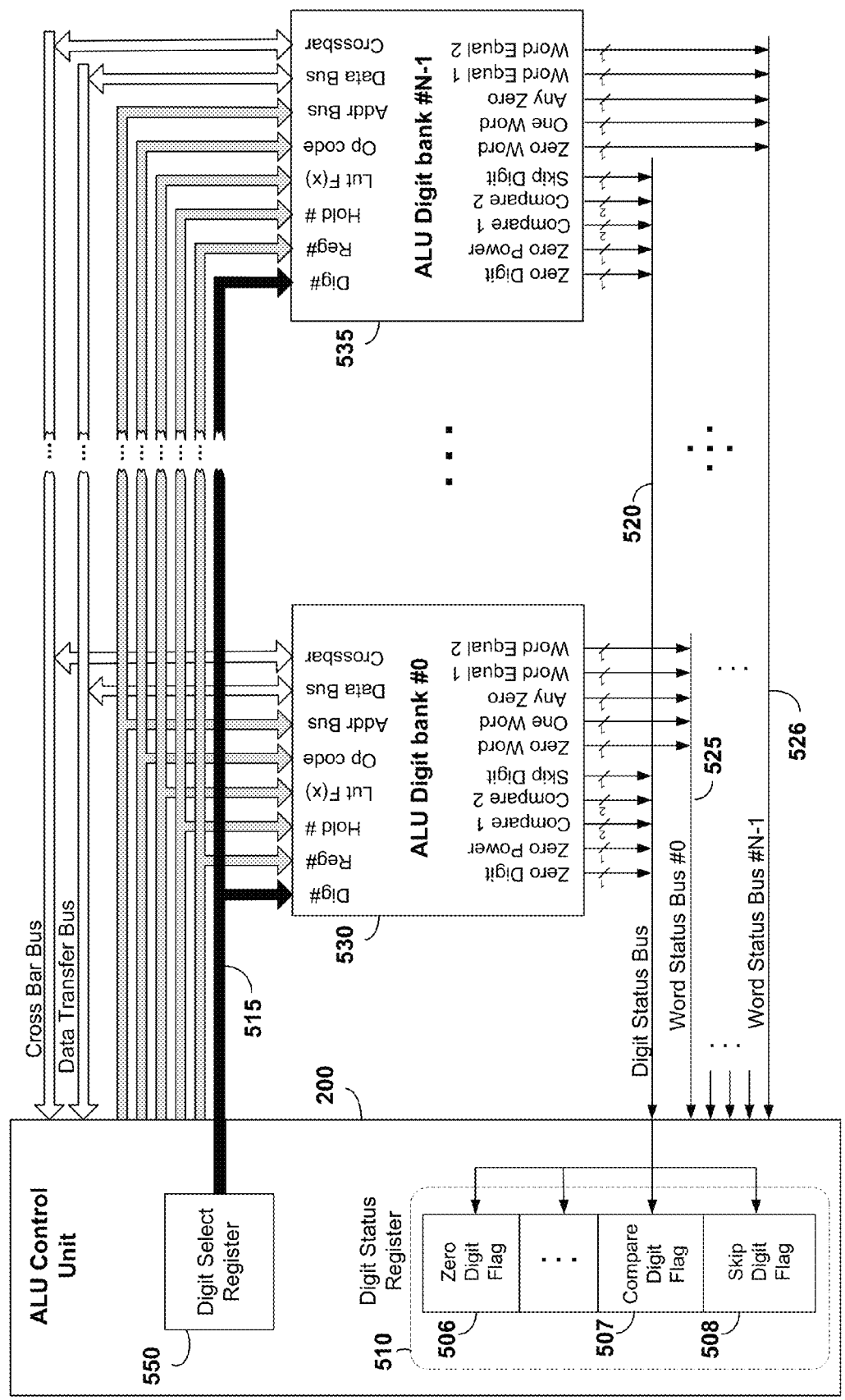
FIG. 5C is a block diagram illustrating exemplary ALU status logic using digit banks.

FIG. 5A illustrates another embodiment of using a status bus to transmit status information from each digit ALU to a central controller 200. In FIG. 5A, a plurality of digit ALUs is illustrated using an "ALU digit bank" block symbol 530 and 535. This type of organization is common since RNS digits may be grouped together on a circuit card, or within a single IC circuit. Within each digit bank, the necessary status lines are grouped into a plurality of status signals gated to a digit status bus 520 and a word status bus, such as word status bus 525.

In FIG. 5B, more detail representing typical logic for a CPU status word is provided. The word status register 500 stores the "word wide" status result of each RNS ALU operation(s). Word wide generally implies status of all valid digit ALUs combined together. For example, if the result of the ALU produces a zero value, the output of AND gate 540*a* is true, and the Zero Word Flag bit 501 contained within the Word Status Register 500 is set. Likewise, if the result of all digit ALU's within a digit bank sets the "Equal Word" flag, the output of AND gate 540*b* will set the Equal Word status flag 502 in the Word Status Register 500. The "any zero" flag 503 represents OR logic processing of an ALU word wide status; if any digit bank reports a zero, the output of OR gate 541 sets the Any Zero Flag 503 of the word status register 500.

In FIG. 5C, detail is shown regarding the "digit status bus" 520. The digit status bus may be implemented as a common bus, i.e., a single set of shared status lines. In this case, the digit to be inspected must first be selected via digit select bus 515, which is illustrated as being driven by digit select register 550. The selected digit ALU, contained within a digit bank 530, will then gate its status to the digit status bus 520. For example, if a particular digit ALU result is zero, and the digit is selected by the digit select bus 515, the Zero Digit Flag contained within the Digit Status Register 510 will be set. The RNS ALU control 200 can select any specific digit ALU, and query for required status information as needed.

Figure 5D:
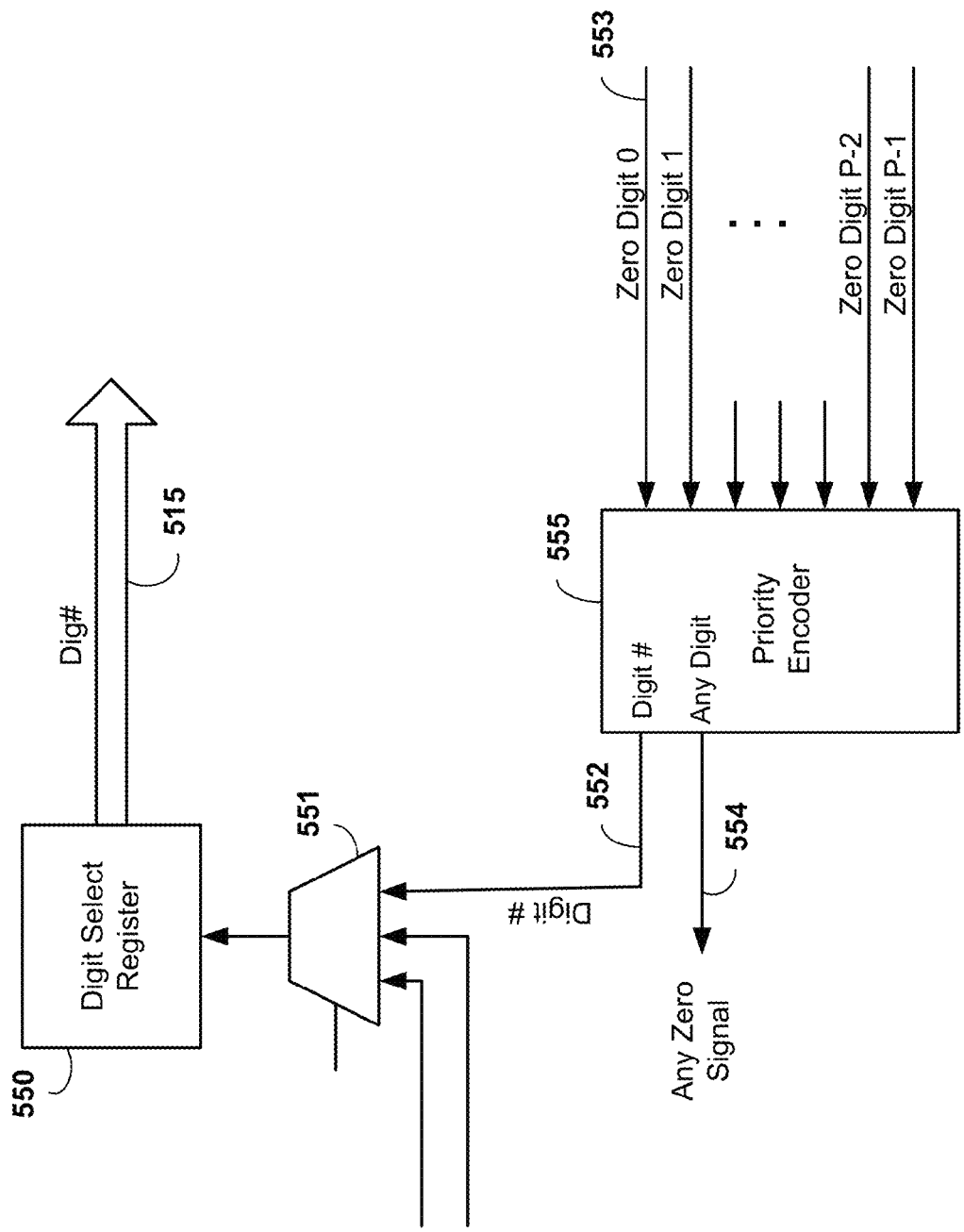
FIG. 5D is a block diagram illustrating exemplary zero digit status logic.

FIG. 5D illustrates additional status logic of interest to the RNS ALU. For example, the integer division method of the present invention requires that "any zero" contained in any digit ALU be detected. In FIG. 5A, one specific status line is called "Any Zero". That is, if any digit ALU contained within an ALU digit bank 530 is zero, the "any zero" signal is set true. Each "any zero" signal is ORed 541 together in FIG. 5B such that if any line is true, the Any Zero Flag contained in Word Status Register 500 is set. In FIG. 5D, additional circuitry is provided which may exist in some form in ALU digit bank 530 and also in RNS control 200. If multiple digits are zero, a system to prioritize the processing of each zero digit status 553 may be implemented using a priority encoder 555 which generates a digit address or code 552 that may be stored in Digit Select Register 550.

For example, in FIG. 5D, a priority encoder 555 is fed by the Zero Digit status 553 of each digit ALU contained within an ALU digit bank 530. If any Zero Digit line 553 is true, the Any Zero Signal 554 is set. Additionally, the highest priority digit is selected, and is enumerated with a value that is fed through selector 551 to be loaded into Digit Select Register 550. In other words, the highest priority zero digit ALU has been detected, and its digit position is loaded into the Digit Select Register 550 in certain operations. The Digit Select register can then be used to enable the newly identified, highest priority zero digit position (modulus). This function is useful for integer division of the present invention and will be discussed in more detail in the integer divide section.

FIG. 22G lists some status test operations used in the design of Rez-1, a specific ALU design which will be introduced later. FIG. 22G lists specific micro-operations, that when invoked, set specific status conditions within the RNS ALU. There are two basic categories of status operations, a digit based status, and a word based status, as shown in the first column of FIG. 22G. For many digit based status operations, a digit position operand is required. This operand may be provided by instruction, or directly by the ALU control unit 200. The digit position operand may be expressed in the form of a digit number, or digit_#, as shown in the third column of Table 2. The digit number acts to select the digit to be tested by the status micro-operation.

Compare status instructions perform a compare with the accumulator versus a digit compare register. If more than one set of digit compare registers are supported, then a Hold_Reg# operand may be required, to select which set of compare registers will be used for the digit compare status micro-operation.

FIG. 22G also shows the return, or result, of the specific status micro-operation, in column 4. Many word based status operations return True or False. For example, if the entire ALU word is zero, the result of a Test for Zero word instruction, or ZeroW, will return TRUE. In the case of comparison, the return value may be one from the set of lesser than, greater than, or equal. A fourth return status may indicate an end of compare, or END, for the case of digit by digit compare instruction Comp1D, for example. The return status of micro-operations shown in FIG. 22G may be used by the ALU control unit 200 in the course of higher level instructions, for instance.

In one embodiment known as Rez-1, status operations are the result of all non-skipped digits. This is to say that if a digit is marked as skipped, that digit does not enter into any status condition determination. This provides Rez-1 the ability to support a dynamic RNS modulus set by removing any ALU digit modulus by marking it as skipped.

Features and Enhancements to RNS ALU

The method and apparatus of the present invention is not limited to the apparatus of FIGS. 2A and 3A. Additional data paths and control circuitry may be added to enhance the operation of the basic apparatus. For example, an integrated compare register, an advanced multi-digit extend operation, and a dedicated method for handling signed values is also contemplated. The following sections describe additional apparatus, features and functions of enhanced architectures of the method of the present invention. Also, these sections help clarify more complex ALU operations, such as conversion to mixed radix and conversion to binary.

Conversion to and from Mixed Radix

RNS to mixed radix conversion and mixed radix to RNS conversion are fundamental operations within the RNS ALU of the present invention. So much so that unique variations of mixed radix conversion provide powerful methods for arithmetic processing of RNS numbers in the present invention. The present invention discloses for the first time unique and novel methods for employing mixed radix conversion as well as novel apparatus for supporting the operations within the RNS ALU.

One unique hardware feature is a hardware LIFO data stack for processing of mixed radix conversion. Another unique feature is the support of "skipped" digits, sometimes called "invalid" digits, which provides a general purpose mechanism for supporting a variable RNS modulus set, and supports a general feature for marking, delaying and grouping digits for base extending.

Mixed radix conversion is a frequently performed primitive operation within the ALU of FIG. 2A. Conversion from RNS to mixed radix generally consists of a series of digit subtractions and modulus divides. In turn, mixed radix digits are generated, and may be stored in register file 300 during high level operations like "digit extend". Alternatively, or additionally, mixed radix digits may be stored in the crossbar LIFO 275 as they are generated, as depicted in FIG. 2B.

Conversely, mixed radix digits may be discarded after they are generated during operations such as "compare" and "sign extend". In any case, this disclosure refers to the general process of mixed radix conversion as "decomposing" an RNS number.

Figure 2C:
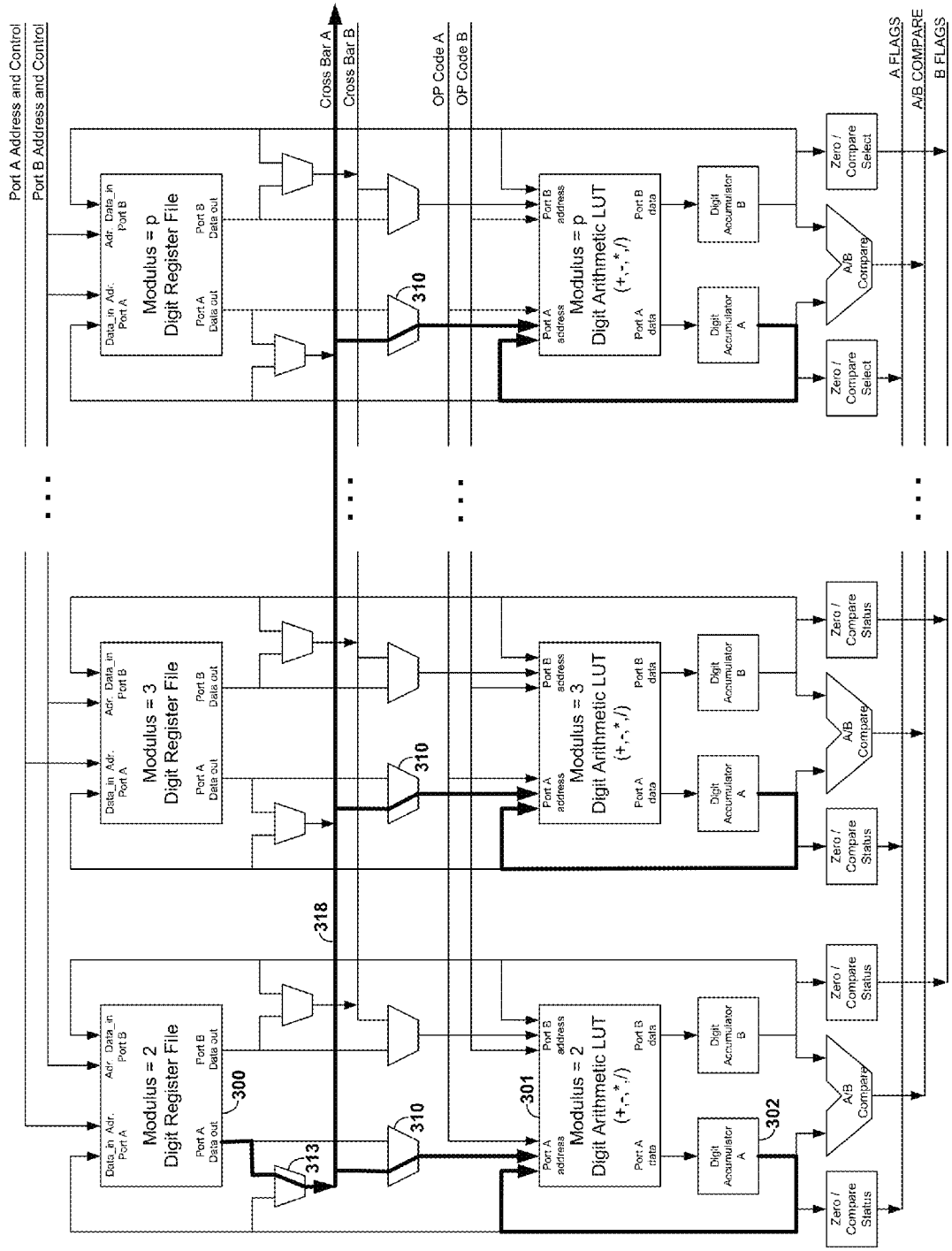
FIG. 2C is a block diagram illustrating an exemplary p-digit RNS ALU architecture with a register file crossbar source.
Figure 2D:
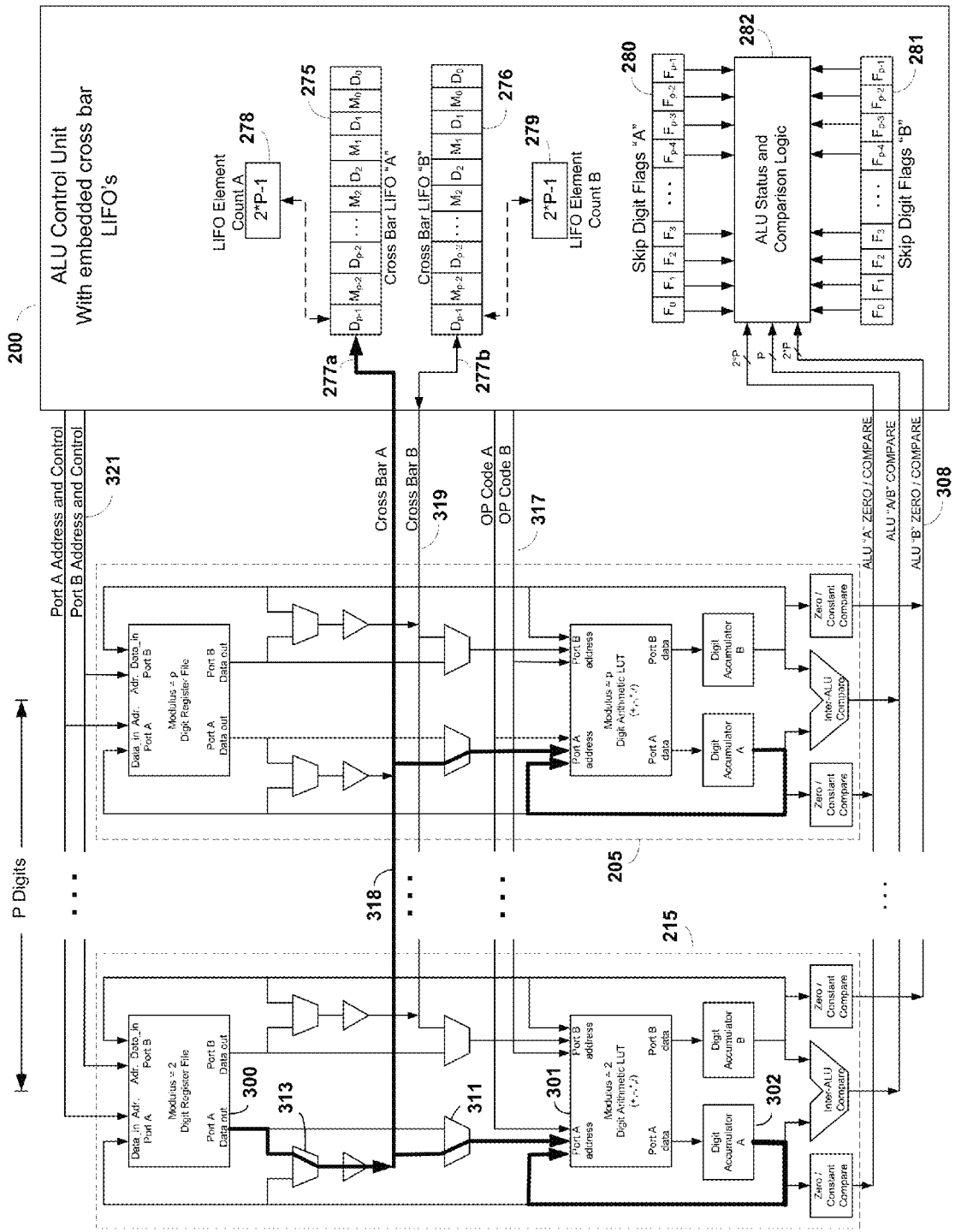
FIG. 2D is a block diagram illustrating an exemplary p-digit RNS ALU architecture.
Figure 2E:
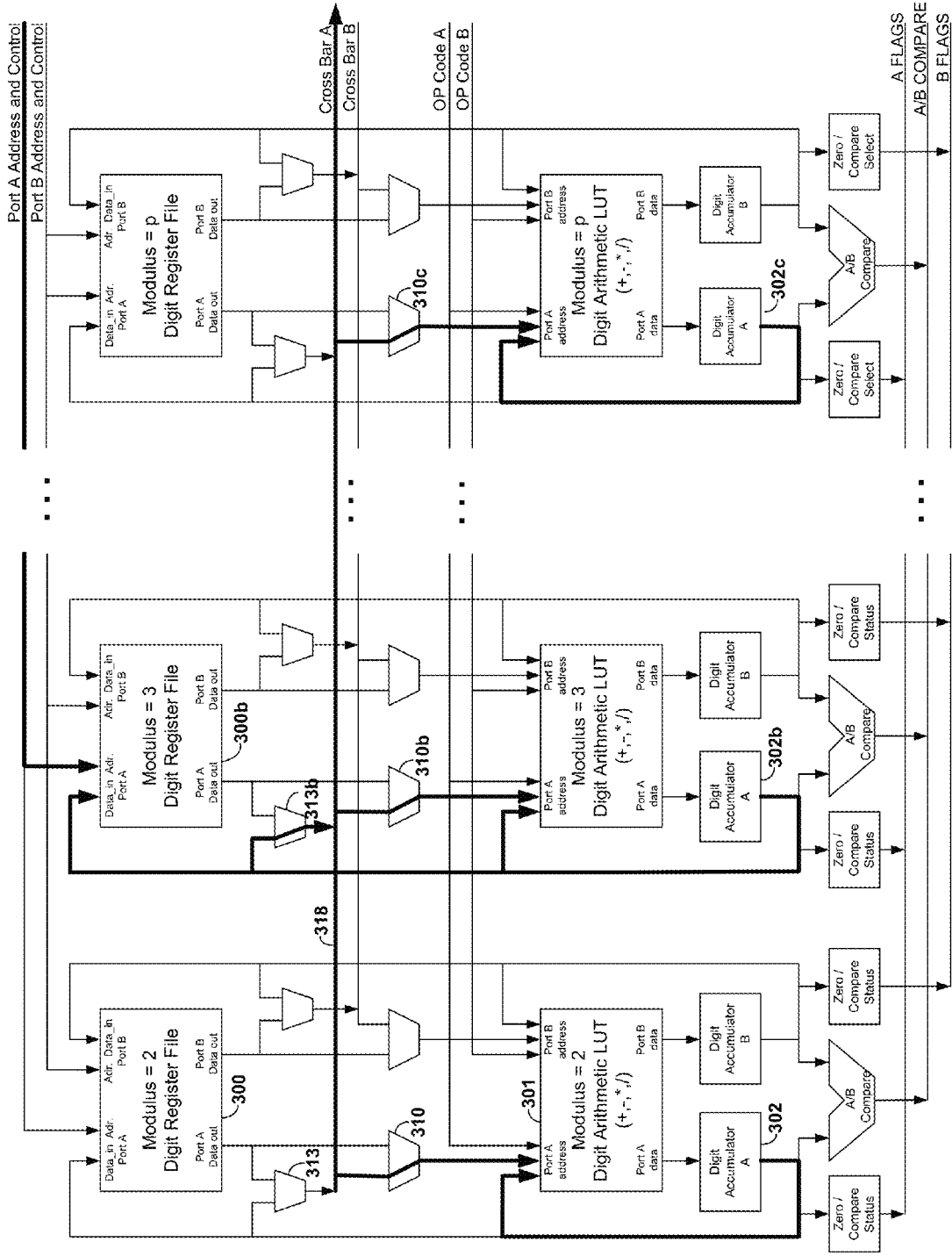
FIG. 2E is a block diagram illustrating an exemplary p-digit RNS ALU architecture with a register file crossbar source.
Figure 2F:
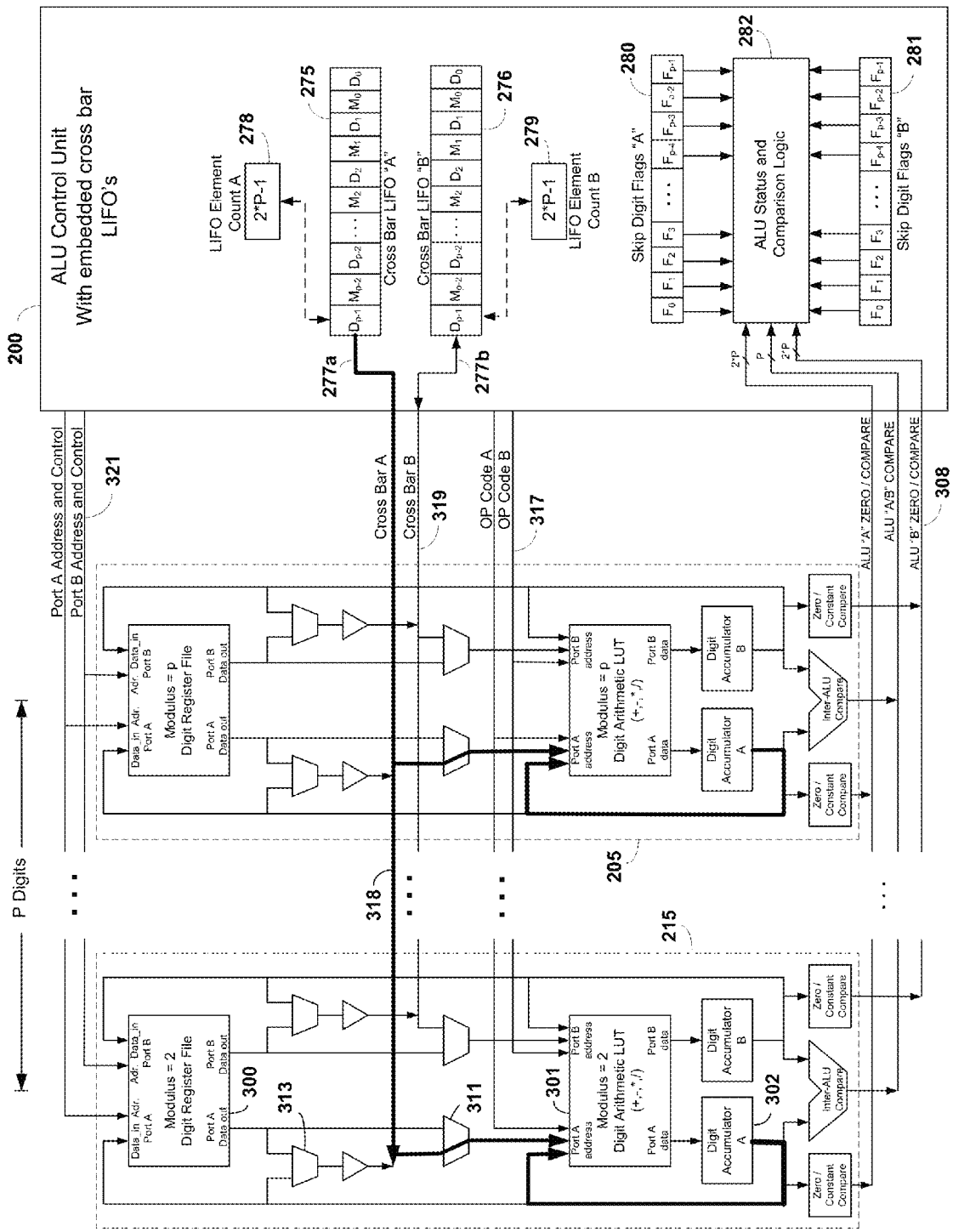
FIG. 2F is a block diagram illustrating an exemplary p-digit RNS ALU architecture with a LIFO crossbar source.

Conversely, converting a series of mixed radix digits back to RNS is another primitive and fundamental operation of the ALU of FIG. 2A. This primitive process is sometimes referred to as "recomposing" an RNS number in this specification. Converting back to RNS, or recomposing, consists of a series of modulo additions and multiplications. To reconvert, the mixed radix digits must be processed in the reverse order as they were generated to be converted back to the correct RNS value; therefore, mixed radix digits have positional significance. Recovering the mixed radix digits in reverse order may be simplified when using the LIFO 275 data structure as depicted in FIG. 2F. Otherwise, digit values may be retrieved from register storage 300 in reverse sequence as depicted in FIG. 2C.

Conversion of RNS to Mixed Radix Detail

FIG. 2B depicts a special hardware apparatus for supporting RNS to mixed radix conversion in one embodiment of the present invention. A Last-in, First-out (LIFO) hardware data stack 275 is coupled to crossbar bus A 318. A similar hardware stack 276 is coupled to crossbar data bus B 319. The LIFO hardware stack allows mixed radix digit and modulus values to be stored in sequence, and retrieved in the opposite order at high speed. Digit and modulus values are gated to and from the LIFO structure using the crossbar bus. A LIFO element count 278 and 279 track the number of stored entries in LIFO A 275 and LIFO B 276 respectively.

Figure 7A:
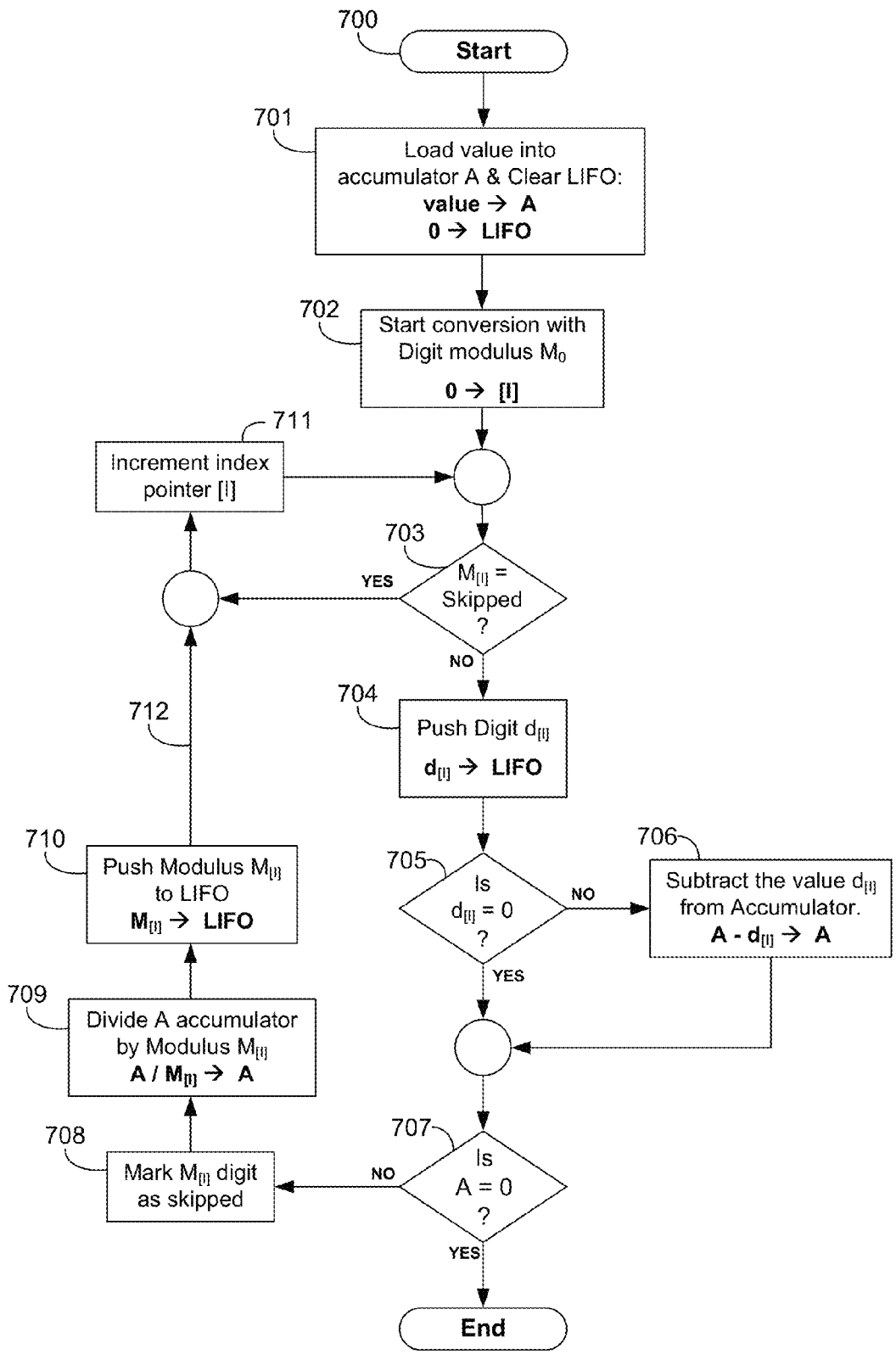
FIG. 7A is a block diagram illustrating RNS to mixed radix conversion with LIFO and skip digit processing.

FIG. 7A depicts a typical control flow for processing RNS to mixed radix conversion in the present invention. The control process first starts with the step 701 of clearing the LIFO structure 275 and loading the accumulator A with the value to be converted. Loading accumulator A for the entire ALU consists of loading each digit accumulator A 302 of each digit ALU slice 215 for every modulus (p). In some cases, control step 701 is not required since the value to convert may already exist in the accumulator, and the LIFO A may be cleared, thus the LIFO element count 278 is set to zero.

In control step 702 an arbitrary starting digit is defined for conversion. In the case of the flowchart, and by example only, the first digit is designated by index [I]=0. In one embodiment, the modulus p=2 is associated to index zero. It should be noted that other starting digits, and other digit orders may exist for conversion; in general, however, once a digit order is chosen, that order is kept for comparison, and followed in reverse for reconversion. For example, one embodiment may start with the largest digit modulus. (In some methods of the present invention, conversion with a specific order of digits is important, and will be noted at that time.)

Figure 3F:
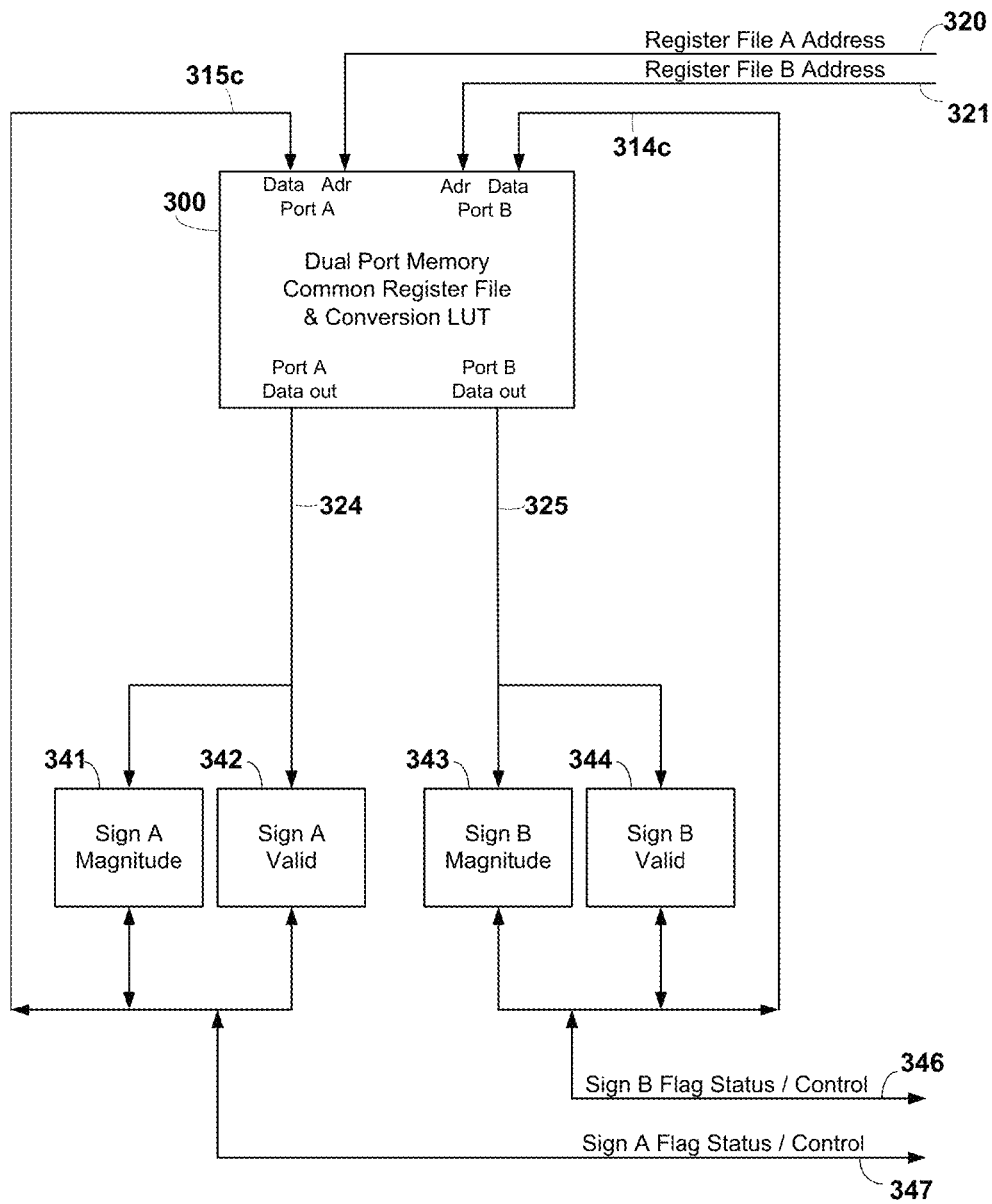
FIG. 3F is a block diagram illustrating an exemplary RNS dual ALU sign flags.
Figure 3G:
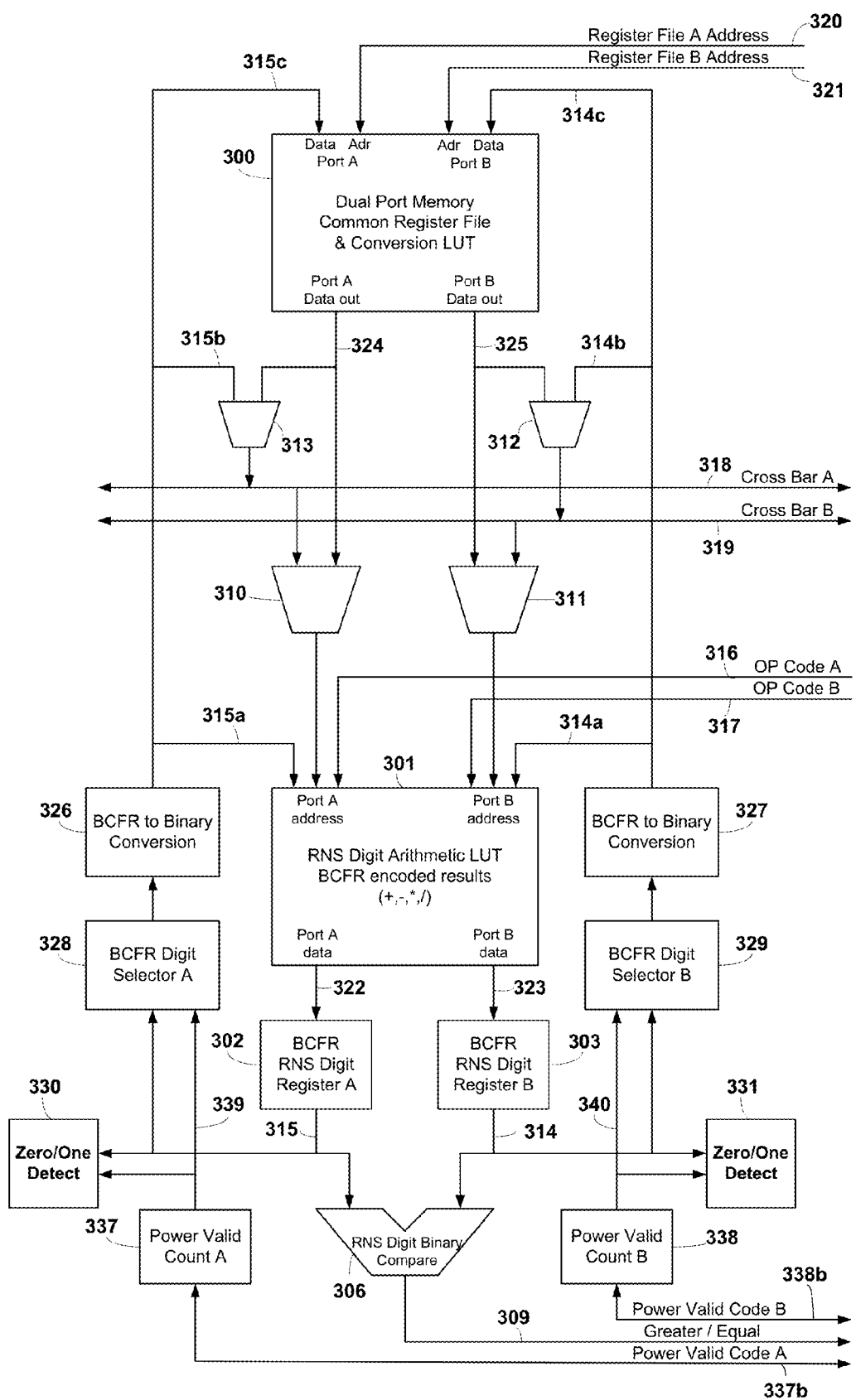
FIG. 3G is a block diagram illustrating an exemplary RNS dual digit accumulator.

At control step 703 a decision is made based on whether the ALU digit is flagged as skipped. For example, a digit may have been previously flagged as skipped using the skip digit flag 330 as depicted in FIG. 3I. Alternatively or additionally, the controller 200 may store skip digit flags 280 depicted in FIG. 2B. If the digit is flagged as skipped, the control system selects the next modulus $M_I$ by incrementing its digit position index 711. One requirement of the flowchart of FIG. 7A is that at least one digit is not marked as skipped. In this case, once a digit is selected that is not skipped, control passes to the step 704 of pushing the selected digits value to the LIFO 275. This operation represents a 'push", or store operation to the hardware stack LIFO 275 of FIG. 2B. The stack LIFO element count 278 is incremented by one.

FIG. 2B illustrates by a dark highlight the data paths affected for the case of ALU A. The step 704 of pushing the digit value to the LIFO includes the process of gating the selected digit to the crossbar bus. This generally implies selector 313 gating the accumulator 302 value to the crossbar bus 318 in the case of ALU A. The selected digit value is latched by the LIFO structure, and stored for future use.

Next, or in parallel to step 704, a step of comparing the selected digit 705 to check for a zero value is made. If the digit value is not zero, the value of the digit is subtracted from the entire ALU, i.e., subtracted from all digit slices simultaneously. Again, the data path of FIG. 2B illustrates the gating of the digit value to the crossbar bus, and depicts all non-selected digits 205 accessing the value of the crossbar bus 318 as an operand to the LUT. The ALU control unit 200 checks for the condition of zero for the selected digit using zero detect status signals 307 generated via zero detect logic 304 as shown in FIG. 3I. Referring to the flowchart of FIG. 7A, it is noted the zero digit detection step 705 may be eliminated, and control directly passed to subtraction 706 of the digit from the accumulator, since subtracting a value of zero is equivalent to skipping the subtraction step 706.

Figure 5E:
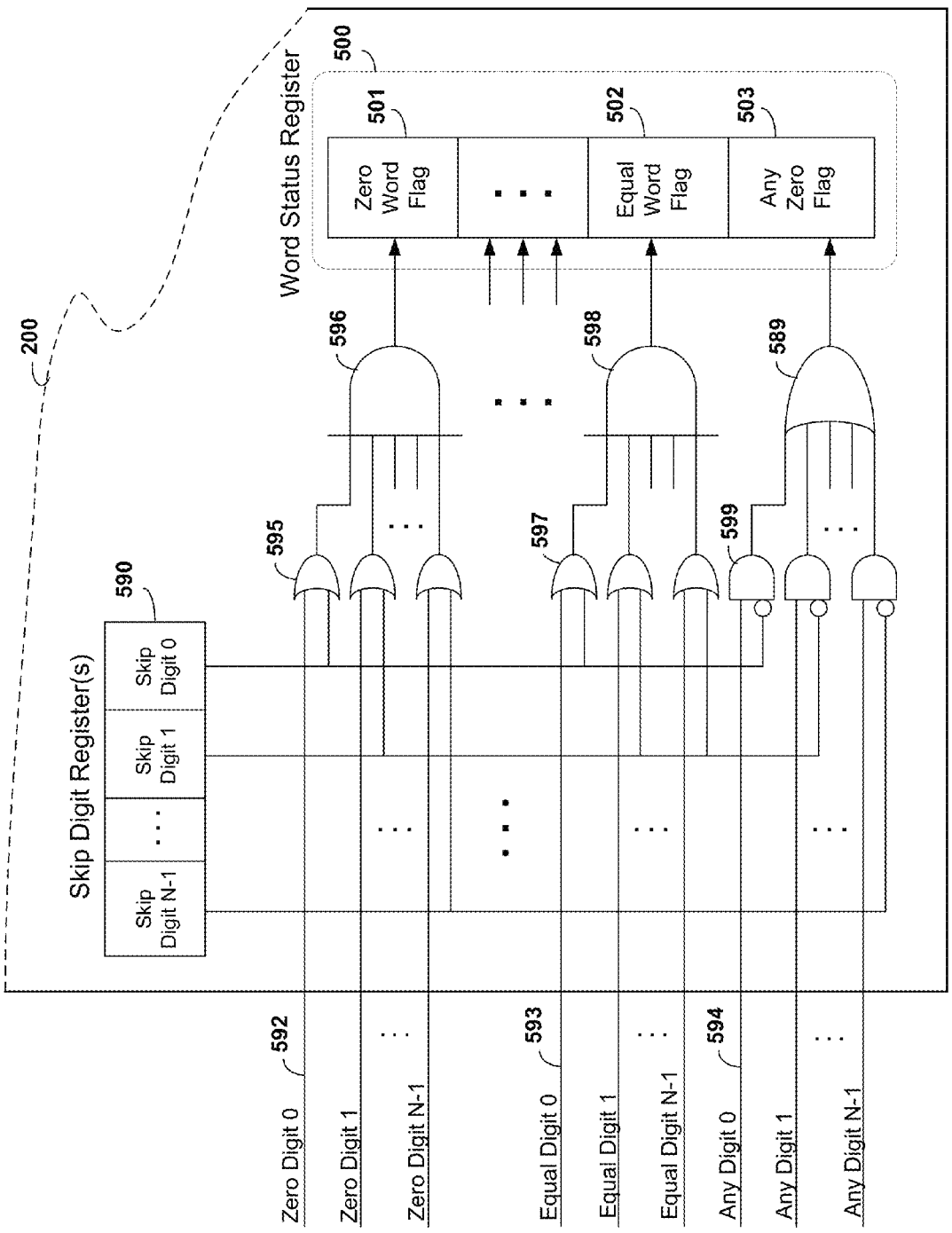
FIG. 5E is a block diagram illustrating exemplary status register logic.

Next, a control decision based on the outcome of the subtraction 706 step is made; the entire accumulator is checked for the value of zero 707. Checking the entire ALU for a status of zero is accomplished using the status lines from each ALU slice. By entire accumulator we are typically referring to all valid digits of the accumulator, i.e., all digits not flagged as skipped. Status lines indicating whether each digit is zero are combined to form a complete zero status for the entire ALU as depicted in FIG. 5E. Zero digit status line 592 is logically ORed 595 with its associated skip digit status and logically ANDed 596 with all other digits to form a zero word status flag 501. If the Zero Word flag 501 is set, control will be passed to step 708 to mark the selected digit position as skipped. The process of marking a digit as skipped is one embodiment of ALU control used to properly mask the digit ALU status during processing. Other techniques can be deployed to accomplish equivalent objectives.

Next, or in parallel to step 708, the accumulator is divided 709 by the value of the selected digit position modulus, $M_I$. The division process is referred as multiplication by the reciprocal of the modulus. In this specification, the operation is referred to as MODDIV, which is essentially an inverse multiply function, and in the case of our example, is performed by the LUT 301. All digits perform the MODDIV operation simultaneously, with the operand value (modulus) gated from the crossbar bus.

The source of the modulus value can vary by design. In one embodiment, the modulus value is stored in the register file, and is gated to the crossbar bus by the selected digit ALU. For example, FIG. 2C depicts primary data flows in the case when the selected digit position is modulus=2. The modulus value is gated from register file 300 via selector 313 to crossbar bus A 318. All LUTs use the crossbar bus A 318 as an operand via a selector such as selector 310. In another embodiment, a special storage for modulus values is gated to the crossbar bus, such as LUT 1111 of FIG. 11A. Regardless of the source of the modulus, each digit ALU is typically divided by the modulus simultaneously.

During the MODDIV operation 709, the modulus value is present on crossbar bus 318 as previously explained and as depicted in FIG. 2C. During this time, the modulus value is "pushed" 710 to the LIFO stack 275 as depicted in FIG. 2D. In control step 710 control unit 200 signals bus control unit 277a to gate the source data from the crossbar 318 and write the modulus value $M_I$ to LIFO stack 275. After this step or in parallel to, the control unit increments the selected digit position [I] 711 and repeats the control loop beginning with the step of checking for a skipped digit 703.

The control loop depicted in FIG. 7A by step 703 and control path 712 is repeated until the condition of the accumulator equal to zero 707 becomes true. When this occurs, the conversion is terminated, and the resultant mixed radix digits along with their associated modulus values are stored in the LIFO structure 275. Example digit values $D_X$ and modulus values $M_X$ are illustrated as contained within LIFO structure 275 of FIG. 2B.

Other methods and variations exist. For example, mixed radix digits may be stored in the register file as they are generated. This is useful when storing RNS values as mixed radix constants. In FIG. 2E, the digit position of modulus=3 is selected, and the accumulator 302b is gated to the crossbar bus in the procedure previously discussed. In addition, the highlighted data path depicts the digit value is stored to register 300b. In this manner, for each digit position for which a mixed radix digit is generated, the digit is stored in a designated location of register file 300, 300b.

Another variation uses the register file to store mixed radix values instead of the LIFO hardware stack 275. In this embodiment, the control unit 200 may be aware of mixed radix digit length, possibly using a significant digit detection mechanism, or marker, for example. In another embodiment, a digit count may be used with the mixed radix number stored in the register file. In another embodiment, leading zeroes are stored, and a mechanism for detecting leading zero digits is used. Additionally, tracking skipped digits may be more complicated, since a mechanism for tracking the sequence of valid digit modulus for reconversion to RNS may be required. This disclosure uses the LIFO stack for ease of use and convenience of explanation, but it should be understood that other solutions to accomplish these same objectives may be used but are not discussed in detail herein.

RNS to Mixed Radix Conversion Example

Figure 7B:
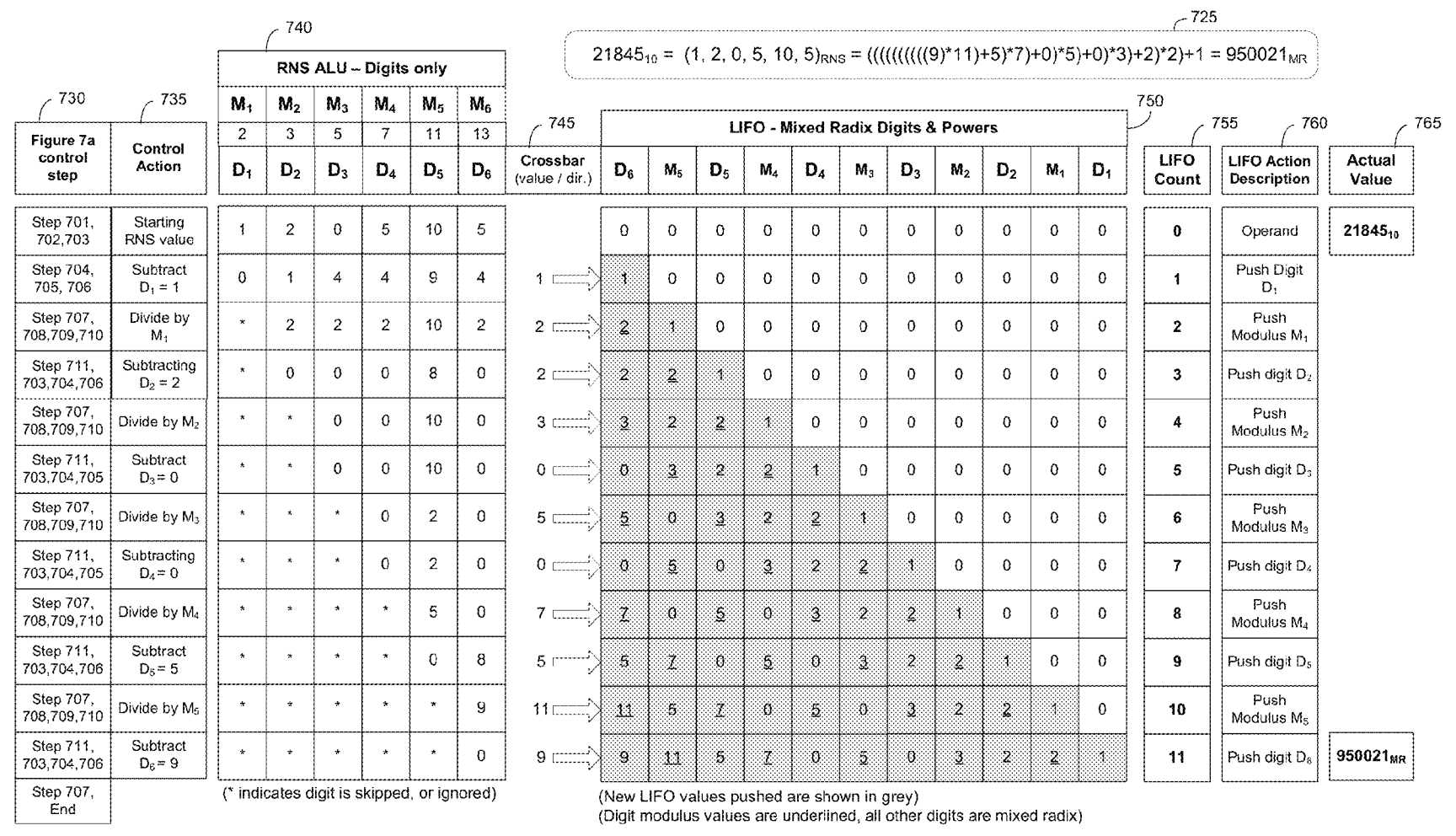

FIG. 7B illustrates an actual example of RNS to mixed radix conversion. The example of FIG. 7B illustrates the numerical relation within the dotted line 725. In this example, the decimal value 21,845 is represented by 6 prime modulus {2, 3, 5, 7, 11, 13}, which has a range of 30,030. The starting RNS value having the indicated decimal value is loaded into the RNS ALU 740 at start. Each transition of the ALU is documented with each following line. The associated control loop step of FIG. 7A is listed in column 730. The RNS ALU action is listed for each step, as indicated in the second column 735 of FIG. 7A.

FIG. 7B also illustrates the action and direction of the crossbar bus during conversion using the Crossbar value and direction column 745. Values transmitted via the crossbar are pushed to the LIFO data structure 750, and are shown as grayed out in FIG. 7B. A LIFO data count is tracked for each step in the LIFO Count column 755 and the LIFO action is listed for each step in the LIFO Action Description column 760. At the last step of the RNS to mixed radix conversion, the LIFO count reaches eleven (11) in this example. For convenience, the decimal equivalent is listed under the Actual Value column 765 for the first step, when the value is in RNS format, and in last step of the conversion, when the resulting value is stored in the LIFO in mixed radix format. In this case, the LIFO 750 contains the mixed radix digits and their corresponding radix, or power. The digit modulus values are shown as underlined in the LIFO 750. The conversion ends when all non-skipped digits of the ALU 740 are zero.

Conversion of Mixed Radix to RNS Detail

Conversion of mixed radix to RNS is equally important, and resembles the same operations, only in reverse. The need to convert to the mixed radix format and then back again to the RNS format may appear redundant, but surprisingly forms a foundation for fractional arithmetic operations and other functions of the present invention. Therefore, it becomes important to understand the primitive conversion operations.

Figure 8A:
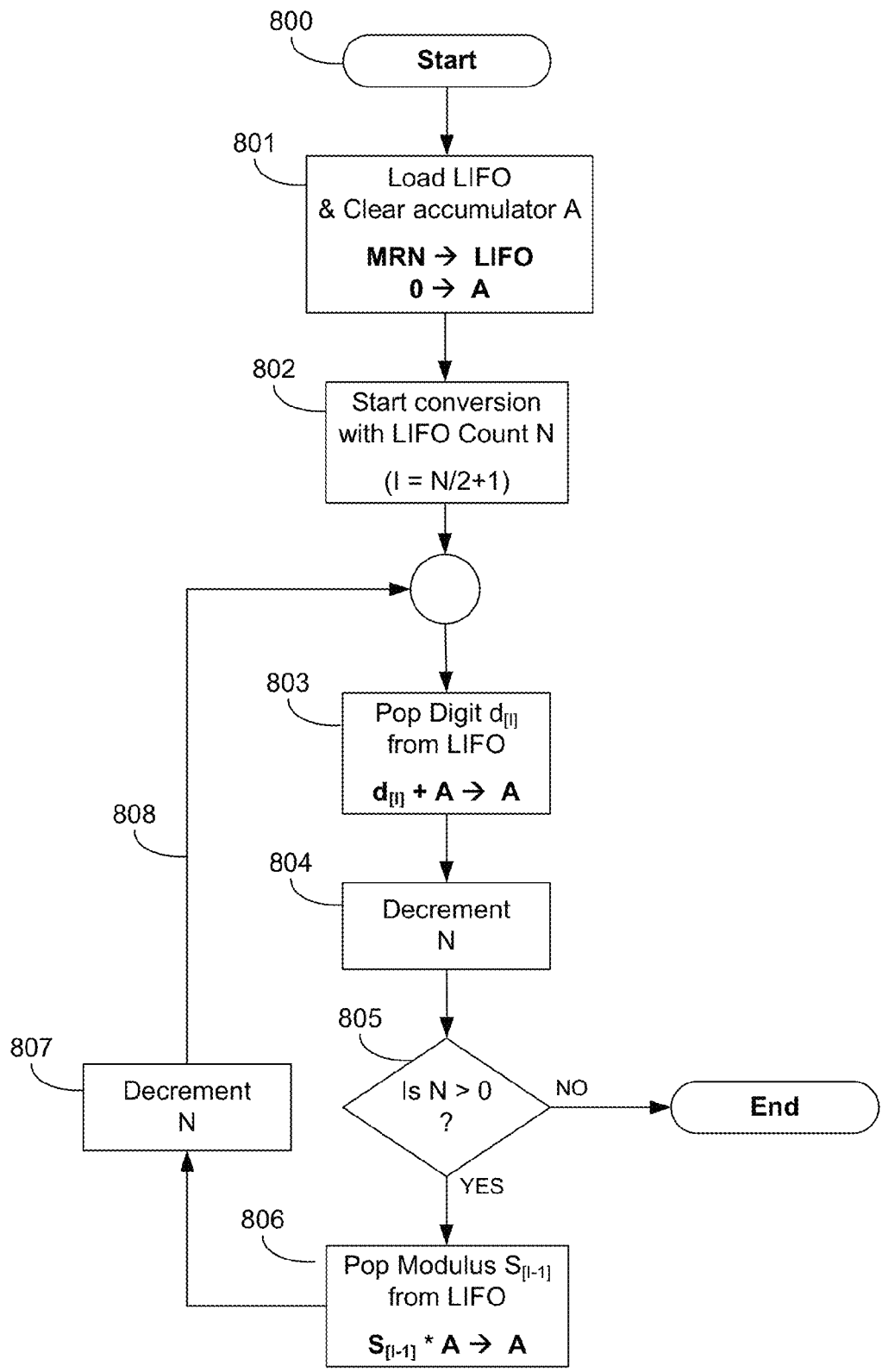
FIG. 8A is a block diagram illustrating exemplary mixed radix to RNS conversion with LIFO.

FIG. 8A illustrates a typical control flow for performing conversion of mixed radix numbers stored in the LIFO structure 275 back to residue format. It should be noted that the LIFO data format is special in that it contains the digits and modulus values; modulus values represent the powers of the mixed radix number format. As a consequence, skipping a digit during RNS to mixed radix conversion changes the ordering of powers, and hence creates a new mixed radix number system. The LIFO adapts to these changes, since the proper reconstruction sequence is preserved in the LIFO.

The control unit first loads the LIFO (perhaps by RNS to mixed radix conversion) and then clears the accumulator 801. The control unit receives the LIFO element count value 802 as depicted in FIG. 2F. The first element of LIFO 275 is a digit value and is added to the ALU accumulator in control step 803. The LIFO stack 275 is "popped", and the next stacked value is gated to the crossbar bus 318 as depicted by heavy lines in FIG. 2F. The value or copy of the element count is decremented 804 and a control decision 805 determines if elements are still available on the LIFO stack 275. If elements are still available on the LIFO, the top of the LIFO stack is gated to the crossbar and multiplied to each digit of the ALU. The LIFO is popped, and the element count 278 of FIG. 2F is decremented 807.

The control loop defined by control path 808 is repeated until the LIFO element count 278 is depleted as detected at control step 805. At that time, the mixed radix number once residing in the LIFO is converted to RNS format and resides in the ALU accumulator. Special variations of this process exist in the unique and novel apparatus of the present invention. For example, the RNS to mixed radix conversion can decompose the value of an RNS number using one set of RNS modulus, and the mixed radix to RNS conversion can reconvert the value to an RNS number having a different set of modulus.

Mixed Radix to RNS Conversion Example

Figure 8B:
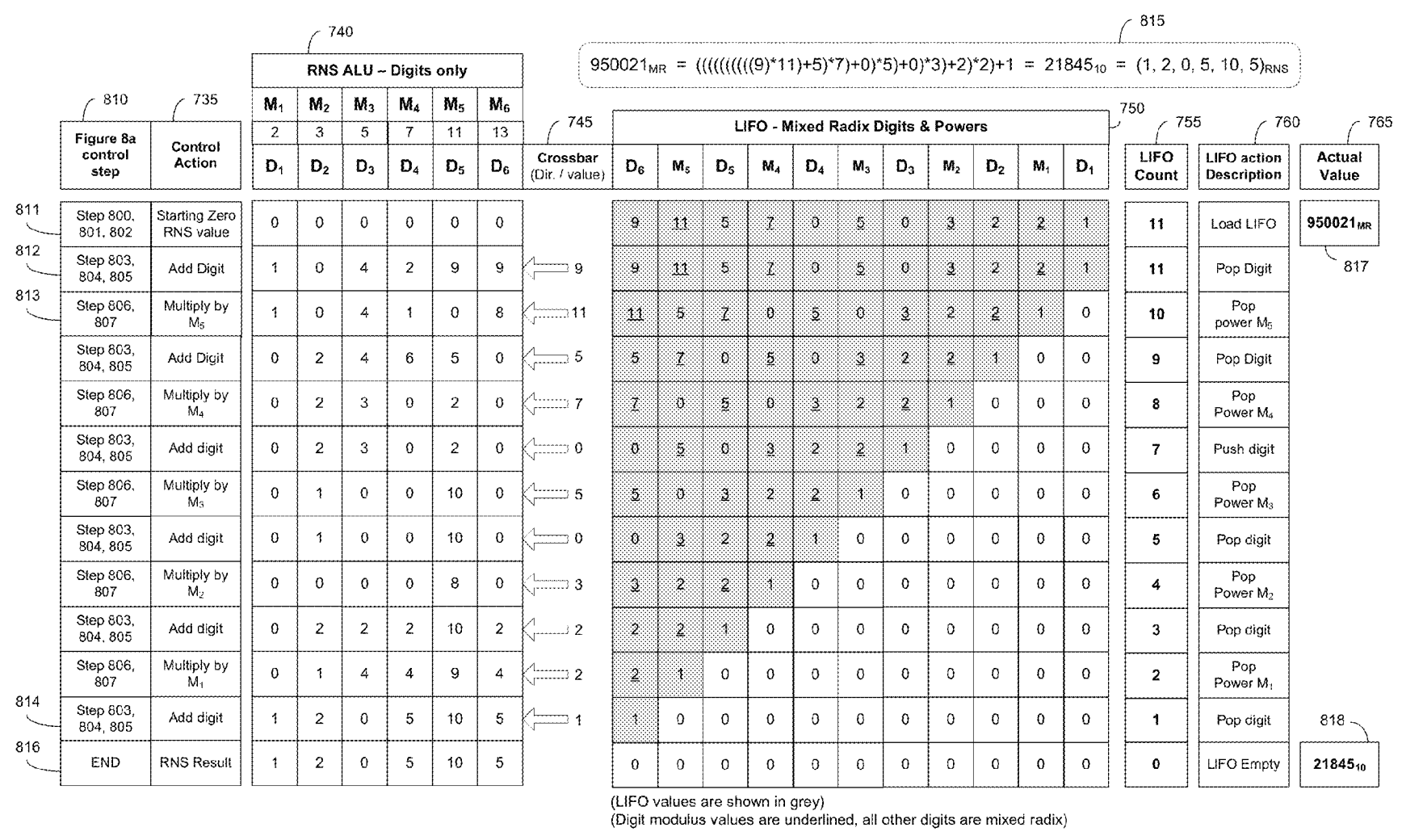

FIG. 8B illustrates a specific example of mixed radix to RNS conversion. The numeric example is given by the relationship 815 enclosed by dotted lines, and is the same relationship as provided in the RNS to mixed radix example of FIG. 7B; however, the conversion operation is in reverse order.

In mixed radix to RNS conversion, the LIFO starts with the mixed radix number loaded into the LIFO 750. Again, a special mixed radix format is required, which includes the mixed radix digit and its associated digit power, or radix. For example, the LIFO may be loaded using an RNS to mixed radix conversion as discussed earlier using FIGS. 7A and 2B. In step 811 of the example of FIG. 8B, the LIFO 750 is initialized with the mixed radix digits and powers of mixed radix number $950021_{MR}$, as shown in the actual value column 817. The RNS ALU 740 is initialized with zeroes in step 811.

Referring to FIG. 8B, during the conversion of mixed radix to RNS, the reverse process occurs. Digit values are popped from the LIFO 750 and added to the RNS ALU 740; modulus values are popped from the LIFO 750 and the RNS ALU 740 is multiplied by the modulus value. The example of FIG. 8B illustrates the crossbar data and direction 745. In this case, the data is shown flowing from the LIFO 750 to the RNS ALU

740. When all LIFO elements have been popped, the LIFO count 755 goes to zero at step 816, and the process ends with the converted RNS value loaded into the RNS ALU 740.

Other methods and variations exist. For example, a system which does not use a LIFO structure can instead use the register file to store and convert mixed radix numbers. Depending on the desired level of functionality, the need to support features such as variable modulus sets can be contemplated. Additionally, the control system must also deal with tracking the position of skipped digits during conversion and reconversion of mixed radix numbers. Many specifics of these alternate control solutions are beyond the scope of this disclosure.

Fused LUT Arithmetic Functions

Since primitive operations of decomposing and recomposing RNS numbers are essentially sequential, they are categorized as a slow operation; therefore, it is important to find a method to enhance performance. Since the function of decomposing requires sequential modulo subtraction and divide, both operations can be "fused" together in a single LUT. Likewise, since recomposing a number is a function of addition and multiplication, both of these operations can be fused together in a single LUT. Therefore, instead of performing two operations, a single operation is performed for each digit during decomposing and recomposing. This provides for nearly double the speed for slow operations, and is a claimed invention of this disclosure.

Fused LUT Subtract and Divide

One brute force method for fusing two LUT table operations into a single LUT operation is to increase the size of the LUT by increasing the effective address width, since now a third operand is present. This is illustrated in FIG. 3C, which shows three digit sources as address input to LUT 301. This technique works, but may not be effective, since the size of the LUT is now a cube of the digit range, as opposed to the square. In one novel enhancement of the present invention, the digit slice ALU of FIG. 3A is modified as shown in FIG. 3D. In place of operand selectors 310 and 311 are placed address translators 334 and 335. Address translators essentially perform the more simple of the four modulo operations, namely addition and subtraction.

During mixed radix conversion (decomposition), address translator 334 acts as a subtract function, passing the accumulator (digit register) value via path 315a and subtracting 334 by common crossbar value 318b, the result appearing at LUT 301 where modulo divide is performed. In this embodiment, the address translator function 334 supports modulo subtraction, so that its output is always a valid LUT address. In this case, the arithmetic LUT no longer stores the entries for subtraction. This technique reduces the LUT size, while speeding the primitive operation of mixed radix conversion.

The fused subtract and divide function may operate as a single subtract or divide function. For example, if a value is to be subtracted only, the fused address translator performs a subtraction, and the LUT is instructed to divide by one. Alternatively, the LUT can be bypassed (not shown). If only a digit divide is to be performed, the address translator can subtract a value of zero. Alternatively, the address translator can be bypassed using appropriate logic (not shown).

Figure 3H:
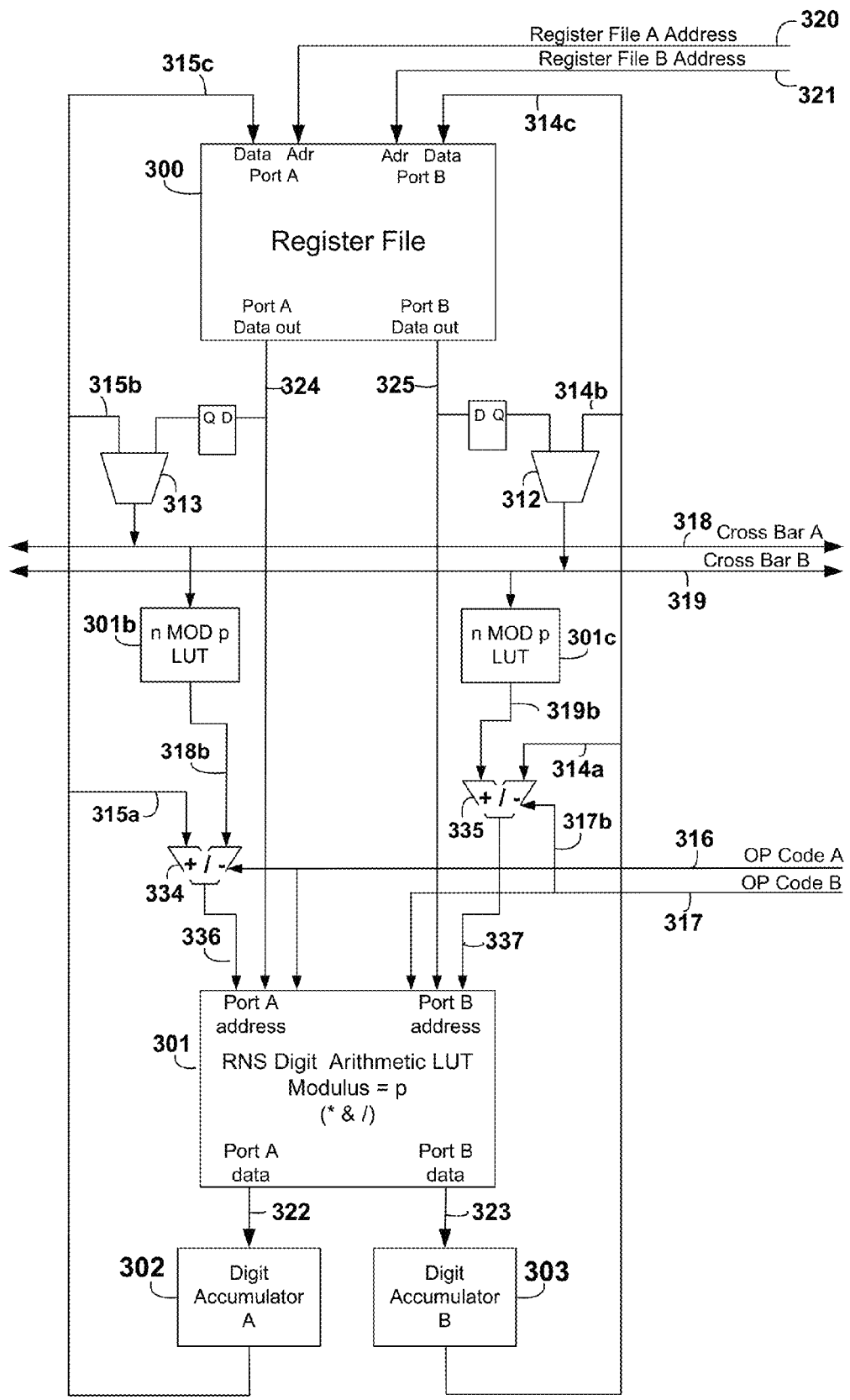
FIG. 3H is a block diagram illustrating an exemplary RNS dual digit accumulator with a fused LUT and a Modulo p LUT in detail.
Figure 3I:
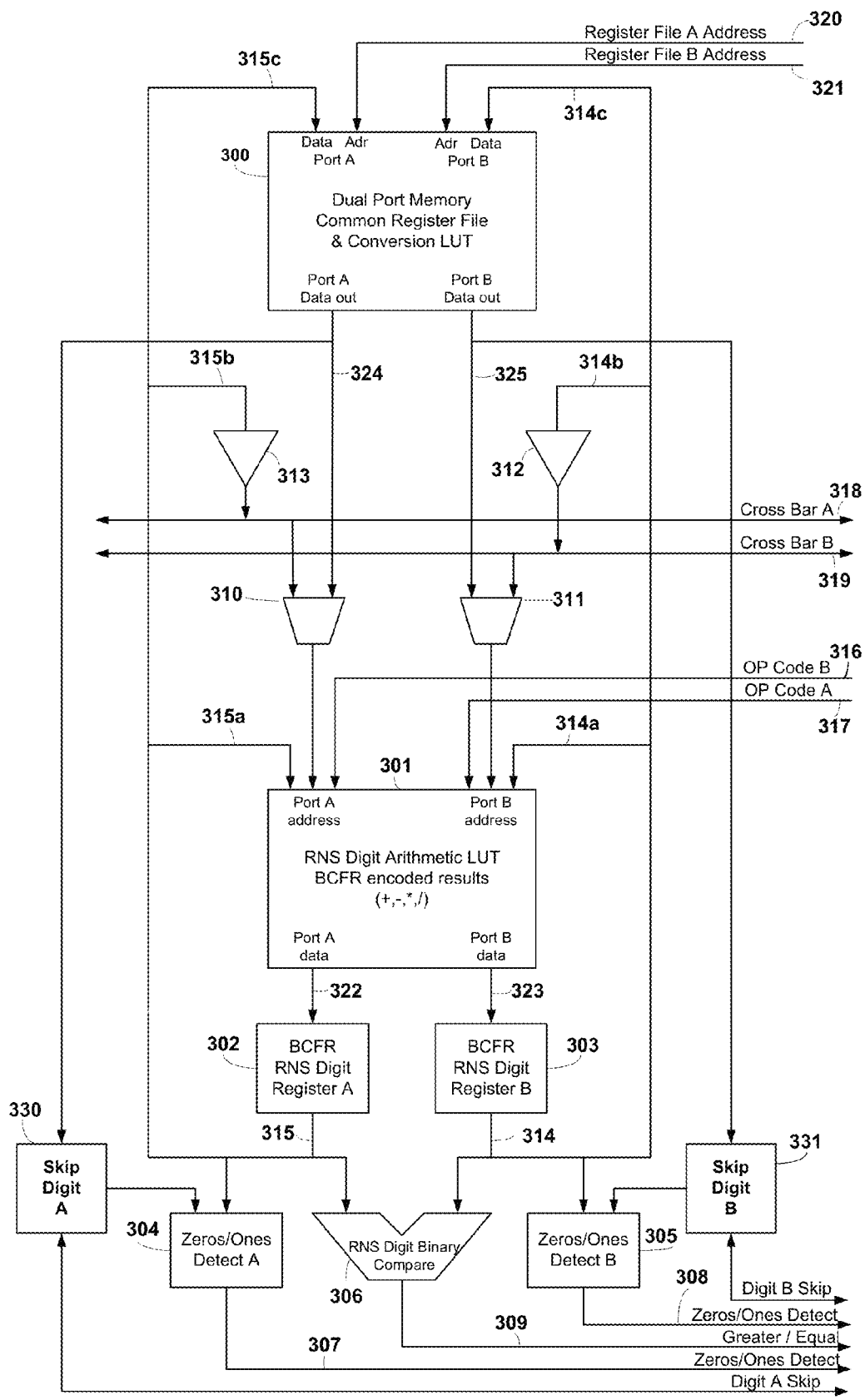
FIG. 3I is a block diagram illustrating an exemplary RNS dual digit accumulator.

FIG. 3H illustrates a digit ALU variation with both an address translator 334 coupled to a Mod p LUT 301b. One advantage of this arrangement is the Mod p LUT limits the range of the crossbar value to p−1, and therefore simplifies the circuit requirements of the address translator 334, especially if the modulus p width is much less than the crossbar width Q.

Fused LUT Add and Multiply

During mixed radix to RNS conversion (re-composition), address translator 334 is instructed to provide an "add" function via the OP Code A control lines 316, as depicted in FIG. 3D. The add function adds the value of the crossbar A bus 318 to the value of the accumulator (digit register A), and sends the result 336 to the LUT 301 where a multiplication function is performed. The multiply is performed with the value of a register file 324, which contains the value of a digit modulus in this embodiment. (The digit modulus value may also come from other places, such as from a second crossbar bus, for example) The LUT 301 is instructed to perform a multiply while the address translator 334 is instructed to perform an add function.

In one embodiment, address translator 334 performs modulo p addition, so that its output 336 is always a valid LUT 301 address. In one embodiment, address translator 334 and 335 are LUTs themselves. In this case, total LUT is not changed, but signal propagation delays are increased since two LUT's are cascaded. This is the case of cascaded LUT's.

It should be noted the configuration of FIG. 3D still allows separate "non-fused" operations, since addition alone can be performed as long as the multiplication operand is one. Likewise, multiplication alone can be performed as long as the additive operand is zero. Other solutions which enable a single arithmetic function are possible as well. The controller 200 determines the necessary control line operations and table look-ups to achieve the desired results, and is not shown for clarity.

The enhancement depicted by FIG. 3D implies operations such as compare and digit extend will require half as many clocks than the conventional apparatus of FIG. 3A. This enhancement allows the ALU to be analyzed in a straightforward manner, that is, performing a digit operation every clock cycle. The single digit operation comprises either a fused subtraction and divide, or a fused multiplication and addition. This type of speed enhancement is important for high performance designs, but not important in explaining algorithms of the present invention. Most discussions to follow therefore assume the ALU has separate LUT cycles for each arithmetic operation.

Residue Number Comparison

The comparison of two RNS numbers results in a condition of lesser than, greater than or equal. Two RNS numbers can be compared for equality using a dual accumulator ALU and a digit comparator 306. Assuming one operand is loaded into digit register A and the other operand is loaded into digit register B, a comparator 306 determines if the operands are equal, and if so, indicates an "equal status" via lines 309. In one embodiment, digit comparator output 309 from each digit is processed in parallel, so that a determination of equality is made in one or less clock cycles. For all systems, checking for identical numbers is typically fast.

On the other hand, checking the magnitude of an RNS number against another RNS number is regarded as a slow operation. However, unique and novel apparatus of the present invention provides an efficient solution for number comparison. Number comparison is important, and also helps to explain how the dual accumulator architecture provides efficiency.

In one embodiment of the present invention, a dual accumulator, digit slice architecture is utilized as illustrated in FIGS. 2A and 3A. For each digit, operand A is loaded into Digit Register A 302 and operand B is loaded into Digit Register B 303. (Loading a full word into an ALU consists of loading each modulus digit of the operand into each associated digit slice.)

For unsigned operands, and using the dual accumulator architecture of the present invention, the compare process is a dual and simultaneous conversion of each RNS value into a mixed radix number format. During dual conversion, each ALU generates a digit together, the digit being of the same modulus, or position. The result of a single "digit cycle" is to produce two mixed radix digits, one stored in Digit Register A 302 and the other stored in Digit Register B 303. Control circuitry can save the mixed radix digits in the register file 300 for later comparison. However, in a unique method that follows, the digits are directly compared using comparator 306 as they are generated.

As the mixed radix digits are generated in each cycle, they are compared with each other, and the result of the comparison may be affected. In one embodiment, as mixed radix digits are generated, they are compared, and then discarded. The process mirrors a comparison of fixed radix numbers, but from least significant to most significant digit.

For unsigned numbers, if one RNS conversion terminates (one or more digits) before the other, that number is smaller. Therefore, special hardware support is added to the conversion which terminates the comparison as soon as the smallest number is exhausted. The mixed radix digits can be stored, or simply discarded, in either case generating the final result (less than or greater than) of the entire RNS word comparison.

Comparison Control Flow

Figure 9A:
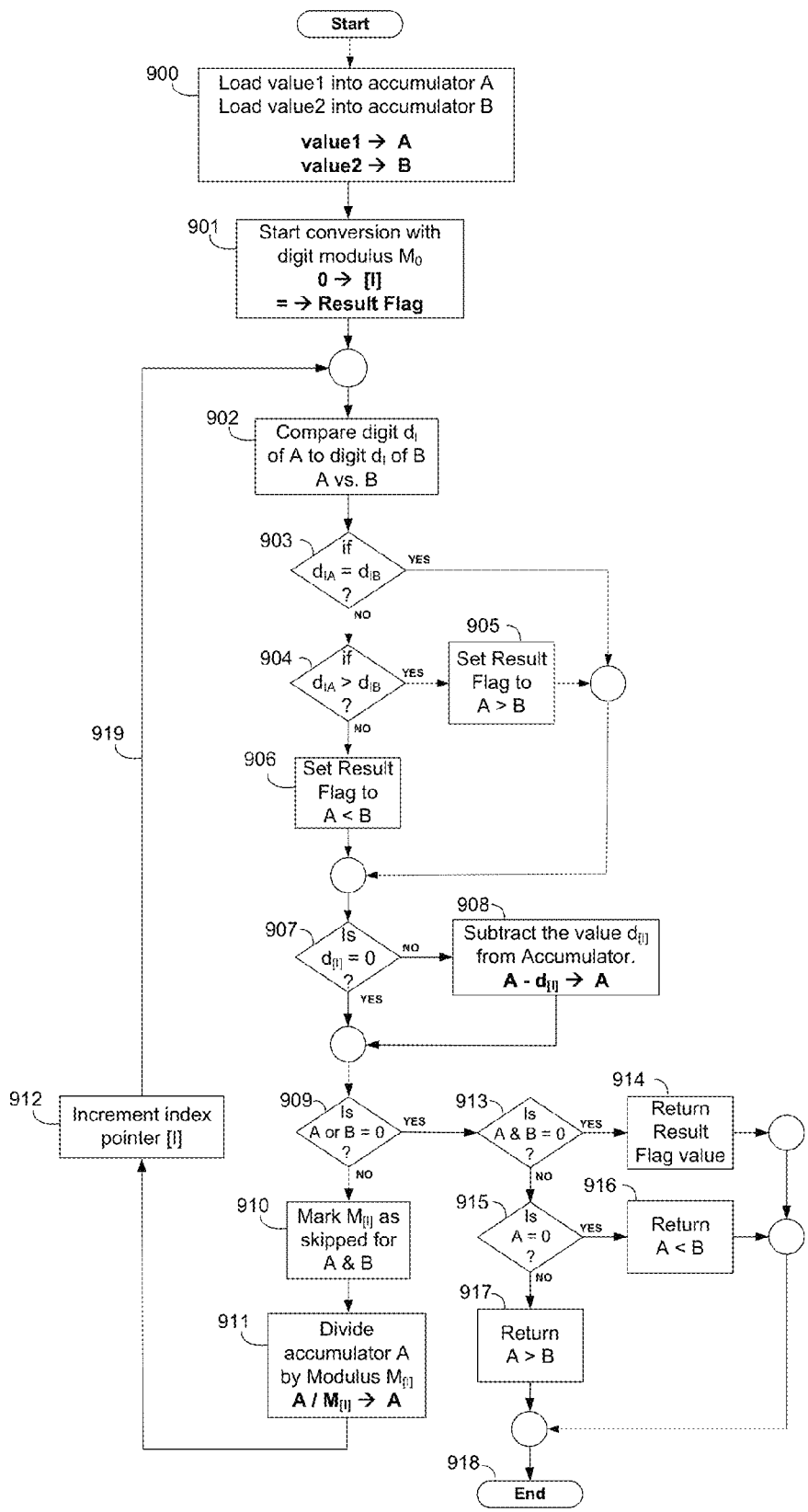
FIG. 9A is a block diagram illustrating an exemplary RNS value to RNS value comparison.

FIG. 9A is a typical control flow for a basic comparison of positive integers within a dual RNS ALU of the present invention. The compare routine of FIG. 9A illustrates an approach using mixed radix conversion. Each ALU generates a mixed radix digit each conversion cycle, and these digits are compared to one another. A control unit tracks the result of each digit comparison, updating the status of comparison as digits are generated and compared.

At the start of the comparison, the values to be compared are loaded into ALU A and ALU B, as shown in control step 900. An order for digit processing is determined, the result flag is initialized to equal, and the starting digit is marked in control step 901. In this example, the digit order will be successive, starting with the digit position zero, and moving to the highest digit position. The first digits are generated in 902, and the digits are compared in 903. If the digits are equal, the status of comparison does not change, and control continues at control decision step 907, otherwise, control passes to step 904 where the digit magnitude is compared. If the ALU A digit is greater than the ALU B digit, the status of comparison is set to A>B 905. However, if not, the status of comparison is set to A<B 906.

In control decision step 907, the value of the digit position is subtracted 908 from the entire ALU if it is non-zero. In the case of some embodiments, the value of the digit position is subtracted from the ALU regardless, since subtracting a value of zero 908 is the same as skipping this step. The digit subtraction process typically occurs simultaneously for each digit ALU. In control decision step 909, a determination is made as to whether ALU A or ALU B is zero. If neither ALU is zero, the control system continues by dividing the ALU by the selected digit position modulus 911. The control system may also mark the selected digit position as skipped, or "invalid" 910, either before, during or after step 911. The control system then selects the next digit position to process by incrementing the digit position index 912. Other variations exist which may use a different sequences of digits.

The control loop defined by path 919 occurs for each digit generated by the mixed radix conversion process. The next digit comparison occurs at step 902. Again, the selected digit of each ALU is compared. Based on the result of the digit comparison, the comparison status result flag may be modified in step 905 or in step 906. At some point, the values contained within one or both RNS ALU's will decompose to zero. When this occurs, the control decision step of 909 is TRUE, and control proceeds to decision step 913 which determines if both ALU values are zero. If both operands decompose to zero in the same cycle, the comparison result flag is returned 914 as the result of the comparison. However, if one operand goes to zero before the other, the comparison control circuitry will test ALU A for zero; if ALU A is zero, it's value is smaller, and therefore the comparison returns A<B 916. If not, the ALU B is zero, and the comparison apparatus returns A>B 917.

More complex control flow diagrams are required to handle negative values, and are not disclosed in detail herein. However, these apparatus are explained as follows. The comparison unit, or comparison control system, may use the status of the sign bit to determine a comparison. If one operand is negative, and the other is positive, then a comparison result may be determined without decomposing either operand. If both operands have the same sign, a flow control similar to that of FIG. 9A is used. For negative values using p's-complement, the comparison result is the logical inverse of the case of positive operands; for example, the absolute value of the smallest negative number is represented by the largest machine number integer, the machine number integer being the format measured by the comparison apparatus in one embodiment.

A novel an innovative invention for comparison of the present invention is disclosed. The novel apparatus integrates an operand "range comparison" function which operates in tandem to the mixed radix conversion process of the compare function of FIG. 9A. Using the integrated range compare, a sign extend operation is integrated into the comparison operation; therefore, an operand with a non-valid sign flag will be extended, i.e., set to valid, after the comparison operation is complete. This helps reduce the need to sign extend operands during the course of processing values, and results in an increase in ALU performance and efficiency.

RNS Comparison Example

Figure 9B:
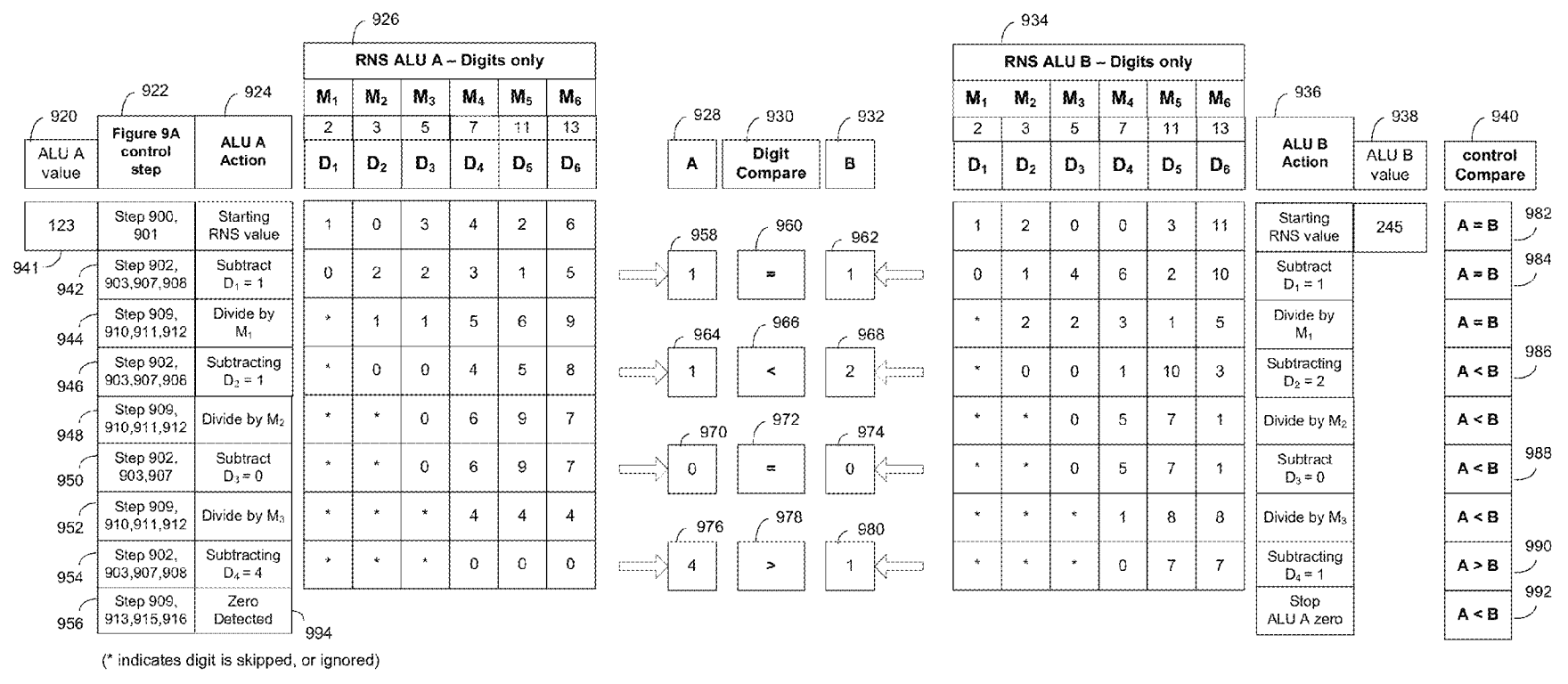

FIG. 9B illustrates a simple comparison of two numbers (123 vs. 245). A dual ALU architecture is illustrated as having ALU A 926 and ALU B 934, each ALU having 6 prime modulus {2, 3, 5, 7, 11, 13}. The first state of each ALU is shown in the first row 941 having each value loaded into its respective register. In this example, the value (123) is loaded in to RNS ALU A, and the value (245) is loaded into RNS ALU B. The column entitled "FIG. 9A control step" 922 lists the associated control step for each successive state of the ALU A listed downwards. The columns listed as ALU A action 924 and ALU B action 936 describe specific actions for each ALU respectively.

In the center of the diagram of FIG. 9B, the digit comparison process is illustrated. During specific steps of the control 922, each RNS ALU generates a mixed radix digit, such as the first digit generated by ALU A 958, and the first digit generated by ALU B 962. In this case, each digit generated has the value of one (1), so the comparison outcome of the two digits is equal 960. In one embodiment, the comparison of the digits is performed by comparator 306 as shown in FIG. 3A, for example. The results of the comparison may be transmitted via bus 309 to RNS control unit 200 for processing.

Control unit 200 of FIG. 2A may track the result of each digit comparison, which is illustrated by the column entitled "control compare" 940 in FIG. 9B. This is equivalent to the comparison result flag of FIG. 9A. At start of the comparison, the control compare status 940 may be set to "equal" 982.

During the first digit compare 960, the control compare 940 continues to be set equal 984. In the next clock, or cycle, each RNS ALU is divided by the next modulus M, illustrated by the control steps 944. In the next digit compare cycle, ALU A generates the digit one (1) 964 while ALU B generates the digit two (2) 968. Since the ALU B digit is greater, the control compare status 940 is set to A<B 986. Again, another modulus divide cycle 948 is processed; this corresponds to control steps 910 and 911 in FIG. 9A.

A third mixed radix digit is generated by each ALU in step 950; in this example, both digits are equal, so the control compare result 988 remains set to A<B. After another modulus divide cycle, a fourth mixed radix digit is generated by each ALU. The ALU A digit 976 is four, which is greater than the ALU B digit 980 of value one. Therefore, the control compare status 940 is now changed to A>B 990. However, during this same cycle, the value of the digit four is subtracted from ALU A 954 per control step 908 in FIG. 9A. Likewise, the value of one is subtracted from ALU B. The compare control unit detects ALU A is now zero 994, while ALU B is not. The control loop detects this condition in decision step 913 of FIG. 9A. In this example, control proceeds next to control decision 915 to determine if A alone is zero, which it is. Next, control passes to step of flagging, or returning as a result, the status A<B 916.

In the example of FIG. 9B, the comparison has terminated on an operand reducing to zero 994 before the other operand. If positive numbers are assumed, the control unit reaches an immediate determination of the comparison, in this case, resulting in A<B 992.

Digit Compare Registers:

Another unique provision of the present invention is the inclusion of a special comparison function. In FIG. 3E, a special modification to digit slice ALU of FIG. 3A, which shows the addition of two compare registers 302*b* and 303*b*, and the addition of two comparators 306*b* and 306*c*. Using the dual ALU, each ALU A and B may perform a compare of its contents versus the value of a constant. The constant is loaded into the digit compare register A 302*b* for comparison against the value in the Digit Register A 302 via comparator 306*b*. The comparison result is signaled via the Digit A compare lines, and is used to set or update the value of the comparison, based on the digit comparison at hand. The ALU B has a similar structure for supporting the comparison of ALU B with a constant loaded in Digit compare register B 303*b* using comparator 306*c*.

The digit comparison operation requires two operands, one is the digit accumulator (register) and the other is a constant. The constant is a value previously converted to mixed radix format. Each digit of the constant is stored in its Digit Compare register 302*b* of each digit ALU. This saves the need to use two ALUs at once, which is the case if both numbers are in RNS format. The system controller 200 supports an implied order of conversion and re-conversion of mixed radix digits, thereby establishing standard data types in mixed radix format that may be used directly within the ALU of the present invention. The digit compare function may co-execute with other operations to help detect certain status, such as range and overflow. For example, the value at which positive numbers first become negative numbers can be loaded in the constant digit compare register 302*b*, and while a mixed radix conversion is being performed, a determination as to the sign of the value may also be determined.

Curiously, while mixed radix digits are used with the ALU design, in many embodiments, there are no provisions to perform arithmetic operations, such as addition and subtraction, directly on the mixed radix data type; instead, mixed radix data typically acts as an intermediate format that helps the RNS ALU perform certain other types of operations, such as comparison, conversion, and truncation.

In an advanced embodiment, a dual ALU generates mixed radix constants in tandem to the method of comparing the generated constant to an RNS operand. This process allows the generated mixed radix constant to adapt to a variable RNS modulus set. This embodiment is equivalent to an RNS versus RNS number compare of FIG. 9A which further includes the control element to process skipped digits.

Several key instructions executed by the ALU of the present invention perform a sign extension to the final result. One key feature to the fractional multiply of the present invention is the ability to sign extend the result during the multiply operation. Sign extension requires a comparison against specific fixed or predetermined ranges. The ALU may store the value of a particular range (or limit) as a mixed radix constant, and compare the limit against an operand as it is being converted to mixed radix, or otherwise processed.

Another advantage for the constant compare method just described is it frees each ALU from the other. Each ALU A and B is free to perform basic comparison against limits, ranges, and other important values without requiring the services of the other ALU. This modification to the dual ALU digit slice architecture provides significant performance increase. It also demonstrates the high resource cost of an arbitrary RNS versus RNS value comparison, which use should be minimized when programming high speed RNS applications.

Figure 9C:
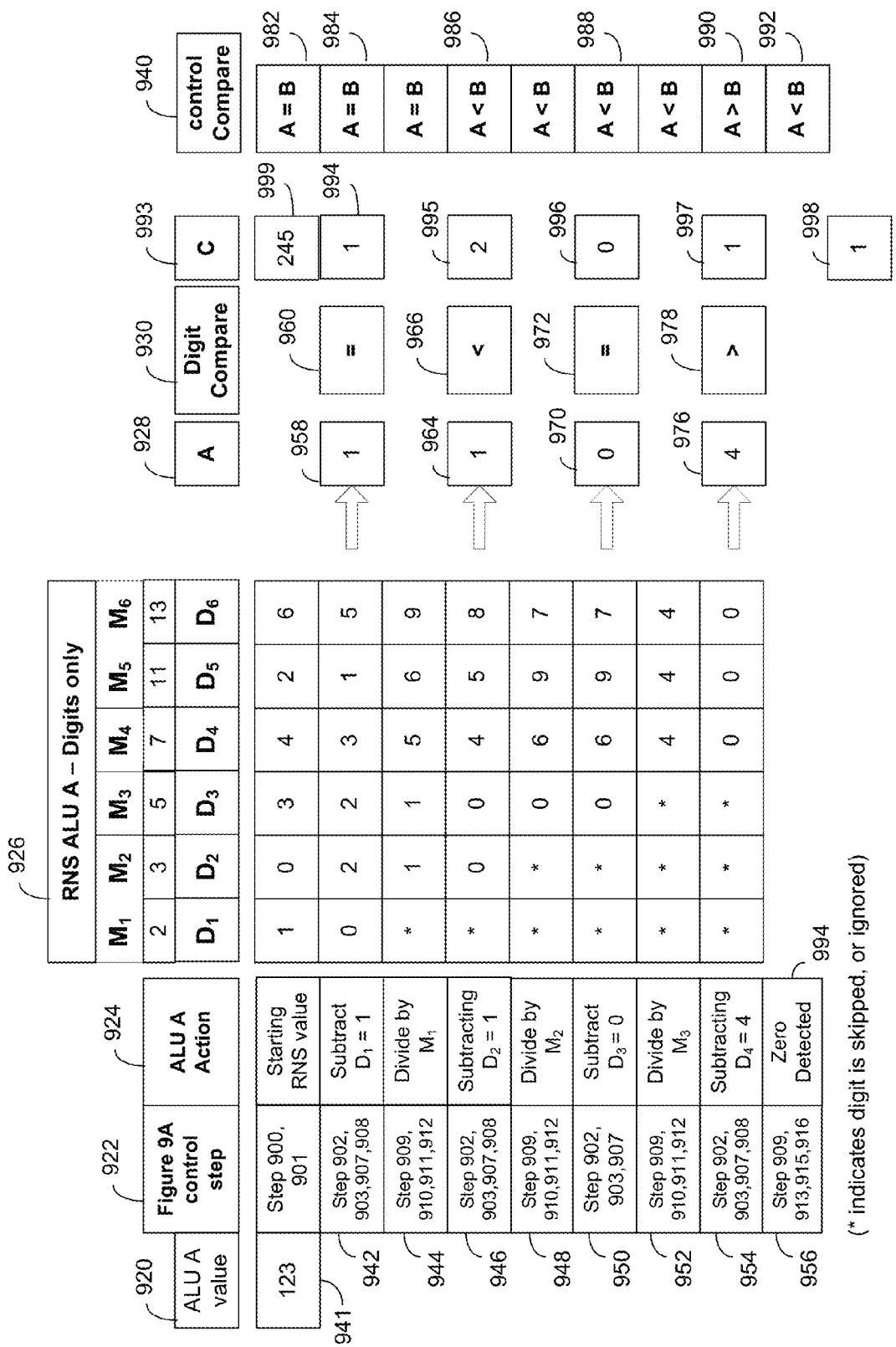
FIG. 9C is a block diagram illustrating an exemplary RNS value to RNS value comparison.

In FIG. 9C, an example comparison is made between the contents of an RNS ALU 926 and a constant value of two hundred forty five (245) 999. The constant value is stored for comparison is a plurality of digit compare registers 994, 995, 996, 997 & 998. Each digit compare register of FIG. 9C is similar to digit compare register A 302*b* of FIG. 3E. The operand compared with the value contained in the RNS ALU is a mixed radix constant; converting to mixed radix is not necessary. By loading each digit compare register of each digit function block with the value of the associated digit of the constant, only a single ALU is needed, not a dual ALU.

The mixed radix constant ($11021_{MR}$) has an associated radix set, and even an associated radix order; therefore, the number format of the mixed radix constant implies the order of mixed radix conversion of RNS ALU 926. For many cases, selecting the least valued prime (base) modulus first and proceeding upwards is a common standard. In FIG. 9C, the comparison proceeds in the same fashion as the example of FIG. 9B since the same values are compared, only in FIG. 9C, the value of (245) is stored as a constant, not as an RNS value.

Using the arrangement described above, the digit compare registers may be integrated into each RNS ALU digit function block, and used to perform comparison of values as they are processed. For example, the fractional multiply must convert an intermediate RNS number to mixed radix format, and a comparison of this number yields the sign of the value of the number. The ALU may load the negative number threshold value, represented as a mixed radix constant, into digit compare registers A 320*b* of FIG. 3E. During conversion of the intermediate number to mixed radix for another purpose (the purpose of normalizing), the generated mixed radix digits may be compared to the negative value threshold (constant), thereby determining if the value, or result, is positive or negative.

Digit (Base) Extend with Skipped Digit Flags.

The process of obtaining a value of a digit modulus given the value of all other digits is known as digit extension, or base extension. This process is known in the prior art, as various methods have been proposed. However, the method and apparatus of the present invention provide novel and unique ways for using mixed radix conversion to perform digit extension.

One embodiment of the present invention utilizes direct base extension during integer division and during certain slow conversion processes. By direct, it is implied the base extend is executed on its own, and is not a side effect of another operation.

For example, during the integer divide process of the present invention, the divisor is checked for the presence of zeros in any digit accumulator. Upon the detection of a zero digit, the entire accumulator is divided by that digits modulus via LUT 301, using a MODDIV operation. After division, that digit is marked as "skipped", or "invalid", using storage such as skip flags 280 of FIG. 2B or skip digit flag 330 in FIG. 3D. When all zero digits are divided out and thus marked skipped, the contents of the ALU may be base extended. This is a unique situation, since multiple digits may need to be extended, i.e., the digits marked as skipped require extending. The method of the present invention provides a unique apparatus that can base extend a maximum of P−1 digits in one base extend operation, where P is the number of RNS digits.

Figure 10A:
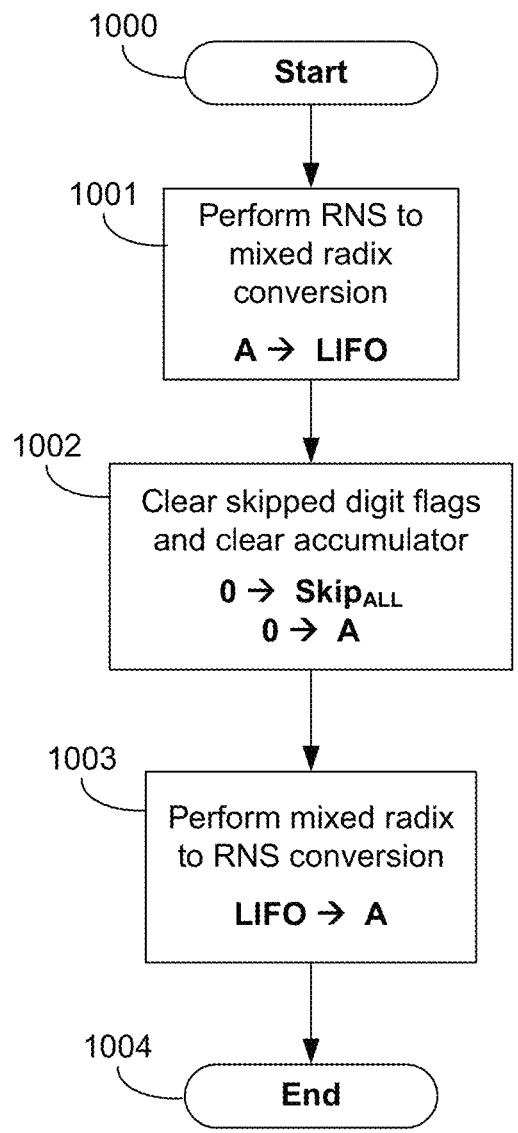
FIG. 10A is a block diagram illustrating exemplary digit extension using LIFO.

In one embodiment, the digit extend operation is performed using a control flow as depicted in the flowchart of FIG. 10A and a LIFO stack 275 structure depicted in FIG. 2B. Base extension is started with an RNS to mixed radix conversion 1001 as in flowchart of FIG. 7A. This operation recognizes skipped digits in control step 703 of FIG. 7A. Additionally, the unique LIFO data structure ensures the correct digits and modulus values are stored for reconstruction to RNS, regardless of the order of skipped digits.

After conversion to mixed radix 1001, the mixed radix digits reside in LIFO stack 275. As a following option, control clears all digit skip flags 280, and the accumulator A is cleared 1002. The mixed radix digits in the LIFO are converted back to RNS using a mixed radix to RNS conversion 1003, such as depicted in FIG. 8A. When the mixed radix to RNS conversion is complete, the RNS value is restored to the accumulator with all digits extended. The control unit 200 may clear all skip digit flags thereby indicating all digits are valid and extended.

It should be understood that many variations exist. For example, hardware may be optimized to skip steps where possible, as well as perform multiple operations in parallel or out of sequence to that shown herein.

Base Extend Example

Figure 10B:
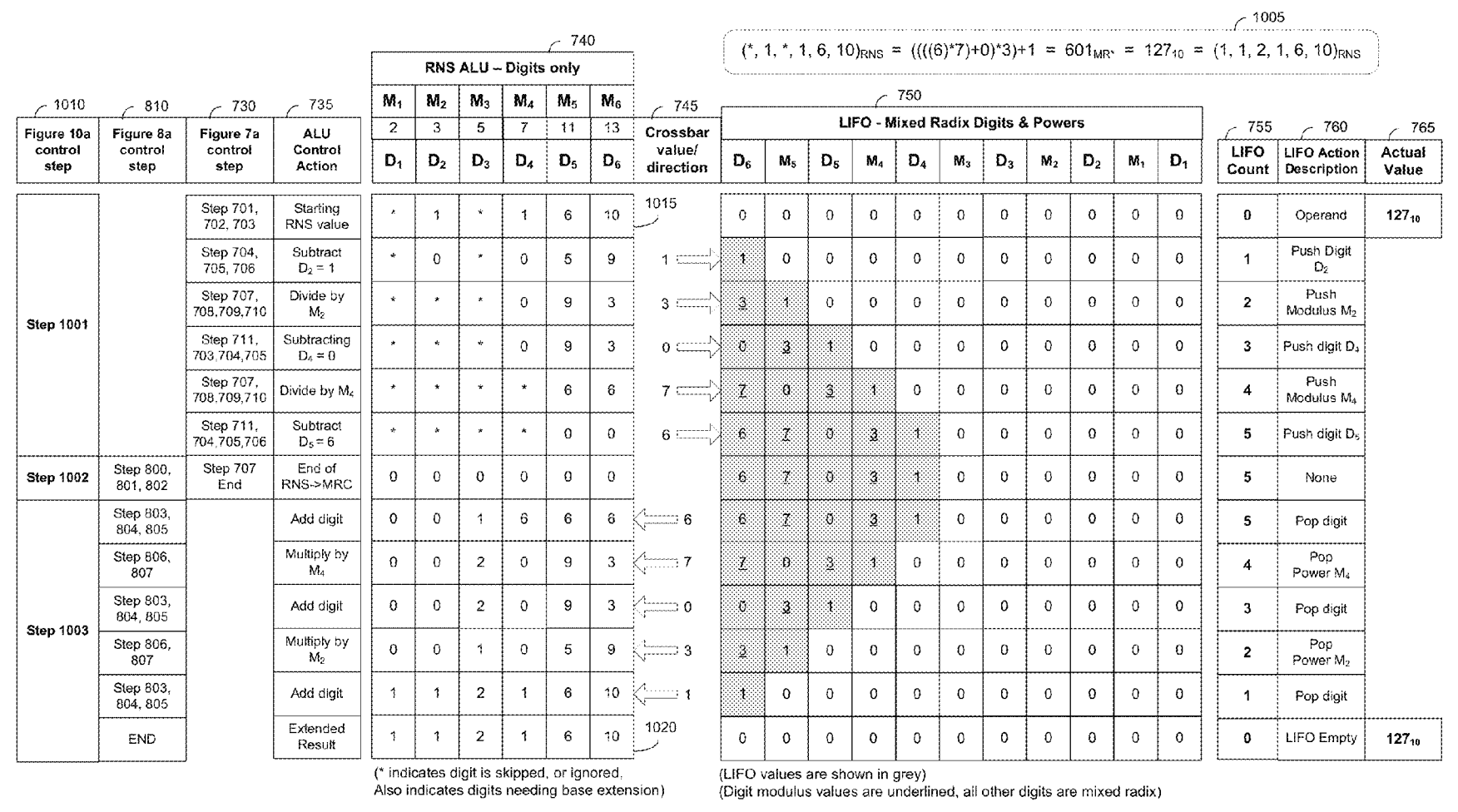

FIG. 10B illustrates a base extend operation as an example. This example again uses a simple RNS ALU consisting of six prime modulus {2, 3, 5, 7, 11, 13}. In the figure, the RNS ALU 740 is depicted as a series of digit values, each RNS digit value, $D_X$, located in a given column and associated to a specific modulus, $M_X$. The example of FIG. 10B illustrates the relationship given in the equation 1005 enclosed in dotted lines. In this example, the decimal value of one hundred twenty seven (127), in RNS format, is stored in the RNS ALU 740 with two digit positions undefined ($D_1$ & $D_3$). After the digit extend operation, the original RNS value is restored 1020 with previously undefined digits now defined, or extended.

As seen in FIG. 10B, the base extend operation is composed of a sequence of two conversions; the first conversion of RNS to mixed radix, and the second conversion is from mixed radix to RNS. This is illustrated in FIG. 10B using the column listing the associated control step 1010 of FIG. 10A. Special support for marking digits as skipped is supported and is indicated in the figure using an asterisk. For example, the RNS starting value 1015 is indicated by the following digits (*, 1, *, 1, 6, 10). Each asterisk indicates the specific RNS digit position (modulus) is undefined.

In FIG. 10B, the direction of data on the crossbar 745 is indicated. During the first process of converting the RNS value to mixed radix 1001, data is processed and sourced from the RNS ALU and pushed to the LIFO 750. During the process of converting the mixed radix value back to RNS 1003, data is sourced by the LIFO, and processed by the RNS ALU. In FIG. 10B, the starting RNS value has undefined digits in the $M_1$ and $M_3$ modulus positions. At the end of the base extend operation, the RNS value 1020 is fully extended, meaning the digit values for modulus $M_1$ and $M_3$ are now defined. At step 1002 of FIG. 10A, all skip flags for all digits are cleared, indicating all digits are valid, and the RNS value is fully extended.

Sign Magnitude and Sign Valid Bit

The method of the present invention provides a unique and novel approach to handling signed values in RNS format. The residue number system is not a weighted number system, and therefore, it is difficult to encode RNS numbers in a manner in which both arithmetic operations and sign determination of arbitrary values is easy. In order to determine the sign of an RNS value, the value must first be encoded in a format supporting signed numbers. If so, an operation is applied to the RNS value to determine the sign of the value.

In one embodiment of the present invention, numbers are encoded using method of complements format. That is, roughly half of the (usable) RNS range is devoted to positive numbers, and the other half is devoted to negative numbers. Using the method of complements allows the RNS format to represent signed values, even though detecting such sign may be difficult. More importantly, the method of complements allows direct operation on signed values. In one embodiment, the method of complements is used by the ALU to perform addition, subtraction and multiplication directly on signed values, treating the values as if they are unsigned integers. However, some operations, such as division, require knowing the sign of the value beforehand. Therefore, some means for detecting the sign of a value is required. More of this topic will be discussed later.

In addition to the method of complements, two bits are assigned to each RNS representation supporting signed values. In one embodiment, the RNS ALU supports two sign bits encoded in the following way. One bit is encoded as a sign magnitude bit. The sign magnitude bit may be set to zero for positive numbers and set to one for negative numbers, for example. A second bit is encoded as a "sign valid" bit. This bit is set true if the sign magnitude bit is valid, otherwise it is set false.

If a value has a valid sign bit, the sign valid bit is set true, and the sign magnitude bit is set to reflect the actual sign of the value. If the sign valid bit is set false, this implies that a sign extend operation is required before the sign bit is restored and can be used.

FIG. 3F depicts hardware storage of the sign magnitude bit and sign valid bit for the dual accumulator ALU of FIG. 3A. Two sets of sign bits are depicted, one for ALU A and the other for ALU B. Sign A magnitude bit 341 is set if the value is negative, although this is a decision by design only. Sign A valid bit 342 is set if the sign A magnitude bit 341 is valid. Sign B magnitude bit 343 and sign B valid bit work the same way for ALU B. Control unit 200 may read and/or manipulate the value of the sign and sign valid bit via sign status and control lines 346, 347. Therefore, the ALU can read the value of the sign and sign valid bit upon performing an operation, and may also set these bits as a result of an operation.

In FIG. 3F, sign and sign valid bits may be loaded from the register file 300 in tandem to the operation of loading the RNS value to the accumulator. Therefore, each register location in register file 300 has two additional bits, the sign magnitude bit 612 and the sign valid bit 613 as depicted in FIG. 6B using the dotted line 616. Conversely, if a value from the accumulator is stored to the register file 300, the corresponding values of the sign bit 341 and sign valid bit 342 are written along with the value itself. If the ALU provides a means to validate, or otherwise sign extend the value of the accumulator, this sign information may be stored with the value in register file 300 for later use.

The Sign Extend Operation

In one method of the present invention, a sign extend operation accepts an RNS value and extracts its sign, sets the sign magnitude bit using the extracted sign, and sets the sign valid bit true.

To implement a sign extend operation on the value contained within the RNS ALU accumulator, the value is converted to mixed radix format. During this conversion, a comparison is performed against the positive value range using digit compare register 302b in FIG. 3E for ALU A, and using digit compare register 303b for ALU B. During the mixed radix reduction of the accumulator, the generated mixed radix digits are compared on a digit by digit fashion with the mixed radix digits stored in the digit compare register of each digit ALU. The mixed radix digits stored in the digit compare register are pre-generated and moved from the register file to the digit compare register before or during the sign extend operation. Control unit 200 monitors the comparator 306b result via the digit comparator status signal 307b. After the value is converted, the control unit may store the sign result in the sign magnitude bit 341 and set the sign valid bit 342 true in the case of ALU A. ALU B will store its sign result into sign magnitude bit 343 and set its sign valid bit 344 true. The sign and sign valid bit may be written to a specific register file location to restore an operands sign bits.

In one embodiment, the range comparison is reduced to a single digit compare on the $P^{th}$ digit modulus (modulus starting with P=1). The reason is the positive number range may be checked using half the range of the RNS word, which in mixed radix format is a single non-zero digit followed by P−1 zeroes. In this case, the CPU comparison unit assumes the first P−1 digits are compared with zero until the $P^{th}$ digit is compared. If the conversion terminates before the $P^{th}$ digit, the value is determined to be positive. If the comparison holds to the $P^{th}$ digit, the digit comparison will determine the range comparison outcome, and hence the sign of the value. In this case, only a single comparator is used in one digit position, and therefore only one comparator is required for a particular number format, thereby reducing comparators, status lines and control unit circuitry.

Integrated Sign Extension

One novel and new feature of the present invention is the handling of the sign and sign valid bits during certain operations. Because the operation of sign extension is relatively costly, it is best to minimize its use. The present invention does so by integrating the process of sign extension directly into many common operations, such as compare and fractional multiply. Since such common operations may refresh the state of a values sign bit, the need to perform sign extensions is significantly reduced in most cases, thereby maximizing processing performance of the present invention.

Variable Power Digit Modulus

A variable power digit modulus is a new and novel mechanism utilized by the method of the present invention to enhance performance for certain operations, such as integer division and fractional division. This feature is among the more complex options for the ALU of the present invention. It will be briefly described here, and concepts introduced later in their proper context.

The variable power modulus modifies the prime number based modulus into a power of the prime number. For example, given the base modulus p=2, a power based modulus might be p=$2^8$, or p=256. Since the power of the prime value is still pair-wise prime with respect to all other digit modulus, there is no redundancy of the residue number system, and everything works as expected.

However, the power based modulus provides additional features that can be used to significantly enhance performance. In the case of integer division, using power based modulus can significantly reduce the number of base extensions required, therefore speeding the process. The reason is that a power of a modulus can be detected for divisibility by a power of the modulus, meaning the reduction process may divide by a higher power instead of the smaller value of the prime modulus. More of this is discussed in the section covering the integer division enhancements.

In the case of the fractional divide procedure, the ability to efficiently scale an RNS fractional value is important. A highly efficient scaling procedure is provided by the use of a power based modulus of base p=2. The power based modulus allows a variable modulus setting for the digit. Setting the modulus appropriately allows a truncation of the modulus such that a value is scaled efficiently.

Another benefit of the power based modulus is better accuracy in terms of fractional representation of common ratios. This is especially true if the lower valued prime modulus values are used to implement power based modulus, since the lower prime numbers are more frequent factors in general. Additionally, increasing the digit range of lower value digit modulus (p=2, p=3, etc) helps evenly distribute the memory of all LUT's, which means memory LUT space is more balanced across digits and performance more efficient. Also, the range of the RNS system may be increased without increasing the value of the largest prime number modulus. Therefore, there are many justifiable reasons to support expanded modulus via power based modulus, even if not all power based modulus features and benefits are realized.

Figure 11A:
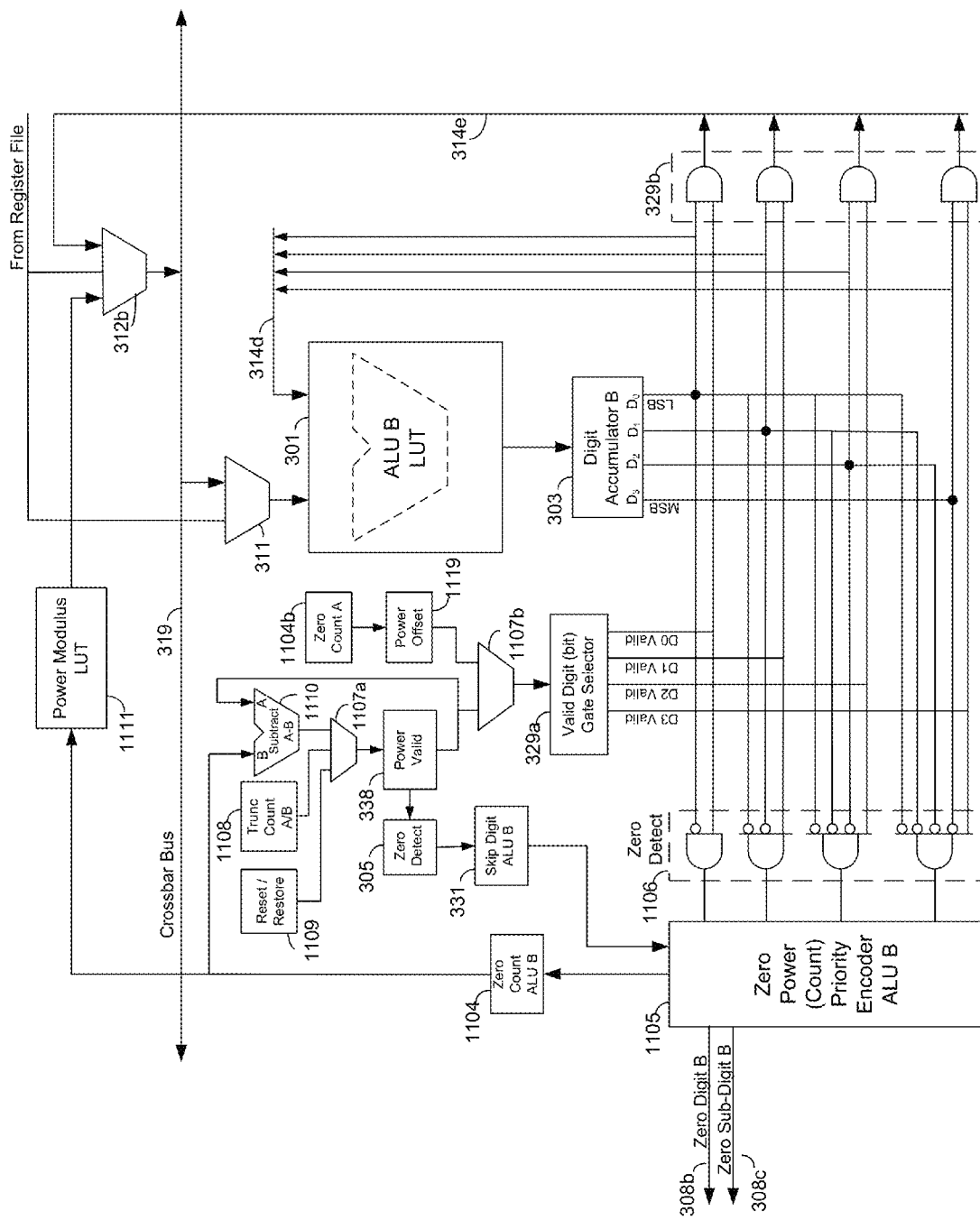
FIG. 11A is a block diagram illustrating an exemplary power based 2's modulus ALU.
Figure 11B:
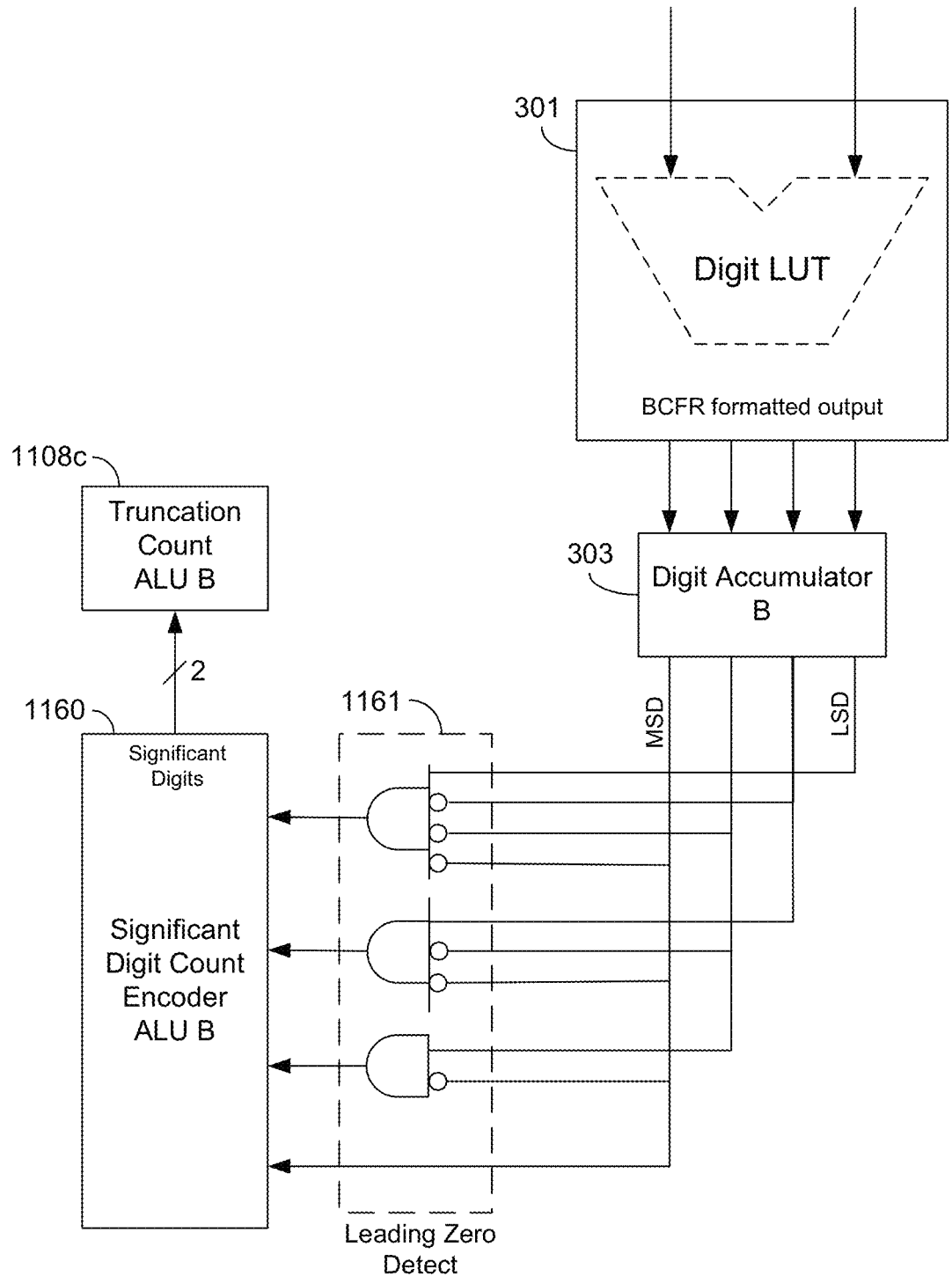
FIG. 11B is a block diagram illustrating an exemplary leading zero detect circuit of a power based digit ALU.

A power based digit modulus is said to contain "sub-digits". Sub-digits may be flagged as valid or invalid, and in one embodiment, are so flagged using a power valid register 338 and an apparatus similar to FIG. 11A. The power based modulus digit apparatus is depicted in FIG. 11A as an enhancement to the digit ALU. Only those components pertinent to the discussion are shown for clarity, since other components shown in FIG. 2A may also be present. Only the block circuitry for ALU B is depicted in FIG. 11A for clarity; an additional set of circuitry may exist for ALU A. The following capabilities are among those provided by the power based modulus:

In FIG. 11A, a four bit modulus p=$2^4$ is depicted. By means of example, the output of the digit accumulator 303 is divided into four digit lanes, each digit lane being one bit wide. A zero detect 1106 apparatus provides a means to detect if the value of the digit is divisible by any power of the base modulus p=2. A digit gate function 329b allows the digit ALU to gate specific lanes of sub-digits to the crossbar bus 319. A leading zero digit detector 1161 assists in determining a truncation count for scaling operations (FIG. 11B). A power valid register 338 controls how many sub-digit lanes are gated via valid digit gate selector 329a.

A power based digit modulus provides an adjustable modulus capability. During MODDIV operations, the largest modulus allowable for division may be obtained via power modulus LUT 1111, which is indexed from the output of the zero count 1104 register. The zero count 1104 register indicates how many consecutive least significant (valid) subdigits equal zero; this value indexes the appropriate power (modulus) from LUT 1111 to be gated via selector 312b to serve as an operand for MODDIV. This ensures the maximum modulus value is used to divide the digit, which is useful during the operation of integer division.

FIG. 11A also illustrates the Zero Digit B 308b and the Zero Sub-Digit B 308c status signals. The Zero Digit B status signal is active if all valid sub-digits are zero. This signal essentially indicates a zero in the digit position. The Zero Sub-Digit B status signal is active if a portion of the sub-digits (least significant) digits are zero. Using signals 308b and 308c, the ALU control unit may determine if the digit is completely zero, or if the digit value is divisible by some smaller power of the base modulus p.

Figure 11C:
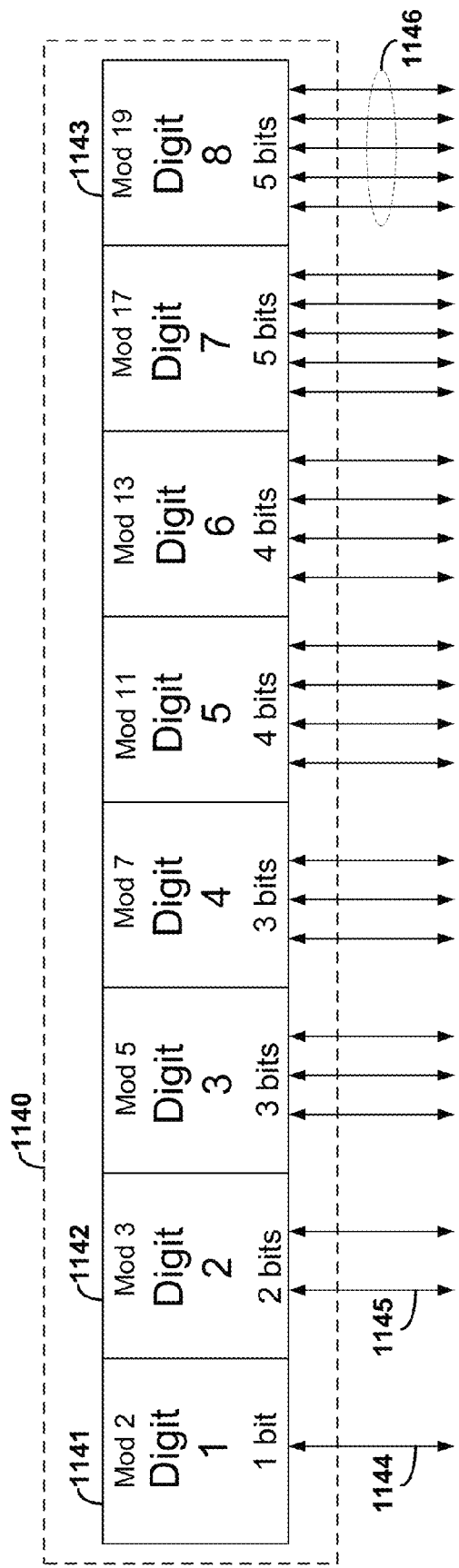
FIG. 11C is a block diagram illustrating an exemplary eight digit natural RNS register with binary coded digits.
Figure 11D:
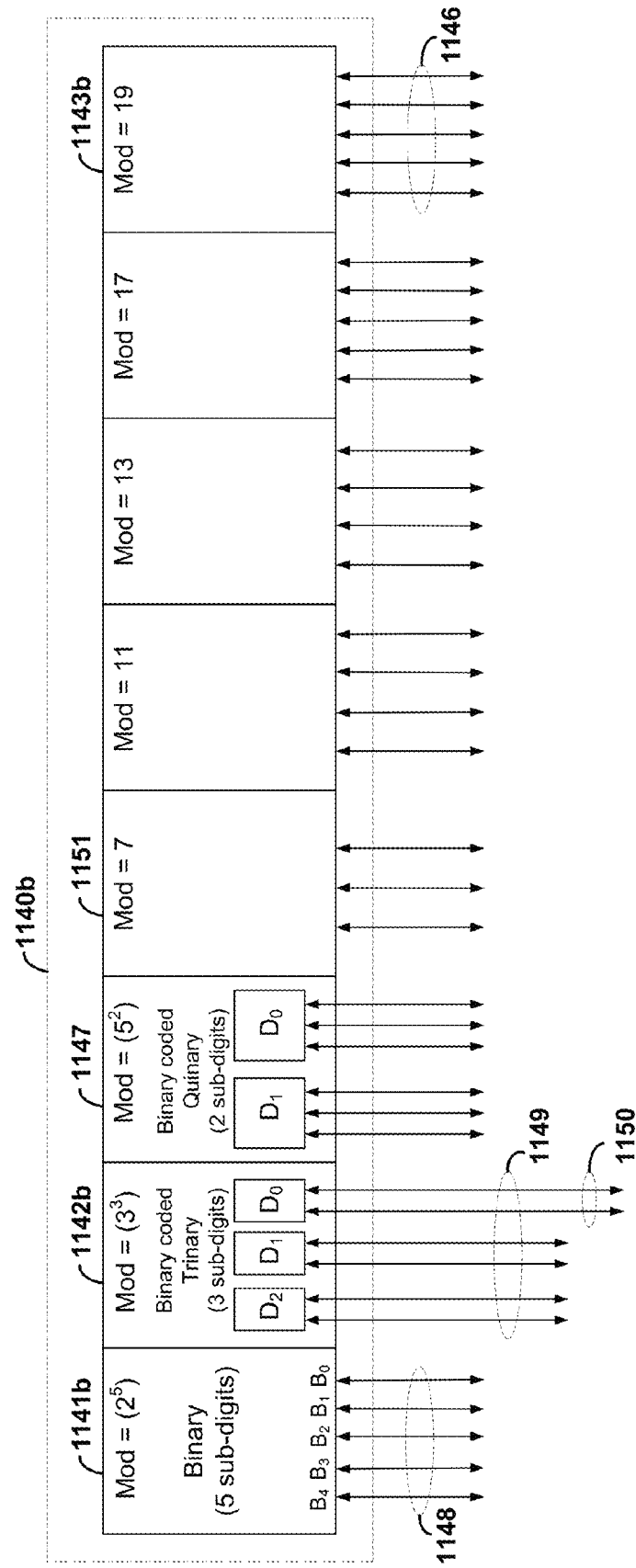
FIG. 11D is a block diagram illustrating an exemplary eight digit power based RNS register with binary coded p-nary fixed radix digits.

To help describe the power modulus digit further, FIGS. 11C and 11D are provided. In FIG. 11C, an example RNS register 1140 is depicted without any power based modulus feature. Each digit modulus is represented by a square symbol, such as digit modulus two 1141 and digit modulus three 1142. Each digit modulus is a binary coded register such as digit modulus nineteen 1143 with its five bit digit register 1146.

In FIG. 11D an RNS register with power based modulus is depicted by example. A difference is seen in the binary coding of the digit modulus two 1141b, modulus three 1142b, and modulus five 1147. For example, in digit modulus three 1142b, three sub-digits are depicted enclosed by dotted circle 1149. Each sub-digit is binary coded as two bits, such as sub digit $D_0$ 1150, since each sub-digit must store values up to two. However, all sub-digits 1149 taken together form a unique tri-nary sequence, not a standard binary count.

Table 3 illustrates the 8 digit RNS count sequence with unique power based modulus for the first three digits. Note in Table 3 the Modulus $M_1 = 3^3$ is a binary coded tri-nary encoding, and illustrates the count sequence for the digit modulus $p = 3^3$ 1142b of FIG. 11D. Likewise, the power based modulus $M_2 = 5^2$ is shown which illustrates the count sequence for the power modulus $p = 5^2$ 1147. The count for the power modulus $p = 2^6$ is only binary, since binary is already binary coded fixed radix (BCFR) representation, and is shown for the digit modulus 1141b of FIG. 11D.

Figure 11E:
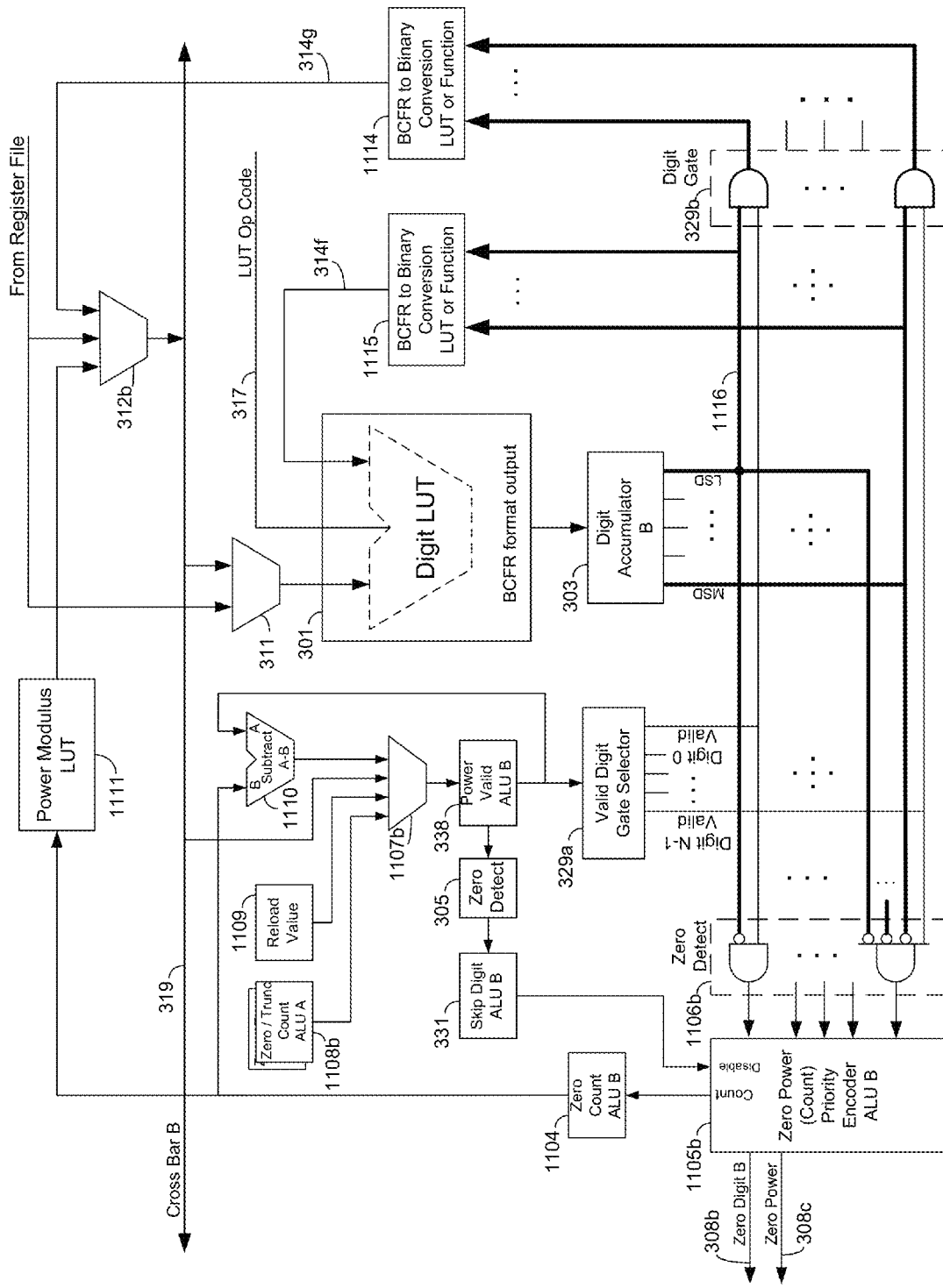
FIG. 11E is a block diagram illustrating an exemplary power based BCFR modulus digit ALU.

There are other methods to accomplish these objectives not discussed here, however, the fixed radix, variable power, p-nary encoding for power based digits as illustrated by example in FIG. 11D, FIG. 11A and FIG. 11E is a claimed invention of the disclosure.

Figure 11F:
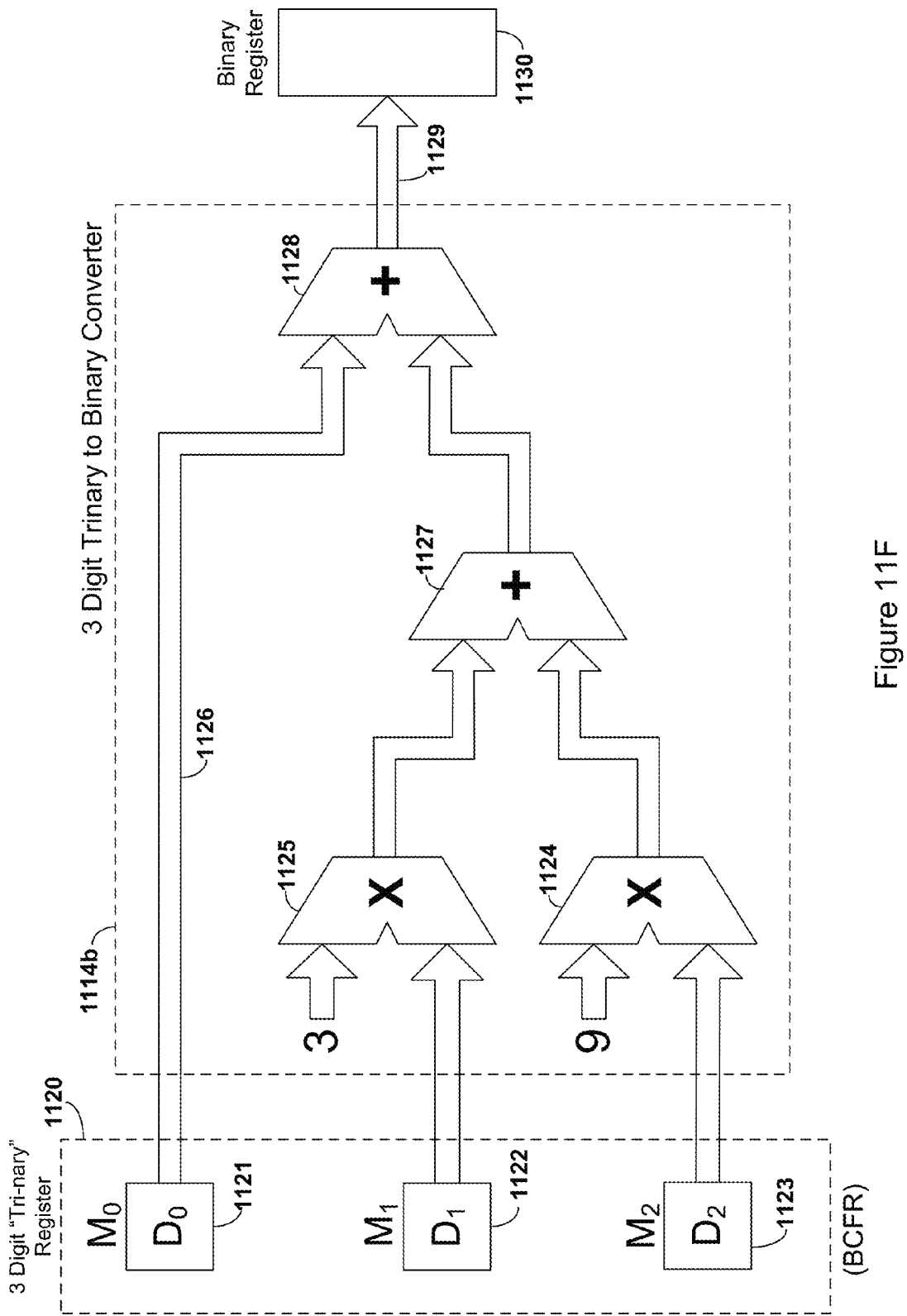
FIG. 11F is a block diagram illustrating an exemplary tri-nary to binary converter.

FIG. 11F illustrates an example BCFR to binary converter, also depicted by block symbols 1114 and 1115 in FIG. 11E. The BCFR to binary converter may be required when gating the power digit accumulator value back to the crossbar bus. This is required since the accumulator value is encoded in a BCFR format, not binary, and the crossbar may require a common binary format between all digit ALUs. The converter may use hardware arithmetic multipliers 1125, 1124 and hardware adders 1128, 1127 to perform the conversion as shown in FIG. 11F.

FIG. 11F illustrates a simple case of a three digit tri-nary register 1120 being converted to a binary value 1130. The sub-digit $M_2$ 1123 is multiplied by nine and added 1127 to the product of the $M_1$ sub-digit 1122 times three. This sum is then added 1128 to the value of the $M_0$ 1121 sub-digit. The binary result is the converted value of the 3 digit tri-nary register, and is output 1129 and saved in register 1130, by means of example. Conversions from BCFR to binary and binary to BCFR may also be performed using look up tables (LUTs); Table 4 is provided as a simple example of a specific BCFR conversion that may be stored using a LUT.

TABLE 4

Binary Coded Trinary

| Sub-digit $D_1$ | | Sub-digit $D_0$ | | Binary (No sub-digits) | | | | Decimal |
|---|---|---|---|---|---|---|---|---|
| $b_1$ | $b_0$ | $b_1$ | $b_0$ | $b_3$ | $b_2$ | $b_1$ | $b_0$ | $D_0$ |
| 0 | 0 | 0 | 0 | 0 | 0 | 0 | 0 | 0 |
| 0 | 0 | 0 | 1 | 0 | 0 | 0 | 1 | 1 |
| 0 | 0 | 1 | 0 | 0 | 0 | 1 | 0 | 2 |
| 0 | 1 | 0 | 0 | 0 | 0 | 1 | 1 | 3 |
| 0 | 1 | 0 | 1 | 0 | 1 | 0 | 0 | 4 |
| 0 | 1 | 1 | 0 | 0 | 1 | 0 | 1 | 5 |

TABLE 3

RNS Number Sequence with Power Based Digits

| Modulus $M_0 = 2^5$ $D_0$ | Modulus $M_1 = 3^3$ $D_1$ | Modulus $M_2 = 5^2$ $D_2$ | Modulus $M_3 = 7$ $D_3$ | Modulus $M_4 = 11$ $D_4$ | Modulus $M_5 = 13$ $D_5$ | Modulus $M_6 = 17$ $D_6$ | Modulus $M_7 = 19$ $D_7$ | Value (decimal) |
|---|---|---|---|---|---|---|---|---|
| 00000 | 000 | 00 | 0 | 0 | 0 | 0 | 0 | 0 |
| 00001 | 001 | 01 | 1 | 1 | 1 | 1 | 1 | 1 |
| 00010 | 002 | 02 | 2 | 2 | 2 | 2 | 2 | 2 |
| 00011 | 010 | 03 | 3 | 3 | 3 | 3 | 3 | 3 |
| 00100 | 011 | 04 | 4 | 4 | 4 | 4 | 4 | 4 |
| 00101 | 012 | 10 | 5 | 5 | 5 | 5 | 5 | 5 |
| 00110 | 020 | 11 | 6 | 6 | 6 | 6 | 6 | 6 |
| 00111 | 021 | 12 | 0 | 7 | 7 | 7 | 7 | 7 |
| 01000 | 022 | 13 | 1 | 8 | 8 | 8 | 8 | 8 |
| . | . | . | . | . | . | . | . | . |
| . | . | . | . | . | . | . | . | . |
| . | . | . | . | . | . | . | . | . |
| 10111 | 200 | 31 | 5 | 2 | 4 | 8 | 10 | 6983776791 |
| 11000 | 201 | 32 | 6 | 3 | 5 | 9 | 11 | 6983776792 |
| 11001 | 202 | 33 | 0 | 4 | 6 | 10 | 12 | 6983776793 |
| 11010 | 210 | 34 | 1 | 5 | 7 | 11 | 13 | 6983776794 |
| 11011 | 211 | 40 | 2 | 6 | 8 | 12 | 14 | 6983776795 |
| 11100 | 212 | 41 | 3 | 7 | 9 | 13 | 15 | 6983776796 |
| 11101 | 220 | 42 | 4 | 8 | 10 | 14 | 16 | 6983776797 |
| 11110 | 221 | 43 | 5 | 9 | 11 | 15 | 17 | 6983776798 |
| 11111 | 222 | 44 | 6 | 10 | 12 | 16 | 18 | 6983776799 |

TABLE 4-continued

Binary Coded Trinary

| Sub-digit $D_1$ | | Sub-digit $D_0$ | | Binary (No sub-digits) | | | | Decimal |
|---|---|---|---|---|---|---|---|---|
| $b_1$ | $b_0$ | $b_1$ | $b_0$ | $b_3$ | $b_2$ | $b_1$ | $b_0$ | $D_0$ |
| 1 | 0 | 0 | 0 | 0 | 1 | 1 | 0 | 6 |
| 1 | 0 | 0 | 1 | 0 | 1 | 1 | 1 | 7 |
| 1 | 0 | 1 | 0 | 1 | 0 | 0 | 0 | 8 |

In Table 4, a list of values ranging from zero to eight is shown using three different number systems. Binary coded tri-nary is listed on the left of the table, as two binary encoded tri-nary digits. Standard binary code is listed in the middle, and the equivalent decimal value is listed on the right column of Table 4.

Table 4 illustrates the conversion of a value from one format to the other. For example, the value for the decimal value five (5) is $12_3$ in tri-nary, and if each digit is encoded in binary, is the written in binary as 01,10, the comma separating the ones place from the threes place. The normal four bit binary code for the decimal value of five (5) is 0101, which is shown in the middle of Table 4. A LUT may be programmed such that a tri-nary encoded input references the location where a binary encoded equivalent value is stored.

Integer RNS Divider and ALU

Novel features of the RNS integer division method and of the RNS ALU apparatus, which enhance the speed and efficiency of RNS operations, are disclosed next.

For a practical, general purpose RNS based digital processing system, there is a need to divide arbitrary RNS integer numbers. It would be beneficial if the divide method is reasonably fast, and easily extensible in terms of word size. It would be beneficial if the RNS integer divide method operates without requiring many redundant digits, or even worse, without requiring a squared range of modulus.

With the integer division method of the enclosed invention, intermediate values may be handled with an increased range of only a single redundant digit or less. Alternatively, other embodiments exist that eliminate redundant digits, but require additional comparisons, for example. Another embodiment simply uses the negative range of a signed representation to serve as a redundant digit. This means the divide method of the present invention is efficient in terms of its redundant range requirement.

Consider that a practical solution to arbitrary RNS integer divide greatly impacts the practicality of an RNS based computer or ALU. It follows that one important ingredient of a practical RNS divide method is that its structure and operation integrate well with all other parts of the ALU. The method of the present invention satisfies this requirement. The integer divide method may operate directly on the full machine word of the ALU, making possible conversions of primitive data formats which underlie other more complex data formats.

Another benefit of the RNS division method of the present invention is its extensibility. The method of the present invention may be extended to any arbitrary RNS word size. Systems based on the present method may extend resolution by simply adding more digits, i.e., by utilizing the natural sequence of primes to extend digits to a desired RNS word size. The main restriction is implementing the logic for each digit as the word size of the digit increases. Otherwise, the method of the present invention scales in a linear fashion, and without additional complication.

The method of RNS division of the present invention operates on any arbitrary set of operand values, directly in residue number format. No intermediary binary format is used in the divide calculation.

The method of RNS integer division of the enclosed invention is unique. The method is not based on prior algorithms for division; as such, the new method provides its own unique set of opportunities to improve speed and efficiency of operation. A general purpose RNS ALU apparatus, organized as digit slices, supports the new divide method; the digit slice ALU is modified and optimized to support the novel enhancements disclosed.

The disclosed techniques for improving the speed of the RNS integer division method provide a solution which is expedient in terms of practicality, speed, and complexity. The techniques for improving speed are novel, and provide a surprising result in that each enhances the speed of the RNS division technique without counteracting the benefits of other techniques.

Lastly, these enhancements, together with new instructions and operations, provide a new ALU design which supports improved performance for fractional RNS representations. In terms of need, an efficient and arbitrary RNS integer divide simplifies the conversion of common integer ratios to RNS fractional representation. Therefore, and as expected, integer division is an important ingredient to a general purpose RNS ALU capable of general purpose arithmetic operations.

Residue Number format for Integer Division

The method of integer division is based upon an extensible formulation for residue numbers. This formulation is based on the use of a "natural RNS" number. This term may be new, and is hereby defined to be an RNS number which includes the prime modulus 2, and every prime number thereafter for each of the remaining digits of the RNS representation.

The largest number represented in the range of the natural RNS number of (n) digits is given by:

$$\text{Largest number} = (2*3*5* \ldots *p) - 1, \text{where } p = n^{th} \text{ prime number} \quad \text{(eq 1.)}$$

The range of the number representation includes the number zero, and is therefore given by:

$$\text{Range} = R = (2*3*5* \ldots *p), \quad \text{(eq. 1b)}$$

We can also write the range in terms of the variable "n", i.e., n=the number of RNS digits:

$$\text{Range}(n) = R(n) = (2*3*5* \ldots *p_n), \text{ where } p_n = n^{th} \text{ prime modulus}$$

Therefore, by means of example, our prototype RNS ALU supports a 16 digit RNS word, the digits representing the modulus (2, 3, 5, 7, 11, 13, 17, 19, 23, 29, 31, 37, 41, 43, 47, 53). In the RNS ALU of the present invention, the (natural) RNS number system is treated as fundamental as the binary number system. In the enclosed method, RNS numbers are represented using a long series of digits, in much the same way as one uses binary representation using many bits. Also, the modulus p=2 is important, and is typically required in the ALU of the enclosed invention.

As a further example, Table 5 illustrates an RNS number sequence using the first eight prime modulus, (2, 3, 5, 7, 11, 13, 17, 19).

TABLE 5

Natural RNS Number Sequence

| Modulus $M_0 = 2$ $D_0$ | Modulus $M_1 = 3$ $D_1$ | Modulus $M_2 = 5$ $D_2$ | Modulus $M_3 = 7$ $D_3$ | Modulus $M_4 = 11$ $D_4$ | Modulus $M_5 = 13$ $D_5$ | Modulus $M_6 = 17$ $D_6$ | Modulus $M_7 = 19$ $D_7$ | Value (decimal) |
|---|---|---|---|---|---|---|---|---|
| 0 | 0 | 0 | 0 | 0 | 0 | 0 | 0 | 0 |
| 1 | 1 | 1 | 1 | 1 | 1 | 1 | 1 | 1 |
| 0 | 2 | 2 | 2 | 2 | 2 | 2 | 2 | 2 |
| 1 | 0 | 3 | 3 | 3 | 3 | 3 | 3 | 3 |
| 0 | 1 | 4 | 4 | 4 | 4 | 4 | 4 | 4 |
| 1 | 2 | 0 | 5 | 5 | 5 | 5 | 5 | 5 |
| 0 | 0 | 1 | 6 | 6 | 6 | 6 | 6 | 6 |
| 1 | 1 | 2 | 0 | 7 | 7 | 7 | 7 | 7 |
| 0 | 2 | 3 | 1 | 8 | 8 | 8 | 8 | 8 |
| . | . | . | . | . | . | . | . | . |
| . | . | . | . | . | . | . | . | . |
| 1 | 0 | 1 | 5 | 2 | 4 | 8 | 10 | 9699681 |
| 0 | 1 | 2 | 6 | 3 | 5 | 9 | 11 | 9699682 |
| 1 | 2 | 3 | 0 | 4 | 6 | 10 | 12 | 9699683 |
| 0 | 0 | 4 | 1 | 5 | 7 | 11 | 13 | 9699684 |
| 1 | 1 | 0 | 2 | 6 | 8 | 12 | 14 | 9699685 |
| 0 | 2 | 1 | 3 | 7 | 9 | 13 | 15 | 9699686 |
| 1 | 0 | 2 | 4 | 8 | 10 | 14 | 16 | 9699687 |
| 0 | 1 | 3 | 5 | 9 | 11 | 15 | 17 | 9699688 |
| 1 | 2 | 4 | 6 | 10 | 12 | 16 | 18 | 9699689 |

The relative occurrence of "zeros" in any specific digit of a number is an important factor in the integer division method of the enclosed invention. It then follows that each successive (prime) digit modulus has a priority in terms of frequency of zeros. The chance that any random number has at least one digit equal to zero is given by:

Chance of any zero digit=$(R-(2-1)(3-1)(5-1)(7-1)\ldots(P-1))/R$ where range $R=2*3*5*7*\ldots*P_n$ This equation approaches 1 as n, the number of digits, goes to infinity. For example, at n=15 digits, the chance of any number having at least one zero is better than 86%. At 32 digits, the chance is better than 88%.

The division method of the enclosed invention has unique properties. One such unique property is that the speed of division increases as the number of RNS digits increases. The reason is RNS numbers with redundant digits carry more information about the number, and the method of the present invention capitalizes on that information. For example, additional digits expose new divisor factors, which may be used to divide by during division. In this light, redundant RNS digits are not completely redundant.

Division Quick Overview:

A new RNS decomposition procedure is defined for the integer division method of the present invention. This new decomposition method is hereby called "closest factor reduction" (CFR). In the method of the present invention, the division method operates on two RNS numbers, generally consisting of the same set of modulus, (although this is not a restriction). One of the RNS numbers represents the dividend, and the other represents the divisor. The divisor, using the apparatus and methods described herein, is reduced using CFR. The main divide loop in FIG. 12A, defined by control path 1213, discloses the CFR method. The dividend, in turn, is reduced using an MRC like procedure, but in a fashion corresponding to the reduction of the divisor. The reduction of the divisor completes when the divisor equals 1. At this point, the dividend register is tested to be an accurate quotient result. If the result is in error, the divisor is reloaded, and the division process is repeated with the error value replacing the dividend. If iteration is required, each time through the iteration, an accumulator sums or subtracts the resulting dividend register until a final correct result (quotient) is obtained.

Division Detailed Explanation

Figure 12A:
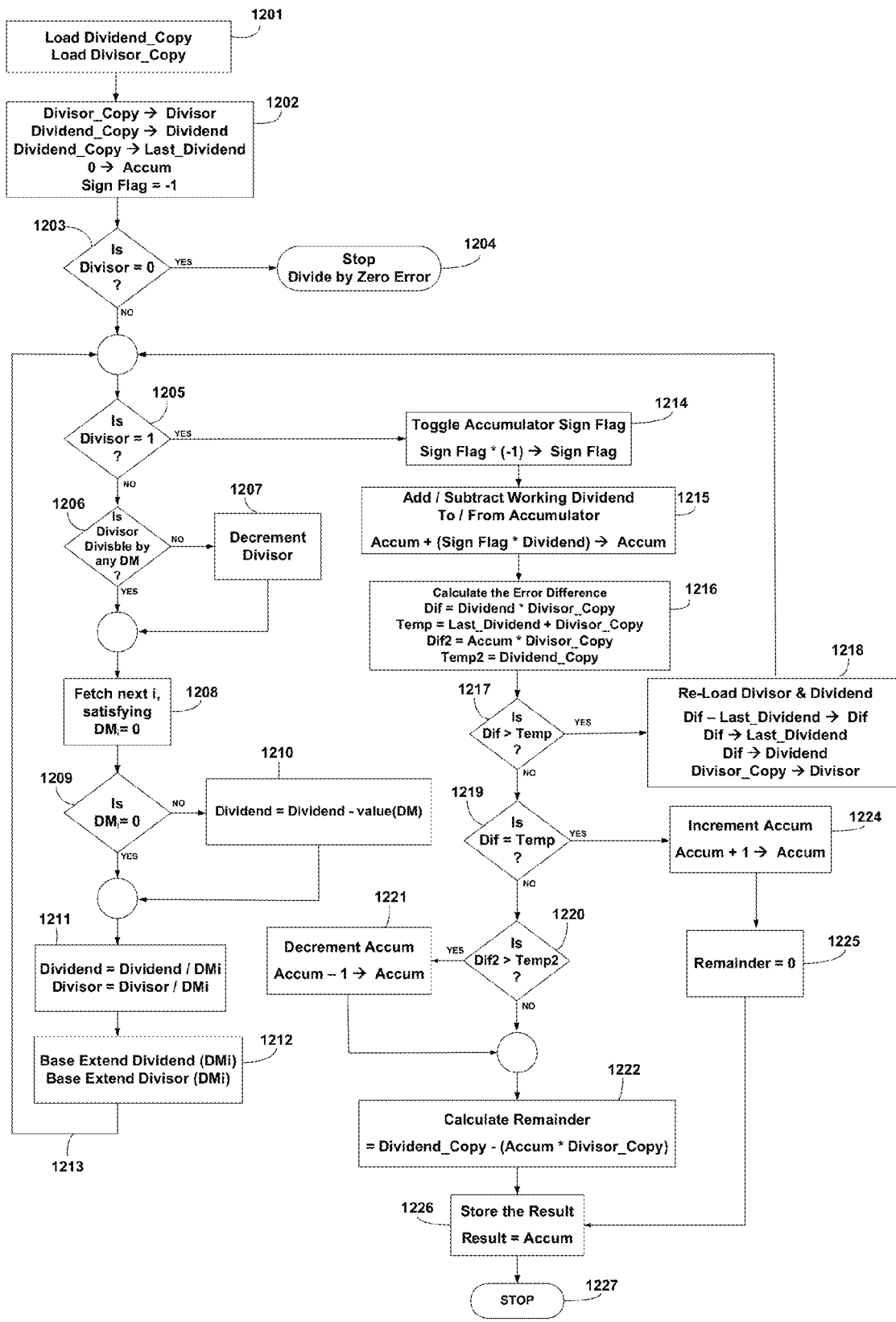
FIG. 12A is a flow diagram illustrating an exemplary RNS integer divide.
Figure 12B:
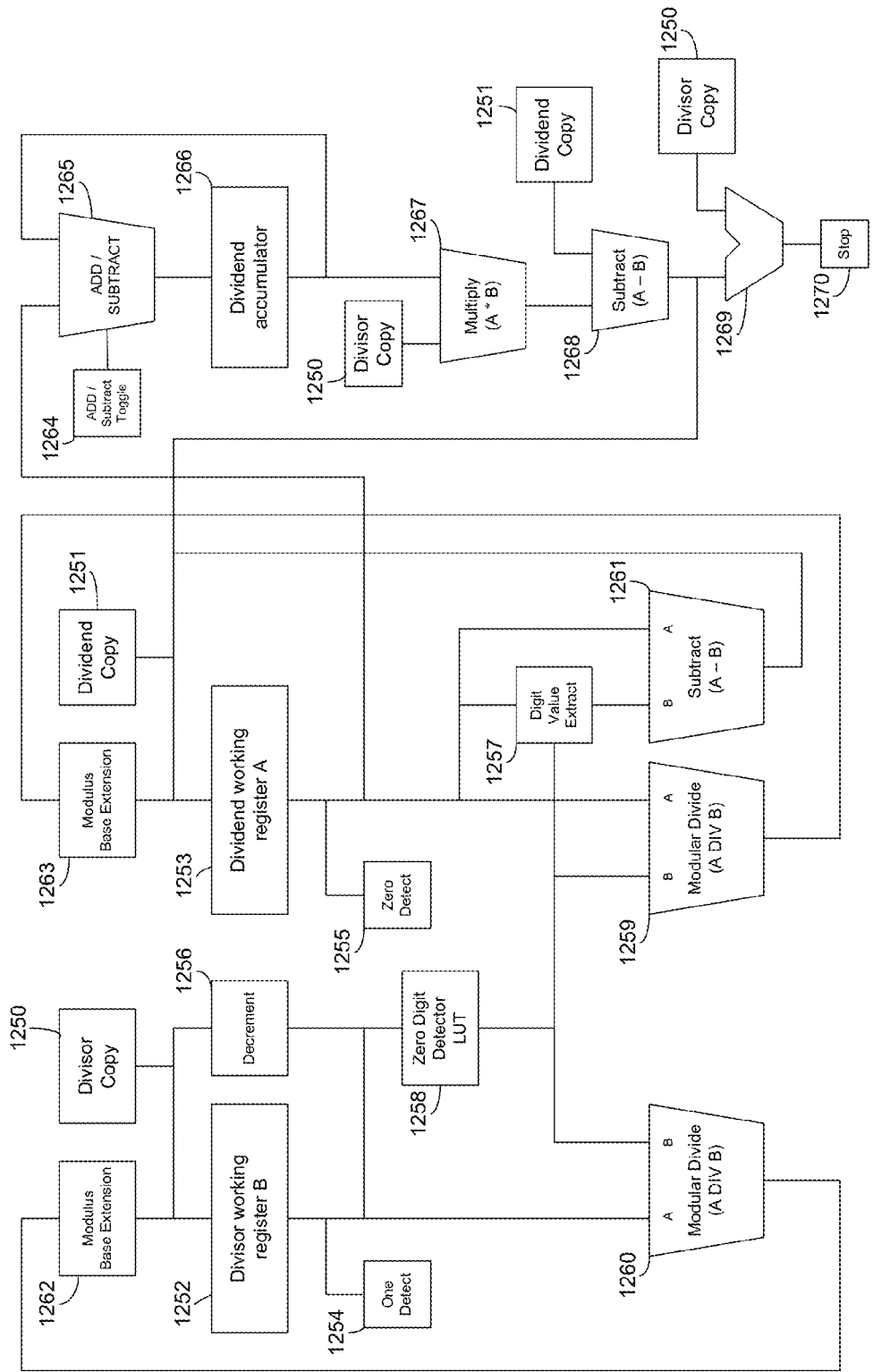
FIG. 12B is a block diagram illustrating an exemplary RNS integer divider.

Referring to FIG. 12B, a basic block diagram for the RNS divide is disclosed. Details of each block are not provided, as each block represents basic RNS functions. When new functions are disclosed, the function of the block will be explained. The hardware block diagram of FIG. 12B is a new embodiment for an RNS integer divide unit, and differs from FIG. 2A. The embodiment of FIG. 12B is disclosed to illustrate the integer algorithm may adapt to other architectures. It should be noted that there are multitudes of solutions for hardware implementation of each block, but the disclosed interconnection of these blocks is unique in terms of providing a means and apparatus for performing integer division of arbitrary RNS numbers. In a later section, an example integer divide is illustrated using the apparatus of FIG. 2A to further clarify the integer algorithm, which is among the most complex of RNS arithmetic operations disclosed herein.

In FIG. 12B, RNS registers 1252, 1253 of FIG. 12B represent RNS registers consisting of a plurality of modulus. Other examples of RNS register formats depicting a plurality of RNS modulus are provided in FIG. 11C and Table 3. In one embodiment, the modulus include the number 2 and all other primes thereafter for as many digits as is required for the application. For example, in our prototype RNS ALU, each RNS register is composed of 16 digits, with the first digit being the modulus 2, another digit being the modulus 3, and so on up to the digit representing the modulus 53. It should be noted that order of RNS digits is not important; however, for purposes of explanation and organization, we will often refer to digit ordering starting with modulus p=2.

The details provided in FIG. 12B disclose basic data flow and processing stages of the RNS integer divide method of the present invention. The associated control logic for the integer divide method and apparatus is disclosed in the flow chart of FIG. 12A. The flow chart assumes both operands are positive, however, extension of the method to handle signed integers will be discussed later. It should be noted that many variations of hardware implementations are possible which follow, or similarly follow, the basic functionality disclosed in FIG. 12A and FIG. 12B, including the digit slice architecture of FIG. 2A.

Referring to FIG. 12A, RNS division starts with loading the values of the divisor and dividend into temporary RNS registers, designated as the Dividend_Copy register and the Divisor_Copy register, as shown in step 1201. These registers are referred to as "copy registers", since they will contain the original values of the dividend and divisor for later use. Referring to FIG. 12B, the divisor copy register 1250 and dividend copy register 1251 are shown.

In FIG. 12A after step 1201 processing proceeds to block 1202 which loads the values of the dividend and divisor into their respective "working" registers, denoted as divisor working register B, 1252, and dividend working register A, 1253 in FIG. 12B. Furthermore, at block 1202, other initializations are performed, such as setting the initial toggle state 1264 and clearing the dividend accumulator 1266. Additionally, a temporary storage register or memory location entitled Last_Dividend is initialized with the contents of the Dividend_copy register.

Control generally processes step 1203 in parallel or after steps 1201 and 1202; in step 1203, the control unit checks the divisor for zero. If the divisor is zero, control is diverted to block 1204, which halts the divide operation and flags the operation as a divide by zero error. If the divisor is non-zero, flow proceeds to the decision control block 1205 as illustrated.

Referring to FIG. 12A, control decision block 1205 is executed, which tests if the divisor working register 1252 is equal to one. If the divisor working register 1252 is not equal to one, control is passed to block 1206. Decision block 1206 determines if the divisor is divisible by any supported digit modulus (DM). This is equivalent to determining if any digit of the divisor is equal to zero. At block 1206 in FIG. 12A, the divisor is tested for any "zeroes" in any of its digit values. This is performed by a Zero Digit Detector unit 1258 in FIG. 12B.

In step 1206, if the working divisor register 1252 has no zeroes in any of its digits, then control is passed to block 1207 which decrements the working divisor 1252 by one. Because the RNS representation of the present invention has a modulus of 2, a single decrement guarantees that a zero will be present in at least the modulus=2 digit of the working divisor 1252. In either case, control will then proceed to the step of selecting a digit for processing 1208.

If there is at least one digit equal to zero, then control proceeds to block 1208, which is essentially a decision of which zero digit to operate on first given the case of more than one zero digit in the divisor 1252. The functionality of block 1208 will be expanded on later in the disclosure. For the most basic explanation of the division method, it is fine to choose any arbitrary digit having a zero in the divisor, or to start with the digit with smallest index, for example. In other words, for basic operation, the order of choosing each digit modulus having a zero in the divisor is not important.

(In the flowchart of FIG. 12A, at step 1208, each digit modulus is denoted as $DM_i$, which denotes the $i^{th}$ digit of a register. For sake of definition, we arbitrarily assign an index to each digit modulus, DM, and for the purposes of this disclosure, we will assign the first index, i=0, to the digit modulus of 2. Therefore, the index i=1 refers to the digit modulus of 3, and so on.)

In either case, when control proceeds to step 1208, a zero is present in at least one of the digits of the working divisor 1252. In block 1208, a decision as to which zero digit to operate on is made. In one basic embodiment, the digits of the divisor register 1252 are sampled and the zero digit having the smallest index, i, is chosen.

Next, control is passed to block 1209 where the dividend working register 1253 is tested. Specifically, the digit of the dividend register whose modulus corresponds to the zero digit ($DM_i$) of the divisor, as selected in step 1208, is tested for zero 1209. If the dividend working register 1253 digit is zero ($DM_i$=0), control is passed to block 1211. If not, control is passed to block 1210, which subtracts the working dividend register 1253 by the value contained in the selected digit position of the dividend value, i.e., digit position from step 1208.

As shown in control block 1210, the dividend is subtracted by the value of its own digit of the selected digit position $DM_i$. For example, if at step 1208 the modulus=2 is selected, then the value of the modulus=2 digit of the dividend 1253 is subtracted from all digits of the dividend 1253. In FIG. 12B, the digit value extract 1257 is used to extract the digit value from the chosen modulus and subtract this value from every digit of the dividend working register 1253 (full RNS subtraction by the selected digit). The subtraction is accomplished by block 1261 of FIG. 12B, and the result of the subtraction is fed back to the dividend working register 1253.

Referring back to FIG. 12A, block 1211 is performed next. At block 1211, the chosen digit modulus ($DM_i$) of block 1208 is zero for both the divisor and dividend, therefore, a valid modulo (modulus=$p_i$) division is legal. At block 1211, modulo division by $DM_i$ is performed on both the divisor working register 1252 and on the dividend working register 1253, using modulo dividers 1260 and 1259 respectively. For example, if the chosen modulus of step 1208 was modulus p=3, then both the divisor working register 1252 and dividend working register 1253 are divided by 3. From an RNS mathematics point, the divisor and dividend are multiplied by the multiplicative inverse of modulus 3.

It should be noted that RNS modulo division, via blocks 1259 and 1260, may be implemented using look up tables (LUT) or other hardware approaches. Also, when modulo digit division is implemented using a LUT, it is referred to as MODDIV in this specification.

After modulo division, control is passed to step 1212 which performs a digit extension to both the working divisor register 1252 and the working dividend register 1253. In this basic explanation, the digit extended is the digit modulus chosen in step 1208. Digit extension for the RNS registers 1252 and 1253 are required, since after modulo division, the digit values of the chosen modulus are undefined. In FIG. 12B, digit extension is performed on the result of modulo division of block 1260, and the result stored back in the working divisor register 1252. Likewise, the result of modulo division of block 1259 is placed back into the working dividend register 1253. After the step of base extending both registers 1212, both the divisor and dividend are said to be fully extended, that is, each digit of the number format is defined and valid.

Referring to FIG. 12A, control is passed back to the beginning of the CFR reduction procedure, namely control block 1205, which detects if the divisor is equal to one. This is illustrated in FIG. 12A as control path 1213, which returns control back to step 1205. Again, in step 1205, the divisor value is checked for the value of one. If the value is not one, the flow moves again to step 1206, where either the divisor register 1252 already has a zero digit, or the divisor register 1252 is decremented once, via block 1256 and step 1207, to create a zero digit. The control loop represented by control path 1213 is continued again, dividing the value contained in the divisor working register, and dividing the value contained in the dividend working register 1253, by common modulus factors. The control path loop 1213 is executed until the working divisor register 1252 is equal to one.

At step 1205, if the working divisor register is equal to one, control is passed to step 1214. At step 1214, the accumulator sign flag 1264 is toggled. When entering step 1214 for first time, the add/subtract toggle state 1264 will be toggled to indicate that the working dividend register 1253 will be added to the dividend accumulator 1266 (or simply referred to as "accumulator" for short). Each successive time through the step 1214, the toggle state of block 1264 is toggled, such that the result of the working dividend register 1253 is alternately added to or subtracted from the accumulator 1266 using the add/subtract function 1265.

At step 1215, the value of the working dividend register 1253 is either added to or subtracted from the dividend accumulator 1266 using add/subtract function 1265. The operation selected is chosen based on the value of the add/subtract toggle state of block 1264. The result of the operation of step 1215 is stored back into the accumulator register 1266.

At step 1216, an error value is calculated and checked against the original divisor, via divisor copy register 1250. The check is performed using an RNS compare illustrated at block 1269. The error value represents the difference in the expected outcome from the calculated outcome using RNS multiplication at block 1267 and step 1216. A subtraction of the dividend copy at block 1268 is performed to simplify the comparison and creates a valid range of acceptance. Several variations are possible, but the flowchart of FIG. 12A illustrates a typical and basic operation.

The flowchart of FIG. 12A more carefully defines the subtleties of the error checking process of control steps 1216 and 1217. In control step 1216, several values are defined, and may be assembled by other apparatus not shown, for purposes of error checking the value contained in the dividend working register 1253. In FIG. 12A, the variable register "Dividend" represents the Dividend working register 1253 of FIG. 12B. Likewise, the variable register "Divisor" of FIG. 12A represents the Divisor working register 1252. In control step 1216, a test variable "Dif", which equals the product of the Dividend working register and the Divisor_Copy register, is compared with the test variable "Temp", which is the sum of the "Last_Dividend" storage register and the Divisor_Copy register. In this embodiment, the comparison need not handle signed values, since "Dif" and "Temp" are always positive.

Referring to the flowchart of FIG. 12A, if the "Dif" test variable is greater than the "Temp" test variable 1217, the result of the CFR divide process is too large. Therefore, an error value is generated in step 1218, and becomes the new dividend in a new CFR divide iteration, as defined by the loop path 1213. To accomplish this, the working dividend and other temporary variables need to be re-initialized, as shown in the control step 1218. In control step 1218, the "Dif" test variable is decreased by the value of the Last_Dividend, since "Dif" needs to be adjusted by the expected outcome to produce an error value. This subtraction always results in a positive value, since Dif is always larger than, or equal to, Last_Dividend. The reason is CFR reduction, as shown in this variation, will either produce a value that meets the expected value or exceeds it, since decrementing the denominator in step 1207 has the effect of producing a test Dividend value which is too large. This fact, among others, allows the integer division of the present invention to operate on operands requiring the full range of the RNS ALU with only a single redundant digit, or bit.

Other initializations are processed in control step 1218 of FIG. 12A. The Last_Dividend storage register is set to the new target dividend, i.e., the error value contained in "Dif". The dividend working register 1253 is also initialized with the error value contained in Dif. Also, the divisor working register 1252 must be re-initialized with the original divisor, which is stored in the Divisor_Copy register 1250. Other initialization may be required that are not shown.

In step 1217, if the temporary test value "Dif" is not greater than the temporary test value "Temp", as shown in FIG. 12A, control is passed to step 1219. At step 1219, the temporary test value "Dif" is checked for equality to the temporary test value "Temp"; if equal, control is passed to step 1224. At step 1224, the accumulator 1266 is incremented to account for an even division. Control is then passed to step 1225 where the remainder value is set to zero 1225. At this point, the result of the division is contained in the accumulator 1266, and can be stored as a final result in step 1226. Next, the divide operation is finished and terminates at step 1227.

In step 1219, if Dif does not equal Temp, control is passed to step 1220. In step 1220, the accumulator 1266 is tested for correctness. The comparison 1220 is performed using two test variables, "Dif2" and "Temp2"; such test variables may be computed as shown in step 1216, or computed prior to control decision 1220, or otherwise made available for comparison. If the temporary test value "Dif2" is greater than the temporary test value "Temp2", then control proceeds to step 1221, where the accumulator 1266 is decremented by one. The adjustment in step 1221 is a result of accumulated remainders accumulated from step 1210. These accumulated errors cannot change the final division result by more than one.

Control is then passed to step 1222. In step 1222, the remainder (not shown) is calculated if required. Calculation of the remainder is optional depending on design specifics of the ALU.

Finally, in step 1226, the final result of the divide is contained in the accumulator 1266, and may be stored in a final register if required. Control is then terminated at step 1227.

Division—Key Features and Enhancements

The method of the present invention performs division using a series of RNS digit by digit operations. Additionally, the method may require some degree of iteration depending on the properties of the numbers being divided. Therefore, the division may be categorized as a slow division method.

However, the method and apparatus of the present invention includes several key enhancements to dramatically improve the speed of the RNS division of the present invention. Generally speaking, reducing the number of comparisons and base extensions is a primary objective of the speed enhancements. The order of execution time has not yet been characterized for variations of these embodiments. Some of the key features and enhancements for the integer divide of FIG. 12A are listed in Table 6.

TABLE 6

| Reference | Description |
| --- | --- |
| 1 | Delayed base extension combined with simultaneous digit base extension. |
| 2 | Power based modulus for dividing repeated zeros in one divide iteration. |
| 3 | Power based modulus for delaying base extension beyond a denominator decrement. |
| 4 | Look ahead and optimize function for divide iterations by recording divisor zeros. |

TABLE 6-continued

| Reference | Description |
|---|---|
| 5 | Fast MRC based compare, and compare in parallel with CFR processing. |
| 6 | Combined subtract and divide LUT, which provides single clock per digit processing. |
| 7 | Last base extend integrated into the compare operation, with compare supporting skipped digits. |
| 8 | Adding redundant modulus for improved performance. |
| 9 | Delaying last base extend of CFR loop. |
| 10 | Reducing compare clocks with Compare Difference algorithm. |
| 11 | Adding an "increment" option for the divisor; a choice as to which set of zero modulus to choose can optimize performance during division. |

Delayed Base Extension Enhancement

Base extension of RNS numbers is generally considered a costly and time consuming operation. Base extension is the process of adding a redundant modulus to a given RNS number representation. For example, an RNS number represented by the moduli <2,3,5>, which must be less than 30, can also be represented by an RNS number composed of 4 digits, say <2,3,5,7>. In this example, the modulus=7 digit is not required, but if it is included, becomes a redundant digit. The process of determining the value of the redundant digit given all other non-redundant digits is called base extension, and in this disclosure, is often referred to as digit extension.

Base extension is often required after the step of modulo division, the reason being that the digit associated with modulo divide will be undefined afterwards. For example, if an RNS value is divided by modulus p=2, the modulus p=2 digit will be undefined afterwards. Using the same reasoning behind mixed radix conversion, the divided digit becomes redundant, so that base extension may be used to recover the undefined value. Performing a base extension operation after modulo divide recovers the new value of the undefined digit.

Referring to FIG. 12A of the basic flow of the integer divide method, step 1212 shows the base extension operation occurring immediately after the modulo divide operation in step 1211. As shown in FIG. 12A, the base extension operation is performed each and every time through the basic divide loop 1213 (i.e., or CFR loop). Because base extension occurs so frequently, there is a desire to reduce the execution time to perform base extension; in addition, it is desirable to reduce the number of times base extension is performed to begin with. The method of the present invention performs both goals simultaneously and in a novel manner. By combining a process to delay base extension with a method capable of performing simultaneous digit extensions, the method of the present invention significantly reduces the overhead of this critical operation. In fact, by delaying base extensions, the number of cycles of a simultaneous base extension is actually less than a base extension for a single digit alone.

Figure 13A:
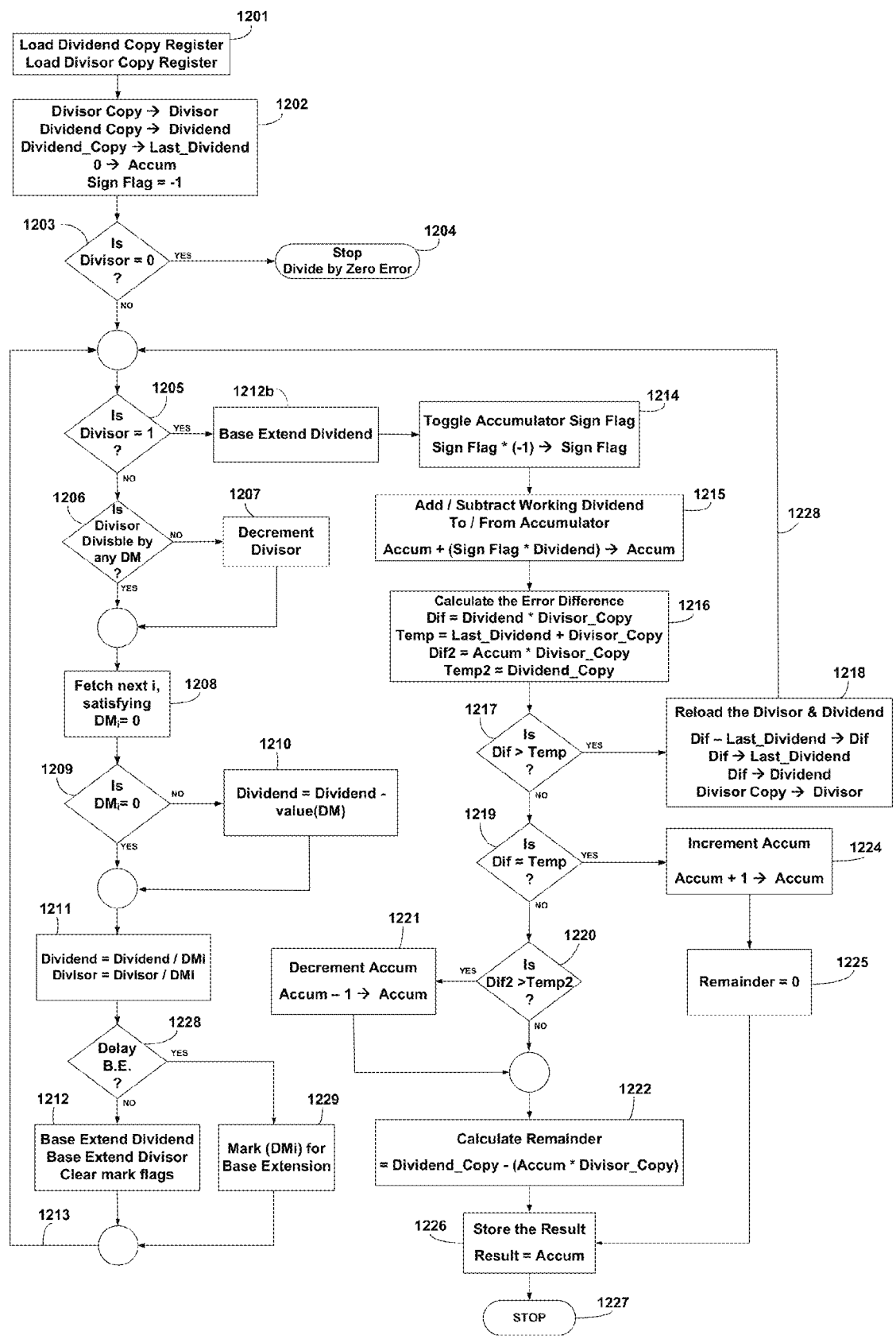
FIG. 13A is a block diagram illustrating an exemplary modified divide with delayed base extension.

To realize the benefits of this novel solution, several modifications to the basic divide method are required. Referring to FIG. 13A, a modified flow chart is provided to describe certain key modifications to the basic control flow. After the step of modulo division 1211, a new step 1228 to check whether the digit extension can be delayed is added. If it can, control is handed to step 1229, which marks the particular modulus (digit position) for base extension at a later time. The process of base extension, shown in step 1212, is modified to allow multiple digit base extensions, where each digit modulus to be extended is so indicated by its associated skip digit flag (which is set in step 1229), or other such flags indicating each digit to extend.

One embodiment of the base extension hardware is based on fast Mixed Radix Conversion (MRC) techniques. In short, a value requiring base extension indicates the digits which require extension via their skip digit flags; the value is decomposed using MRC, skipping any digit modulus marked as skipped. The resulting MRN values and their associated modulus (factors) are stored in a Last-In First-Out (LIFO) type memory. Once the value is decomposed, the LIFO memory is operated in reverse, essentially performing a mixed radix to RNS conversion. This process restores the RNS value, including all digits requiring a base extension. The more RNS digits that are skipped, the more digit positions are needing base extension, and the less clock cycles required for the "simultaneous digit" base extension process.

It may be instructive to note the operation of step 1208 in FIG. 13A, and how it relates to the base extension function 1212 and the decision to delay base extension 1228. In step 1208, a determination of which digit to perform modulo division is made. This step is programmed to sequence through each zero digit of the divisor for each iteration loop 1213. Once all zero digits have been divided and marked for base extension, a single base extension operation 1212 resolves all marked digits. After base extension, it is possible that previously marked digits will again be zero. In this case, the loop 1213 and step of 1208 continue the process of dividing by each zero digit modulus. The step of 1228 further considers whether the base extension is performed due to pending marked digits and no digits equal to zero in divisor 1252.

If after base extension any digits of divisor 1252 are again zero, the process of the loop 1213 will continue. If no base extensions are pending, and no digits are equal to zero, the step of 1207 is performed to provide a new set of divisor 1252 digits which equal zero.

By delaying base extension 1212, significant savings in clock cycles can be realized between the control flow of FIG. 12A and that of FIG. 13A. This is one example of the enhancements possible for the integer divide method.

Example RNS Integer Divide

FIG. 13B illustrates an integer divide example according to the control flow of FIG. 13A. The divide example is illustrated using a dual accumulator RNS ALU. One ALU is loaded with the dividend, the other ALU is loaded with the Divisor, as shown in the first step marked start 1330. In the example, the ALU assigned to the dividend is loaded with the value of (282), while the ALU associated with the divisor is loaded with (59). This is a simple example chosen to illustrate basic integer divide operation.

In the figure, the primary control steps are listed in the first column 1300, and are associated to the operation description, listed in the second column 1305. For each step in the diagram, the state of the dividend value and the divisor value are listed. The ALU structure in the example of FIG. 13B supports a simple eight digit RNS number with the modulus values {2, 3, 5, 7, 11, 13, 17, 19}. Range requirements for the operands are not analyzed here.

After the start step 1330, control advances to the step of decrementing the divisor 1331. The reason is that the original value, (59), has no zero digits. After the divisor decrement 1331, the ALU detects that both the dividend and divisor are divisible by the modulus $M_0=2$. The ALU divides both the dividend and the divisor by the modulus $M_0$ in step 1332. The flowchart of FIG. 13A proceeds to the task of base extending the divisor and dividend, since the digit position $M_0$ is now undefined. After the process of base extension, which was illustrated in FIG. 10B, the dividend and divisor are fully extended.

The integer control again inspects and detects if any digit positions are zero. Since there are no zeroes, the divisor is again decremented 1334. The divisor is now ready to be divided by $M_0$, but the dividend is not. Therefore, the dividend is subtracted by the value of the $D_0$ digit 1335, which in the example, is a value of one. Both the dividend and divisor is divided by the modulus $M_0$ 1336 once again. After the MODDIV operation 1336, a second digit position of the divisor is also zero, that is, the position of $M_3$. Because both the dividend and divisor have a zero in the $D_3$ digit position, both the dividend and divisor may be immediately divided by the modulus $M_3$=7 1337.

The control proceeds to perform a base extension 1338 on the dividend and divisor. Note that the base extension included two undefined digits, demonstrating the base extend operation performs extension on more than one digit simultaneously. In FIG. 13A, this was accomplished by delaying base extension in step 1228, and flagging the undefined digits as skipped in step 1229. After base extend, the digit position of $M_0$ is once again zero for the divisor and the dividend. The control proceeds to divide the dividend and divisor by the modulus $M_0$ 1339. Once again, the digits in the $M_0$ position are undefined until a base extend operation 1340 is performed. At this point, the ALU detects the value of one (1) in the divisor. The dividend is then tested according to the flow diagram step 1220 of FIG. 13A, and is decremented by one 1341. At this point, the divide is complete. Determination of the remainder is not shown in FIG. 13B but requires several more arithmetic operations as expected.

The example of FIG. 13B is used to help illustrate basic operation as well as enhancements of the integer divide process. For example, the control step to base extend 1340 the divisor may be skipped if the ALU can detect a value of one in all "non-skipped" digits. In this case, the last base extension 1340 for the divisor is not required, however, base extension for the dividend generally is.

Power Based Modulus for Modulo Divide of Repeated Factors (Powers)

Delaying base extension of step 1212 can result in a savings in the number of base extensions required, and in the number of cycles to perform the base extension. However, after base extension, it is possible that more zeros will be present in divisor 1252. In fact, the only new zeros possible after base extension are in the position of the digits extended. Therefore, it is common to get "repeated" factors during the main divide loop 1213. Repeated zeroes occurring after base extension represent a new opportunity to perform a digit divide, which then requires another base extension operation. The aforementioned technique of delaying base extension cannot help in this case because the system cannot determine if a repeated zero will occur until after a base extension is completed.

We now disclose a novel approach to reducing the number of base extension operations resulting from repeated zeros after base extension. This novel technique makes use of power based digit modulus, which is especially attractive for lower value prime modulus. One advantage of having lower value modulus replaced by a power of the modulus is that the most common repeated zero modulus can be inspected and divided in one step. In many cases where repeated zeroes would otherwise occur in main division loop 1213, power based digit modulus allows the processing of a plurality of repeated zeroes using a single modulo division and a single base extend operation. The power of the digit modulus determines the maximum number of repeated zeros which can be divided in one step for this digit. For example, a modulus which is a power of three can divide up to three repeated factors in one MODDIV operation. The power based modulus enhancement significantly reduces the occurrence of base extension cycles, and also reduces the number of modulo divide steps as well.

Power Based Modulus Introduction

Consider an example RNS ALU with the following modulus: {2, 3, 5, 7, 11, 13, 17, 19}. The count sequence for an ALU using the example modulus is listed in Table 5, by means of example. To implement the power based residue number system, we modify the first three modulus to some power, for example, we have chosen: {2*2*2*2*2, 3*3*3, 5*5, 7, 11, 13, 17, 19}. We now have a "power residue number system" (PRNS) system as defined herein. The count sequence of an ALU using the PRNS variation is shown in Table 3. In the case of the prime modulus $M_0$=2 digit of Table 5, we have arbitrarily chosen to increase the modulus range to 5 powers, or modulus=$2^5$, as shown in Table 3. This makes the first digit modulus equal to thirty two (32) instead of two (2).

The modulus $M_0$=32 digit can be thought of as a hybrid digit. The digit possesses more "zeros" than one. In other words, a "zero" exists for each of the five powers of the base modulus $M_0$=2. For example, the digit may be evenly divisible by 2, by 4, by 8, by 16, or by 32. Therefore, the hybrid digit operation is capable of acting as modulo 2, modulo 4, and so on up to modulo 32. In practice, each digit modulus "power" is tracked, and a count is used to define how many powers the digit represents. If the power digit is divided by its base modulus, the power count is decreased by one to signify the digit power is reduced by one. After base extension, the entire power of the digit may be restored in addition to the digit value. To facilitate certain operations, and to further reduce the requirement for redundant digits, power based digits having only part of their original power may be included in comparison and base extension operations.

The basic divide is modified to support power based modulus. For one, the least significant "zeroes" of the modulus $M_0$=32 digit are inspected to determine the greatest common factor for division. In the specific case of modulus with base two ($M_0$=$2^X$), the zeroes are sampled directly from the least significant bits of the binary digit value. For example, if the modulo 32 digit contains the value (16), four consecutive zeroes are sampled directly from the least significant bits of the binary value of (32), indicating that four p=2 factors can be divided in one step. Without the power based RNS digit, the divide CFR loop 1213 would require up to 3 extra base extension cycles in our example above (since dividing by 16 needs 4 separate divides by 2).

Power Based Digit Modulus ALU Detail

The first digit in our previous example, the digit modulus $M_0$=$2^5$, is a special case since it is the only RNS digit that is a power of two, which is the same as binary. Hardware implementation of the $M_0$=$2^5$ digit is straightforward using basic binary representation. In FIG. 11A, one embodiment for a PRNS digit having the modulus $M_0$=$2^4$ is illustrated; many of the mechanisms discussed to implement the power based digit modulus are shown in block diagram format. It should be understood other embodiments are possible which perform the same power digit divisibility detection, similar variable power modulus management and other power digit operations.

In the example of FIG. 11A, the power valid register 338 controls the valid digit gate selector 329a, which means the power valid count controls how many digits of the digit accumulator 303 are gated to the crossbar 319 via digit gate 329b. The power valid register 338 also influences the detection of the divisibility of the digit accumulator by control connections to the zero detect unit 1106, which in turn derives a power divisibility count stored in zero count register 1104.

However, for all other (non-binary) digit modulus, the case of supporting powers is more complicated. There are several embodiments that can be applied to implementation of power based modulus for modulus other than two. One basic method involves supporting binary coded fixed radix (BCFR) representation for the digit. For example, the modulus $M_1=3$ of Table 5 is modified to a modulus of $M_1=3^3$ as shown in Table 3. Therefore, the $M_1$ modulus is now 27, consisting of three sub-digits, each having their own zero; this is a three "sub-digit" binary coded tri-nary digit. Inspecting a BCFR digit for even division by a power of the modulus (base) is simplified, since even powers have successive sub-digits that are zero.

In one embodiment, the arithmetic LUT 301 of a power based digit is reconfigured to store its data in Binary Coded Fixed Radix (BCFR) format, as shown in FIG. 11E. This means the LUT output is in BCFR format, not binary; therefore, the format of the value stored in the digit accumulator is also BCFR format. For example, if the base modulus of the digit is p=3, then the digit accumulator would store binary coded tri-nary. FIG. 11 illustrates general data paths, and is therefore applicable to any modulus (p).

In FIG. 11E, the output of the digit accumulator 303 is routed back to the input of the ALU 301, via path 314*f*, and by means of BCFR to binary conversion block 1115. In addition, the output of the digit accumulator 303 is routed back to a selector 312*b* that may gate the output the crossbar bus 319.

Generally speaking, gating a BCFR format value directly onto the crossbar bus is problematic in the embodiment of FIG. 3A, since the crossbar bus is binary format, a common representation shared by all digits using the crossbar. Therefore, a BCFR to binary conversion LUT 327 is inserted to convert the BCFR format to the common binary format, as shown in FIG. 3G. Also shown in FIG. 3G, a BCFR to binary conversion LUT 326 is shown in the operand path 315*a* to the LUT 301. This is one of many possible design choices. In this case, the main LUT 301 is encoded assuming binary inputs. This has the advantage of keeping the main LUT 301 smaller in size (since BCFR format is wider than binary, in general).

The power based RNS digit of FIG. 11E has the ability to divide the digit value, and hence all other digit values, by a variable power of the modulus base. For example, a power digit modulus $M_0=2^5$ can be divided by up to five powers of two. After all five powers have been divided, the entire digit may be flagged as "skipped", or invalid. If less than 5 powers still remain, the digits modulus is said to be "partial". The mechanism tracking the current count of valid powers, or sub-digits, is power valid count register 338 shown in FIG. 11E.

For the example of FIG. 11E, if a modulus (32) digit has all valid sub-digits, power valid count 338 is set to five in our example. If the accumulator value 303 is divided by a single power of the base modulus, which is two in our example, the power valid count is decremented by one using subtraction unit 1110. In one case, the zero count register 1104 contains the maximum power of the base modulus for which the digit accumulator is evenly divisible. In this example, that power is one. In FIG. 11E, the value of the zero count register 1104 may be loaded via zero power count priority encoder 1105, using data input by zero detect unit 1106. The zero detect unit 1106 detects any digit position which starts with a series of zeros, and the priority encoder 1105 selects from the plurality of digit positions to select one specific digit position representing the maximum number of sequential zero digits. A count of zero indicates the digit accumulator is not divisible by any power of the base modulus.

Memory is required to track a plurality of modulus values. In a natural residue number ALU, each digit modulus is a single power, so there is only one modulus value per digit position. As previously discussed, this modulus value may be stored in register file 300. However, In an ALU which manages a dynamic power modulus, there may be more than one modulus value depending on the state of the power valid register 338. In FIG. 11E, a special adaptation is made, that is, LUT 1111 stores all possible modulus values, of which any one of the plurality of modulus values may be selected and gated via selector 312*b* to the crossbar bus 319. In FIG. 11E, the power modulus LUT 1111 may select a modulus entry based upon the value contained in the zero count register 1104.

In FIG. 3G, a register labeled "Power Valid A" 337 and "Power Valid B" 338 are included, one for each ALU. This register provides the current count of the power of the digit modulus. The count value is decreased when the digit undergoes a MODDIV operation of its modulus, or some power of its modulus. The power valid count is restored to the original power of the modulus after a base extend operation. In one embodiment, only a single Power Valid register 337 is used for both ALU's, since during division, both ALUs are divided by the same factors simultaneously. Therefore, a single counter for each digit reflects the accurate power count for both digits A and B of the ALU.

The power valid count 337 instructs BCFR digit selector 328 to "gate" only the valid sub-digits of the BCFR digit register 302 back to the ALU 301 or crossbar bus 318. All non-valid sub-digits are typically set to zero by the output of the BCFR digit selector 328 unit. For example, if a BCFR digit contains three digits, and only two digits are valid, the digit selector 328 will gate (pass) only the two least significant digits during certain operations. The gating operation is also shown in additional detail using FIG. 11E.

For example, in FIG. 11E, sub-digit 1116 is passed through digit gate 329*b* if the Digit 0 Valid signal from the Valid Digit Gate Selector 329*a* is one. The Valid Digit gate selector 329*a* is responsive to the input from the power valid count 338, so if the power valid count 338 is at least one or greater, the least significant digit lane 1116 is passed. This operation is useful for integer division of the present invention, since the proper digit portion, defined by the number of valid digits, or powers, can be transmitted to the crossbar 319 and to other digit ALUs.

In FIG. 11E, it can be seen Power Valid count register 338 is associated with the "skip digit" flag 331. That is, if the power valid count 338 goes to zero, zero detect unit 305 signals the skip digit flag be set. In general, every digit has a power, even if the power equals one. If the power equals one, and the digit is divided out, then the power is now zero, and the digit should be skipped. Hence, the power valid count 338 is an extension of the skip digit flag 331 function. Further illustrated in FIG. 11E is the skip digit flag 331 signaling the zero power priority encoder 1105*b*, which in turn affects the states of the zero digit 308*b* detection and zero power 308*c* detection.

For example, if a digit is marked as invalid, or skipped, the status of the Zero digit line will always be true, since setting the signal true removes the digit from consideration, similar to AND gate 596 of FIG. 5E. In FIG. 11E, the skip digit flag 331 within the digit ALU may influence the zero digit 308*b* and zero power 308*c* status signals before they are transmitted back to the control unit 200. In contrast to FIG. 5E and FIG. 2A, this is an example of distributing certain skip digit and status signal circuitry away from control unit 200.

Another basic embodiment for a PRNS digit function block consists of one or more table look-ups that in addition to providing arithmetic results, also provide an indication of the digits "zeros" status, and may also provide a zero mask, or offset vector, to guide subtraction of the numerator in preparation for modulo division. In this embodiment, the need to directly encode the digit accumulator 303 using BCFR may be bypassed, and replaced by table look-up mechanisms that provide the necessary information for power based modulo division. This embodiment and other alternatives for managing a variable digit modulus is not disclosed herein.

Divide Example with Repeated Factors

FIG. 13C uses the example of FIG. 13B and illustrates the enhancement of supporting power based modulus and grouping repeating factors during the divide of FIG. 13A. In FIG. 13C, the first three digit modulus are converted to support a power of the modulus. For example, the $M_0=2$ modulus of FIG. 13B is changed to an $M_0=2^5$ modulus 1316 in FIG. 13C. As another example, the $M_1=3$ of FIG. 13C is changed to $M_1=3^3$ 1317 of FIG. 13C. Note the $M_0$ modulus is shown in binary, to illustrate the binary value's divisibility (by a power of 2) can be detected more easily.

In the control steps of the example of FIG. 13C, the example proceeds in identical fashion as the example of FIG. 13B until the control step 1336*b*. In the control step 1336*b* of FIG. 13C, the ALU divides the dividend and divisor by the value of four (4), and not two (2) as was the case in FIG. 13B. The enhanced ALU can detect the $D_0$ digit value is divisible by four, not just two. By dividing by a power of the base modulus p=2, an extra step of division as required in FIG. 13B is saved. Note both the dividend and divisor ($M_0$) digit ends with two zeros in step 1335, hence a power based modulus ALU can detect this condition, and act to gate the largest power that divides the values evenly, which is two powers of p=2, or $2^2=4$ in this case.

The example of FIG. 13C also illustrates a delayed base extension of a power based modulus. That is, the high order "sub-digits" of $M_0$ are marked invalid while the remaining sub-digits remain valid. This is an example of a partially valid digit, which contains valid and invalid sub-digits. The invalid sub-digits are illustrated using an asterisk in the two high order binary bits of the $D_0$ digit values in step 1336*b* and 1337. Because the enhanced ALU processes repeated factors in addition to delayed base extension, one entire base extend cycle 1338 of FIG. 13B is eliminated in FIG. 13C.

Relationship to Divide Routine—How Grouping Repeated Factors Increases Performance In FIG. 13A, the flow chart of the modified divide with base extension delay, consider the decision block 1208 which advances to the next available zero in the divisor. In a modified embodiment, the block at 1208 also includes fetching the next zero digit, including power based digits which has a variable number of "zeroes". In other words, in the case of the modulus 2 with power 5, the digit can immediately indicate if the digit value is evenly divisible by 2, 4, 8, 16 or 32. Therefore, at step 1208, if the digit being divided is a power based digit, the system also tracks the power of the divider which will be used in block 1210 and 1211.

In block 1210, the offset value must be subtracted from the Dividend. If the modulus is of variable power, then only the valid digits indicated by the Power value count are included in the offset value, and the remaining digits are masked during subtraction 1210. This is the digit gating function described earlier.

In block 1211, the RNS number is divided by the digit modulus. In FIG. 13A, and in the case of a power based digit, the value DMi of step 1211 is replaced with the base modulus to the power of "valid power", or $2^V$, where V is the valid power count in this example. In the case of one or more least significant sub-digits equal to zero, the MODDIV operation will divide by $2^S$, where S equals the number of consecutive, least significant, zero sub-digits of the digit accumulator 303, and where S<V.

In the modified embodiment, the net effect is that certain opportunities are being taken to combine multiple digit divide operations at block 1211 and replace them with a single divide of more than one factor at a time, in this case, a power of the base modulus. The effect of reducing the requisite iterations through the divide loop 1213, including reduction of divide at 1211 and base extension 1212 is significant. Typical speed increases as a result of basic repeated factor grouping using power based modulus is nearly 100% speed improvement.

Power Based Modulus for Delaying Base Extension Beyond Divisor Decrement

The power based digit modulus of the present invention can provide another novel means for speed increase. In FIG. 13A, at decision control block 1228, a decision is made as to whether to base extend the dividend (and divisor). If there are no available zeros to divide, and there are pending digits marked for base extension (or marked as skipped), then the flow chart of FIG. 13A and of the original divide flowchart FIG. 12A instructs to base extend 1212 before returning to step 1205. In many cases, flow continues back to block 1206 where the RNS divisor is inspected for more zeros. In one variation, before committing to step 1207, which decrements the divisor to get a zero, all factors are divided out, including possible factors from invalid digit positions. Therefore, a base extension 1212 is required to determine if any skipped (previous zero) digits extend to a zero before proceeding to step 1207.

A power based modulus can help the ALU determine, in certain cases, that base extension is not needed. For example, the modulus $M_0=2^5$ digit may contain a digit that is divisible by 2 but not by 4. In this case, the ALU can determine that after a division by the modulus 2, the modulus 2 digit is not divisible by 2 once again. In other words, after a partial division by a base modulus, the power based digit is now a non-zero partial digit, and therefore indicates that base extension will not yield a zero result.

If a plurality of power based modulus digits are implemented, then the chance that only partial digits are remaining at stage 1228 increase. In other words, after dividing out by a set of power based modulus, in some cases, only partial power digits will result. In this case, there are no digits marked for base extension. Since there are no zeroes for division via loop 1213, assuming the divisor is not equal to 1, the loop will continue at 1206. The step of decrementing the divisor 1207 is now executed to retrieve at least one guaranteed zero, i.e., the modulus 2, of at least one power.

In the iteration of control loop 1213 that may follow, the digits, including the partial digits, that divide out (i.e. are zero) will be processed. In some cases, the digits are not related to the previous iteration factors (before the decrement at 1207). In this case, these digits do not enter into a divide, and do not require further base extension in the subsequent loop 1213. However, the eventual presence of a completely skipped digit will trigger a base extension operation, thereby recovering all the partial and skipped digits requiring base extension.

Therefore, the base extension operation 1212 usually applied before every decrement at 1207 is sometimes skipped, and combined with a subsequent base extension operation. Again, if a digits power valid count drops to zero, the entire digit is skipped, and marked for base extension. In this case, the completely invalidated digit causes the RNS number to be base extended at 1212, since the value of the digit is undefined, and therefore, the digit cannot be used in subsequent operations.

Delaying Base Extension Beyond Divisor Decrement Example

FIG. 13D illustrates the enhancement of delaying a base extension beyond the step of decrementing the divisor 1207 in the control flow of FIG. 13A. This feature is made practical using an ALU supporting a power based modulus, such as the modulus $M_0=2^5$ 1316. In FIG. 13D, the divide example is the same as in FIG. 13B and FIG. 13C, but illustrates the new enhancement. In the step of dividing by the first modulus 1332, the high order power digit of the $M_0$ modulus is marked as invalid, and base extension is delayed. In other words, the number of significant bits of the digit modulus $M_0$ decreased from five to four. Instead of performing a base extension in step 1333, the ALU of FIG. 13D creates a divisor zero by decrementing the divisor. After decrementing, the $M_0$ digit should always contain a zero. In the example, the ALU determines the $M_0$ digit is divisible by four, and the division process continues as in FIG. 13C.

In FIG. 13D, the base extension of step 1333 in FIG. 13C is eliminated. The $M_0$ power based modulus stores enough information to delay base extension through the divisor decrement process 1334, and also allows grouping of repeated factors in the divide step of 1336*b*. The only base extension remaining from the original example of FIG. 13C is the last base extension 1340, which ensures the result quotient is fully extended.

Look Ahead and Optimize Function for CFR Reduction and Divide Iterations

In the basic divide flowchart of FIG. 12A, and also of FIG. 13A, the basic divide loop of 1213 to 1206 is interrupted at step 1205 if the divisor equals to one. In this case, the basic flowchart calls for a base extension at 1212*b* to format the divisor value so that it may be added to the accumulator at step 1215. If an error is detected at step 1217, the basic divide loop will be re-entered via control path 1218 to 1205. In this case, the working divisor will start with a fresh copy of the original divisor value. This also means that the divisor CFR algorithm will be identical, and the Divisor will reduce in the same manner. A complex control system can take advantage of this fact for subsequent divide iterations. Knowing the decomposition of the Divisor beforehand allows the control system of the divider to know whether digits marked as skipped at 1212 will activate the base extend function of step 1212. In some cases, un-necessary base extension can be avoided. This is possible if the base extensions are known beforehand, and this will not generally be known unless the divide flow re-enters the divide loop for a repeated time. In other words, once through the primary divide loop, the divisor factors and hence base extensions are calculated and stored. If the divide repeats the primary divide loop via path 1228, the knowledge of the previous decomposition of the divisor can be used to process the dividend directly thereafter.

Additionally, the decomposition and subsequent base extend values for the Divisor can be stored and accessed as needed, thereby saving the need to repeatedly perform the same tasks on the divisor. Knowing this fact does not save time since the working dividend must be base extended at any rate, this process being in parallel with the divisor base extension at step 1212. However, it potentially saves hardware resources and power.

Fast MRC Based Compare, and Compare in Parallel with Processing

In one embodiment of the RNS divider of the present invention, a novel adaptation is provided to speed performance. In FIG. 13A, a decision as to the accuracy of the result is made at step 1217. If the result is within range, the division algorithm proceeds to step 1219 where adjustments are made and a final result is stored. Otherwise, control passes to step 1218 where the working Divisor is reloaded with the original divisor, and the working dividend is reloaded with the new delta, or error, calculated in step 1216.

In the FIG. 13A, it can be seen that at step 1217 either the divide continues at 1218, or prepares for completion at 1219. Also, once intermediate values are calculated in steps 1214, 1215 and 1216, control may be immediately passed to 1218, bypassing the step of checking the error at 1217 temporarily. Using a separate comparator circuit, the comparison of control step 1217 is processed in parallel to the new iteration of digit division. If the result of the comparison is YES, then control to 1218 was justified, and the new digit divide iteration can continue as is. Otherwise, if the result of the comparison is NO, then the primary divide loop entered via path 1228 is canceled, and the process of adjustment at 1220 commences. This is one example of breaking up of the divide control path of FIG. 13A into parallel processes to save time and clock cycles.

As another improvement, the process beginning at 1219 can execute in parallel with the execution of the comparator of step 1217, using a third circuit. If the parallel compare circuit returns NO, then the outcome of the adjustment process started at 1220 can be used immediately.

Parallelization of the flow chart in FIG. 13A can result in considerable savings, especially in savings of clock cycles due to comparison operations at step 1219. In fact, the clock cycles of step 1219, which represent the main comparison in the divide circuit, may be operated in parallel to the remaining portions of the flowchart. Since comparison and base extension contribute the most clock cycles to the RNS divide operation, there is significant savings in reducing the effective comparison clocks. In this case, effectively reducing comparison clock cycles to a single comparison at step 1220.

Many of the details of the parallelism are not disclosed for brevity sake. For example, it should be obvious that control flow from the main divide loop may need to wait for the completion of a previous compare before re-entering the compare process again.

Furthermore, all of the previously disclosed speed enhancements, those due to power based modulus and delayed base extension, will work in unison to the speed enhancements gained by implementing a parallel comparison mechanism. Combining all of the speed enhancements together creates a powerful, high speed RNS divide apparatus.

Combined Subtract and Divide LUT Providing Single Clock Per Digit Processing

Repetitive arithmetic operations are applied to intermediate values within the divide process of FIG. 13A. There is an opportunity to combine some of these operations. One interesting sequence of operations to combine is that of Subtraction and MODDIV (inverse modulo multiplication). In FIG. 13A, at step 1210, the Dividend is being prepared for the modulo divide (MODDIV) operation at step 1211 by subtraction of the digit value. This operation is followed by the MODDIV operation at step 1211. Therefore, there is an opportunity to combine the subtraction and modulo division operation into the same LUT access cycle. This effectively reduces the clock rate for divide operations almost by half. In a similar manner, base extension involves repeated addition followed by multiplication. A RNS digit LUT table which combines the addition and multiplication of the digit value into one LUT access can effectively save clocks for that process.

It should be noted that comparison and base extension are also performed using a two function sequence of either Subtraction followed by MODDIV, or Addition followed by Multiplication. In other words, speeding up basic RNS digit LUT's to process two functions in one access cycle speeds all other processes in the Divider. Therefore, performing such an enhancement, in of itself, reduces the clock cycles for the divide operation in half. FIG. 3H shows a digit function block which includes hardware provisions for a combined subtract/divide, and add/multiply architecture.

In one embodiment, the modulo addition portion of the look-up is implemented in hardware using a binary adder, comparator and subtraction unit circuit (not a LUT). The modulo multiplication is retained as a memory LUT access, whose input is fed by the result of the modulo addition hardware circuit. Similarly, in the case of combining the subtraction and MODDIV LUT functions, the subtraction unit is implemented in hardware using a subtract, comparator and adder unit. The result of the hardware modulo subtraction is fed into a LUT that handles the MODDIV operation via table look up.

In another implementation, modulo subtraction and modulo digit division is combined directly using a larger three input LUT. This was illustrated in FIG. 3C. This approach is fast, but costs much more memory for each digit LUT. If the single operation LUT depth is $Q^2$, then the combined two function LUT depth is $Q^3$.

Adding Redundant Modulus for Improved Performance

Another unique property of the divide algorithm of FIG. 12A and FIG. 13A is that the efficiency of the algorithm increases as the number of redundant digits increases. The reason is that redundant digits provide more opportunity to reduce the divisor using CFR, thereby providing a more precise decomposition. The more digits that divide out, the lesser the number of iterations and base extensions required.

The effect of redundant digits is dramatic. Another result is that smaller numbers divide much faster than larger numbers. Further adding redundant digits reduces execution time, but at an ever diminishing degree.

Table 6 lists many of the most popular speed improvement techniques. Other improvements to the integer divide method and apparatus are listed in Table 6, and still others are possible, but are beyond the scope of this disclosure.

Fractional RNS ALU

Fractional arithmetic in computers is not new, and most computers support some type of fractional representation. Many modern binary CPU's support a fractional number format referred to as "floating point". Several variations of floating point number formats have been adopted, but recently, several standards have emerged, such as IEEE 754-2008.

Computer operations on fractional representations are very important. Without fractional numbers and fractional arithmetic operations, the ability to perform real world calculations is severely limited, i.e., limited to integer operations alone. While there are some notable exceptions to common fractional representations, such as using integers to form rational number types, fractional representations such as floating and fixed point have dominated most computer applications, including scientific and digital signal processing calculations. Indeed, fractional representation is the technique used by digital systems to represent real numbers, such systems being limited to a finite number of representation states.

In the prior art, RNS calculations are performed using integers only. In some cases, RNS based systems have been adapted to applications requiring fractional values; in these cases, integers are treated as "scaled" values. In some literature, the use of integers to represent scaled values is termed "fixed point" arithmetic. However, referring to scaled values (integers) as a fixed point format is erroneous. In this disclosure, fixed point arithmetic refers to arithmetic operations that operate on a value 1) which may contain a fractional part and a whole part, and 2) when multiplied by another fixed point value produces a value that occupies the same range, and exists in the same fixed point format. When using RNS integer multiplication, this is not the case, since multiplying two integers produces a representation with a different range, and a different format. In the prior art, there is a need to "re-scale" such integer results, however, such re-scaling is not singularly defined, and is dependent on a specific choice of modulus, and specific application.

In the prior art, it is thought by many academics that general purpose fractional representation using RNS numbers is not possible, or at least not feasible. This is not true. The method of the present invention introduces several new fractional RNS representations. Indeed, the method of the present invention will disclose novel methods for performing general purpose arithmetic operations on these fractional RNS types. Using the methods of the present invention, fractional RNS multiplication, the most important of the RNS fractional operations, is indeed efficient, accurate and extendable.

What is needed is a new approach to fractional number representation in RNS, as well as a practical method and apparatus for general purpose calculations on such fractional RNS numbers. The next sections disclose new RNS fractional representations, and the methods and apparatus' for general purpose arithmetic operations using these representations.

Fixed Point RNS Fractional Representations

RNS numbers are not weighted; this is to say the magnitude of an RNS number is not easily ascertained by inspection of the digits alone. Unlike digits of fixed radix numbers, an RNS digit does not represent any portion or amount. The lack of an ordered and weighted sequence of digits makes the ability to "measure" a residue number difficult. The difficulty in quantifying an RNS value, and the difficulty in dividing an RNS value, may suggest that a fractional RNS representation is not possible, or at least not feasible. However, this is not true, as we shall discuss two different fractional number systems important to the present invention.

The fixed point fractional representation for RNS numbers is disclosed herein and is represented using Expression 2a in the following way:

$$I_1, I_2, I_3, \ldots I_M, F_1, F_2, F_3, \ldots F_N \qquad \text{(Expression. 2a)}$$

Where $I_1$ through $I_M$ represent M number of RNS digit modulus' reserved for the "whole" range of the number, and $F_1$ through $F_N$ represent N number of RNS digit modulus' reserved for the "fractional" range of the RNS fixed point representation.

In expression 2a, the total number of pair-wise prime modulus' is equal to M+N. All digits M+N are treated as a single RNS number. For example, during a parallel operation such as addition, all digit modulus (M+N) may perform the add operation simultaneously.

The "dot" separating the fractional portion from the whole number portion is for illustration purposes, since a residue number cannot support the exact equivalent of a "decimal point", or "binary point". The dot in expression 2a could be replaced by a comma. In fact, there should be no confusing Expression 2a with its binary, fixed radix equivalent. For example, even digits $I_1$ through $I_M$ must change if any fractional, nonzero value (less than one) is added. Residue numbers spread a values' information among all digits, and there is no such concept as concentrating a values' fractional portion to only the fractional digits alone.

In practice, an RNS ALU may require an extended range of digit modulus. The extended range of digit modulus may be expressed as:

$$I_1, I_2, I_3, \ldots I_M, F_1, F_2, F_3, \ldots F_N, E_1, E_2, E_3, \ldots E_X \quad \text{(Expression. 2b)}$$

Where $I_1$ through $I_M$ represent M number of RNS digit modulus' reserved for the "whole" range, and $F_1$ through $F_N$ represent N number of RNS digit modulus' reserved for the "fractional" range, and $E_1$ through $E_X$ represent X number of RNS digits modulus reserved for the extended range of the ALU.

The extended range, grouped as an adequate number of successive digits in one embodiment, provides the range necessary for scaling, and for holding intermediate values during fundamental operations, such as multiplication and division. Furthermore, extended digits may be required for detecting overflow, or performing other advanced features.

We can define the total number (M+N) digits of expression 2a as the RNS "data type representation", whereas the total number (M+N+X) digits of expression 2b as the RNS ALU "accumulator machine number". Expression 2b is analogous to a binary ALU of the prior art, which may have a wider accumulator than the operand size of the values processed.

Additionally, an ALU may adjust its accumulator definition to accommodate different data types. Therefore, all or more available digits of expression 2b can be formatted according to the expression:

$$I_1, I_2, I_3, \ldots I_{M+N+X-1}, R_1 \quad \text{(Expression. 2c)}$$

In this expression, a single digit $R_1$ is reserved as a redundant digit for use by the integer divide operation of the present invention. All other digits are treated as defining a range for integer values, consuming the entire range of expression 2b.

Treating the machine ALU as an integer value is common. Such integer formats represent primitive data types within more complex ALU operations, such as fractional multiplication. We will not disclose all such data types here, only to disclose the concept of fundamental representations, such as expression 2c, being used alongside and in conjunction with more complex representations of expression 2a and 2b.

Note that in a given design, fixed point data values may be handled, stored and moved with its extended (and therefore redundant) digits intact, as in expression 2b. Alternatively, a design may store and handle values in the format of expression 2a, and require values be base extended before an operation, (and truncated afterwards). In either case, the full number of digit modulus within an ALU "accumulator" will account for all required extended and redundant ranges. Machine designs which move and store values with extended digits intact save time, and are attractive for high speed RNS ALUs.

Despite the many differences, many parallels can be drawn between the fixed point RNS fractional representation defined herein and a fixed point binary fraction. In 1960, William Kahn proposed the definition of ulp(x), which is an acronym for unit of the last place. This definition aided the analysis of floating point numbers and other binary representations with fractional representation of (x) bits. For fixed point RNS representation, we will herein define "ump(n)", or unit of most precision. This is the smallest fraction that can be defined by a fixed point system, and is hereby defined for the RNS fixed point representation of (n) fractional digits as:

$$\text{ump}(n) = 1/(F_1 * F_2 * F_3 * \ldots * F_n) \quad \text{(Equation. 3)}$$

For example, if a fixed-point RNS number has as its fractional representation the following modulus': (2, 3, 5, 7, 11), then the unit of most precision is:

$$\text{Ump}(5) = 1/(2*3*5*7*11) = 1/2310 = 0.000432900_{10}$$

Using Equation 3, it is obvious that to increase the precision of the RNS fixed point number, an extension of the number of fractional digits is required. For a fixed point machine, the machine precision (i.e., the number of fractional digits) may be defined during design of the system, but this is not a limitation of the present invention. For example, in a later section, a "sliding point" RNS representation is defined, whereas the number of fractional digits may dynamically change during arithmetic operations.

Likewise, the largest RNS fractional value less than one (unity=1.0) is given by:

$$\text{(Largest fraction<1.0)} = (F_1 * F_2 * F_3 * \ldots * F_n - 1)/(F_1 * F_2 * F_3 * \ldots * F_n) \quad \text{(Eqn. 4)}$$

Given the example above of a fixed point RNS fraction having the fractional modulus' (2, 3, 5, 7, 11), the largest fractional value less than one is:

$$(2*3*5*7*11-1)/(2*3*5*7*11) = (1.0 - \text{ump}) = 0.999567$$

Again, this is similar to a fixed point, fixed radix number, for which the "range" of the fractional digits minus one ($R_F - 1$) divided by the range of the fractional digits ($R_F$) represents the largest fraction (less than one) which can be represented.

The "range" of the fractional portion of a fixed point RNS number employing N pair-wise prime modulus' is an important quantity, defined as:

$$\text{Fractional Range} = R_F = F_1 * F_2 * F_3 * \ldots * F_N) \quad \text{(Eqn. 5a)}$$

Therefore, the "range" of the integer (whole) portion of a fixed point RNS number employing M pair-wise prime modulus' is equally important, and is defined as:

$$\text{Integer Range} = R_W = (I_1 * I_2 * I_3 * \ldots * I_M) \quad \text{(Eqn. 5b)}$$

Moreover, the definition of fractional range affects the definition of unity in a RNS fixed point number. For example, in fixed radix systems, if the fraction point is omitted, the whole number portion appears to be scaled up by the fractional range. Likewise, the unit value (1.0) of a fixed point RNS number is said to be "scaled" by its fractional range $R_F$:

$$\text{Unit value} = (1.0)_{10} = R_F \quad \text{(Eqn. 6)}$$

For example, given a fixed point RNS value having the fractional modulus' $(2, 3, 5, 7, 11)_F$, and having the whole modulus $(13, 17, 19, 23)_W$, the value of one $(1.0_{10})$ could be written as:

$$1.0_{10} = 10, 11, 15, 9 \cdot 0, 0, 0, 0, 0$$

Given that the sequence of RNS digit modulus' in the written representation is: (23, 19, 17, 13·11, 7, 5, 3, 2), the "point" representing another comma, but is used to clarify range assignments of Expression 2.

Another way to write an actual RNS fixed point number in terms of its digits is to specify each digit value using a sub script which specifies its associated modulus; therefore, given our example modulus, we can write the value of one as:

$$1.0_{10} = 10_{23}11_{19}15_{17}9_{13} \cdot 0_{11}0_{7}0_{5}0_{3}0_{2}$$ (Expression 7a)

Again, in Expression 7a, the fixed point RNS value is shown as a sequence of whole digits separated from a sequence of fractional digits by a point; this is a convenience of representation, and should not be confused to be equivalent to a fraction point in a fixed radix number, although both are similar in many respects.

In fact, the concept of "ordered digits" has little meaning in RNS numbers; only the assignment of modulus to a given digit value has meaning. This fact is often missed when looking at fixed radix numbers, since the order of digits customarily defines the power of each digit. However, again this is only notational convenience, since in truth, each digit position of a fixed radix number is associated with a particular "power" of the radix, and we have grown accustomed to writing digits in a particular order to maintain that (implied) association, and to simplify the concept of carry and borrow.

In this disclosure, we shall use the notation of Expression 7a when the meaning of RNS digits is deemed confusing. However, again, the written order of digits is not important other than to clarify notation. We shall see later that, indeed, the digit order of certain types of RNS operations is arbitrary for the same reason, as this is a property of residue numbers. (Although once an order is chosen, it should be maintained for certain subsequent operations).

To be clear, it is important to illustrate a few more fixed point RNS numbers using the example modulus above. One interesting number is the written value of ump; another is the written value of ump plus unity:

$$\text{ump} = 1_{23}1_{19}1_{17}1_{13} \cdot 1_{11}1_{7}1_{9}1_{3}1_{2}$$ (Expression 7b)

$$\text{ump+unit value} = 11_{23}12_{19}16_{17}10_{13} \cdot 1_{11}1_{7}1_{9}1_{3}1_{2}$$ (Expression 7c)

The largest value represented in the example fixed point RNS system is represented with the largest integer represented by the M+N digit RNS number:

$$\text{Largest value} = 22_{23}18_{19}16_{17}12_{13} \cdot 10_{11}6_{7}4_{5}2_{3}1_{2}$$ (Expression 7d)

Where the example fixed point RNS system of expression 7d handles positive numbers only.

Fixed Point RNS Fractional Arithmetic Operations

Arithmetic operations for fixed point RNS values are in many ways analogous to arithmetic operations for fixed point, fixed radix systems. There are however, many differences, especially for the operation of fixed point RNS multiplication.

For fixed point addition and subtraction of unsigned RNS values, the operations are straight forward and are identical to RNS integer addition and subtraction. For example, for fixed point RNS addition, each operand (A) digit is added to its corresponding operand (B) digit (of the same modulus) using modulo addition, without carry. Subtraction is the same except the operation is modulo subtraction. Because the RNS fractional format is fixed point, the fixed point position is not affected, as would be the case in binary fixed point addition and subtraction.

FIGS. 14A, 14B and 14C illustrate simple examples of fractional addition given the modulus set {23, 19, 17, 13, 11, 7, 5, 3, 2}, where the fractional digits are assigned to the modulus {11, 7, 5, 3, 2}. In FIG. 14A, the value of one seventh is added to the value of one fifth. Because the RNS fractional system of our example supports fifths and sevenths exactly, this particular example illustrates an exact result, namely, a result of $^{12}/_{35}$. Redundant modulus' are not necessarily required for addition, and are not shown in the examples.

FIG. 14B illustrates a fractional addition with values that are not exactly represented. In this case, the value of ¼ is added to the value of ⅛. Using the example RNS system, exact fractional representations do not exist for these values. In this case, the example system approximates the desired values; the example system adds $^{577}/_{2310}$ to $^{289}/_{2310}$ which yields $^{866}/_{2310}$, or approximately 0.3749. The binary fractional system will perform this particular addition more accurately, and will yield an exact result of 0.375, but the binary system will have difficulty representing one fifth and one seventh, and must approximate the results of FIG. 14A. FIG. 14C illustrates the addition of two fixed point numbers having both a fractional and whole part.

(In this disclosure, the term "fractional" generally describes a representation which includes both fractional and whole parts; i.e., a plurality of digits associated to the integer range of a number, and a plurality of digits associated with the fractional range.)

For RNS fixed point multiplication, the situation is similar to fixed radix multiplication, but with several key differences. To begin with, any fixed point fractional value can be rewritten in terms of its integer and fractional parts. Expression 2 is rewritten in this form:

$$i_1, i_2, i_3, \ldots i_M f_1, f_2, f_3, \ldots f_N \rightarrow w + n/R_F = ((w^* R_F) + n)R_F$$ (Expression 7e)

where, w=integer representing the integer portion of the RNS value n=integer representing the fractional portion of the RNS value That is, (w) equals an integer value representing the whole portion of the fixed point RNS number, and (n) is an integer value representing the fractional portion; n being an integer value such that $0 <= n < R_F$, where $R_F$ is defined in Equation 5a.

In expression 7e, the notation chosen to describe an RNS value is explained. The left hand term of expression 7e represents an RNS value of the form of expression 2a, where the integer range and the fractional range are shown using different letters for each RNS modulus. The digit value associated with a modulus assigned to the fractional range is denoted as $f_J$, while a digit value associated with an RNS modulus assigned to the whole range is designated as $i_K$. As known by those skilled in the art, the range of any RNS digit value, $f_J$ and $i_K$, is therefore:

$$0 \leq f_J < F_J \text{ (for any fractional modulus } F_J, 1 \leq J \leq N)$$

$$0 \leq i_K < I_K \text{ (for any whole modulus } I_K, 1 \leq K \leq M)$$

It is important to note that in expression 7e, the left hand expression represents a single RNS value, which is mathematically treated in accordance to assigned ranges of expression 2a.

For completeness, the relationship between RNS values and the values w and n, (which is not needed for this discussion, but adds to our definition) is:

$$(f_1, f_2, f_3, \ldots f_N) = (n) \text{MOD } R_F = n$$ Eqn. 7f $$(i_1, i_2, i_3, \ldots i_M) = (n+w) \text{MOD } R_W$$ Eqn. 7g In expression 7f and 7g, the fractional and whole ranges of the RNS are separated, and each treated as a separate RNS value, but this is done for mathematical relation purposes only, and by means of example. Again, the left hand expression of 7e is in actuality a single RNS number, and will be processed as a single number in the ALU of the present invention.

Getting back to the main idea, a simple way to look at the right hand side of Expression 7e is to represent the entire fixed point RNS number as a whole integer, Y, over the fractional range of the fixed point number system, so we have:

$$w+n/R_F=Y/R_F \qquad \text{Eqn. 8}$$

where, $Y=w*R_F+n$

We refer to Y as a data representation number, employing M+N digit modulus. Therefore, we are in a position to derive the correct mathematics for fixed point RNS multiplication, which is essentially the same for fixed point, fixed radix systems. To multiply two RNS fractions, we have:

$$Y_1/R_F * Y_2/R_F = (Y_1*Y_2)/(R_F*R_F) \qquad \text{Eqn. 9a}$$

$$(Y_1*Y_2)/(R_F*R_F) = ((Y_1*Y_2)/R_F)R_F \qquad \text{Eqn. 9b}$$

Where $Y_1$ and $Y_2$ represent RNS data numbers, treated as integers.

The issue with the right hand of Equation 9a is the result is not properly normalized for the machine representation. In other words, $Y_1*Y_2$ is not the correct result of the fixed point fractional multiplication. Equation 9b suggests the proper answer, that is, the integer result $Y_1*Y_2$ must be normalized by, i.e. or divided by, a factor of $R_F$. This is analogous to the "left shift" of the binary point in fixed point binary multiplication. For long multiplication as taught in grade school, it is analogous to counting the number of decimal places to the right of the decimal point of both operands, and placing the decimal point to left of the least significant digit of the result that many places.

Fixed Point RNS Multiplication Method and Apparatus

One method to achieve fixed point RNS multiplication of values having the representation set forth in Expression 2a is to multiply the RNS fixed point numbers as if they are integers, and then divide the result by $R_F$, as suggested by Equation 9b. In fact, this can be achieved by performing an RNS integer multiplication, and then applying the RNS integer divide method of the present invention to divide by $R_F$. This technique is indeed a claimed feature of the ALU of the present invention. However, because the integer divide method is not deterministic, the resulting fractional multiplication is not deterministic.

Therefore, an alternate method of the enclosed invention is disclosed which is faster, more simple, and requires less control circuitry. The new fractional RNS multiply is consistent, and predictable in terms of execution cycles. From an overall view, the unique and novel method for fixed point RNS multiplication of the present invention uses a modified base extension algorithm and apparatus. The case of multiplying two positive values is explained first to simplify the disclosure.

The multiply operation starts with an RNS integer multiply of the operands, i.e., treating each fixed point operand as an extended integer (i.e., integer multiply of the machine numbers). Next, a modified base extension procedure and apparatus performs three required functions as a combined operation. These three functions are: 1) divide by $R_F$, 2) digit extend the fractional digits, and 3) round the result. The RNS fixed point multiplication is achieved in linear time with respect to the number of RNS digits, assuming LUT access time is fixed.

It should be noted that for a given numeric range, a range equal to or greater than the number range "squared" may be supported by the ALU for the multiplication operation; this is the same case if we are multiplying two N bit binary numbers, such an apparatus might use an N+N bit width to store the full result. In addition, by adding one or more redundant digits, certain numeric overflow status can be generated.

(Variations of arithmetic ranges for RNS fractions can be supported but are not discussed in detail herein. For example, a machine number with a range equal to one number range times an additional fractional range is contemplated. In this example, the fractional range is squared, thereby covering the range requirement for fractional operation, but supporting only a single whole range, which easily "overflows" if the values are too large. Like the binary case, if the result exceeds the range of the representation, it is invalid. In another case, a machine which only supports calculations with numbers less than a certain value may have a unique range requirement.)

In one embodiment, the RNS ALU carries the double width (range squared) representation throughout all operations, and not just within the integer multiplier as required. This embodiment trades the need for additional hardware in order to save clock cycles that would be needed to base extend each operand before multiplication. An alternate embodiment is contemplated which does not require a range squared representation throughout, but at the cost of additional steps to base extend the RNS values before multiplication.

Figure 15A:
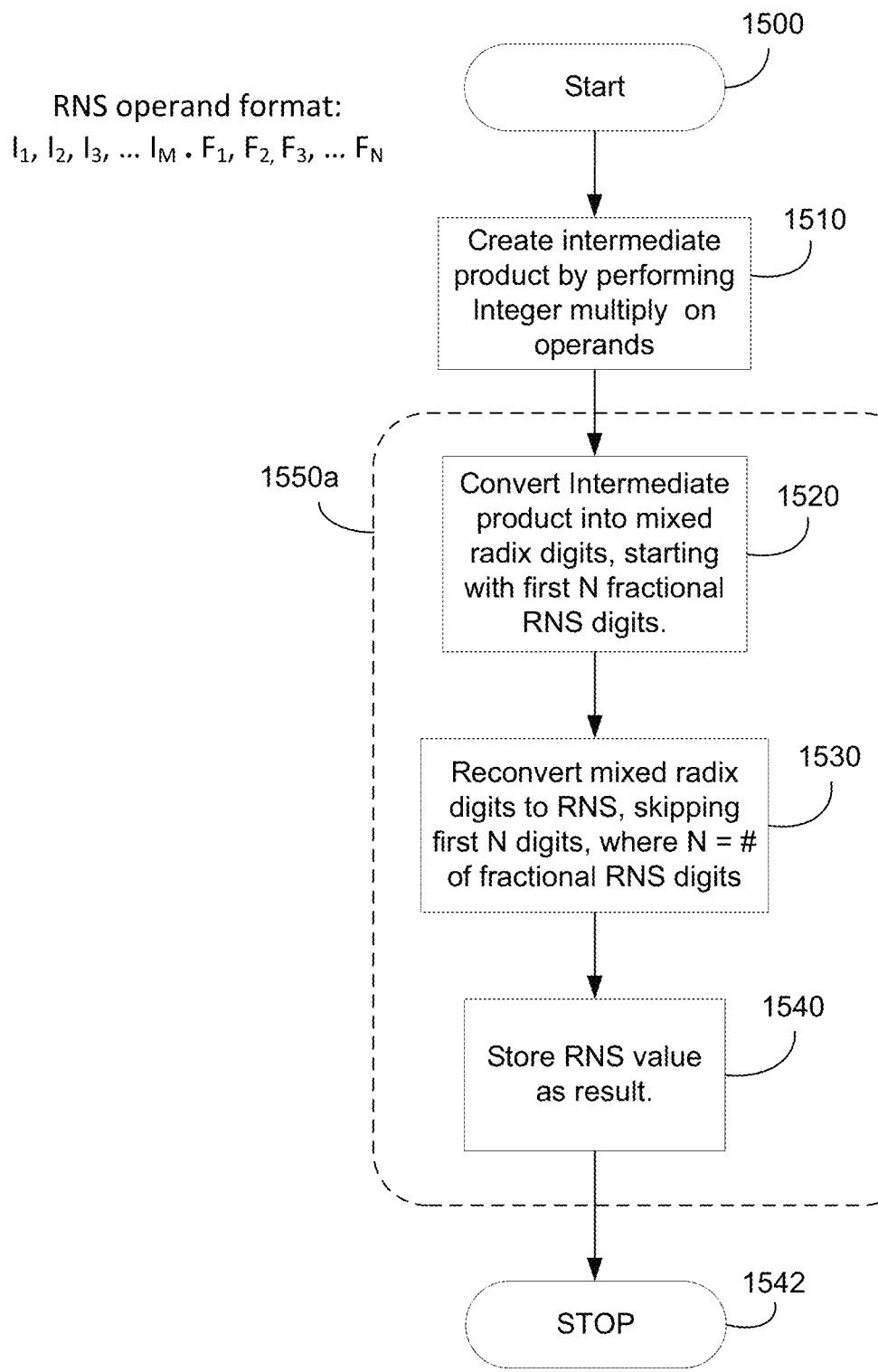
FIG. 15A is a flow diagram illustrating an exemplary simplified fixed point RNS multiply with truncation rounding.

To begin the disclosure of the novel approach to fixed point RNS multiplication of the present invention, the flow chart of FIG. 15A is provided. The flow chart of FIG. 15A represents basic steps to provide an overview, and does not delve into micro-coded specifics. However, the method of FIG. 15A assumes basic data structures as shown in FIG. 2A, for instance, supporting the fact that all algorithms of the enclosed invention may use a similar digit slice data structure. However, this is not a limitation of the method(s) herein.

FIG. 15A illustrates the most basic fixed point RNS multiply method of the enclosed invention. It does not include advanced rounding functions other than truncation rounding, nor does it describe how signed operands are handled. Instead, it is provided to give a foundation for the more advanced methods to follow. The flow chart further assumes and references the basic notation for fixed point RNS numbers as provided by Expression 2a.

The flowchart of FIG. 15A starts at the control step 1500 marked start. It is assumed the operands are stored in a suitable memory, and may be accessed for the RNS multiply operation 1510. After RNS integer multiplication 1510, which generally requires an extended range, the result of the integer multiply 1510 is converted to mixed radix digits using a process similar to the flowchart of FIG. 7A. It is important that the mixed radix conversion 1520 start with the fractional RNS digits designated by the modulus $F_1$ through $F_N$. The mixed radix digits may be stored in any suitable manner, as long as they may be accessed in a reverse order for step 1530. In one embodiment, a LIFO hardware stack is used to store and retrieve both mixed radix digit values and their associated modulus, such as that depicted in FIG. 2B.

After converting the result of the RNS multiply from step 1510 into its corresponding mixed radix digits in control step 1520, the process of reconverting 1530 the mixed radix digits back to an RNS number is performed. In the reconversion 1530 of mixed radix digits, the mixed radix digits are reconverted to RNS starting with the last digit converted; in other words, the reconversion process 1530 occurs in the reverse digit order from the original mixed radix conversion 1520. In a special modification of the mixed radix to RNS reconversion procedure, the last N digits (to be reconverted) of the mixed radix value are ignored, or skipped. These discarded digits correspond to the first N digits converted in mixed radix conversion 1520, where N is the number of fractional digits of the representation.

The final result of mixed radix to RNS conversion 1530 is stored in step 1540. This result is the final truncated result of the multiplication of the two (positive) fixed point RNS operands. The method of FIG. 15A accomplishes several important objectives, which include a multiply, an implicit divide by $R_F$, and a full digit extension as a result of reconversion.

The truncation of mixed radix digits is an operation that truncates the digits as well as the powers of the digits. Therefore, the truncated mixed radix number represents a new number, in a new mixed radix number system, since the new mixed radix number system has fewer radix, or powers. In one embodiment, reconverting the mixed radix number 1530 includes the process of truncation by the method of skipping digits. By stopping short of converting the last N mixed radix digits, the truncation operation is realized, and is equivalent to adjusting the element count 802 of FIG. 8A.

A formal proof for the RNS fixed point multiplication is not provided here, but is readily explained in the following manner. From the integer multiply in step 1510, it is understood from equation 9b that a divide by the fractional range, $R_F$, is required to normalize the result. The conversion of the integer result to mixed radix 1520 represents a valid result, only in another number system, namely, mixed radix. Since the mixed radix system is a weighted system, an equivalent fraction point exists, therefore, truncation is valid. Since the first digits converted to mixed radix become the least significant digits, these digits are truncated. The number of digits truncated will equal the number of fractional digits in the RNS format, since there is a one to one correspondence from RNS to mixed radix in terms of range represented by the digits. One complete fractional range is to be divided, which is equivalent to truncation in the mixed radix system of N number of least significant digits, N being the number of (fixed point) fractional modulus in RNS.

In FIG. 15A, the control steps 1520, 1530 and 1540 are enclosed using a dotted rectangle 1550a. This grouping of low level functions 1550a constitute a new RNS fixed point operation, herein referred to as "intermediate to normal" conversion. In the sections that follow, the intermediate to normal conversion 1550a will be expanded to support signed values, sign extension and result rounding. As will be disclosed, the ability to separate the intermediate to normal conversion 1550a from the intermediate format processing stage 1510 provides very fast arithmetic processing; since for some operations, a plurality of intermediate format processing is accomplished using the fastest RNS operations, while the intermediate to normal conversion 1550a is only required once. This new method of processing has significant benefits in RNS, but has no value if attempted in binary.

Signed Values and the Method of Complements

Figure 15B:
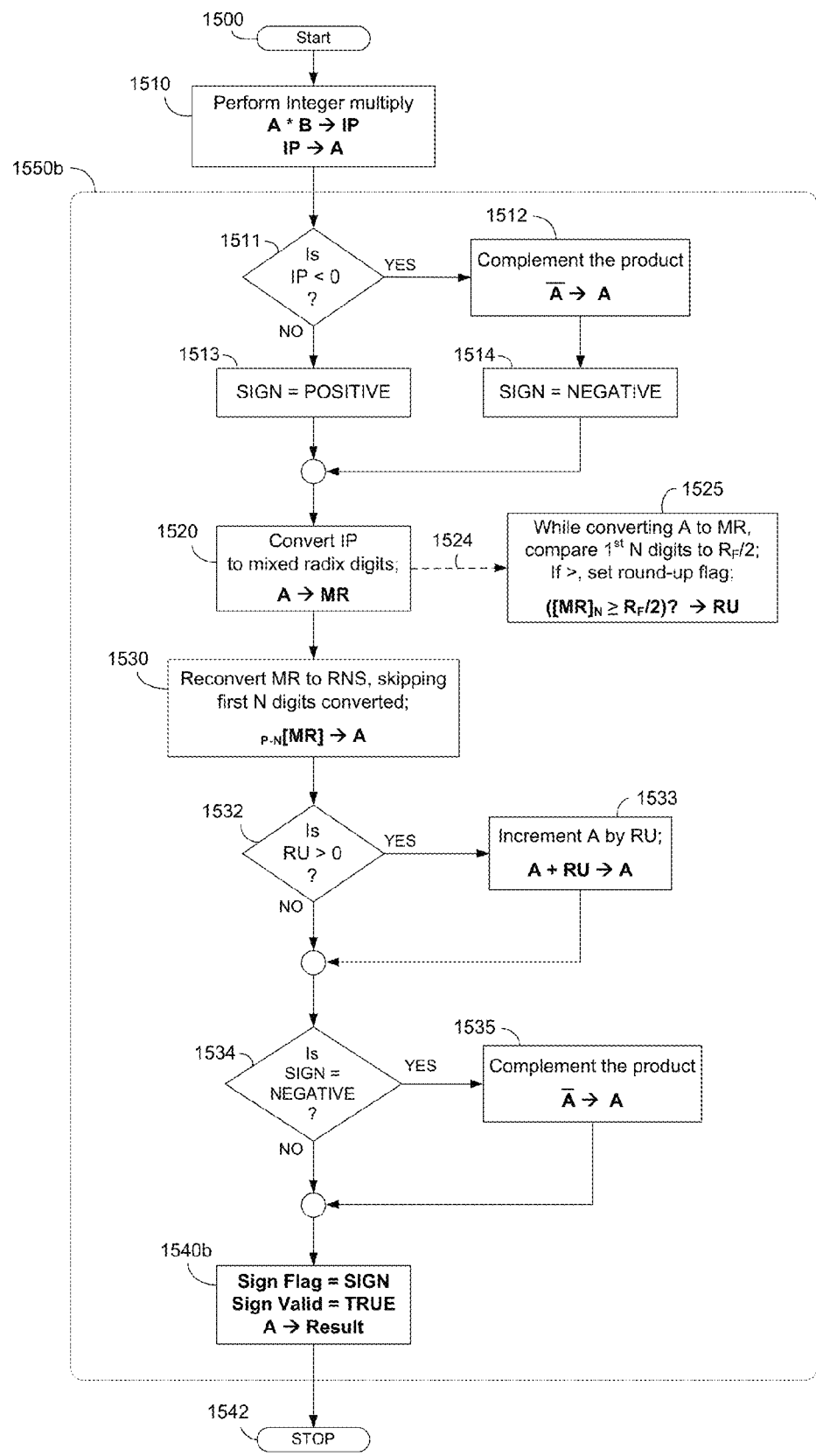
FIG. 15B is a flow diagram illustrating an exemplary fixed point RNS multiply with signed operands and basic rounding.

FIG. 15B discloses a more complete method for fixed point RNS multiplication of the present invention. Based on the method of FIG. 15A, the modified flow diagram of FIG. 15B adds a procedure for handling signed operands as well as a procedure for handling a more sophisticated rounding function. Before explaining the process and method of FIG. 15B, it is desirable to explain the mechanics and method for handling signed RNS operands.

In one embodiment of the present invention, the method of complements is used for representing signed quantities. For most binary computers, the method of complements is referred to as 1's or 2's complement binary. The method of complements can also be applied to the fixed point RNS representation of the present invention. That is, a negative RNS quantity "A" may be defined by:

$$\text{Negative} A = (R_Y - A) \qquad \text{Eqn. 10a}$$

where, A is a positive value, and $$R_Y = \text{RNS number representation range} = R_F * R_W \qquad \text{Eqn. 10b}$$

In equation 10b, the entire range of the number representation, $R_Y$, is defined. This range may be defined by the product of the fractional range and the whole range, such as $R_F * R_W$.

The method of complements, herein renamed as "P's complement", P referring to the different prime (or semi-prime) modulus digits, is established when a negative value A is defined as a positive value A subtracted from the RNS representation range $R_Y$. The machine range $R_Y$ is essentially the modulus of the number representation, whereas the number representation consists of (M+N) RNS digits, as defined in equation 2a.

One way to explain signed addition and subtraction is to say that RNS ranges support "wrap-around", and therefore, a portion of the number range $R_Y$ may be reserved for positive quantities, and the remaining portion may be reserved for negative quantities, with the value "0" being unique, and located in the "middle" of both signed sub-ranges.

For multiplication, the method of complements is illustrated briefly as a review using two positive operands A and B, and demonstrating the multiplication of $-A*B$:

$$(R_Y - A)*B = (R_Y * B - AB) \text{MOD } R_Y = (R_Y - AB) \qquad \text{Eqn. 11a}$$

given: $AB < R_Y$

From equation 11, the right hand result is the definition for the negative quantity $A*B$, provided the value $(A*B)$ is less than the machine number range $R_Y$. If we model RNS signed ranges after binary 2's method of complements, the allowable range for positive values is set from "+ump" to $(R_Y/2-1)$, while the allowable range for negative values is set from "–ump" to $(-R_Y/2)$, this case requiring the RNS machine number support at least one even modulus, although this is not a limitation of the present invention. It is, however, required that the range for positive and negative numbers do not overlap, and are unique, with the exception of zero. In one embodiment, the machine number range $R_Y$ is larger than the combined range of both the negative and positive number ranges (plus zero) because of the existence of redundant modulus, or a partially redundant RNS digit. Any number of redundant digits may be added, since adding redundant modulus to the ALU machine word does not affect the modulus properties of the digits associated with the machine number $R_Y$.

If both operands are negative, the following method of complements is briefly noted:

$$(R_Y - A)*(R_Y - B) = (R_Y * R_Y - R_Y * B - R_Y * A + AB) \text{MOD } R_Y = AB \qquad \text{Eqn. 11b}$$

given: $AB < R_Y$

Operation of Signed Number Formats

One advantage of representing signed quantities using P's complement is that RNS operations of addition, subtraction and multiplication generate a correctly signed result without having to know the sign of the operand beforehand. In other words, the sign of the value is correctly handled by the arithmetic operation and the result is correctly encoded as a signed value. However, while the resulting data may be correctly signed using the method of complements, the ability to ascertain the sign of the result may be difficult. The reason is that unlike a fixed point radix number system using the method of complements, the sign of an RNS value cannot be readily ascertained by inspection of the value's digits. This is a key difference between RNS numbers versus fixed radix numbers like decimal or binary.

Some operations require the sign of an operand before execution, such as division, for example. Some operations may be aided by knowing the sign of the operand beforehand, such as comparison. Therefore, the P's complement system, while powerful, may not always be adequate alone for handling signed values within the RNS ALU. In one embodiment of the present invention, a "sign" bit and "sign valid" bit is supported in conjunction to the previously defined P's complement, fixed point RNS representation. The sign bit will act as a sign magnitude bit, while the sign valid bit defines whether the sign bit is to be trusted, i.e. whether it is valid or not.

Using method of complements alone, the sign of an RNS operand may not be readily inspected. Therefore, without otherwise knowing the sign of the value, a sign extension operation is required if the sign of the value is needed. On the other hand, by convention, if the operand has a valid sign magnitude bit, the sign of the value is known, and a sign extension is not required. For example, if the divide operation requires a positive operand, and the sign bit indicates a negative quantity, only a complement operation is required on the operand, and not a sign extension. A sign complement operation is fully parallel, and much faster than a sign extension operation, which is sequential.

For the operation of signed comparison, the presence of a valid sign bit greatly speeds the comparison of a negative to a positive number. Additionally, a valid sign bit allows the comparison hardware unit of the present invention to use special techniques to speed execution, such as comparison via (mixed radix) digit length.

The "sign valid" bit is used to determine if the sign magnitude bit is valid, since during arithmetic processing, the validity of the sign magnitude bit may be lost. However, using the unique methods of the present invention, the sign magnitude bit may be set and flagged as valid during certain operations, such as fixed point multiply, or signed operand comparison, among others. The ability of certain arithmetic operations to simultaneously sign extend operands is a key feature of the method of the present invention.

In another embodiment of the present invention, operands do not carry a sign (magnitude) bit and a sign valid bit. Instead, sign extend operations are required whenever knowledge of a values sign is required and unknown. The sign extend operation resembles a modified comparison operation against the starting range of the negative numbers, $R_y/2$, or a comparison with the ending range of positive numbers. This is performed using a modified mixed radix converter with an integrated comparison apparatus; during mixed radix conversion, the value of the accumulator is compared against mixed radix constant(s). The special digit compare registers of the digit slice ALU of FIG. 3E can be used to support such an integrated comparison.

Advanced Fractional Multiply Detail

In FIG. 15B, a basic method for multiplying two fixed point signed values is disclosed. This method is suitable for a single accumulator RNS ALU. In step 1510 control circuitry performs an RNS integer multiply of the two signed fixed point RNS operands, denoted as operand A and B. That is, the fixed point RNS numbers are treated as if they are integers, i.e., the machine numbers are directly multiplied. The integer multiply 1510 of the fixed point operands provide an intermediate result, or intermediate product (IP). The RNS integer multiplication may be accomplished between corresponding digits using a LUT technique, such as LUT 301 of the digit slice of FIG. 3A. In another embodiment, a conventional binary hardware multiplier is used which performs modulo-p multiplication, where p is the modulus of the RNS digit.

After the integer multiply of control step 1510, the sign of the intermediate product (IP) is determined 1511. In one embodiment, the sign may be determined by inspecting each operands sign and sign valid bits. If the sign of both operands A & B are valid, the sign of the intermediate product can be easily determined, otherwise, a sign extend operation is required on each operand having an invalid sign bit. FIG. 15B assumes each operand A and B have a valid sign bit. If the intermediate product is determined to be a negative quantity, the intermediate product is complemented 1512, and the sign of the final result is set to negative 1514, otherwise, the sign of the final result is set to positive 1513.

Next, RNS to mixed radix conversion 1520 of the intermediate product is performed. In one embodiment, a plurality of RNS digit slice ALU's performs the conversion task, as described in FIG. 2B and FIG. 7A. However, a novel and unique modification to the RNS to mixed radix conversion 1520 method is supported, that is, the RNS to mixed radix converter 1520 includes apparatus to perform rounding of signed fixed point RNS multiplication.

In FIG. 15B, a novel apparatus is added as follows, which is computed in parallel, and integrated into the mixed radix conversion process 1520, as denoted by dotted path 1524. A comparison 1525 is performed on the intermediate product during the conversion to mixed radix 1520. The comparison 1525 is limited to the first N digits of the mixed radix conversion, which represent a mixed radix conversion of one equivalent fractional range of the intermediate value; i.e. N defined as the number of fractional digits defined for the fixed point RNS value. It is also these first N (mixed radix) digits that are skipped in the mixed radix to RNS conversion 1530. The importance of comparison 1525 is to perform a rounding function determination on the final result, such determination affecting the decision control block 1532.

In one embodiment, the first N mixed radix digits from conversion 1520 are compared with the constant $R_F/2$; if the comparison 1525 determines the first N mixed radix digits are greater than or equal to $R_F/2$, the result is rounded up by incrementing 1533 the converted result from reconversion 1530. The rounding operation is flagged by setting a suitable memory bit, or entering a suitable control state; the process of incrementing the result by one is delayed until after the conversion to RNS in control step 1530, since the incrementing operation is best accomplished in RNS (without carry).

Other variations of rounding modes may exist. It should be noted the rounding method of FIG. 15B is only one type of rounding that may be implemented, and additional modes should be obvious to those skilled in the art of floating point unit design in conventional binary computer systems. For example, a comparison mechanism may also indicate the truncated digits are equal to half range ($R_F/2$), and may cause a round-up only if the converted result is even in this case.

After mixed radix conversion 1520 of the intermediate result, control circuitry performs a mixed radix to RNS "reconversion" 1530. As previously illustrated in FIG. 15A in step 1530, the least significant N digits of the mixed radix number are ignored in the reconversion 1530. That is, the process of reconverting mixed radix digits to RNS format 1530 employs the unique process of skipping, or ignoring, the first N mixed radix digits generated from converter 1520. To be clear, the first N digits of the mixed radix conversion are generated and used until the rounding comparison 1525 is complete; after this, they are not needed.

If a LIFO apparatus is used to perform the mixed radix truncation, the LIFO digit count may be subtracted by N, since the mixed radix digits to be skipped are the last N digits to be popped. Alternatively, another variation using the LIFO generates the first N mixed radix digits, but never pushes them to the LIFO. In this case, the LIFO element count and data properly reflects the normalized value (i.e. remaining digits); during re-conversion, the process is streamlined, since there is no need to purge the LIFO of (ignored) data, and the LIFO depth may be designed to be smaller.

It should be noted that discarding, or truncating mixed radix digits does not affect, or shift, the associated digit "power" for all non-discarded mixed radix digits. One might expect this when truncating a fixed radix number. That is, discarding a mixed radix digit also discards the associated power; that is, the discarded digit value and its associated power is not part of the calculation of converter 1530. The use of the LIFO illustrates this fact since one unique embodiment supports both modulus and digit data residing in the LIFO. Truncating the mixed radix number in the LIFO therefore involves truncating a data pair, a mixed radix digit and its associated modulus value. That is to say that truncating a mixed radix digit may cancel the associated digit add and modulus multiply step during mixed radix to RNS conversion.

In the conversion of mixed radix to RNS 1530, a special notation is disclosed. The truncated mixed radix value is denoted as $_{P-N}[MR]$, which describes a truncated mixed radix number which retains the most significant (P–N) digits, where P is the original mixed radix digit length. The notation $[MR]_N$ refers to a truncated mixed radix number which retains the least significant N digits.

In FIG. 15B, the result of rounding comparator 1525 affects the control decision 1532 which determines whether the final result is adjusted, i.e. incremented (by "ump" as defined in Expression 7b). In other words, if the rounding comparator 1525 determines a "round" is required, the final result is incremented, or otherwise increased 1533. Next, the sign flag set from control decision 1511 is tested, and if set to negative, the final result is complemented 1535. This process properly encodes the negative value. Next, the sign bits of the result are set 1540b, the sign bit of the final result being determined beforehand from step 1511. In one embodiment, the sign valid flag is set to indicate a "valid" sign bit condition. The final result is stored, and the control circuitry terminates 1542 the signed fixed point multiply operation.

Once again a dotted rectangle 1550b is used to group the operations which make up the intermediate to normal conversion method of FIG. 15B. The operations enclosed handle signed values in a straight forward manner. It should be noted the negative value itself cannot be processed according to steps 1520, 1525 and 1530 due to a number reasons, the most significant being direct division by a negative value is invalid. Therefore, intermediate values are complemented if they are negative, and the final result is complemented again. Other variations are possible, for example, the operands themselves may be complemented if negative, and the sign value tracked accordingly. In either scenario, FIG. 15B requires the sign of each operand must be known.

The intermediate to normal conversion 1550b of FIG. 15B is suitable for an RNS ALU having a single ALU. In this case, the management and processing of signed values produce additional burden on arithmetic processing. There is no opportunity to sign extend during the multiplication of FIG. 15B since the process of sign determination occurs only after the step of mixed radix conversion 1520, which is then too late. For high performance applications, a new method is disclosed which utilizes a dual accumulator ALU to convert the intermediate product and its complement simultaneously. During conversion, the sign is automatically determined, and the correct value is selected for further processing of step 1530. This new method not only sign extends an intermediate product automatically, but allows the separation of the intermediate to normal conversion process from the intermediate RNS processing steps. This "decoupling" of arithmetic steps provides for an unprecedented increase in processing performance of product sums and other operations, in a true fixed point number representation. The brand new and novel apparatus for performing high speed fixed point fractional arithmetic is described next using the flowcharts of FIGS. 15C and 15D.

Figure 15C:
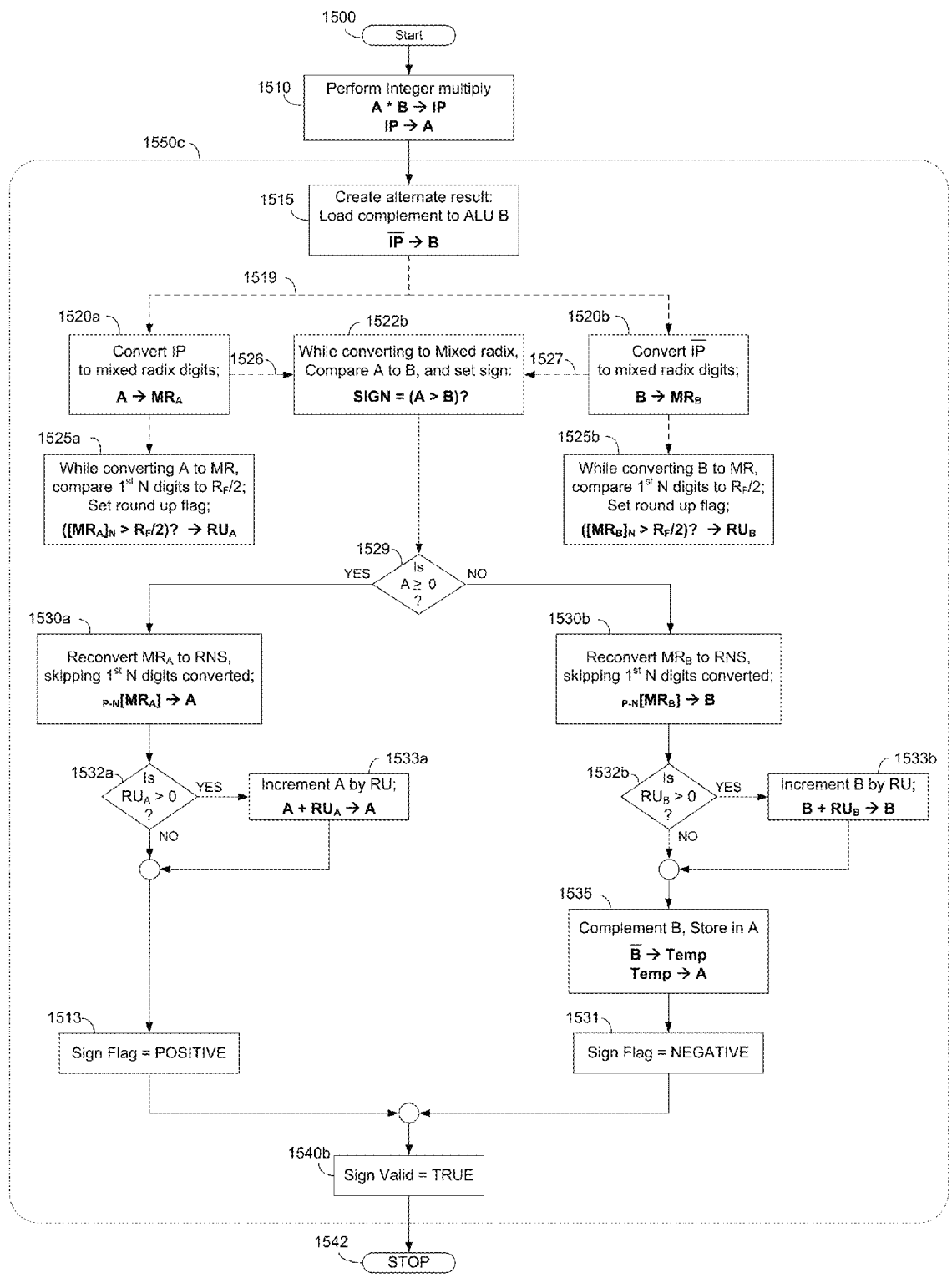
FIG. 15C is a flow diagram illustrating exemplary fixed point RNS multiply with signed operands and integrated sign extension.

In FIG. 15C, a high performance alternative to the method of FIG. 15B is disclosed. In step 1510, the two fixed point operands are multiplied as if they are integers; this creates a resulting intermediate product (IP). The IP may be stored in a temporary location for further accessing. The IP is also stored in the accumulator A according to step 1510. Next, in step 1515, the intermediate product complement is stored in accumulator B. The complement may be derived from the original IP value by subtracting IP from the value of zero, thereby forming an additive inverse. The dotted line 1519 represents a parallel control flow; one branch continuing to control step 1520a, and the other proceeding to control step 1520b. In other words, the control unit begins a simultaneous conversion to mixed radix format 1520a, 1520b, converting the contents of accumulator A and B in digit synchronized fashion.

During the synchronized conversion of accumulator A and B, a comparison is made between the two values under conversion. In other words, each mixed radix digit generated in ALU A is compared with the corresponding digit generated in ALU B. This is illustrated by the dotted lines 1526 and 1527. The goal of the comparison is to determine which (absolute) value contained in ALU A and B is smaller. Once the comparison 1529 determines which value is smaller, that value is already converted to mixed radix (since the comparison terminated on the small value going to zero first). Furthermore, the small value is also positive, and is therefore suitable for the next stage of processing.

According to the specifics of FIG. 15C, the sign flag is set from the test of whether the A accumulator is larger than the B accumulator. If A>B, the original value is negative, and therefore the conditional control step 1529 proceeds to step 1530b, to continue processing with the value of ALU B, since the complemented value is positive. Otherwise, if A<B, the ALU A value is positive, and the control step 1529 directs control to step 1530a, which processes the value contained in ALU A. Once control has been directed by decision block 1529, the non-selected ALU may terminate the conversion process since the value contained may be disposed. The selected value, either contained in ALU A or ALU B, is then processed by truncating the mixed radix digits as explained previously, and re-converting the truncated value back to RNS 1530a, 1530b. In one embodiment, an apparatus similar to that of FIG. 2B is used. In FIG. 2B, each ALU supports a LIFO structure connected to its associated crossbar bus, which contains the mixed radix value.

Also during the synchronized conversion of accumulator A 1520a and accumulator B 1520b, the process of determining a round up 1525a, 1525b is processed in parallel for each ALU respectively as illustrated. The round-up determination for each ALU is stored in its respective round up pending bit, or is handled using state logic which results in the final value being adjusted for round up in steps 1533a or step 1533b, which ever path is selected via control decision 1529. If control decision step 1529 selects the step 1530*b*, it indicates the complemented value is smaller, which implies the original value is negative. Therefore, at step 1535, the resulting reconverted RNS value, still contained in ALU B, is complemented. According to the specifics of FIG. 15C, the value (in ALU B) is then moved to the ALU A register. At step 1531, the sign flag is set to indicate a negative final result. If the control decision step 1529 selected the step of 1530*a*, the same round up process applies at step 1532*a* and 1533*a*; if a round up was determined in 1525*a*, the value contained in the ALU A is incremented 1533*a*. Next, at step 1513, the sign is set to positive in this case. The control path of FIG. 15C merges at step 1540*b*, which sets the sign valid bit to true. Other variations to this control flow are possible which do essentially the same thing.

In FIG. 15C, a dotted rectangle encloses those operations making up the so called "intermediate to normal" conversion operation 1550*c*. Unlike FIG. 15B, the intermediate to normal conversion 1550*c* of FIG. 15C may be decoupled from the intermediate arithmetic processing stage 1510. The reason is the sign extension operation is completely handled by the control flow of FIG. 15C, and therefore, the intermediate processing stage 1510 may be relieved from the responsibility of handling or tracking the sign of the intermediate value. In later sections, it is disclosed how high performance operations rely on the operation of FIG. 15C, and in particular, the operation of the intermediate to normal conversion 1550*c*, to significantly enhance performance.

Figure 15D:
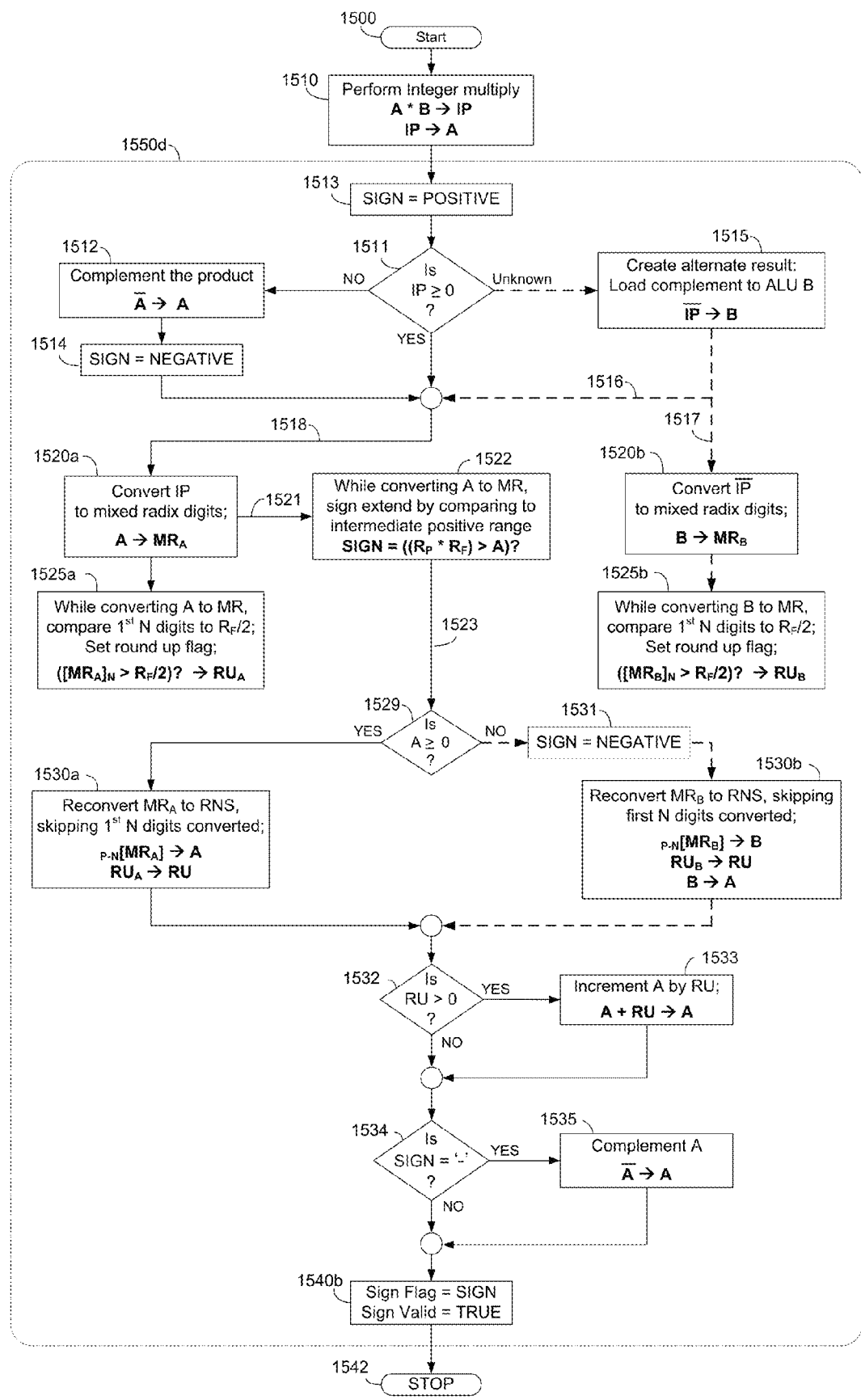
FIG. 15D is a flow diagram illustrating exemplary fixed point RNS multiply with signed operands and integrated sign extension.

In FIG. 15D, a variation to FIG. 15C is provided. In FIG. 15D, the control flow is designed to handle either case of FIG. 15B, or FIG. 15C. For example, if the sign of the result is known beforehand because the operand sign flags are valid, the control flow of FIG. 15D behaves as FIG. 15B. In this case, only a single ALU is required, and therefore a high performance system is at liberty to use the free ALU for other tasks. However, if the sign of the operands are not known, the decision control step 1511 directs control to step 1515, which essentially launches the flow of FIG. 15C. In this case, both ALU's are needed at the same time. One subtle difference of FIG. 15D is the comparison step of 1522, which may check more accurately for the proper range of the intermediate value. In this manner, overflow or other arithmetic over-run may be detected (not shown). Further details are provided in the control flow diagram of FIG. 15D.

Fractional Multiply Example with Truncation

In FIG. 15E, a table of RNS ALU range definitions is disclosed. This table defines some of the typical range considerations for an example RNS ALU. Many of these range definitions are associated with the practical needs of fractional RNS multiplication. The table of FIG. 15E has been adapted for the specific modulus of the examples to follow. In the table of FIG. 15E and in FIG. 15F, the example ALU uses seven fractional digit modulus {2, 3, 5, 7, 11, 13, 17}, four whole number digit modulus {19, 23, 29, 31}, and seven redundant modulus {37, 41, 43, 47, 53, 59, 61}.

In FIG. 15F, a basic example of the novel fractional multiplication method is illustrated. In this example, the RNS fixed point value of three and one seventh (3⅐) 1591 is multiplied to the RNS fixed point value eight and one fifth (8⅕) 1592. Because the example RNS ALU supports these denominators exactly, both operands can be exactly represented by the number system, as noted by their machine number representation 1585. For example, the machine number ratio 4186182/510510=8.2 exactly.

In FIG. 15F, the progression of states of a basic RNS fractional multiply are shown. In the column entitled "FIG. 15B Control Step" 1555, the control step of FIG. 15B associated with the current state is listed. The RNS ALU is illustrated as a series of modulus, grouped into three distinct modulus groups; the extended digit modulus group 1560, the integer digit modulus group 1565 and the fractional digit modulus group 1570. The description of each number format 1580 is listed for clarity, and the machine equivalent ratio is listed in the "Machine value" column 1585. An interpreted value column 1590 is provided to illustrate the normal way humans view fractional numbers.

The example of FIG. 15F illustrates a simple case of multiplying two positive numbers, however, even a positive number may need to be sign extended. Therefore, the example also illustrates the sign magnitude and sign valid bits 1575. The sign valid bit is assumed to be set "invalid" for both operands 1591 and 1592 at start.

Referring to the example of FIG. 15F, at the initial start of the multiply, one operand is loaded into the ALU at step 1556. (The second operand is shown for clarity in step 1557, but may not actually be loaded separately). The second operand, shown in state 1557, is multiplied to the ALU in step 1558 and the resulting intermediate product 1593 stored in the RNS ALU. The ALU now contains an intermediate number in RNS format 1593. In the next state 1559 of the example of FIG. 15F, the intermediate number is converted to a mixed radix number 1594. The RNS to mixed radix conversion process may use a flow diagram similar to that of FIG. 7A.

In a novel enhancement, the mixed radix number is truncated in step 1561. In another variation, the first N mixed radix digits generated is discarded. The remaining truncated mixed radix number 1596 is a new value represented using a different mixed radix number system, since the modulus set has been changed (due to truncation). In any event, the remaining mixed radix number 1596 is converted treated according to its unique radix (modulus) set. In one embodiment, a LIFO hardware stack is used to manage the dynamic radix set by storing each digit and its respective radix in pairs.

In step 1562, the truncated mixed radix number 1596 is converted back to RNS 1597. In this case, the converted value is normalized, and represents the proper result of the example system, namely, the value of 25 and $^{27}\!/_{35}$, or approximately $25.7714_{10}$. In the final step 1563, or optionally in parallel with other prior steps, the sign bit and sign valid bit 1575 is set appropriately. This is an important feature, since the fractional multiply apparatus of the present invention also performs a sign extend on the final result. This helps to reduce the number of cycles needed to sign extend operands before other operations, such as comparison and division.

Fractional Multiplication Example with Basic Round Up

In FIG. 15G, another example of fractional fixed point RNS multiplication is provided. In this example, different values are chosen. These values are chosen to illustrate values that cannot be exactly represented in the RNS ALU of example 31e. Values whose denominators are powers of two are chosen, namely the operand values of eight and one sixteenth (8 1/16) 1581 and three and one quarter (3¼) 1582. The actual machine ratios used to represent intended operands are listed in column 1585. Using a calculator, one can determine the error of the machine ratios versus the interpreted initial values that may be sought 1590.

The fractional multiply proceeds as the last example with an integer multiply of the operands 1558 forming an intermediate product 1583. The intermediate product is converted to mixed radix in step 1559 with several novel modifications. In one such modification, the mixed radix intermediate value 1584 is truncated by removing the least significant seven digit positions in step 1561, and the resulting mixed radix number 1586 is reconverted to RNS in step 1562.

In another key modification, the first seven digits of the mixed radix conversion of step 1559 are compared to half the fractional range in step 1564. In the example, the value derived from the first seven mixed radix digits exceeds half the fractional range ($R_F/2$) 1588. Therefore, the truncated result 1587 is incremented by one, accounting for a round up operation 1564. The multiplication terminates in step 1566, which may include the step of setting the sign magnitude and sign valid bit 1575. The interpreted result of the multiplication is (26.2031) 1589. If the desired calculation is (8.0625× 3.25), the result is in error by the value (26.203125−13376925/510510)=−6.3356e−5. In terms of perfect initial ratios, the multiplication result is off by (4115987/510510*1659157/510510−13376954/510510)=−5.51e−7. These values can be compared with the value of ump, which in this example is 1.96e−6.

Modification of the ALU of the present invention to include power based modulus in the $M_0$ digit, of at least three powers ($2^3$), will provide a perfect result in the example above. This fact demonstrates the advantage that power based modulus has on the method of the present invention, that is, it provides more unique denominator combinations, including those denominators having a factor of some power, which may be used to provide more exact number representations of interest.

Multiply and Accumulate Unit

Many modern high-speed binary CPU's employ specialized instructions, such as multiply and accumulate instructions. Additionally, special techniques for implementing multiply and accumulate functions exist for binary computers in the prior art, such as "fused" multiply and accumulate units. The reason is that many computer calculations require two operands to be multiplied, and a third operand to be added to the result of the multiply. Digital signal processing is one application which benefits from the addition of a multiply accumulate unit (MAC).

Figure 16A:
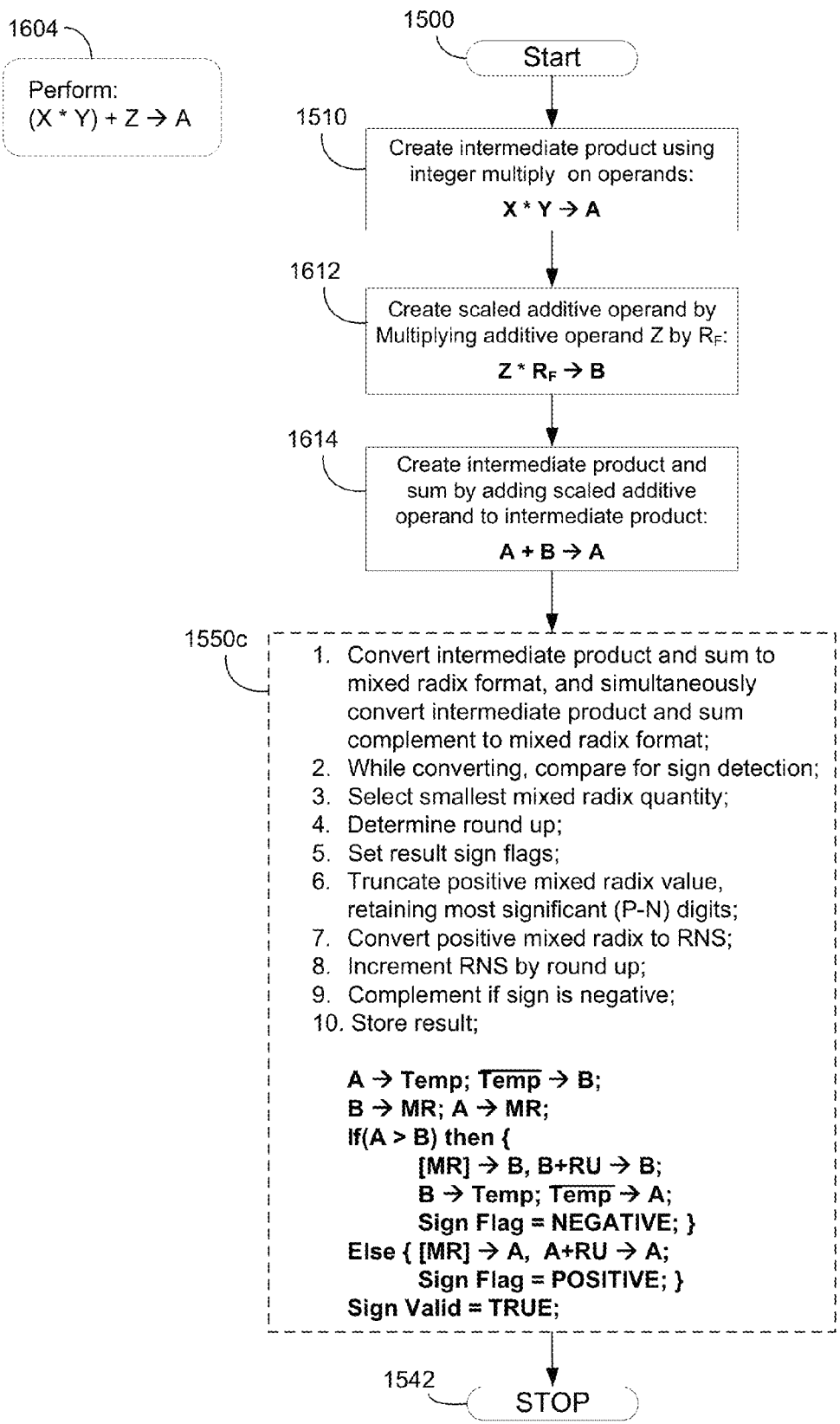
FIG. 16A is a flow diagram illustrating an exemplary fixed point RNS multiply and accumulate.
Figure 16B:
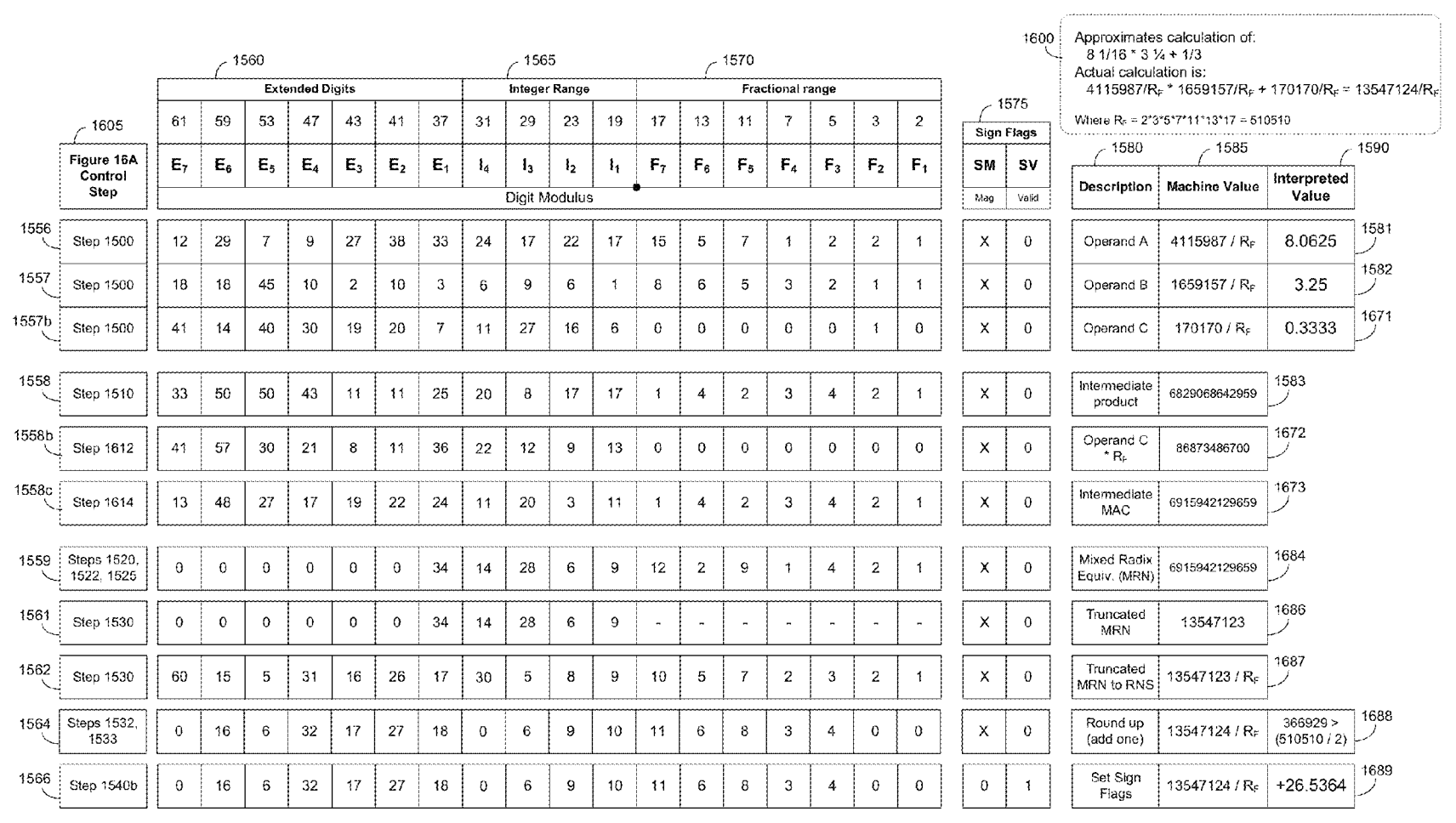

In the method of the present invention, a modification to the novel method of fixed point RNS multiplication, as disclosed in FIGS. 16A and 16B, provides an RNS fixed point multiply and accumulate function (RNS MAC).

One general motivation to support a MAC instruction is to allow a single instruction the ability to perform two operations. However, another motivation behind the RNS MAC differs in some respects to that of its binary counterpart. In the case of a certain prior art binary CPU, a fused multiply and accumulate instruction integrates both the multiply and addition function together, thereby creating a function which is faster than both functions would be when executed separately. However, in the case of an RNS based CPU, the speed of the fixed point addition is already quite fast, being constant with respect to digit width (assuming a fixed digit-slice ALU speed). In contrast, one motivation for combining the multiply and accumulate function for RNS based CPU's is based on saving sign extend operations.

In FIG. 16A, a method of the control circuitry associated with an RNS MAC unit of the present invention is disclosed. In one embodiment of the RNS MAC, the use of a dual RNS accumulator in combination with a specialized control unit, such as disclosed in FIG. 2B, provide a unique and novel apparatus for an RNS MAC. However, the dual accumulator, digit slice architecture of FIG. 2B is not a limitation to the disclosure. For example, an embodiment which uses dedicated registers, data paths and control circuitry may also be used. This latter embodiment is explicitly not digit-slice architecture.

FIG. 16A represents a typical multiply and accumulate (MAC) operation, which may include additional control and instruction execution circuitry 200 of FIG. 2B in one embodiment. FIG. 16A is a modification of FIG. 15C, where the flowchart of FIG. 16A has been modified by the addition of two extra steps. Also, the intermediate to normal conversion 1550c of FIG. 15C is redrawn as a smaller block 1550c of FIG. 16A for conciseness. The operation of block 1550c is therefore identical in both figures.

In FIG. 16A, after the integer multiply 1510 of two fixed point RNS operands, a control step of scaling the third "additive operand" 1612 is disclosed. Using a dual ALU, the process of scaling the third additive operand 1612 is accomplished in parallel to the integer multiply 1510, but may also exist as a sequential operation as shown in the flowchart of FIG. 16A. The multiply and accumulate unit (MAC) adds the scaled (additive) operand Z, stored in accumulator B, to the intermediate product generated in control step 1510 and stored in accumulator A 1614. The operand to be added must be scaled by $R_F$ 1612, the fractional range of the fixed point representation, prior to the addition 1614; this is accomplished with an integer multiply by $R_F$. After the addition of the scaled operand, an intermediate product and sum is stored in accumulator A 1614. At this point, control is passed to the intermediate to normal format converter 1550c.

At this point, the intermediate value contained in the accumulator is a correctly encoded p's-complement (intermediate) value; however, the sign of the intermediate value cannot be known beforehand in all cases. The reason is the process of adding a signed value to a signed product may invalidate the resulting sign, i.e., if the signs of each value are different. Therefore, in some cases, even knowing the signs of all operands prior to the MAC operation will not provide the information needed to know the final result sign. In these cases, a conventional approach must be used, thereby reducing the usefulness of a MAC instruction.

However, using the novel and unique capabilities of the intermediate to normal format converter 1550c, the ability to sum the intermediate product (A*B) with the scaled operand (Z*$R_F$) is made possible for all cases, as illustrated in FIG. 16A. As previously explained, the intermediate value is converted to mixed radix, and a complement of the intermediate value is converted to mixed radix in block 1550c. During the synchronized conversion of both the original and complement, the smallest magnitude is determined via an integrated compare mechanism. Also during conversion of both the original and complement, a round up is determined for each value. The sign of the result will depend on which value is smallest in absolute magnitude (i.e. treated as an integer). If the complemented value is smallest in magnitude, the original intermediate value is negative, otherwise, it is positive. The smallest absolute mixed radix value is truncated and reconverted to RNS. If that value is associated with a round up, the value is incremented or otherwise increased. If the value is determined to be negative, it is complemented, and the sign flags may be set as appropriate.

Fractional Multiply and Accumulate Example

In FIG. 16B, an example of an RNS based fractional multiply and accumulate operation is illustrated. The example is based on the fractional multiply example of FIG. 15G with an additional operand value added, that of one third (⅓). This example illustrates a basic case of positive values only, and does not delineate detailed steps of conversion 1550c for clarity.

In FIG. 16B, the three operands are shown, the two operands that will be multiplied, operand A 1581 and operand B 1582, and a third operand C 1671 will be summed to the product of A and B. Like FIG. 15F, an intermediate product is formed in step 1558. However, for an additive operand, its intermediate format is formed by the scaling of operand C by the amount $R_F$, as shown in step 1558b. The final intermediate result is the sum of the intermediate product 1583 of step 1558 with the scaled operand C 1672; the final intermediate sum resides in the ALU at step 1558c. By this point, the multiply and accumulate operation has taken place, but the result is in an un-normalized, intermediate format.

The result is normalized using a unique convert-truncate-reconvert mechanism. The first step is to convert the intermediate MAC result 1673 to a mixed radix format 1684 in step 1559. Next, the mixed radix value has F number of digits truncated in step 1561, F being the number of digits associated to the fractional range of the fixed point number. Lastly, the truncated mixed radix number 1686 is converted back to RNS format in step 1562. The new RNS value 1687 may be modified as a result of a rounding operation in step 1564. In FIG. 16B, the result 1688 is rounded, since the discarded mixed radix portion was found to exceed half the fractional range, which in this example, was the minimum value chosen for round up. At the last step 1566, the sign flag 1575 may be set, and the final RNS value 1689 is the final answer.

The multiply and accumulate function may increase efficiency since it is addition and subtraction which typically invalidates a values sign bit. Since the addition (or subtraction) operation may be integrated into the multiply operation, a sign extend operation may be processed in tandem as a secondary operation, as shown in FIG. 16A, control step 1522. In this way, the action of addition, since it is tied to the step of multiplication, will not act to invalidate the resulting sign.

Many operations discussed have been explained in their more simplified view, to help shed light on the methods and apparatus. In practice, enhancements at the hardware level combine functions where possible to reduce the number of clock cycles required. These enhancements have not been discussed in depth herein.

Overflow Detection in Fractional Multiply and MAC

Checking for overflow is an advanced operation that requires a keen understanding of the objectives, and thorough understanding of the number range(s) employed in the architecture. For that matter, it is beyond the scope of a detailed explanation herein. However, some strategies for overflow detection can be mentioned.

A third novel apparatus may exist, which is computed in parallel to conversion 1520, but is not shown in FIG. 16A. That is, a comparison to the fixed point machine number range $R_Y$ is made to determine overflow. The technique is similar to comparison against the positive range 1522, and should be obvious to those who understand this specification. If an overflow is detected, the associated overflow status flag is set, indicating the result is invalid.

Another strategy for overflow detection is the use of operand range detection before or during the multiplication operation. This strategy may reduce the number of redundant digits required to support overflow detection. Overflow detection of addition and subtraction is relatively simple, requiring an additional redundant digit to support the additive range detection; range detection for signed multiplication is more difficult, especially for signed value operation, which must account for improper "wrap around" result of range overflow. In other words, in RNS, there is no one bit position for which overflow can be detected; alternatively, the range of the machine number may be measured and the proper context for overflow can be established beforehand.

Other Implementation Notes for Multiplication:

For clarity and brevity, the flow charts of FIGS. 15B, 15C & 16A (among others) are not specific as to temporary holding registers, and other potential requirements of an actual implementation; any particular design architecture takes these issues into account, which is known by those skilled in the art. For example, the dual accumulator digit slice architecture of FIG. 2A may store temporary results into a register file 300 as shown in FIG. 3A. The digit slice architecture may also use a LIFO data structure to store intermediate results of conversion, for example. It should also be clear that many variations of the techniques presented herein are possible which accomplish the same or similar objectives.

Fractional Sum of Products Overview

The multiply and accumulate operation of FIG. 16A is extended to support a "sum of products" operation. The sum of products operation is common in scientific computing, since summing of products is required for matrix and vector calculations, for example.

Moreover, the sum of products method and apparatus of the present invention provides a high speed solution, since the apparatus allows product sums to be processed in an intermediate RNS format first, with only the final result requiring a normalization procedure. Therefore, if there are N products to be summed, and the effective binary data width is (n) bits, product sum execution time is on the order of $O(n)=(n)/(N*Log(P))$, where P is the number of RNS digits. This result implies very high processing rate for sum of products calculations on very wide data, and where the number of product sums, N, is relatively large. Furthermore, processing rate may be increased further since the method may be adapted to a plurality of parallel or pipelined RNS ALU's.

Sum of Fractional Products Detail

Figure 16C:
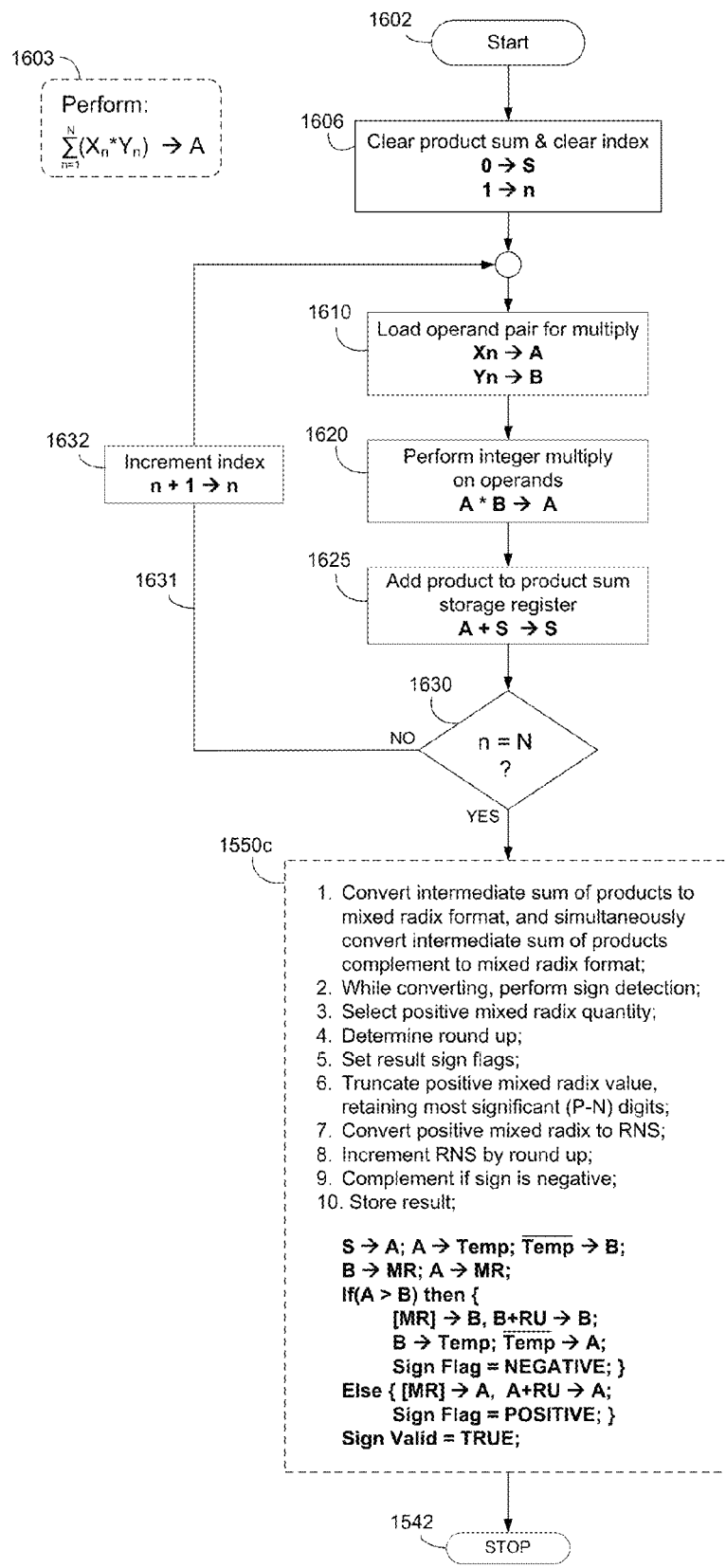
FIG. 16C is a flow diagram illustrating an exemplary fixed point RNS sum of products.

A basic control flow for a basic sum of products operation on fixed point data using the RNS ALU of the present invention is disclosed in FIG. 16C. The control flow is modified from the basic fractional multiply control flow of FIG. 15C. The modified control flow of FIG. 16C integrates an intermediate product sum processing loop defined by control paths 1610 through 1630 and the loopback path 1631. As disclosed in FIG. 15C, the intermediate to normal conversion control step 1550c normalizes the intermediate product, and is used here in FIG. 16C to normalize the product sum generated in steps 1610 through 1630.

In FIG. 16C, the processing loop 1631 is responsible for calculating a sum of products using direct (integer) RNS operations of addition and multiplication. At start, in the control step 1606 of FIG. 16C, the storage S allocated to store the product sum is cleared. In control step 1610, the first operand pair is accessed from storage, and in the next step 1620 is multiplied using a direct, integer RNS multiply. The result of the integer multiply of step 1620 is added to the summation storage register S in control step 1625. If more products are to be summed, decision control block 1630 directs control flow back to 1610, where the next operand pair is accessed. Each time through the control loop 1631 another pair of operands are multiplied and summed to the product sum S. This process is repeated for as many product terms exist in the problem of interest, which is specified by N of control step 1630.

In FIG. 16C, when all products are summed in control step 1625, control is passed to the step of 1550c via the control decision block 1630. At this stage, the intermediate product sum in storage S is both normalized and sign extended 1550c. This profess was explained in more detail earlier. At this point, the processing of the intermediate value is similar to that of 1550c of FIG. 15C, for standard fixed point RNS multiplication of the present invention In an alternative embodiment, the sum of products calculation of FIG. 16C provides a result directly in binary. The truncated mixed radix result of 1550c is converted to binary directly, using the apparatus similar to FIG. 21B. In one variation of this alternate embodiment, the sign determination and round up determination are passed to the binary system, where round up correction and sign conversion are processed in the binary number system. In another variation of the alternate embodiment, the conversion apparatus, similar to FIG. 21B, performs the process of round up and/or sign conversion of the binary result.

Sum of Fractional Products Example

In the example of FIG. 16D, a sum of two fixed point fractional multiplications are processed using the ALU of the present invention. The calculation utilizes some of the same values presented in prior examples, such as FIGS. 15F and 15G. The example calculation performed is shown enclosed in dotted lines 1608. Once again, positive values are used to illustrate a basic case.

In FIG. 16D, at the start of the operation, four operands are shown, operand A 1581, operand B 1582, operand C 1663, and operand D 1664. The example performs the sum of two products, i.e., A*B+C*D. In the state of 1660, the first intermediate product 1665 is formed at step, or state 1661, the second intermediate product 1666 is formed from the integer multiply of operand C and operand D in step 1661. In this example, only two products are summed for sake of brevity, however, in practice, many more terms may be summed. In step 1662, the two intermediate products are summed to create an intermediate product sum 1667.

In step 1559 of FIG. 16D, the process of normalizing the intermediate product sum begins. The intermediate product sum 1667 is converted to mixed radix in step 1559. The mixed radix value is then truncated 1669 in step 1561. The truncated mixed radix is converted to RNS 1670 in step 1562. The RNS value 1670 is adjusted based on the results of round up determination to form a final rounded value 1671. In the last step of 1566, the RNS value has the flags set in accordance to the sign extension determination of step 1559 according to the control flow step 1522 in FIG. 16C.

It can be seen from the example of FIG. 16D that processing values in their intermediate stage allows the RNS ALU to make full use of high speed residue operations. Thus, the more calculations that may be performed in intermediate format, the more efficient the RNS ALU will be.

Adjustable Point RNS Fractional Representations

In the current state of the art, the use of a binary floating point number representation is popular. The reason for this is that binary floating point allows a much larger number range to be supported than would be possible with a similar "fixed point" binary unit. Generally, the floating point number representation contains two parts, a mantissa, and an exponent. The mantissa can be thought of as the binary number itself, where its' binary width defines the maximum "resolution" of the floating point format. The exponent of the floating point format can be thought of as a scaling factor, where the scale factor is of the form of the radix to some power, i.e., an exponent. The scale factor effectively extends the "range" of the floating point number without having to increase the resolution of the floating point format. This is an attractive feature of binary, or any fixed radix number system.

The manipulation of binary floating point numbers is well documented, and beyond the scope of this disclosure. However, its importance to modern conventional processing systems is not to be ignored by any architecture designed for general purpose arithmetic processing. While binary fixed point number systems are still in use today, such as in certain digital signal processors and embedded microcontrollers, binary floating point units have come to dominate binary fixed point units in the commercial market.

In the case of the fixed point RNS unit of the present invention, the comparison between a conventional binary floating point unit and fixed point RNS unit is not as clear cut. For example, in one embodiment of the present invention, a fixed point RNS unit of very large (effective) binary width is contemplated. The very large width of the RNS fixed point unit essentially extends both precision and range of the representation. For example, an RNS ALU with an effective binary width greater than 1024 bits can be constructed using off the shelf memory technology. In this case, the fixed point RNS format is advantageous; for example, fixed point RNS addition and subtraction may be performed in constant time, assuming a fixed digit-slice processing speed. This is to say that a very large increase in effective binary width of the RNS fixed point unit need not introduce significant delays in the operations of fixed point addition and subtraction versus a smaller width fixed point RNS unit.

However, there is still a need to adjust the "fractional point" position of RNS fractional values. Again, the term "fractional point" is a misnomer in RNS fractional representations. There is no exact equivalent between a binary point, whose position is well defined in terms of actual digit position, and an RNS fractional point, whereas there is no such physical "point position". In the case of RNS fractional point representations, we instead have a 'digit count", i.e. a group of specific digits which define a specific range for which the RNS fractional denominator is defined. In one embodiment of the present invention, there is a digit order convention, which regards the modulus associated with the smallest primes as least significant digits, i.e. those digits to be grouped as fractional digits. The convention mainly helps to disclose and discuss the number system, but also has real benefits as will be disclosed later.

Figure 17A:
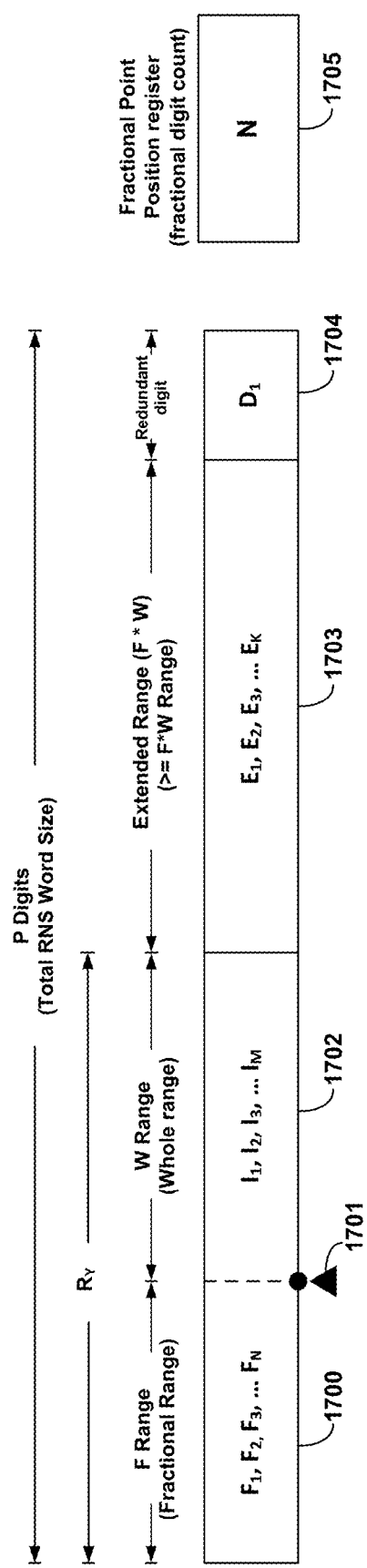
FIG. 17A is a block diagram illustrating an exemplary sliding point RNS representation.

In the method and apparatus of the present invention, there exists a variable point fractional representation herein referred to as a "sliding point" representation. In FIG. 17A, a specific group of digit modulus is reserved for the fractional portion of the RNS fractional representation 1700. In the sliding point representation, the fractional grouping of digits may change, and this fact allows a fractional RNS format that adjusts its digit group, i.e. allows the fractional point to "move". By placing an "imaginary fractional point" 1701 between those RNS digits reserved for the fractional range 1700, and those digits reserved for the remaining machine number 1702, 1703, 1704, we can illustrate and discuss RNS fractional points as actual fractional point positions. Therefore, this disclosure takes the liberty to explain an adjustable fractional point RNS representation by illustrating a dot, or point, between those digits reserved for the fractional range of the RNS value, and those digits reserved for the range of the remaining machine word.

In practice, a fractional RNS representation that adjusts its fractional digit grouping does so using a separate register, herein referred to as the "fractional point position" register 1705. It is also herein referred to as the "sliding point position" register 1705. In this embodiment, an implied RNS digit ordering is assumed, such as treating the modulus having the least significant prime (base) factors as least significant digits. Coincidentally, the sliding point position register mirrors the exponent register of the floating point unit of the prior art. In fact, it serves a similar purpose, to adjust the scaling ratio between the whole range and fractional range of the RNS fractional representation.

Figure 17B:
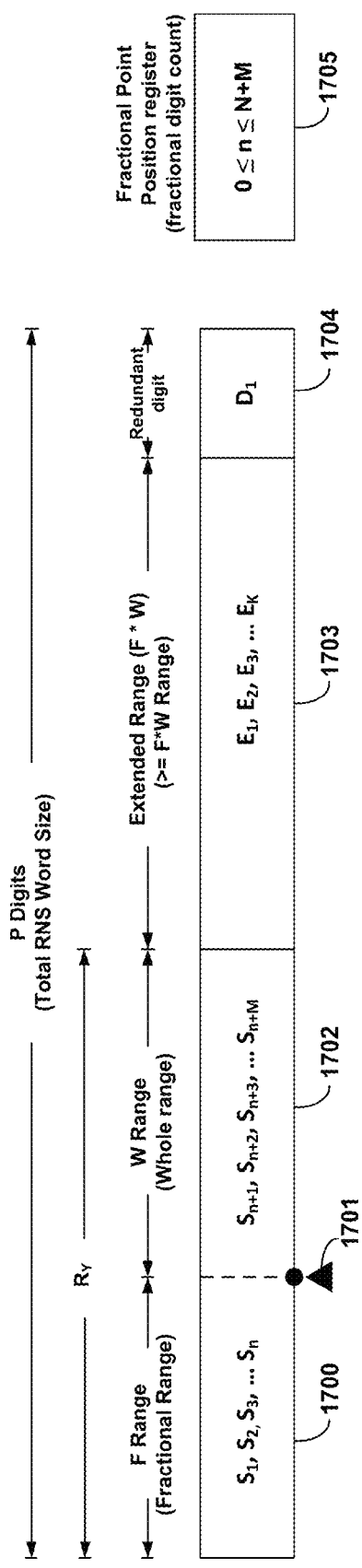
FIG. 17B is a block diagram illustrating an exemplary sliding point RNS representation.
Figure 17C:
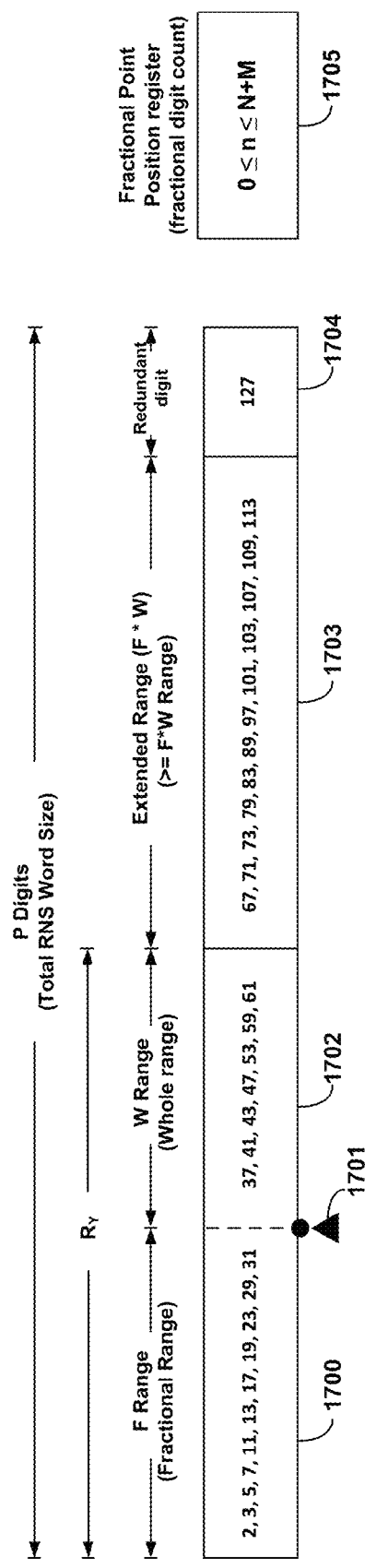
FIG. 17C is a block diagram illustrating an exemplary sliding point representation with example modulus.

FIG. 17B and FIG. 17C illustrate additional aspects, options and variations of a sliding point fractional representation of the present invention. In FIG. 17B, the ALU accumulator is divided into four digit range categories. A fractional range 1700 is illustrated as N digits, while the integer range 1702 is illustrated as M digits. An extended range 1703 is illustrated with a range of K digits. A final redundant digit $D_1$ 1704 is also provided. The redundant digit can aid in certain types of overflow detection. In FIG. 17B, the fractional point position register 1705 defines the "regrouping" of fractional digits. The legal fractional point position is set to between 0 fractional digits and N+M fractional digits for this example. Note that this embodiment does not allow the fractional position 1701 to enter into the extended range 1703; this is to ensure that a minimum extended digit range is always reserved. Other variations may allow the fractional point position 1701 to extend into the extended digit range, but these are application specific, and are not dealt with here.

FIG. 17C provides example modulus arranged into their respective ranges; the overall representation may operate on an ALU of Q=7 bits, where the largest digit modulus is p=127. Power based modulus are not shown in the fractional range 1700, but could be supported if desired. The sliding point RNS format of FIGS. 17B and 17C will be discussed in detail later.

Fractional RNS Division

The need to adjust the fractional point position of an RNS fixed point fraction is similar to the need to adjust the floating point position of binary floating point numbers. For example, in the prior art floating point representation for fixed radix numbers, it is well known that adjusting the floating point position one digit to the left effectively divides the value by its radix. Conversely, moving the floating point position one digit to the right multiplies the value by its radix. This ability to scale a value by its radix is useful, both in terms of value representation and in terms of performing arithmetic operations on numbers. Therefore, for fixed radix representations of the prior art, dividing or multiplying by the underlying radix is indeed accomplished by moving the fractional point position. This fact has been useful for scaling fixed radix numbers in the prior art.

One basic arithmetic operation which benefits from the ability to easily scale a value is division. In fact, basic binary division (and multiplication) takes advantage of the ability to shift a value right (or left). One common requirement for efficient division of fractional quantities is the ability to scale a value within a predefined range. Therefore, the ability to shift a binary value upwards or downwards is of great importance.

An equivalent shift operation on RNS values is not possible; however, in the method of the present invention, RNS fractional values are scaled in a digit by digit succession, and in a manner allowing efficient division. In particular, an RNS sliding point representation is devised and disclosed that allows fractional and integer values to be scaled both upward and downward. The method of the present invention supports an apparatus which uses the sliding point RNS (fractional) representation to perform Newton-Raphson or Goldschmidt division.

Newton-Raphson and Goldschmidt techniques allow fast division on scaled sliding point values using RNS fractional multiplication and addition and/or subtraction. Therefore, fractional division which uses the RNS fractional multiply and scaling apparatus is disclosed; this division technique is new and novel and is a claimed invention of the disclosure.

Before moving forward with the disclosure of the Goldschmidt (or Newton-Raphson) based fractional division technique of the present invention, it should be understood the RNS integer division method of the present invention may also be used in lieu of the Goldschmidt or Newton based techniques. The basic math for this premise is disclosed here briefly.

Referring back to equations 9a and 9b for the terms used, we have for fractional division:

$$(Y_1/R_F)(Y_2/R_F)=(Y_1*R_F)(Y_2*R_F)=((Y_1*R_F)/Y_2)/R_F \qquad \text{Eqn. 12}$$

Equation 12 implies that fractional RNS division may be performed by multiplying the dividend $Y_1$ by the fractional range $R_F$, and performing an integer division of the scaled dividend by the divisor $Y_2$, where $Y_1$ and $Y_2$ represent the fractional RNS values treated as integers (machine numbers). The right hand result of equation 12 is properly normalized for the given fractional RNS representation. This expression does not include a rounding function, which is implemented by a compare against the remainder of the integer division, which should be obvious to those understanding the prior disclosures of this specification, and is not articulated here.

Therefore, the method of performing a fractional division using the integer division method of the present invention is a practical method for performing fractional RNS division, and is a claimed feature of the present invention. This form of division has the advantage of high accuracy for a given machine number range. The fractional division may be fixed point, or variable point, as the integer divide routine may easily adapt to any desired fractional range $R_F$.

New Scaling Method for Fractional RNS Division

One potential disadvantage of the fractional divide method above is the integer divide method of the present invention may not be determinate in terms of clock cycles. In other words, an upper bound of the clock cycles required is either too large, or not known with certainty. This makes some computer architectures, such as pipelining, difficult to implement. On the other hand, the fractional division method based upon a sliding point RNS fractional format using a technique such as Goldschmidt (or Newton-Raphson) is a better candidate for pipelined architectures. The upper bound of the Newton-Raphson divide algorithm is deterministic, and the fast RNS fractional multiply techniques of the present invention can be used to implement a predictable divide apparatus.

However, one requirement for using Goldschmidt (or Newton's) method to perform division is the divisor, D, be scaled such that:

$$0<D\le 1 \qquad \text{Eqn. 13a}$$

However, a more efficient algorithm for division based on Newton's or Goldschmidt's method requires the divisor, D, be scaled such that:

$$0.5\le D\le 1 \qquad \text{Eqn. 13b}$$

In Goldschmidt division, to ensure the correct quotient, the numerator is scaled by the same amount required to scale the divisor D. In order to efficiently perform the required scaling on any value that may be represented, a new fractional RNS representation is required. Therefore, a sliding point RNS representation is devised and disclosed, and a unique and novel apparatus to perform division on this new representation, among other operations, is disclosed.

In one embodiment of the present method of fractional RNS division using fractional multiplication, the divisor is scaled according to Equation 13a and Newton's method is performed to find the reciprocal of the divisor. Once a reciprocal is determined, the reciprocal is multiplied by the dividend to determine the quotient.

In another embodiment of the present invention, a unique and novel means for scaling the RNS divisor, D, to meet the requirement of equation 13b is disclosed. The Newton-Raphson algorithm is applied, and a reciprocal of the divisor is determined. Again, the reciprocal is multiplied by the dividend to find the quotient. The resulting increase in performance over the aforementioned method is significant, and provides a basis for high speed RNS division of the present invention. That is, providing a means to scale a fractional RNS value to meet equation 13b results in a fast and accurate implementation of Newton's or Goldschmidt's division method.

In yet a third method of division, the divisor is scaled according to equation 13a, the numerator is scaled by an equal amount, and the Goldschmidt division algorithm is applied to determine the quotient. In a more efficient variation to this method, the divisor is scaled in accordance to equation 13b, and the numerator is again scaled by an equal amount, and the Goldschmidt algorithm is applied.

One advantage of using the Newton-Raphson (or Goldschmidt) algorithm is that it does not require a comparison, only an equality check. That is, the result of successive iterations of the Newton's method may be compared until they are equal (or otherwise oscillate). Furthermore, for Newton-Raphson, the initial value formula used to minimize the maximum of the absolute value of the error is:

$$X_0 = 48/17 - 32/17 * D \qquad \text{Eqn. 14}$$

It is noted the values of 48/17 and 32/17 may be exactly represented in most RNS systems of the present invention. Furthermore, Goldschmidt division may also be implemented with an equality check for fast RNS fractional division. Like Newton-Raphson, for fast implementation, the Goldschmidt algorithm is most efficient when the divisor D is scaled in accordance to equation 13b.

Newton-Raphson and Goldschmidt division are well known in the prior art. That is, through the use of the RNS fractional multiplication methods of the present invention, a fractional division method can be ascertained. What is needed and unique to the present invention is the method of scaling the divisor D to meet the requirement of equations 13a and 13b. Once the divisor D is scaled, the dividend N must be scaled by an equal amount. Upon achieving a scaling of both operands, either Newton-Raphson or Goldschmidt division may be applied using a fixed point or sliding point RNS fractional multiplication method and apparatus of the present invention. Therefore, the following disclosure focuses on the scaling operations, and not the division routines themselves.

For signed fractional division, it is important the sign of the divisor D is determined beforehand. If the divisor D is negative, the absolute value of the divisor should be used, or an alternate division algorithm handling negative operand input. In one embodiment of the present invention, a sign bit and a sign valid bit is used to determine if the operand sign is known, and if so, what the sign of the operand is. If the sign is not known (sign valid bit equals false), the sign of the divisor D may be determined in addition to scaling. In the unique and novel method of fractional division of the present invention, an operand sign extend and scaling function is integrated into a single operation. This single operation is facilitated by a 'sliding point'' RNS fractional representation. This method and apparatus is disclosed next.

Sliding Point RNS Fractional format

To explain the sliding point fractional RNS representation, it helps to start with the definition for the fixed point RNS fractional representation of Expression 2a. Expression 2a only shows the primary digits of the RNS fractional representation, and not the extended and redundant range digits for simplicity. To further clarify the representation, FIG. 17A shows a more complete description of a fixed point RNS representation which includes an extended range, and optionally, a redundant digit, required for multiplication and division.

FIG. 17A discloses one embodiment of the RNS fixed point representation using a segmented register illustration. The total RNS fixed point fractional machine number includes the RNS digits which represent the range of the fractional portion of the representation 1700, ($F_1, F_2, F_3, \ldots F_N$). It includes the RNS digits which represent the range of the whole portion of the representation 1702, ($I_1, I_2, I_3, \ldots I_M$), and it may include a number of RNS digits representing an extended range 1703, ($E_1, E_2, E_3, \ldots E_N$), which extend the machine number range to exceed a "squared" usable range in one embodiment. A full squared range will represent a range that is equal to or greater than $(R_F * R_W)^2$. (An extended range may also be supported with a number of sub-digits i.e., squaring each modulus). Finally, a redundant digit 1704, or range, may be included to facilitate integer division on the entire machine number range squared ($R_Y^2$).

A few points are noted, since the representation of FIG. 17A is only one possible register organization. It is noted that the range accounting for signed values is included in the fractional 1700 and whole 1702 ranges, assuming the method of complements is used. It also noted that extended ranges may be less than or greater than $(R_F * R_W)$ depending on the application; in fact, range requirements for a given general purpose RNS ALU are only briefly considered herein. FIG. 15E provided a table of such ranges for the examples given for fractional multiplication. Full extended ranges may allow for certain forms of overflow detection, among other features.

FIG. 17A also shows a fractional point position register 1705. The fractional point position register may be a conventional binary register which indicates where the fractional point 1701 is positioned. In reality, the fractional point 1701 is virtual, and is shown as a "position" for purposes of illustration. The fractional point position register 1705 is best described as the number of fractional digits F which make up the fractional range 1700. In a fixed point RNS fractional representation, the fixed point position register may contain a constant, or may not exist, and instead may be implied within hardcoded or micro-coded circuits.

In one embodiment, the digits associated with the lowest prime factors are grouped together to form the fractional range 1700. This embodiment maximizes the number of denominators in the fractional representation, thereby increasing general processing accuracy. This embodiment also maximizes the most fundamental denominators.

In FIG. 17B, the position point register contains a value (n) that can change. (FIG. 17B is modified so that both the fractional range and the whole range share the same digit designators S, and the subscript of the digit designator S is sequential to illustrate the operation of the sliding point representation.) In this illustration, we treat the entire effective RNS range $R_Y$ as a continuous sequence of RNS digits representing the effective machine number. The fractional point 1701 is located at digit position (n), where (n) is specified by the fractional point position register 1705. The fractional point position register can be altered, much as an exponent register is altered to affect the range of floating point binary numbers. By altering the fractional point position register, more or less RNS digits are grouped to form the fractional range 1700. Certain ALU elements are responsive to the fractional grouping, and modify their processing algorithms accordingly.

In this embodiment, the fractional range 1700 digit grouping always start with the digits associated with prime modulus of the smallest prime factors. In our example of FIG. 17B, the value of the fractional point position register, n, can have a value between zero (0) and M+N inclusive. If the value is zero, the format is integer only; at the other extreme, if the sliding point position is set to all digits (M+N), the number format is all fraction, i.e., values less than 1.0. Normally, the sliding point position is placed at a position providing the fractional range and the integer range required of the application. Defining a known and standard sliding point position may be referred to as a "normalized format". The format of a number can be modified by sliding point scaling operations, for example. These scaling operations facilitate more efficient processing in some other configuration of the sliding point unit. For example, an application may use an increased fractional range format for fractional calculations, and use extended integer range format for integer calculations, and combine the two results in a normalized format to achieve the smallest overall error in calculation.

To further clarify the sliding point representation, consider FIG. 17C, an example RNS machine word composed of digits whose modulus is the first 31 prime numbers. That is, the first digit modulus is p=2, the second is p=3, and so on and so forth to the last digit modulus, p=127. The largest digit width in terms of binary bits is seven (7) in this example. Therefore, the crossbar bus of our digit slice architecture would be at least 7 bits wide, allowing it to transfer the value of any digit to all other digits ALUs. FIG. 17C illustrates the first eighteen RNS digits as allocating and defining the range of the data representation number, $R_Y$.

Changing the value of the position point register changes the number of RNS digits that are dedicated to the fractional range of the RNS representation. To illustrate, a fixed point RNS fractional representation is first considered. In terms of a fixed point representation, a specific design may choose to group the first 11 RNS digits as fractional digits 1700. This provides a fractional range in excess of 2.00E+11, which results from multiplying the first 11 primes together, as shown in equation 5a. In this embodiment, the fractional point position register 1705 is always set to the value eleven (11), since the first eleven RNS digits are dedicated to the fractional range 1700. Therefore, in this example, all fixed point fractional values will exist with the fractional point position register set to eleven.

In terms of a sliding point representation, the value of the fractional point position register 1705 is allowed to change; its value may range from zero to eighteen (18) in our example, since $R_Y$ is defined as the fractional range times the whole number range, from Equation 10b. In FIG. 17C, if the fractional point position register is set to 12, then an additional RNS digit modulus is grouped to the fractional range; in the example at hand, this means the fractional range would be extended by a factor of 37, since the modulus p=37 is now grouped with the fractional range 1700. This also means the whole number range 1702 is reduced by a factor of thirty seven (37), since the whole number range 1702 is now composed of only 6 RNS modulus, as opposed to the previous set of seven.

Therefore, as shown in FIG. 17C and by means of example, it is readily seen that sliding the fractional point position 1701 to the right extends the fractional range 1700 while reducing the whole number range 1702. Conversely, sliding the fractional point position 1701 to the left extends the whole number range 1702, while reducing the fractional range 1700 by the same factor. This is analogous to fixed radix or mixed radix number systems, except we have chosen to write our least significant digits starting on the left.

In practice, there is no real fractional point position, but instead, the value of the fractional point position register 1705 is used. In other words, the value contained in the fractional point position register defines a "virtual" fractional point position 1701; in reality, it defines the RNS digits grouped as the fractional range 1700. The value contained in the fractional point position register 1705 affects how the fractional and whole portion of the RNS representation is treated, and indeed, how they are processed. Again, the notion of a fractional point position is similar, but not exact to fixed or mixed radix number systems. However, much insight can be gained into the sliding point RNS representation using an illustration such as shown in FIG. 17C.

Fractional Division Framework

A specific embodiment of the present invention may choose to define a "normalized" sliding point RNS number as one which places the fractional point position at a specific value, say eleven as in our previous example. One motivation for normalizing sliding point numbers is to achieve fast fractional addition and subtraction, since fixed point RNS addition and subtraction can be achieved in constant time regardless of the digit width of the representation, assuming a fixed LUT access time. In other words, defining a normalized sliding point number allows such normalized numbers to be treated as fixed point fractional numbers. Therefore, the methods and operations previously discussed regarding fixed point RNS numbers may be used by adjusting N, the number of fractional digits, and will not be covered here.

However, as stated, one need for altering the grouping of fractional RNS digits is to scale the value in accordance to equations 13a and/or 13b. In other words, a sliding point function is useful for scaling fixed point RNS numbers in preparation for division using the fractional RNS multiplication method of the present invention, and then applying Newton-Raphson or Goldschmidt divide algorithm. Unlike a binary number where shifting the fractional point always reduces or increases a value by a power of two, shifting the fractional point position of an RNS number changes the value in different amounts, depending on which modulus is shifted into and out of our fractional range 1700 and whole range 1702.

However, using FIG. 17C, it can be visualized that shifting the fractional point position to the right of our significant digits (i.e. significant range), a fractional scaling of a value greater than one to a value less than one can be achieved; such an operation can scale a value greater than one to achieve the requirement of equation 13a. Unlike the case of binary, through moving the fraction point 1701 alone, one should not expect the scaled value to meet the requirement of equation 13b, since scaling is not a power of two for all digits, except the first digit with modulus p=2. Because the requirement of equation 13b is not met by simply re-positioning the fractional point position, the fractional divide operation is not efficient, and may require many more iterations to complete, thereby slowing the ALU and complicating the design of pipelined RNS CPU and ALU architectures. Therefore, there is a need to scale RNS values to meet the requirement of equation 13b.

Scaling an RNS value less than one half (<0.5) to a value meeting the requirement of equation 13b is a related but different operation. In one embodiment, such an operation involves scaling the value up enough to establish a value greater than the original value, but meeting equation 13b. The scaling up operation preserves a specified minimum number of fractional digits F, providing a large enough range to guarantee the required accuracy during division.

In a unique and novel method of the present invention, an apparatus that scales any RNS fractional value to a value which meets the requirement of equation 13b is disclosed. Such an apparatus allows high speed fractional division using either fixed point or sliding point RNS numbers. The scaling method and apparatus uses the sliding point representation just disclosed in conjunction with a specially modified RNS to mixed radix conversion technique. The examples provided next assume digit slice architecture for simplicity of explanation, but the invention is not limited to this. This technique is new, and provides a significant new paradigm for general purpose RNS number processing and ALU design.

Fractional Scaling Specific Detail

The unique and novel method for scaling RNS fractional values is broken into two cases, the first case involving scaling numbers down, and the second case of scaling numbers up. Both cases are processed with the same algorithm, and in an integrated fashion. For purposes of clarity, we will focus on positive values, and on each case above separately; next, we will explain the integration of both methods. A basic example is also given. Additionally, the discussion is focused on using sliding point representation to scale operands appropriately, for which an (adjustable) fixed point multiplication method is then used to process fractional division. Next a brief discussion on scaling the result back to a normalized format is discussed. The case of using non-normalized sliding point representation throughout the divide process is lengthy and not discussed herein.

To facilitate an efficient fractional scaling method using sliding point RNS representation, consider again the example machine word of FIG. 17C. In FIG. 17C, thirty one (31) distinct pair-wise prime modulus are used. In this case, the modulus are the prime numbers from two (2) to one hundred twenty seven (127). Using thirty one digits has an advantage and is not coincidental, since up to thirty one prime numbers starting with two (2) can be represented using a 7 bit binary word. (Recall the RNS systems considered utilize binary coded digits).

In one embodiment of the present invention, and by means of example, the two's digit modulus is extended to a power of seven, since a power of seven makes complete use of the available 7 bit wide digit format required for the 31 digit RNS system of FIG. 17C. The power based RNS modulus concept was introduced earlier, as shown in FIG. 11D, and in the discussion of a high speed variant of the integer divide method of the present invention. Extending the two's modulus to a power of seven creates a modulus of one hundred twenty eight (128). Extending a prime modulus to a specific power preserves the modulus pair-wise prime status versus all other modulus of the RNS word.

A unique property of raising the two's modulus to the maximum power for which all other prime modulus will fit, i.e. 7 bits in the present example, is that the two's power based modulus becomes the largest modulus of the RNS sliding point word representation. This fact guarantees that during the scaling process, which is based on decomposing the value using a mixed radix conversion procedure, the two's power modulus digit will the largest value digit at end of conversion. This simplifies the scaling method, and is the method presented herein. Further details regarding this are discussed below.

Another important facility required is the concept of a "variable power" modulus. Essentially, this was disclosed earlier in the discussion of a high speed integer method through the use of a power based digit modulus. While the concept is essentially the same, the need for a variable power modulus is different. For the scaling procedure being discussed, the ability to alter, and truncate, the power of the two's modulus allows the number to be scaled in accordance to equation 13b. In other words, it is the ability to modify the power of the two's modulus that allows scaling within the power of a single binary bit, i.e., a power of two.

In the method of high speed integer division of the present invention, a digit slice ALU of FIG. 3G was introduced. In particular, the number of valid powers of a digit is tracked by a special counter, the Power Valid Count 337. In the scaling method to follow, at least the two's power based modulus requires a power valid counter 337. Other RNS digits may employ power based digits, but the need to modify the power of any other digit is not required for the scaling method to follow. It should be noted that power valid counts may be a part of the word representation, and moved and stored with any particular value, or may only be a component of the ALU hardware, implying a value may be normalized before being stored into general purpose memory.

To disclose the procedure for scaling an RNS fractional number using the sliding point representation discussed earlier, the flow chart of FIG. 18A is shown. Additionally, a convenient nomenclature for the RNS digit modulus and digit values is adopted to simplify the disclosure. The nomenclature is modified from FIG. 17C, and is shown in FIG. 18B. In FIG. 18B, all digit modulus are denoted as $S_n$, where n is the position of the modulus. The digit value for each modulus, $S_n$, is denoted by $d_n$. While position of an RNS modulus is not mathematically important, for clarity, the digits associated with the modulus of the least (base) power are listed first, and shown in order from left to right in FIG. 18B. For example, the first modulus is denoted as $S_1$, which is the modulus with base=2. The second modulus is $S_2$, which is the modulus of base=3, and so on and so forth to modulus $S_P$, which is the last digit modulus of the P digit sliding point representation. In terms of shifting the fraction point position in FIG. 18B, shifting to the left increases a number, while shifting to the right decreases the number.

In FIG. 18B, a fraction point position register 1705 is shown. The fraction point position register defines the fraction point position 1701; it essentially defines the group of digits that are grouped into the fractional range of the RNS sliding point number. The digits grouped into the fractional range 1700 are all digits from $S_1$ to $S_R$ inclusive, where R may be altered by fraction point position register 1705. Also shown in FIG. 18B is the whole range 1702. A values' whole range is not preserved when moving the fractional grouping, since the whole range is a difference of P and R. Typically, during sliding point scaling, the machine number itself is not changed, just the fraction point register (and optionally the power valid register), which controls how the number is interpreted.

Also shown is the $S_1$ power valid register 337b which defines the power of the two's power modulus $S_1$. In one embodiment, the maximum power of the two's modulus provides a digit modulus that is greater than any other modulus $S_n$. This is referred to as the "maximum power of two's modulus".

The last range shown is the extended range defined by the extended digits 1703 in FIG. 18B. The number of extended digits will depend on the intermediate value requirements of the divide algorithm. For example, the Goldschmidt routine requires the value of two (2.0) be used after scaling. If the original scaled value is large enough, the fraction point 1701 may be placed past the last digit $S_Q$, in which case at least one more (extended) digit is required to represent the value two (2.0) during the divide process. Moreover, Goldschmidt division may increase the value of the dividend to a very large value, despite the fact that scaling has decreased the range of the whole part of the value. In this case, the range of extended digits should allow a range suitable for the application, and may indeed be larger than the whole range 1702 of the normalized representation.

Furthermore, additional range represented by a redundant digit having a range greater than Q−1 bits is required. The reason is that the maximum truncation of the two's power digit is Q−1 bits worth of range. During Newton-Raphson or Goldschmidt division, the divisor is scaled in accordance to equation 13b. Likewise, the dividend must be scaled in the same proportion as the divisor. Since the two's power modulus is to be modified for proper scaling, it is important that one or more redundant digits exist when scaling the dividend to preserve the number range. Digits reserved for the extended range 1703 may also be used to fulfill the redundant digit requirements.

In FIG. 18B, an example set of modulus is also provided to help clarify the notation. The RNS sliding point word is comprised of eighteen (18) digits, starting with the first digit 1706 being a power of two (2). In the example of FIG. 18B, the base two's modulus power may be raised via the power valid register 337b to a maximum value of six (6); therefore, the largest modulus of the base two's modulus $S_1$ is 64. The smallest power for base two's modulus is one (1), meaning the smallest modulus for $S_1$ is two (2). A value of zero in the power valid register 337b may indicate the digit is completely undefined, i.e. the digit is skipped.

The fraction point register 1705 indicates how many digit modulus are grouped into the fractional range 1700. In the example of 18B, the normalized value for the fractional point register is eleven (11); the fractional grouping may be extended via the fraction point register 1705 to include up to eighteen (18) digits, i.e., all the whole digits of the RNS sliding point number. In one embodiment, to increase processing accuracy, the fractional digits start with the modulus of the lowest prime base (p=2) and increase from lowest prime to largest prime.

In the control method that follows, the embodiment does not allow the fraction point to be less than the normalized value N; this is to ensure a guaranteed number of fractional digits to provide accurate results during the divide process, however, the technique is not limited to this. An alternative embodiment scales up a number sufficiently by moving the fraction point to less than the normalized value N. This decreases the fractional range, and decreases the accuracy. Alternatively, a method and apparatus for scaling is contemplated which adds additional fractional digits (>N), such that enough accuracy is obtained to provide a rounding function; in this case, additional extended digits are required. This process scales the value to an "intermediate normalized" number where the fraction point position is greater than N, the normalized position.

Figure 18A:
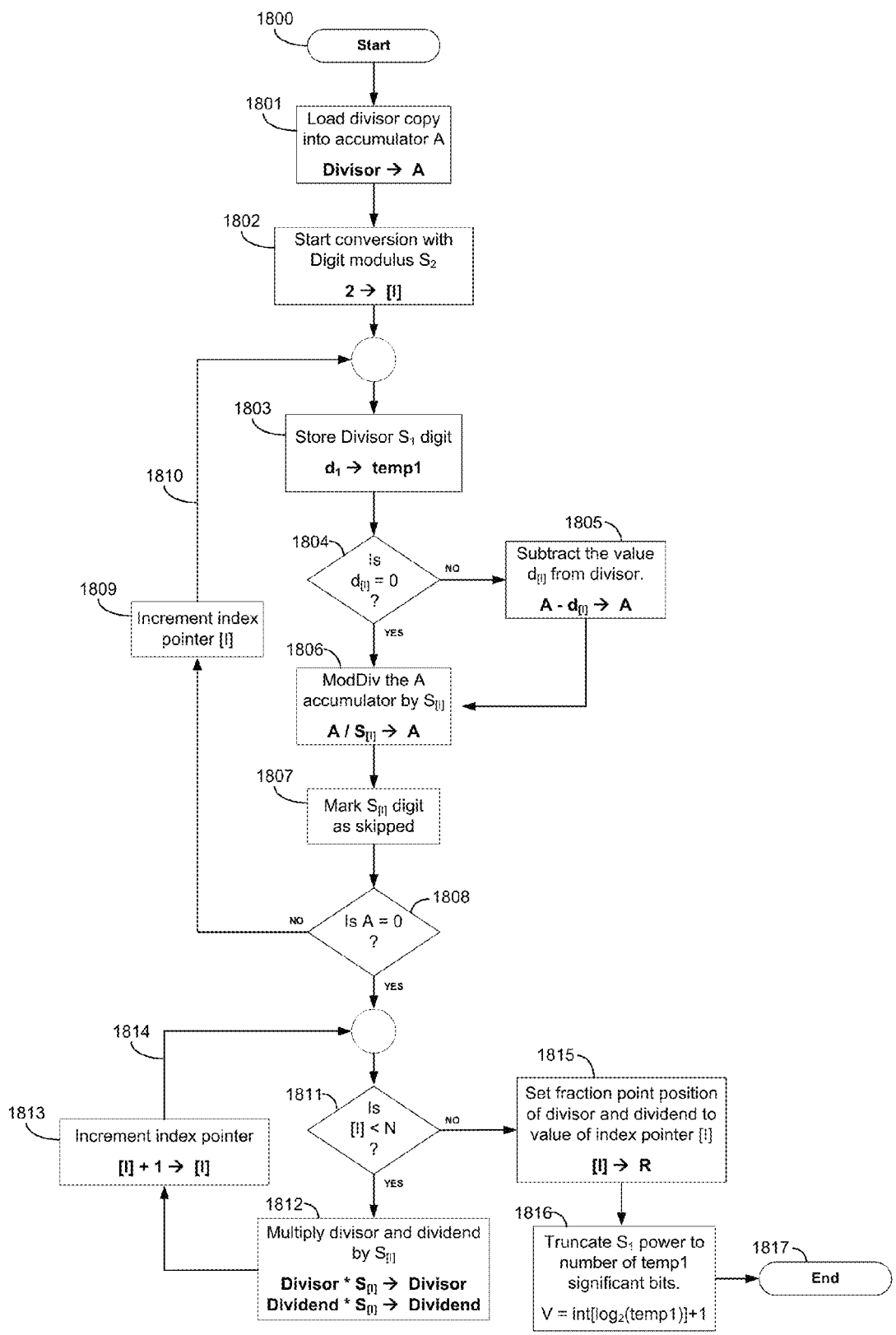
FIG. 18A is a flow diagram illustrating exemplary sliding point scaling.
Figure 18B:
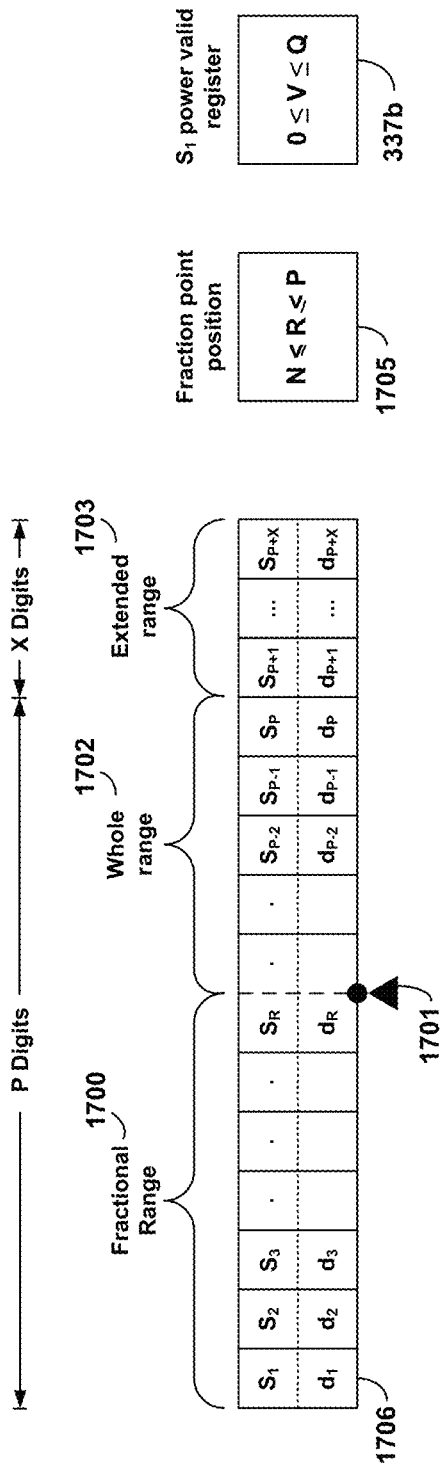
FIG. 18B is a block diagram illustrating an exemplary sliding point RNS representation with power valid register and example modulus in detail.

FIG. 18A illustrates a basic control flow diagram for the scaling method of the present invention, and uses definitions of the sliding point RNS fractional representation of FIG. 18B. It should be noted that variations of the flow control diagram of FIG. 18A are possible, as the methods disclosed are basic for the purpose of clarity. The control diagram also assumes RNS digit slice architecture, such as the dual accumulator architecture of FIG. 2A. However, the invention is not limited to this particular architecture.

In FIG. 18A, control starts at step 1800 which assumes the divisor and dividend are accessible by control circuit 200 via register file 300. The control circuit 200 loads a copy of the divisor 1801 into an accumulator for purposes of scaling the divisor. The scaling method is a modified version of RNS to mixed radix conversion, but with several key modifications. For one, the order of conversion must end with the two's power modulus being the last digit to be converted. FIG. 18A illustrates each digit to be operated on by using an index value [I]. To skip the two's modulus, the control circuit starts conversion by initializing the index value to some other value than the index associated with the two's modulus. In this case, the index is initialized with the index associated with the next digit modulus, i.e. the modulus of three. Therefore, the index is initialized with the second digit position 1802 by loading the value of two into the index variable. (Index starts with one in this description).

Next, control circuitry stores the value of the two's power modulus 1803 in case it is needed later. Next, control circuitry tests the digit value of the selected digit modulus (i.e. selected via the index value) to determine if the digit value is zero 1804. If not, control circuitry subtracts the value of the digit from the accumulator 1805. Control is then passed to divide the accumulator by the digit modulus 1806. To be clear, the divide operation has been defined as a MODDIV operation, which is essentially an inverse modulo multiply for each digit of the accumulator by the selected modulus. Once the accumulator has been divided by the currently selected modulus, the digit may be marked as skipped 1807, although this is not necessary in some embodiments. Marking a modulus as skipped identifies all subsequent subtractions 1805 and divides 1806 to ignore the digit; in practice, control circuitry is configured to ignore the digits already processed in one embodiment. Also, the process of flagging a divided digit as skipped ensures the value of the digit does not enter into the ALU status, allowing the control to determine if all valid digits are zero, for example.

Next, the control circuit tests to determine if the accumulator is zero 1808. If so, it means the value has been completely converted. If not, the next digit modulus is selected as illustrated by incrementing the index value [I] 1809. The control circuit path 1810 illustrates a basic loop which is similar in RNS to mixed radix conversion. Once the accumulator value reaches zero by test 1808, control is passed to determine if the index count (digit position index) is less than the normalized value N 1811. If so, the divisor and dividend are multiplied by the modulus of the current digit position, selected via the index pointer [I]. This represents the case where the divisor is less than one (1.0). After multiplying, the index pointer is again incremented to access the next digit position.

Control path loop 1814 continues until the index pointer [I] is equal to the normalized position N. It should be noted that during the previous control loop 1810, it is possible that the index value is larger than N. When either condition is met, control is passed to set the new fraction point position 1705 of the divisor and dividend 1815. This operation represents the sliding of the fraction point as discussed earlier. Control is passed next to the step of truncating the two's power modulus to the number of bits required to represent the value saved in tempi 1816. In other words, the number of significant bits of the last non-zero value of the two's digit from control loop 946 defines the new power of the two's modulus.

For example, if the last digit value of the two's power modulus is five (5), then the two's power modulus is limited to a power of three, since three bits is needed to represent the value of five. Therefore, the power valid register 337*b* will be set to a value of three. This is an important and key step to the scaling method of the present invention. That is, a variable power of the two's modulus is set appropriately to scale a value to meet the requirement of equation 13b.

Consider that the last digit converted to a mixed radix format is the most significant digit of the mixed radix number. If the last digit is a two's power modulus, the two's power can be truncated to exactly fit the value of the (most significant) mixed radix digit. If the fraction point position is moved to include all significant digits of the mixed radix number, and the modulus is truncated to fit the most significant digit, the scaled value is guaranteed to fit within the requirements of equation 13b.

Sliding Point Fractional Scaling Example—Scaling Downwards

Figure 18C:
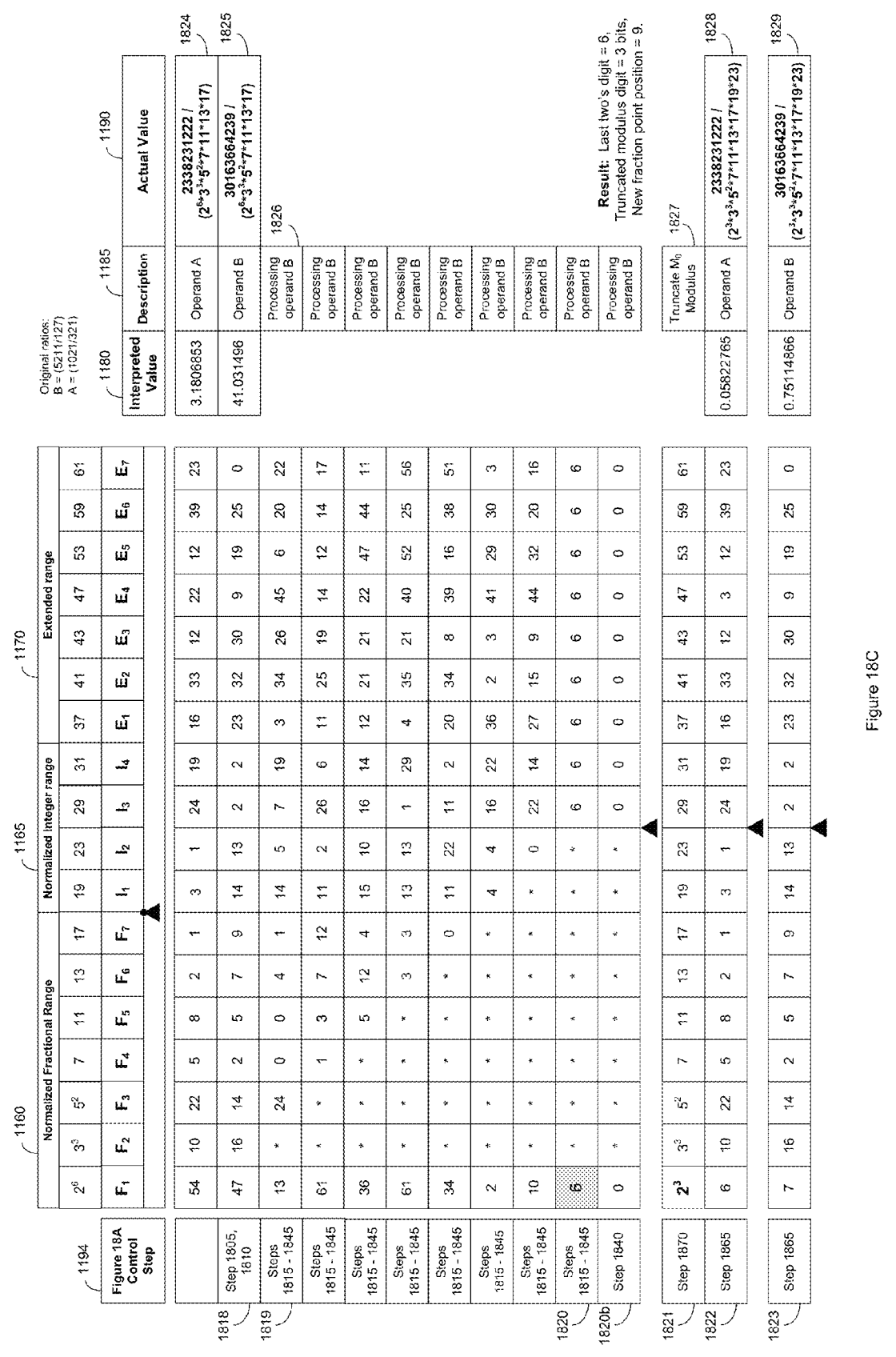

FIG. 18C illustrates a fractional scaling example using the sliding point method of FIG. 18A. The scaling operation starts with two RNS operands, a divisor and a dividend. The divisor is scaled in accordance to equation 13b. The dividend is scaled at the same ratio as the divisor. In the embodiment of FIG. 18A, the sliding point scaling operation does not alter the values of the underlying RNS values, instead, the scaling operation affects the fractional grouping via the fraction point position register 1705 and the two's power modulus via the $S_1$ power valid register 337*b*.

In FIG. 18C an example ALU is shown with three digit range sections, a normalized fractional range 1160, a normalized integer range 1165, and a extended digit range 1170. By normalized, we are referring to a particular data format definition provided with the example. For the full divider example, operands are provided in a normalized format, and returned in a normalized format; however, internal operations may be performed in a variable fraction point format. The example of FIG. 18C illustrates the process of receiving the operand in normalized format, and converting the operands into a variable point data format suitable for the division process.

The example operand A 1824 and operand B 1825 are shown. Operand B is treated as the divisor in this example, and therefore the scaling operation begins a mixed radix conversion of operand B in step 1819. Note the first digit modulus, $M_1=2^6$, is skipped, and the second digit modulus, $M_2=3^3$ is processed instead. After the digit is processed, an asterisk is placed at the digit position to indicate it is now skipped. Each time a digit is divided, the conversion is essentially testing the "length" of the RNS number. In this case, the mixed radix conversion exceeds the normalized fraction point position by being re-located at the digit modulus $M_8=23$ at step 1820*b*.

In step 1821 of FIG. 18C, the ALU modulus is shown as modified, since the two's base modulus is truncated to three bits from six. The two's digit modulus is shown in bold at step 1821. At step 1822, the operand A value is shown with the new fraction point position setting, and the new two's modulus power. At step 1823, the divisor is shown with the new fraction point position and the new two's modulus power. The Actual Value column 1190 lists the final value of the divisor as a new ratio of modulus values. This new ratio is approximately equal to 0.75114866, which is properly scaled according to equation 13b. The dividend is scaled in the same proportion, since the value is unchanged, and the same modification to the fractional denominator is made.

For full fractional division, the scaled fractional format 1828, 1829 is used in the computation of division. The fractional multiply routine used to implement the division treats the new "scaled" operands as fixed point operands having a different fixed point position. When division is complete, the final quotient may be converted to the normalized format using a sliding point normalization operation.

Sliding Point Fractional Scaling Example—scaling upwards

The figure of 18D illustrates another example of the scaling method of FIG. 18A. In this example, operands are chosen so that the divisor is scaled upwards. That is, the divisor operand 1838 is much less than 0.5, and the scaling routine will work to scale the value up to meet the requirements of equation 13b.

Figure 18D:
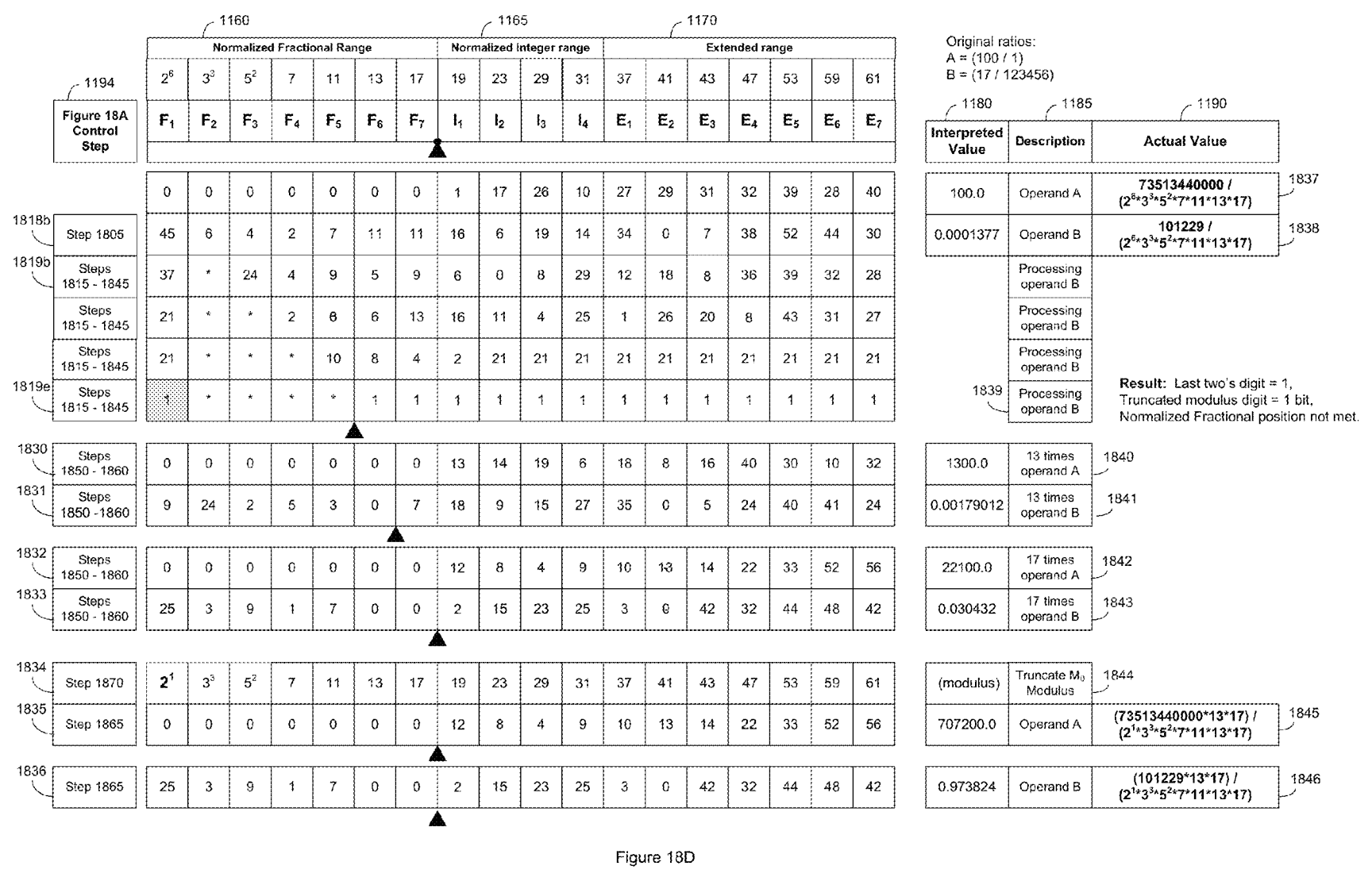

In FIG. 18D, the operand A value is one hundred (100.0), and the operand B value is approximately (0.0001377). At least the operand B is a copy, since the original operand B value will be needed at the end of the conversion operation. In step 1818 of the example, the operand B is treated as the divisor, and undergoes a conversion operation similar to mixed radix conversion and similar to the control flow of FIG. 7A. The conversion example starts with the digits of the fractional range 1160. However, the mixed radix conversion, which starts in step 1819 must not process the two's modulus digit, so the two's modulus digit is not chosen for conversion using a subtraction and modulus divide.

At the end of conversion 1819*e*, the two's modulus digit is stored, as shown using the highlight of the digit value one (1) in the $F_1=2^6$ digit column. Referring back to FIG. 18A, the stored value of the last digit of the two's modulus 1803, before the conversion value goes to zero 1808 (not shown), is used to define a truncate count in the control step 1816. In this case, the value of one may be stored using a single bit, therefore, the truncation of the two's modulus to one bit 1834 will be affected as illustrated in the bold face type of FIG. 18D.

Also during the conversion step 1819*e*, the last valid fraction point position is determined to be the fifth digit, as indicated by the solid black triangular digit position marker. During conversion, the fraction point failed to meet the position of the normalized format in step 1819*e*, the normalized position being seven in this example. In this case, and according to the control flow of FIG. 18A, the scaling will increase the value of the RNS number to move the fraction point position farther, as shown in the decision control block 1811 and control step 1812. In FIG. 18D, at step 1830, the operand A is multiplied by the value of the current digit position modulus, which is thirteen (13). At step 1831, the operand B (original divisor) is also multiplied by thirteen. At steps 1832 and 1833, each operand is multiplied by the next digit modulus value of seventeen (17). Since the digit modulus seventeen is associated with the seventh fractional digit (i.e., the normalized fractional grouping), the process of multiplying the operands by digit modulus is terminated at the control decisions step 1811 of FIG. 18A.

Referring to FIG. 18A, at this point the fraction point position remains in the normalized (seven) position at control step 1815, and the step of truncating the two's power modulus 1816 is performed by truncating the two's power to a value of one, since one bit is required to store the value of one, which is the last two's digit value during the conversion at step 1819*e* of FIG. 18D. The last two's digit value is one and is shown as shaded in step 1819*e*. The modification of the power of the two's digit modulus is shown in step 1834 as a bold face type in FIG. 18D. In this case, the power of the two's modulus is decreased from six to one.

In the particular scaling routine of FIG. 18A, scaling a small value upwards changes the value of the RNS value. However, it does not change the ratio of operand A to operand B, as both operands are modified in the same proportion. The divisor is denoted as operand B 1838 and starts with a value of approximately 0.0001377. The dividend is denoted as operand A, and starts with a value of one hundred (100.0). At the end of the conversion, the fractional point position is not affected, however, both operand has been increased by a factor of thirteen times seventeen (13*17). In addition, the denominator of the numbers has also changed in response to the truncation of the two's power modulus from a value of six to a value of one.

The equivalent fraction of each scaled value is shown in the Actual Value column 1190 of FIG. 18D. The operand A has been increased to a value of 707200.0. The operand B value has been scaled to an approximate value of 0.973824, which meets the requirements of equation 13b. The scaled operands, along with their new fractional modulus set, are used by an RNS fractional multiplication apparatus responsive to the changes in the modulus and fraction point position (from the normalized fixed point configuration). The multiplication apparatus resembles the fixed point multiplication apparatus of the present invention, with the choice of modulus and fraction point position altered.

Advanced Scaling Techniques

Advanced number scaling techniques may include a scaling algorithm which truncates more than the base two modulus digit. Such an apparatus tracks M pre-selected digits that will not enter into the mixed radix conversion. The digit values for M number of digits are stored for N conversion iterations. During end of conversion, the stored digit values are tested for values which define the truncation of each associated modulus. The specifics to this logic are not disclosed herein. The generated truncated modulus set represents a number range closer to the value being scaled. Therefore, the resulting scaled value is a fractional ratio closer to one. The closer a scaled divisor is to one, the more efficient the division.

Fractional Division Using Scaled Operands

The fractional multiply routine is used to perform Goldschmidt division in one embodiment. The result of the Goldschmidt division routine is to produce the correct quotient (A/B), but in a non-normalized format. The non-normalized format may be converted back to a normalized format for further processing.

The Goldschmidt divide process uses fraction multiplication; the fractional multiplication apparatus supports a variable point position in addition to a variable power two's modulus. The multiplication apparatus adjusts to the fraction point position and two's modulus power as determined in the step of scaling of FIG. 18A. Multiplication as previously documented in FIG. 15B can be used, but with a fractional digit grouping and two's valid power setting defined by the scaling process of FIG. 18A.

Using Goldschmidt division, several different conditions can be used to terminate the iteration. One such condition is when the result is the same after two iterations. In fact, one method compares the intermediate result (before normalization) to save clock cycles. Once a repeated result is detected, the result may require normalization before being stored or used in subsequent operations.

Therefore, instead of digit extending the result of the last multiplication (of the division process) to conform to the modified modulus, the ALU control circuitry digit extends and also normalizes the prior iteration (digit extended) result. The normalization may include the restoration of the two's digit power valid register to a maximum value (i.e., two's modulus power is maximized). This is one example of creating efficiency of operation by integrating sliding point scaling, and result normalization directly into the division control process.

If the result of division is already normalized because the scaling did not require a change of the fraction point position, and no change in the two's digit modulus, no action is taken.

If the result of division has a fraction point greater than normal, or N, then the value is normalized by moving the fraction point position to the normal position, and skipping, or truncating, the mixed radix digit of each modulus that was regrouped during base extend in one embodiment. This process performs a division by all digit modulus that have been re-grouped. This division offsets the decrease in the fractional range, $R_F$, which is effectively divided by each digit modulus that is regrouped when the fraction point position is moved back to N, the normal position. One can expect R−N digits to be regrouped, if R is the scaled fraction point position 1705, and N is the normal fraction point position, as shown in FIG. 18B.

If the (non-normalized) result of division has a truncated twos modulus, the value of the result is multiplied by $2^T$ before conversion to mixed radix, where T is the number of powers of the twos digit modulus truncated (lost) during scaling. This multiplication offsets the increase in $R_F$, which is increased by a factor of $2^T$. Before re-conversion to RNS, the ALU resets the power valid register 338 of the two's digit using the normalized value, or the reload value 1109. The reconverted result is therefore properly normalized to the normal two's digit power modulus value.

After optionally dividing by all regrouped modulus, and optionally multiplying by a power of the two's modulus representing the number of powers truncated, the value may reset the fraction point position and the two's power modulus to their normal, or normalized. Thus, the value is identical to the sliding point result, but now in a normalized, fixed point or sliding point format.

Normalizing Sliding Point Division Results

In the method of the present invention, a unique method for re-normalization is disclosed. The method involves base extending the final result, however, during RNS to mixed radix conversion, the truncated power modulus is used; during recomposing, the mixed radix digits associated with the extended sliding point digits are discarded, and all other digits are converted. During the reconversion, the ALU power modulus is fully extended. For example, if the normalized fraction point is seven, and the extended fraction point is nine, then two digits are discarded.

A specially modified mixed radix conversion is used to re-normalize an RNS fraction with a fractional position greater than the normalized value. Important to the modified mixed radix conversion is the starting and subsequently first digit modulus converted; the starting digit and all first digits which should be a digit modulus multiplied in control step 1812. (Note that S is used to indicate the modulus value in FIG. 18A). During re-conversion, the mixed radix digits associated with the first digit modulus multiplied are discarded. After re-conversion, the fractional point position is restored to the normalized position.

In Newton-Raphson, after the reciprocal is found, it may be necessary to normalize the result. In one embodiment, the re-normalization is integrated into the multiplication of the dividend by the reciprocal. This is also a claimed feature of the method of the present invention. Also, after using Goldschmidt division, the final result may need to be normalized after the result is found.

Figure 18E:
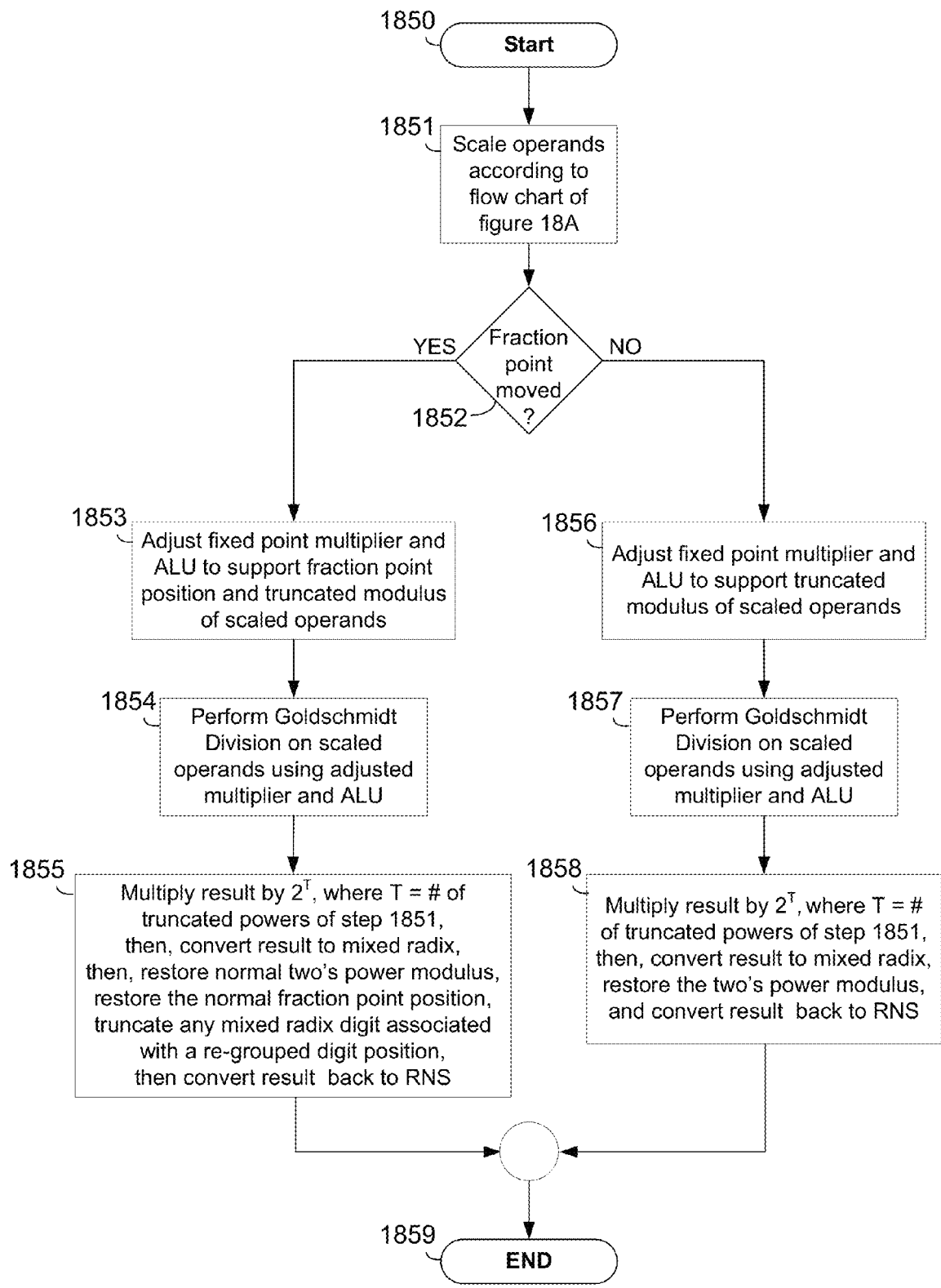
FIG. 18E is a block diagram illustrating exemplary sliding point fractional division.

In FIG. 18E, a basic procedure is disclosed for performing fractional division using the fractional multiplication methods and apparatus, and the sliding point RNS representations and methods of the present invention. At start, in control step 1851 of FIG. 18E, the two operands are prepared for division by undergoing a scaling process, similar to that described using FIG. 18A.

The result of the scaling operation of step 1851 is to convert the divisor to a format which meets the requirements of equation 13b, and to scale the dividend in a proportional manner. To perform this scaling, either or both the sliding point position 1705 and the power valid register 337b of FIG. 18B may be modified from their normal, or normalized, value.

In step 1852 of the control flow diagram of FIG. 18E, a decision is made according to whether the fraction point position 1705 is moved from its normal position. If so, the control executes the control steps 1853, 1854, & 1855; if the fraction point does not move, control executes the control steps 1856, 1857, & 1858.

In FIG. 18E, at step 1856, the RNS ALU changes the value of its $S_1$ power valid register 337b to reflect the new power modulus value obtained by the scaling process of step 1851. In one embodiment, the scaling process of step 1851 performs this step automatically in preparation for steps 1853, 1856. Changing the power valid register 337b of the ALU determines the ALU will treat the base two's modulus as having a maximum power; for example, if the normal two's modulus is $2^Q$, then the truncated two's power modulus is $2^{Q-T}$, where T is the number of powers truncated.

Next, in step 1857 of FIG. 18E, the ALU performs a division by use of RNS fractional multiplication and fractional arithmetic operations, such as subtraction, and by use of the Goldschmidt algorithm or other similar procedure. The ALU will use the scaled setting in the $S_1$ power valid register 337b while performing the operations. Referring to the flow control of the fixed point RNS fractional multiplication of FIG. 15B, one can see that there is no alteration of the two's power modulus register 337b. Therefore, the result of the division is in the same number system format as the scaled operands.

In step 1858 of FIG. 18E, the result of the division is multiplied by $2^T$, where T is the number of two's modulus powers lost in the scaling operation of step 1851. This multiplication compensates for the increase of the fractional range $R_F$, as a result of an increased two's modulus power when the value is normalized.

Next, in step 1858, the scaled result is converted to mixed radix. The ALU then typically restores the normal power of the two's modulus by setting the $S_1$ power valid register 337b appropriately. In some embodiments, special storage is allocated for restoring normal values, which may be gated to and loaded by the power valid register as a result of the ALU normalization operation. Lastly, the mixed radix result is re-converted to RNS. The conversion to RNS uses the restored, normal, value of the $S_1$ power valid register 337b during this reconversion, thereby extending the truncated twos modulus to a full power modulus.

If control flow determines the fraction point is moved 1852, the execution begins with control step 1853. In the steps that follow, if the two's power modulus is also truncated in the scaling operation 1851, then the same steps as described to restore the two's modulus by multiplying by $2^T$, etc., is still performed as described above for steps 1856, 1857, & 1858. However, several additional steps are taken if the fraction point position register 1705 was modified during the scaling operation 1851, thereby defining the division result format.

In step 1853, the ALU adjusts the fraction point register 1705, and optionally the two's modulus power valid register 337b, to reflect the RNS number format of the scaled operands of the scaling operation 1851 of FIG. 18E. In some embodiments, the scaling operation automatically affects the power valid register and fraction point position register to facilitate the processing of step 1854.

In step 1854, a fractional division is performed on the scaled operands similar to that of step 1857. The ALU performs the division using fractional multiplication operations on the sliding point format determined in the scaling operation 1851.

In step 1855, the result of the division of control step 1854 is normalized. If the two's modulus was modified in the scaling operation 1851, the result will be multiplied by $2^T$, as was the case in the control step 1858. In this case, the value $2^T$ compensates for the increase in fractional range $R_F$, which will occur when the two's power modulus is restored to a (larger) normal value. This compensation ensures the fractional result, or fractional ratio, remains the same despite the restoration of the two's power modulus. The value, T, indicates the number of powers truncated, or lost, in the scaling operation 1851.

Continuing on the list of steps enumerated in control step 1855, the resultant value is then converted to mixed radix format. The resulting mixed radix value contains digits that correspond to RNS digit positions regrouped into the new scaled fractional range. Moving the fractional point position register 1705 to a lesser number of digits, means the overall ratio is scaled upwards, by the product of each regrouped modulus. To compensate for the decrease in the fractional range $R_F$ as a result of decreasing the value of the sliding point position 1705 register, the mixed radix result is divided by the product of modulus of each fractional digit re-grouped to the whole range 1702. In one embodiment, this division is accomplished using the integer divide method of the present invention.

In a novel and unique embodiment, the division is performed by removing the mixed radix digits associated with the re-grouped digits, and then performing a conversion of the truncated mixed radix value back to RNS. In one embodiment, the process of truncating the mixed radix digits is also referred to as "skipping" the mixed radix digits during the re-conversion process. In one case, a LIFO containing the mixed radix digits (and their associated power) also supports a skip digit flag for each mixed radix digit. During processing of the mixed radix value back to RNS, the mixed radix digit values marked as skipped do not enter into the conversion calculation, while all other digits do. The radix, or power, of each skipped mixed radix digit is therefore ignored in the MRN to RNS conversion calculation.

Before mixed radix to RNS conversion is started, the ALU typically resets the value of the sliding point position register 1705 to a normal value. The ALU must also establish a normal value for the two's power modulus. In one embodiment, this is accomplished using the Reset/Restore register 1109 to load a value into the Power valid register 338 shown in FIG. 11A. After mixed radix conversion is complete, the value of the scaled result represents the final result, only in a normalized format.

Not shown in FIG. 18E is the process of performing a rounding function after the divide by each re-grouped digit modulus 1855. The remainder of divide process may be compared with half the resulting range defined by all regrouped digit modulus (the divisor). If the remainder is large enough, the result is incremented by one unit, which is generally executed in RNS format, after the value has been normalized.

Binary Conversions

In many applications, utilizing the ALU or CPU of the present invention requires converting binary data to RNS format, and converting RNS data back to binary. Converting to and from a fixed radix system, such as binary or decimal, is required for many common activities, such as plotting results on a graphics display. In the case of encryption and decryption, conversion of binary may be required due to formula rules and other standards.

Conversion from binary to RNS and RNS back to binary has often been an impediment in the prior art, despite the many variations of proposed methods. For example, if the time and cost to perform conversions is greater than the benefit derived by an RNS ALU, there is little or no reason to use the ALU. Therefore, expedient and efficient conversion is not only important, but critical to the usefulness of the ALU of the present invention.

In the prior art, the problem of integer conversion is discussed, however, new and unique to the present invention are methods and apparatus to convert fractional quantities to and from the RNS ALU. For example, a fixed point binary quantity can be converted into a fixed point RNS quantity and an RNS fixed point quantity can be converted back to a binary fixed point quantity. This procedure can be extended to handle floating point binary conversions by normalizing the floating point value appropriately before conversion.

Despite the many proposed methods, what is needed is a fast, adaptive, extensible, flexible and coherent approach to high speed conversion. The conversion method should not rely on specific modulus for example. Additionally, the conversion should scale to any number of digits in a linear fashion. The conversion apparatus should integrate well into the ALU architecture, providing a means to extend the ALU. Finally, the conversion apparatus should be fast and practical, and provide avenues for continued improvement in high speed systems.

The methods and apparatus of the present invention provide these needed features and enhancements in addition to providing conversion for fractional quantities and integers, as well as representations of combined fractional and whole integer quantities.

Integer Binary to RNS Conversion

Figure 19A:
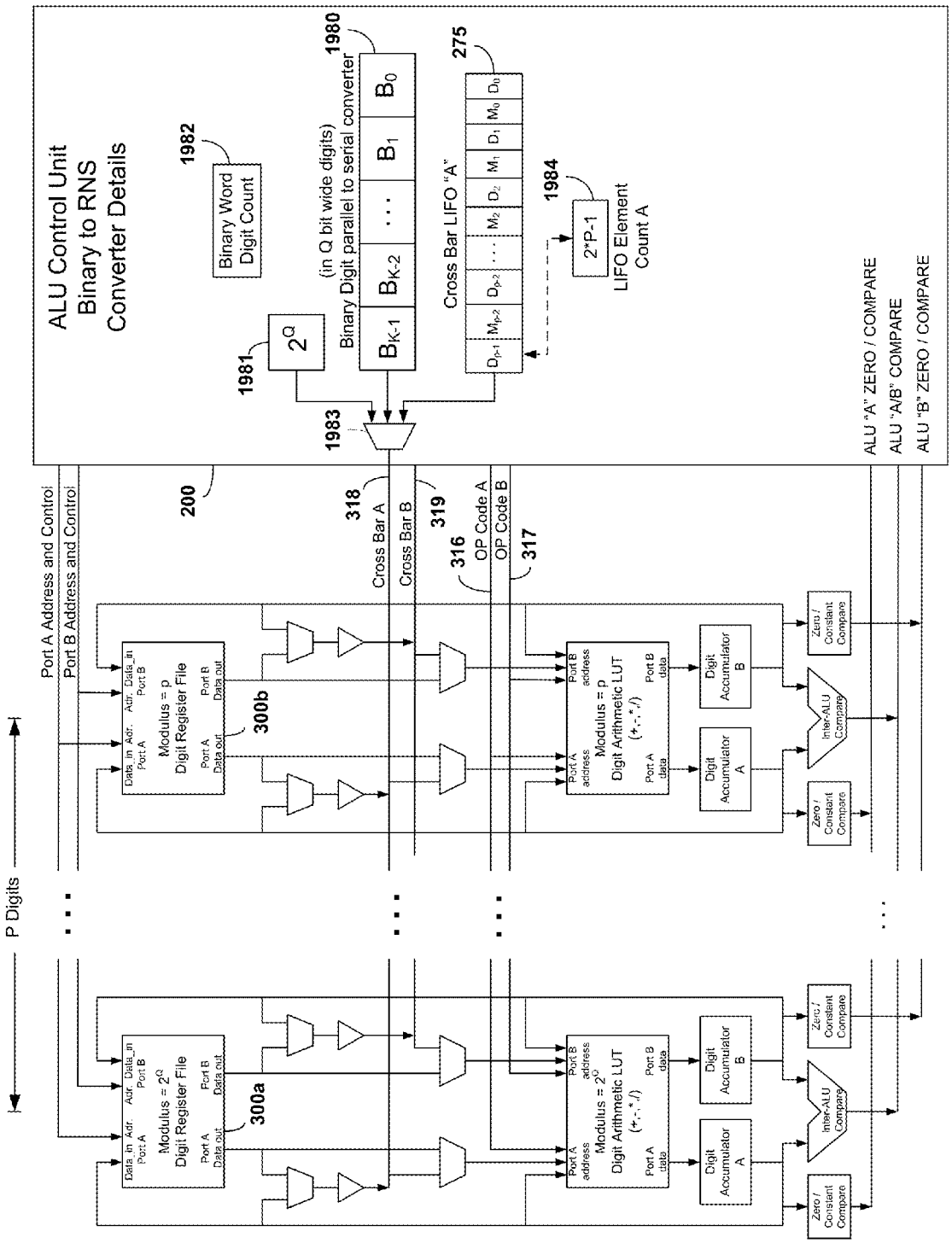
FIG. 19A is a block diagram illustrating exemplary binary to RNS conversion.

Converting integers from binary to RNS is the most straightforward conversion. In one embodiment of the present invention, the ALU utilizes a parallel to serial digit converter 1980 as illustrated in FIG. 19A. The parallel to serial digit converter accepts a binary word, B, and partitions the binary word into Q bit binary digits, such as digit $B_0$ through $B_{K-1}$. The ALU control unit 200, or converter control unit 200 of FIG. 19A, transfers the binary word, digit by digit, to the crossbar bus 318 in the case of ALU A via selector 1983. (Note that a similar circuit and apparatus may exist for ALU B, or any other.) Binary digits may also be sourced from other storage, such as the register file 300. However, this disclosure will focus on the use of parallel to serial digit converter 1980. Adaptation of the conversion routine to accommodate other sources for operands is straightforward.

In one embodiment, selector 1983 may also gate the value of the "binary power" of each individual binary digit B, as shown by $2^Q$ operand source 1981 in FIG. 19A. For example, if the width of binary digit B is Q bits, then the binary power of the digit is $2^Q$. In one embodiment, the value of $2^Q$ is encoded as the value zero, since the value $2^Q$ exceeds the width of a Q bit crossbar bus. Therefore, LUT 301 is encoded such that digit multiplication by zero for recomposing a binary value is actually multiplication $2^Q$ Mod p. Other sources exist for multiplication by the binary power $2^Q$; for example, the value of the binary power $2^Q$ may be stored in register file 300a, 300b and gated to the LUT directly, or gated via the crossbar bus. In another embodiment, multiplication by $2^Q$ is implied, and is accessed via a unique operation code.

Figure 19B:
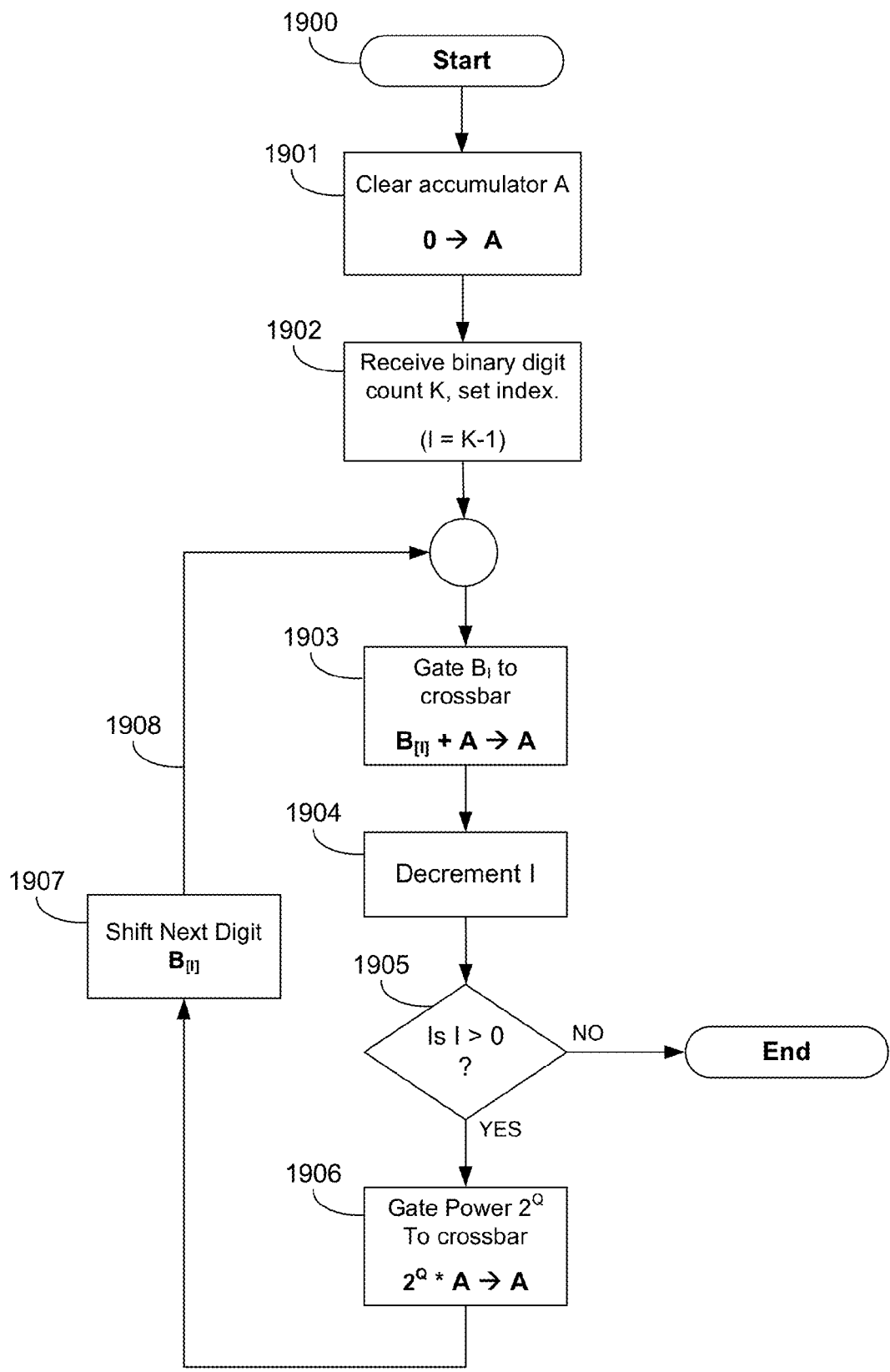
FIG. 19B is a flow diagram illustrating exemplary integer binary to RNS conversion.

The sequence for conversion of integer binary to integer RNS is composed of a series of RNS digit additions and multiplications by $2^Q$. FIG. 19B illustrates typical control flow for a conversion which starts with the most significant binary digit $B_{K-1}$ using the apparatus as depicted in FIG. 19A, and using ALU A.

In FIG. 19B, at start 1900 the control unit initializes the ALU by clearing the accumulator 1901 and receiving the binary digit count, K 1902. A control index I is generally initialized to reflect the digit count and position 1902. Next, the first digit $B_{K-1}$ is gated via selector 1983 to the crossbar bus 318 and is added to the accumulator A. In other words, digit value $B_{K-1}$ added modulo p to every digit of ALU A. Next, the control index, I, is decremented. The control unit next processes control decision 1905, which determines if the last binary digit has been converted.

If not, the selector 1983 of FIG. 19A selects the digit power value 1981 ($2^Q$) to be gated to the crossbar 318. The accumulator A is multiplied by the value of the digit power value 1981 as depicted at control step 1906. In the control step of 1907, the next binary digit is shifted to the front of the converter 1980. Control proceeds via loop path 1908 to process the next binary digit $B_{K-2}$ 1903. In other words, the parallel to serial digit converter 1980 shifts the previously processed digit out, and presents the new binary digit to crossbar bus 318. The flow defined by the repeat of loop 1908 and the start of loop 1903 continues until the last digit is finally added to the accumulator A and control index I goes to zero.

Fractional Binary to RNS Conversion

Converting from a fractional binary format into an RNS fractional format requires a more complex conversion process which must deal with the ratio of the fractional ranges of both number systems. The fractional range conversion may be performed digit by digit using RNS calculations within the RNS ALU. However, often times, these conversions are quite slow if they use integer divide or base extend in each iteration loop; such is the case when performing digit by digit conversion in software. Fortunately, the present invention introduces several hardware apparatus that assist in the conversions.

A fixed point binary number generally includes a number of bits to represent the fractional portion, and a number of bits to represent the whole integer portion. In one embodiment of the present invention, the fractional range of a binary number is converted separately from its integer portion. The integer portion is converted using the method just described, depicted in the flowchart of FIG. 19B. The fractional binary portion is first scaled using an apparatus similar to that of FIG. 20A. The apparatus of FIG. 20A performs the range scaling required when converting a binary fraction to an RNS fraction. After this process, a binary integer is produced which represents the fixed point RNS fraction; this binary value is then converted to RNS format using an integer conversion method, such as that of FIG. 19B.

Both the integer and fractional portions of a value may be converted together, but would require a larger conversion apparatus, and may require more steps; therefore, there are advantages to converting the fractional binary number in two stages, a fractional conversion stage, and an integer conversion stage. Once both quantities are converted, they are combined using the flowchart of FIG. 20B. In one embodiment, the integer conversion stage operates in parallel to the fractional conversion stage, thereby minimizing conversion time.

To understand the hardware conversion apparatus, it is helpful to review some basic conversion formula. Given an N bit binary number, n, representing a binary fraction less than one (1.0), and given an RNS number, r, representing an RNS fraction less than one (1.0) having fractional range $R_F$, we have equivalent fractions if:

$$n/2^N = r/R_F \qquad \text{(eq. 15)}$$

Therefore, the integer conversion of the binary fraction, n, to obtain the equivalent fraction, r, must be scaled according to:

$$r = (n\, R_F)/2^N \qquad \text{(eq. 16)}$$

Therefore, the fraction portion of a fixed point binary fraction is converted as an integer according to the integer conversion described earlier. Next, the value is scaled by the conversion factor $R_F/2^N$. The scaling may be performed using various methods. In one method, the integer division method of the present invention is used to divide the product ($n*R_F$) by $2^N$ directly. The constant $2^N$ may be stored in the register file and the integer division method is used to find r. One advantage of this approach is the integer division can operate on the entire word size of the ALU, achieving greatest conversion accuracy. The result is the fractional portion, r, of the RNS fixed point fraction, which can be added to the integer portion of the binary conversion using a conventional RNS add operation. The remainder of the integer divide may be compared to the appropriate constant to determine if a round up is required on the converted fractional result.

Figure 20A:
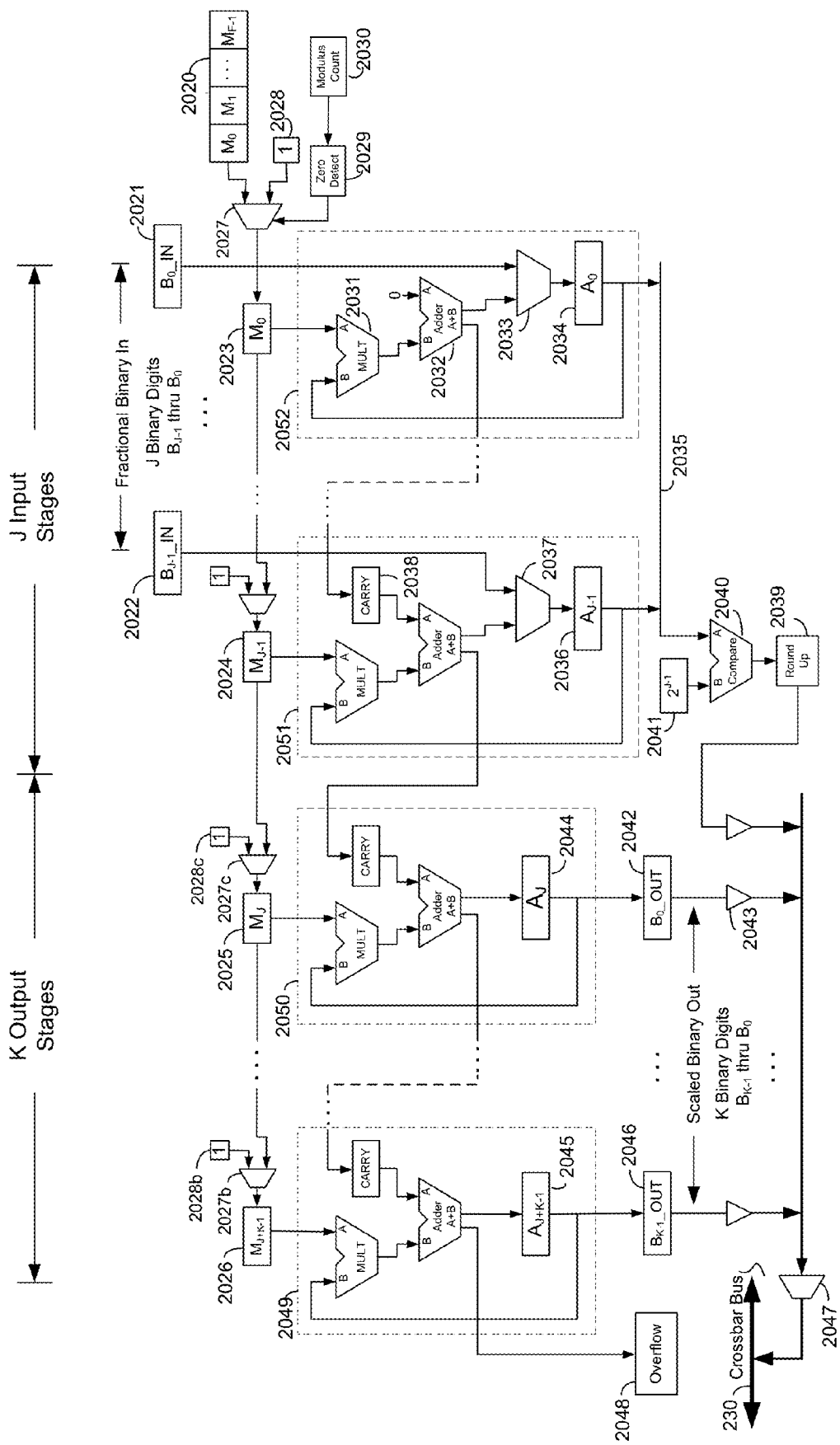
FIG. 20A is a block diagram illustrating an exemplary high speed fractional binary to RNS converter/pre-scale unit.
Figure 20B:
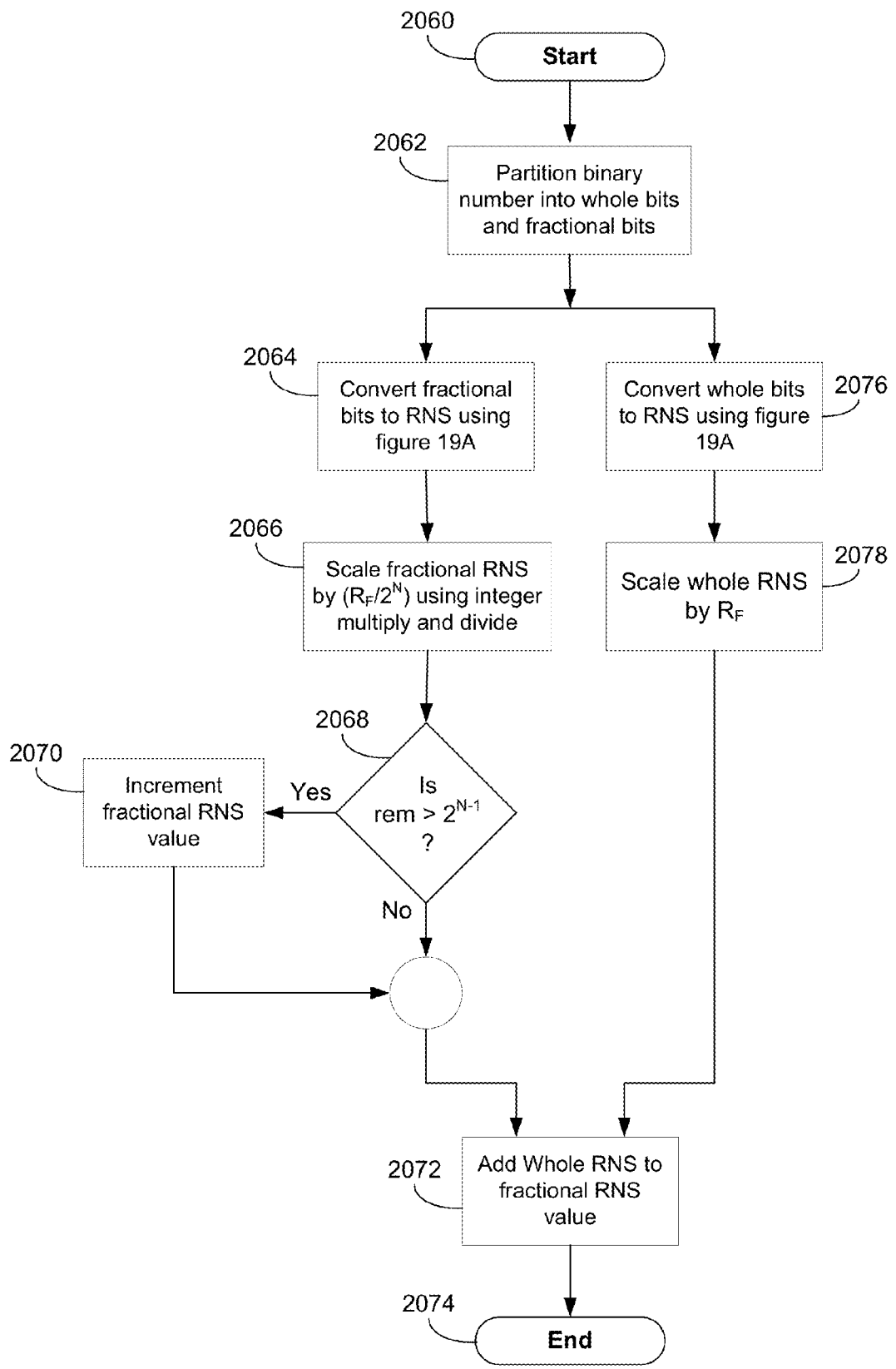
FIG. 20B is a flow diagram illustrating an exemplary conversion of fractional binary to fractional RNS.

In FIG. 20B, an original, fractional binary quantity is converted to RNS; the original binary data type consists of a whole part and a fractional part. In control step 2062, the fractional binary quantity is partitioned according to its fractional and whole quantity parts. The control flow for FIG. 20B illustrates a parallel path, with execution commencing in parallel at control blocks 2064 and 2076. At control block 2064, the control path for converting the fractional part begins. At control block 2076, the control block for the whole part conversion begins.

At control block 2064, the fractional bits that were partitioned from the original binary quantity are converted to RNS, forming an RNS fractional quantity. The conversion of the fractional bits are treated as an integer conversion, and may use the apparatus of FIG. 19A and the flowchart diagram of FIG. 19B to perform the conversion. The RNS quantity is then multiplied by an integer representing the fractional range $R_F$, where F is the number of fractional RNS digits; this process is very fast in RNS. Next, the RNS quantity is divided by the integer representing the value $2^N$, where N represents the number of fractional bits partitioned in 2062, or is otherwise associated with the binary fractional range. This process is relatively slow, since the integer divide method is a slow operation. The resulting integer quantity is now a properly scaled RNS fraction of F digits. The scaling operation can be performed using binary calculations, but it's generally assumed the RNS ALU has an advantage in terms of data width, and therefore processing power.

However, better accuracy can be obtained if a rounding function 2068, 2070 is employed. In control step 2068, the remainder of the integer divide is compared to half the binary fractional range, and if greater than, causes the RNS quantity to be incremented by one 2070. Other rounding functions are possible, and should be obvious to those familiar with floating point unit design techniques.

In control step 2076 of FIG. 20B, the process of converting the whole part of the original fractional quantity begins. Because the whole part of a fixed point, or floating point, format is an integer to begin with, conversion is similar to that discussed for high speed conversion of integers to RNS, such as apparatus of FIG. 19A and the control flow of FIG. 19B. In the final step of the conversion 2072 of FIG. 20B, the fractional RNS quantity is summed with the scaled integer portion. The scaled integer portion is formed by the product of the integer portion and the RNS fractional range $R_F$ 2078.

One drawback of using the integer divide method to perform the scaling of equation 16 is the slow execution time of the integer divide, even though only one divide is required per conversion.

Another technique for scaling by $R_F/2^N$ uses RNS fractional representation to represent the ratio, either directly as a stored constant, or as a sequence of multiplication by range $R_F$ followed by the reciprocal of $2^N$. This latter technique may also employ Goldschmidt division as disclosed in the section on fractional division. This technique is approximately linear with respect to RNS digits, and is also predictable in terms of termination. One potential disadvantage is less accuracy, since in most cases, the fractional apparatus will support less usable range than the integer division method of the present invention. Also, this latter method still requires a considerable number of ALU LUT cycles.

Figure 20C:
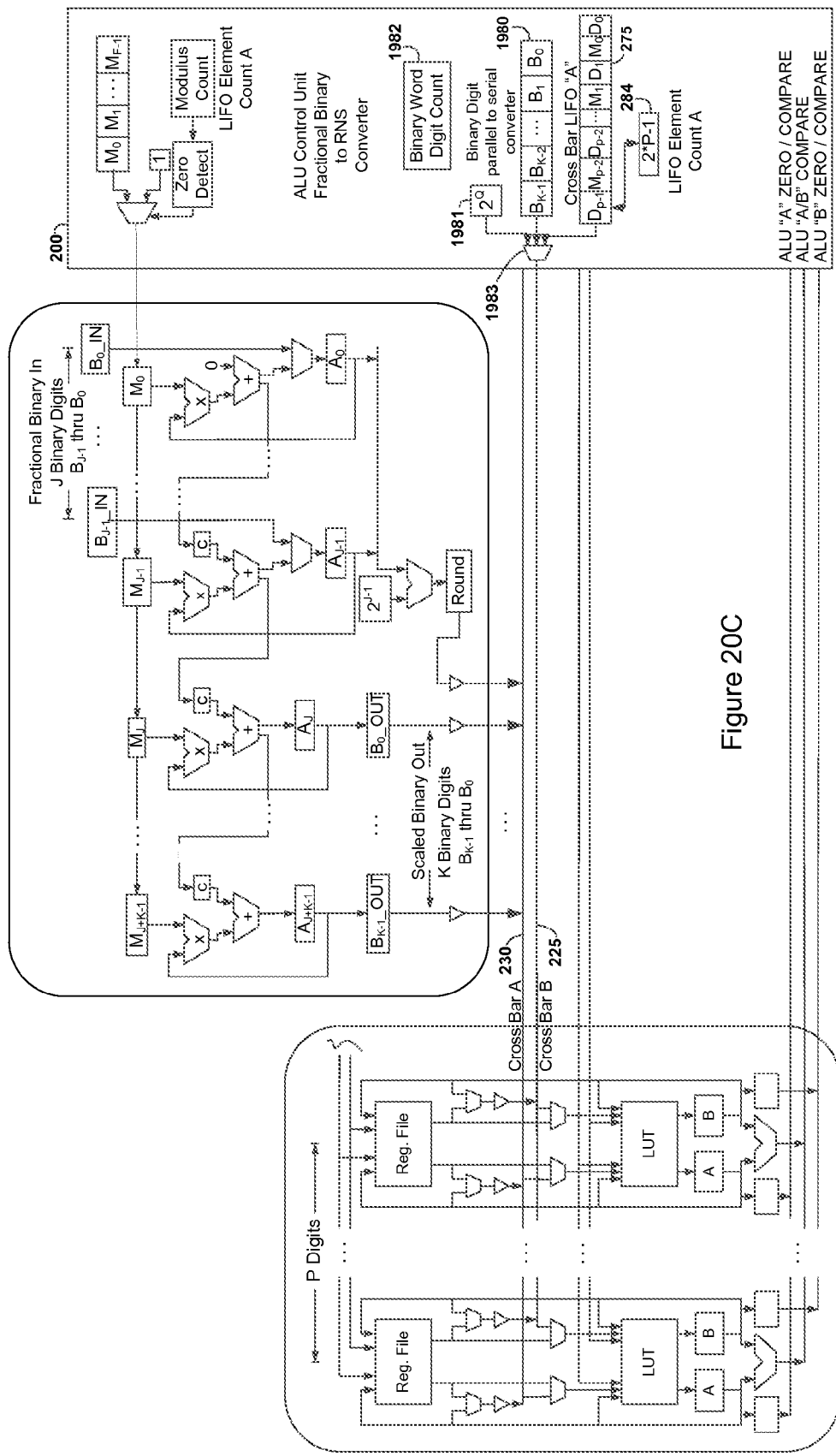
FIG. 20C is a block diagram illustrating an exemplary fractional binary to RNS pre-scale unit to RNS ALU.

In yet another embodiment, a new and unique hardware apparatus is disclosed in FIG. 20A which provides fast conversion of fractional binary values into fractional RNS values. The hardware structure of FIG. 20A is a parallel in, arithmetic shift, and parallel out ALU structure which accepts the binary number, n, and scales it to a new binary number, r, according to equation 16. The pre-scale unit of FIG. 20A may be connected to an RNS ALU as depicted in FIG. 20C via interconnections to crossbar bus 318. The arithmetic operation of the J+K stage structure is a multiply by the fractional RNS range $R_F$, followed by an integer divide by the binary fractional range $2^N$. (N=Q*J). In FIG. 20A, we denote the RNS fractional range as the product of F number of fractional RNS modulus $M_0$ through $M_{F-1}$ contained in shift register or LIFO structure 2020.

Figure 19C:
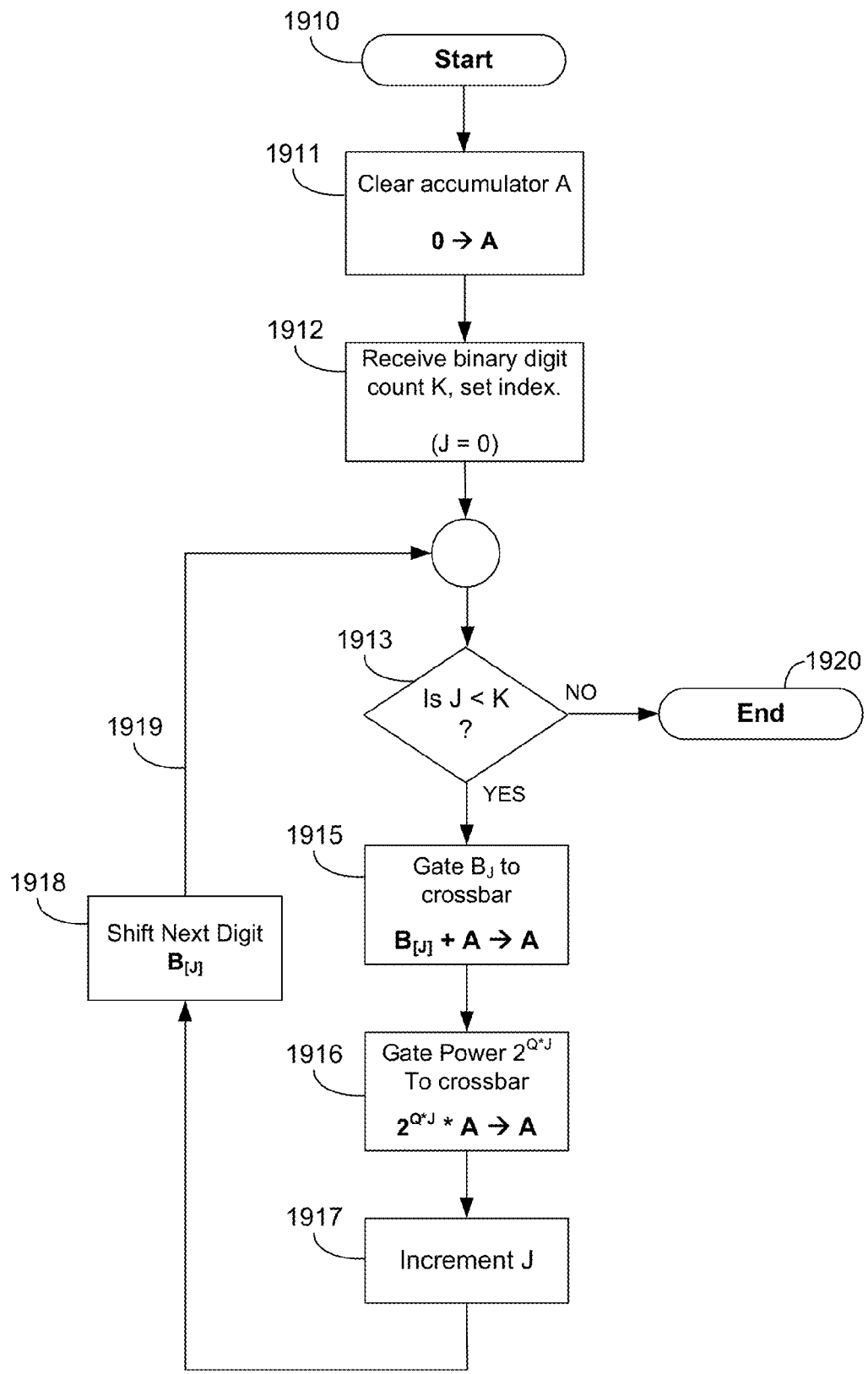
FIG. 19C is a flow diagram illustrating exemplary binary to RNS conversion least significant digit first.

In the embodiment of FIG. 20A, after J+K+F clocks, every digit of the converted output, r, is available at output digit registers $B_0$_OUT 2042 through $B_{K-1}$_OUT 2046. During fractional binary to fractional RNS conversion, the output of the pre-scale unit of FIG. 20A, such as binary digit register $B_0$_OUT 2042, is gated 2047 to the crossbar bus 318. The process of converting to RNS the new scaled binary integer, r, is then similar to flowchart of FIG. 19B or FIG. 19C with the LIFO of FIG. 19A replaced by digit gates 2043 and crossbar gate 2047. After this conversion, the value contained in the RNS ALU accumulator will be the converted fractional value in fixed point RNS format.

The conversion starts by clearing certain registers, while setting others. For example, each modulus digit shift register $M_0$ 2023 through $M_{J+K-1}$ 2026 is loaded with a value of one 2028, 2028b, 2028c via selectors such as 2027, 2027b, 2027c. The conversion also starts with clearing all carry holding registers, such as carry register 2038, and accumulator registers $A_J$ 2034 through $A_{J+K-1}$ 2045. Start of conversion may also include receiving the binary fraction value into the accumulator digits $A_0$ 2034 through $A_{J-1}$ 2036, from the J binary digits $B_0$_IN 2021 through $B_{J-1}$_IN 2022 respectively. The binary digits may be equal in width, such as Q bits wide, and may be the same bit width as the crossbar bus 318, although this is not a limitation.

Because binary representation is more efficient than RNS representation when using binary coded systems, the number of J stages is generally less than or equal to the number of F modulus, given that each fractional range is nearly equal, and Q equals the width of the RNS crossbar bus (i.e., both systems have same digit width).

On the first cycle of the conversion process, the operand shift register $M_0$ 2023 receives the first modulus $M_0$ from modulus shift register 2020 via selector 2027. (The order of mixed radix modulus contained in shift register 2020, is not important.) All other modulus registers, such as register $M_J$ 2025, receive the value from the previous modulus shift register $M_{J-1}$ 2024. Since at start, all modulus shift registers contain a one, on the first cycle, modulus shift registers $M_1$ through $M_{J+K-1}$ will contain one.

In the next clock cycle, the accumulator A0 latches the product of the first modulus $M_0$ with itself, and the next carry stage 2038 latches the result of the first stage 2052 carry value. There is no carry in for the first ALU stage 2052, so the adder 2032 of the first stage is not technically needed in the circuit. In terms of FIG. 20A, the adder 2032 always adds a value of zero, diverting the most significant digit from the multiplier 2031 to the next stage carry latch 2038, and the least significant digit to the accumulator $A_0$ 2034. All other accumulators latch the same value they contain in the prior cycle. The operand shift registers shift the modulus values to the next stages, in a shift register like fashion. The first operand shift register 2023 is loaded with the next modulus $M_1$.

For each successive clock cycle, a value is latched into each digit accumulator A. Carry values, if they exist, propagate to each successive stage on each clock cycle. Modulus values contained in operand shift registers propagate to the left in FIG. 20A, such as the value of operand register 2024 propagating to operand register 2025. After F clocks, the last modulus value contained in shift register 2020 is shifted, and count register 2030 decrements to zero. This triggers zero detect 2029 to gate a value of one to operand register $M_0$ 2023. At this point, successive clocks will begin to propagate a one value through operand shift register $M_0$ 2023.

After J+K+F clocks, the operand register $M_{J+K-1}$ contains a one. If all carry stages contain a value of zero, the conversion is complete. If not, additional clock cycles are required until all carry registers are zero, at which point the conversion will be complete. The conversion result is contained in accumulator digits $A_J$ 2044 through $A_{J+K-1}$ 2045, which can be latched to holding registers $B_0$_OUT 2042 to $B_{K-1}$_OUT 2046 respectively. At this stage, the holding registers contain the binary equivalent of the fractional value, (r), of equation 16.

Next, the binary equivalent of the fractional value (r), contained in the holding registers, is converted to RNS. Each digit stage of the holding registers $B_0$_OUT 2042 through $B_{K-1}$_OUT 2046 is gated to the crossbar bus 318 via selector 2047. The gating of each digit is used to convert the binary result to an RNS integer, which once converted, is treated as an RNS fractional value.

Another value that may be transmitted to the RNS ALU is the rounding bit 2039. The rounding bit 2039 is calculated when the values of the digits $A_0$ 2034 through $A_{J-1}$ 2036 are stable and valid. In one embodiment, the rounding bit is set when the value of digits $A_0$ through $A_{J-1}$ are equal to or greater than half the binary fractional range 2041. If set, the RNS ALU increments the converted result, thereby performing a round up operation. The round up bit may also be injected into the carry of digit stage 2050 at the appropriate time, which is determined once after the discarded digits $A_0$ through $A_{J-1}$ are valid. In some implementations, an overflow register 2048 is used to latch any non-zero overflow value.

Fractional Binary to RNS Conversion Example

Figure 20D:
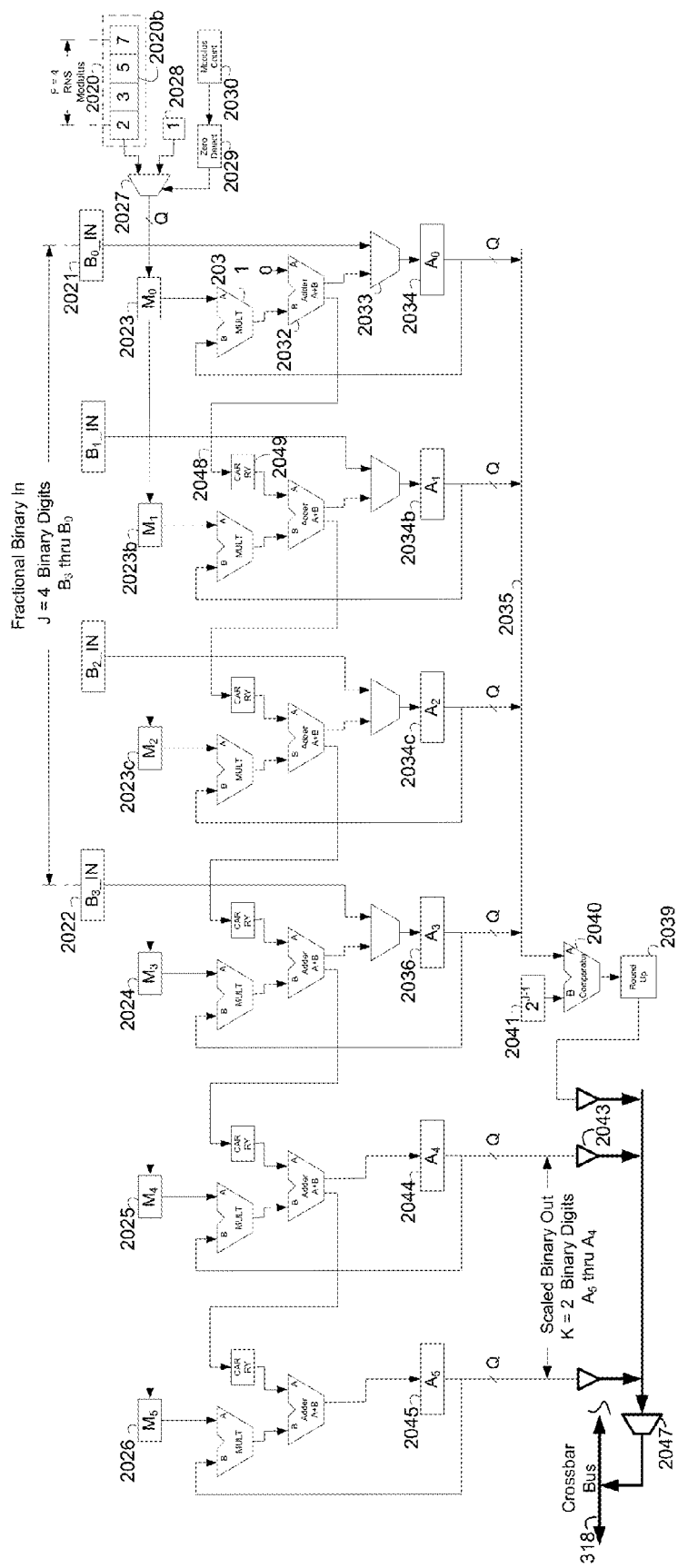
FIG. 20D is a block diagram illustrating an exemplary 4 digit to 2 digit binary to RNS pre-scale unit.

The scaling structure of FIG. 20A operates on values in parallel, which makes flowcharting its operation difficult. As an alternative, an example apparatus, depicted in FIG. 20D, is provided with an example problem, and charted using a waveform diagram of FIG. 20E. The example apparatus supports a binary digit width of four, or Q=4, i.e., a single hexadecimal digit. The example apparatus supports a four digit input $B_0$_IN 2021 through $B_3$_IN 2022. The output is only two digits in this example, directly tapped from accumulators $A_4$ 2044 and $A_5$ 2045. The number of RNS modulus contained in the modulus digit shift register 2020 is four, or F=4.

In FIG. 20E, an example conversion is shown as hexadecimal values plotted over waveforms. The position of the waveform relative to the cycle interval illustrates how values propagate through the apparatus of FIG. 20D. Referring to FIG. 20E, the state of the first modulus operand register, $M_0$ 2023, is shown 2080. Additionally, the state values for operand register $M_1$ 2023b, $M_2$ 2023c, and $M_3$ 2024 are shown in waveforms 2081, 2082, and 2083 respectively. Operand registers $M_4$ and $M_5$ are not shown, but may be readily deduced. The state value for the digit accumulator $A_0$ 2034 is shown in waveform 2084. The state value for the next digit accumulator, $A_1$ 2034b, is shown in waveform 2086. The carry in stage feeding digit accumulator $A_1$, $C_1$, is shown in waveform 2085. Likewise, the remaining carry in and digit accumulator registers are illustrated in waveforms 2087 through 2094.

At cycle 0 of FIG. 20E, all operand registers $M_0$ 2023 through $M_3$ 2022 are loaded with a one value, and all carry registers are cleared. The binary input value to the scaling unit is $5555_{16}$ and is latched in A0 through A3, as depicted in cycle 0 of waveforms 2084, 2086, 2088, and 2090. The accumulators $A_4$ 2092 through $A_5$ 2094, where the converted result will ultimately reside, are cleared. In our example, the value of $5555_{16}$ represents a simple unsigned fractional value of $0.3333_{10}$, since $5555_{16}/10000_{16} = 0.333328_{10}$.

At cycle 1, the operand register $M_0$ 2023 is loaded with the first residue modulus, a value of two, from the modulus shift register 2020 of FIG. 20D. At cycle 2, the modulus value in operand register $M_0$ is shifted to the next operand register, $M_1$ 2023b, while the next residue modulus, a value of three, is shifted into $M_0$. In each new clock cycle, it can be seen that residue modulus values propagate from one modulus register to the next. Also, each operand value is multiplied by its respective digit accumulator, and the result added to the contents of the carry in register. A new carry value, such as carry 2048, may be generated as a result of the multiply and addition. This value is propagated to the carry-in register 2049 of the next stage, and latched on the next clock cycle. All digit stages process in parallel, handing a carry value off to the next stage, and shifting the modulus values to the left, on each clock cycle By cycle 5, the first digit accumulator, $A_0$, is stable, and has a hexadecimal value of 0xA. By cycle 9, all digit accumulators $A_0$ through $A_5$ are stable, since carry registers are all zero, and all modulus operand registers, $M_X$, contain a one value.

The scaled result is contained in $A_4$ and $A_5$, which in our example is hexadecimal 0x45. Also, since the value in digit accumulators $A_0$ through $A_3$ is 0xFFBA, which is greater than 0x8000, the round up bit 2039 (=1) is generated via comparator 2040. Therefore, after conversion of the scaled binary, the RNS ALU will receive the value of 0x45, and add one, which is 0x46=$70_{10}$. Therefore, the RNS ALU, which has a fractional range of $210_{10}$, now contains the fractional value of 70/210=0.3333, or exactly ⅓ in this RNS system. In this particular example, a close approximation of the value ⅓ in binary was converted and correctly mapped it to the exact value of ⅓ in the RNS system.

In the case of converting binary floating point numbers into RNS fixed point values, or RNS sliding point values, the floating point number must be appropriately normalized, and must be a value that can be explicitly represented by the RNS ALU. However, once normalized, the floating point conversion works similar to that of the fixed point binary to RNS fraction conversion but is not described here further.

Integer RNS to Binary Conversion

Converting RNS results back into binary is more troublesome, and more complex than forward conversion. One reason has to do with the property of residue arithmetic. That is, it is relatively easy to convert a binary number to RNS, as one may truncate, or sub-divide, the weighted binary system and convert each chunk of data using modulo arithmetic, i.e., without carry. On the other hand, it is more difficult to convert an RNS number back to a binary number, since one must sub-divide a residue number, and convert each data chunk back to binary, i.e., with carry. In consideration of this, if the process of converting arithmetic results back to binary cannot offset the effects of binary carry, then there may be less reason to convert to and use RNS to begin with.

The method of the present invention introduces a novel and unique hardware apparatus that not only minimizes the effect of binary carry during reverse conversion, but effectively eliminates it, for any bit width conversion. The conversion is linear with respect to RNS digits, given our standard assumptions, and assuming crossbar bus sized operands can be processed in constant time. This assumption is essentially true in practice, since there is only a small difference in adding and multiplying 8 bit operands versus 10 or 11 bit operands, for example. Given this assumption, the conversion time exhibits approximately O(n)=n/log(P) behavior in terms of effective binary bits, n, versus RNS digits P.

Figure 21A:
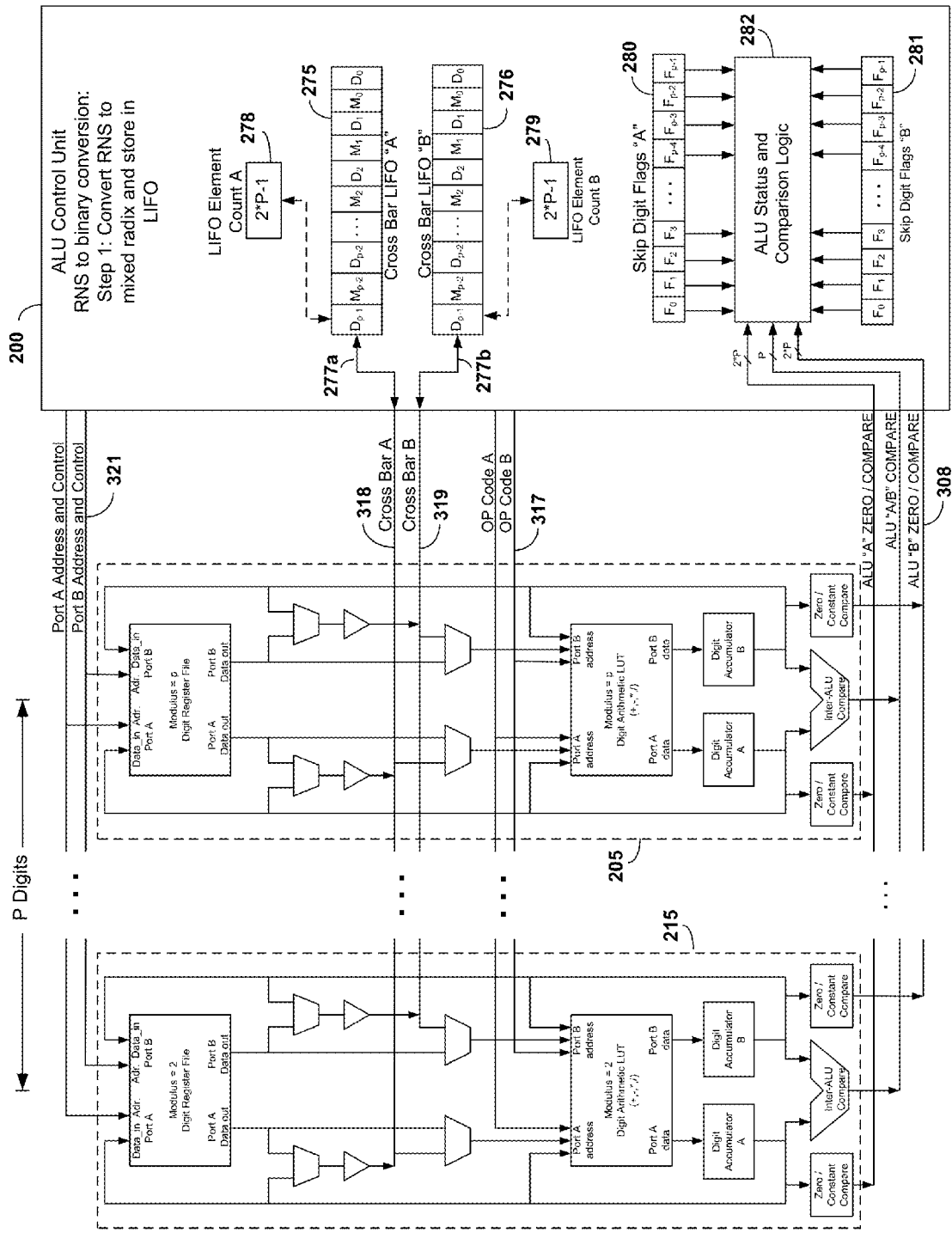
FIG. 21A is a block diagram illustrating an exemplary apparatus for converting an RNS number to mixed radix format in preparation for conversion to binary.
Figure 21B:
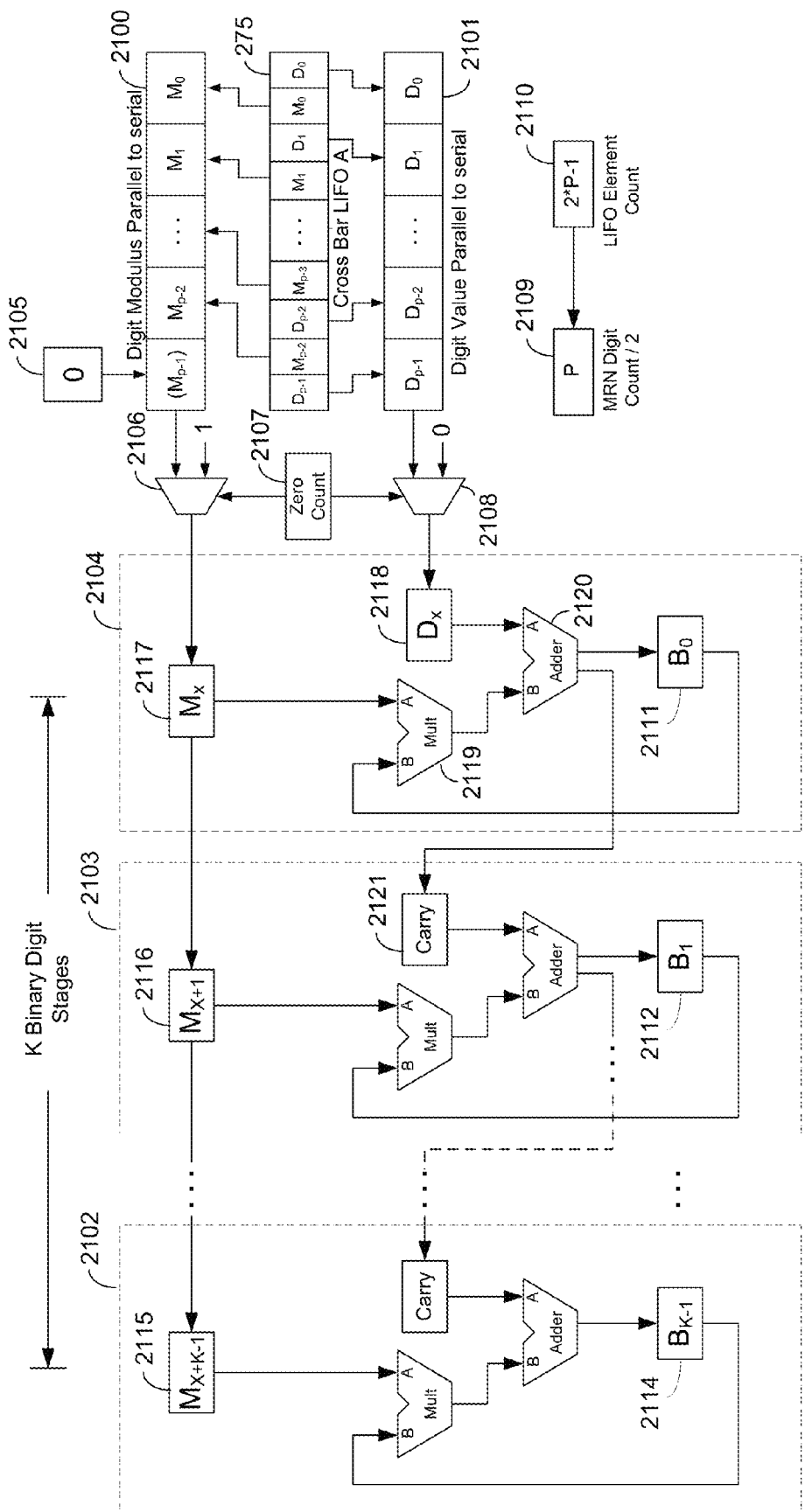
FIG. 21B is a block diagram illustrating an exemplary high speed mixed radix to binary converter.

In the present method, the RNS integer to binary conversion requires the RNS number to be converted to a mixed radix number first, using apparatus previously described, such as FIG. 21A, and RNS to mixed radix conversion control methods previously described, such as in FIG. 7A. After the RNS result is converted to mixed radix format, and stored in the LIFO 275 of FIG. 21A, the apparatus of FIG. 21B illustrates how the mixed radix digits and modulus values are then converted to binary.

FIG. 21B illustrates novel hardware apparatus for high speed conversion of mixed radix integers to binary integers. One common element in FIG. 21B is the crossbar LIFO 275, which was introduced in the topic of RNS to mixed radix conversion. Other unique features are K number of binary digit ALU stages, such as the first ALU stage 2104, each ALU stage feeding a binary digit accumulator, such as binary digit accumulator $B_0$ 2111. Each binary digit may be a fixed width, such as width=Q, but this is not a limitation. In one embodiment, the digit width Q is set equal to the crossbar data width.

As seen in FIG. 21B, after RNS to mixed radix conversion is completed, the crossbar LIFO A 275 contains the values of mixed radix digits, such as $D_{P-1}$, as well as the digit modulus (power), such as $M_{P-1}$. Digit values are latched to parallel to serial digit converter 2101, while modulus values are latched to parallel to serial converter 2100. During that time, a zero value 2105 is latched to the front of the modulus parallel to serial converter 2100. The reason is the number of modulus values are less by one than digit values, and the starting seed for the conversion process is a modulus with a zero value. Selector 2106 selects the first modulus (=0) at the first conversion cycle. Selector 2108 selects the first digit value from the front of parallel to serial converter 2101.

In the remaining cycles of the conversion process, the mixed radix digits are recomposed, not to RNS, but to binary. In the first binary arithmetic cycle, a zero value is clocked into stage 0 modulus operand register 2117 and the first mixed radix digit (the last to be converted during RNS to MRN conversion) $D_{P-1}$, is latched into stage 0 additive operand register 2118. Since the first modulus is zero, the result of binary multiplier 2119 is zero, and therefore the result of binary adder 2120 is identical to the stage 0 digit value (additive) register 2118. During the first arithmetic cycle, the parallel to serial registers 2100 and 2101 shift the previous values out, and gate the next digit value and digit modulus for latching by registers 2118 and 2117 respectively. In our example, the modulus $M_{P-2}$ is gated through selector 2106 and the next digit value, $D_{P-2}$ is gated via selector 2108.

On the second clock cycle, the result of ALU cycle 0 is latched in $B_0$. Also, the previous zero stored in the stage 0 modulus operand register 2117 is latched to stage 1 modulus operand register 2116. Additionally, the carry out digit from adder 2120 is latched in the carry operand register 2121. At the same time, the next digit $D_{P-2}$ is latched into the digit operand register 2118, and the associated modulus $M_{P-2}$ is latched to the stage 0 modulus operand register 2117.

After some combinatorial logic delay, the multiplier of stage 1 is now zero, and its adder essentially outputs the carry 2121 value to register accumulator $B_1$ 2112. The multiplier 2119 of stage 0 outputs the product of the new modulus $M_{P-2}$ and the previous latched value of $B_0$ 2111, and this result is added to the new digit $D_{P-2}$ via adder 2120.

On the third clock cycle, the result of adder 2120 for ALU stage 0 is latched into binary digit accumulator $B_0$ 2111. Likewise, the result of adder of ALU stage one 2103 is latched into binary digit accumulator $B_1$ 2112. Likewise, the modulus value 2116 in stage one 2103 is latched into the successive stage modulus value register, $M_X$, and so one and so forth; the carry out of stage one is also latched in stage two 2103 ALU carry operand register 2121, and carry out stage of stage one 2103 is fed to the next stage carry operand register, and so on and so forth.

In FIG. 21B it becomes clear that as data is shifted across the K binary digit stages, the binary ALU stages 2104, 2103, 2102 work in parallel. The parallel operation of the cascaded stages is hereby described as a "digit brigade arithmetic logic unit". Each stage 2104 of the digit brigade ALU performs a multiplication and addition operation in the same clock period. The stages are cascaded, such that the results of the previous stage feed the operands of the digit ALU of the succeeding stage. Each succeeding stage is of a higher significance in terms of the binary weighted value, or power.

After P clocks, or a lesser number of clocks to empty the converter 2100, the zero count detect unit 2107 triggers selector 2106 to gate a value of one, and also signals selector 2108 to gate a value of zero. The reason for gating a one to the modulus operand register 2117 is to preserve the value of the binary digit accumulator $B_0$ once all modulus values have been introduced to stage zero 2104. In fact, as the value of one propagates to each successive modulus operand register, such as operand register 2116, the value of that digit is complete, and is preserved.

The reason for gating a value of zero to the digit value operand register 2118 is to preserve the value of the digit accumulator $B_0$ once all digit values are exhausted in converter 2101. Modulus and digit values loaded in converters 2100 and 2101 are exhausted together.

After P clocks, digit stages $B_0$ through $B_{K-1}$ begin to complete in sequence, as the modulus value propagating towards successive stages is one, and the carry value propagating to successive stages is zero.

After P+K clocks, all modulus values originally contained in parallel to serial register 2100 have been introduced to the K binary stages, and the results of each K stage have been completely propagated. At this point, the values contained in binary digit accumulators $B_0$ through $B_{K-1}$ contain the binary value of the original mixed radix value, which in turn is identical to the original converted RNS value. $B_0$ is the least significant binary digit, while $B_{K-1}$ is the most significant binary digit. If all binary digit stages are concatenated, the resulting sequence is the pure binary converted sequence, which is Q*K bits wide in FIG. 21B, and given the width of each binary digit is Q bits.

Mixed Radix to Binary Conversion Example

The control flow for the apparatus of FIG. 21B is complex, and is difficult to disclose using a control flow diagram. Instead, a waveform diagram of FIG. 21D is provided which discloses an example conversion. The example of FIG. 21D also uses the example apparatus of FIG. 21C. The example of FIG. 21D illustrates the conversion of the value one thousand (1000) from mixed radix to binary number format; the associated initial and final values are shown enclosed by dotted line 2153.

Figure 21C:
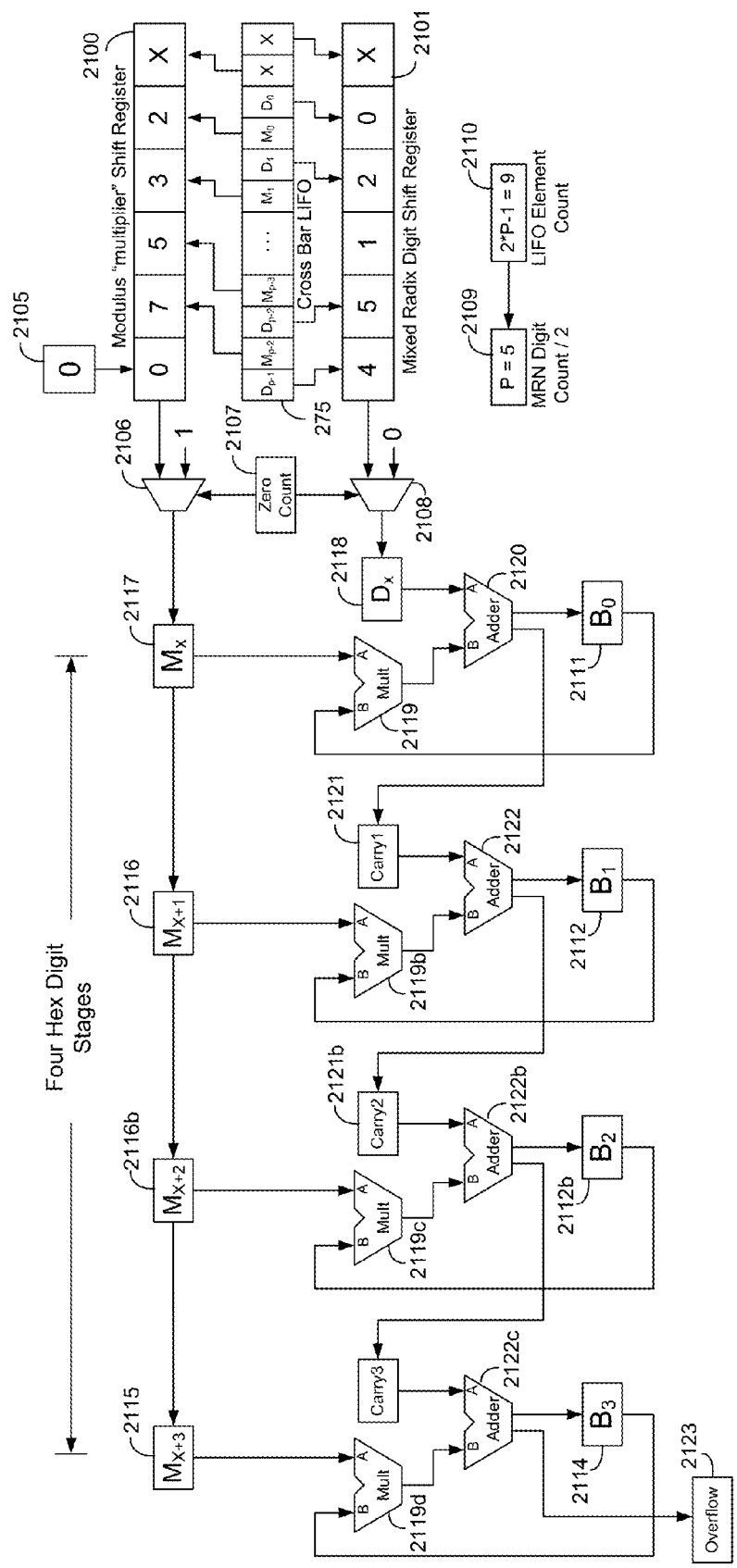
FIG. 21C is a block diagram illustrating an exemplary mixed radix to binary converter.

The apparatus configuration for the example of FIG. 21D is also provided as shown enclosed by dotted line 2153. Referring to FIG. 21C, the mixed radix value contained in LIFO 275 is converted to a binary value contained in binary digit registers $B_0$ 2111 through $B_3$ 2114. Each binary digit is 4 bits wide in our example, or Q=4. The overall output of the conversion is four hex digits, or K=4, which provides up to 16 bits of range. The conversion apparatus of FIG. 21C also includes provision to handle a mixed radix value of F=4 digits, the specific radix being {2, 3, 5, 7}. The total size of the conversion apparatus is described as supporting F+K stages, corresponding to a conversion clock requirement of approximately F+K clocks.

In FIG. 21D, the first waveform 2130 illustrates the values of the modulus register $M_X$ 2117 at each cycle, or clock, or the conversion. Clock cycles for the conversion of FIG. 21D are shown along the top of the waveform diagram, with starting cycle 0 on the left, and terminal cycle 8 on the right. Likewise, the value of modulus registers $M_{X+1}$ 2132, $M_{X+2}$ 2134, and $M_{X+3}$ 2136 are illustrated at each cycle of the conversion. Likewise, the values contained by other registers of apparatus FIG. 21C are shown during the example conversion of FIG. 21D.

At cycle 0 of FIG. 21D, the $M_X$ modulus register 2117 is loaded with the value of zero (0), while the digit operand register $D_X$ 2118 is loaded with the value of four (4). It can be seen from FIG. 21C that the modulus value of zero is sourced from the modulus shift register 2100, while the digit value of four is sourced from the digit shift register 2101. All other registers of FIG. 21C are either don't care, or are cleared in cycle 0.

At cycle 1 of the conversion of FIG. 21D, the modulus operand register $M_X$ 2130 is loaded with the value of seven (7), while the digit operand register $D_X$ 2138 is loaded with the value of five (5). Furthermore, as a result of the cycle transition, the B0 register 2140 is loaded with the value of four (4), which was propagated by the adder 2120 of the first converter stage. The carry-in of the second stage is zero as indicated at cycle 1 of signal C1 2142 since the carry out of the first stage was zero at cycle 0.

At each successive cycle of the waveform of FIG. 21D, the modulus values are propagated from one modulus register to the next, such as from modulus register $M_X$ 2117 to the modulus register $M_{X+1}$ 2116. Furthermore, carry values are propagated from the output of adders in each digit stage to the carry operand register of the next stage, such as carry out from adder 2120 to carry-in operand register 2121. At each successive cycle or clock, the values contained in each binary digit register $B_0$ 2111 through $B_3$ 2114 are processed, as shown in the waveform as binary digit values $B_0$ 2140, $B_1$ 2144, $B_2$ 2148 and $B_3$ 2152.

At cycle 8 of the waveform of FIG. 21D, the result of the conversion is stored in digit registers $B_0$ through $B_3$. In the example, the value of $1000_{10}$, represented in a mixed radix format as the value $45120_{MR}$, is converted to the value $03E8_{16}$ using the example apparatus of the FIG. 21C.

Fractional RNS to Binary Conversion

The conversion of fractional RNS to binary is important, since for general purpose processing, many results will include a fractional value. For RNS processing to be efficient, it must be possible to efficiently convert fractional RNS values back to binary fractions.

As was the case in forward conversion, reverse conversion of fractional values must rescale values from one fractional range to another. Manipulating equation 15, we get the reverse conversion ratio:

$$n = (r * 2^N)/R_F \qquad \text{(eq. 17)}$$

To convert, the RNS ALU must multiply the RNS fractional value by the binary fractional range $2^N$, then divide by the RNS fractional range $R_F$. The RNS ALU may efficiently perform the division by $R_F$, and is therefore best suited to perform this task. The RNS ALU may require an increased dynamic range, since a multiply by the fractional range $2^N$ is required. In one embodiment, the fraction and integer portion of a value is converted in two stages, thereby reducing the overall range requirement for equation 17. This is the method used by the control flow of FIG. 21E.

Figure 21E:
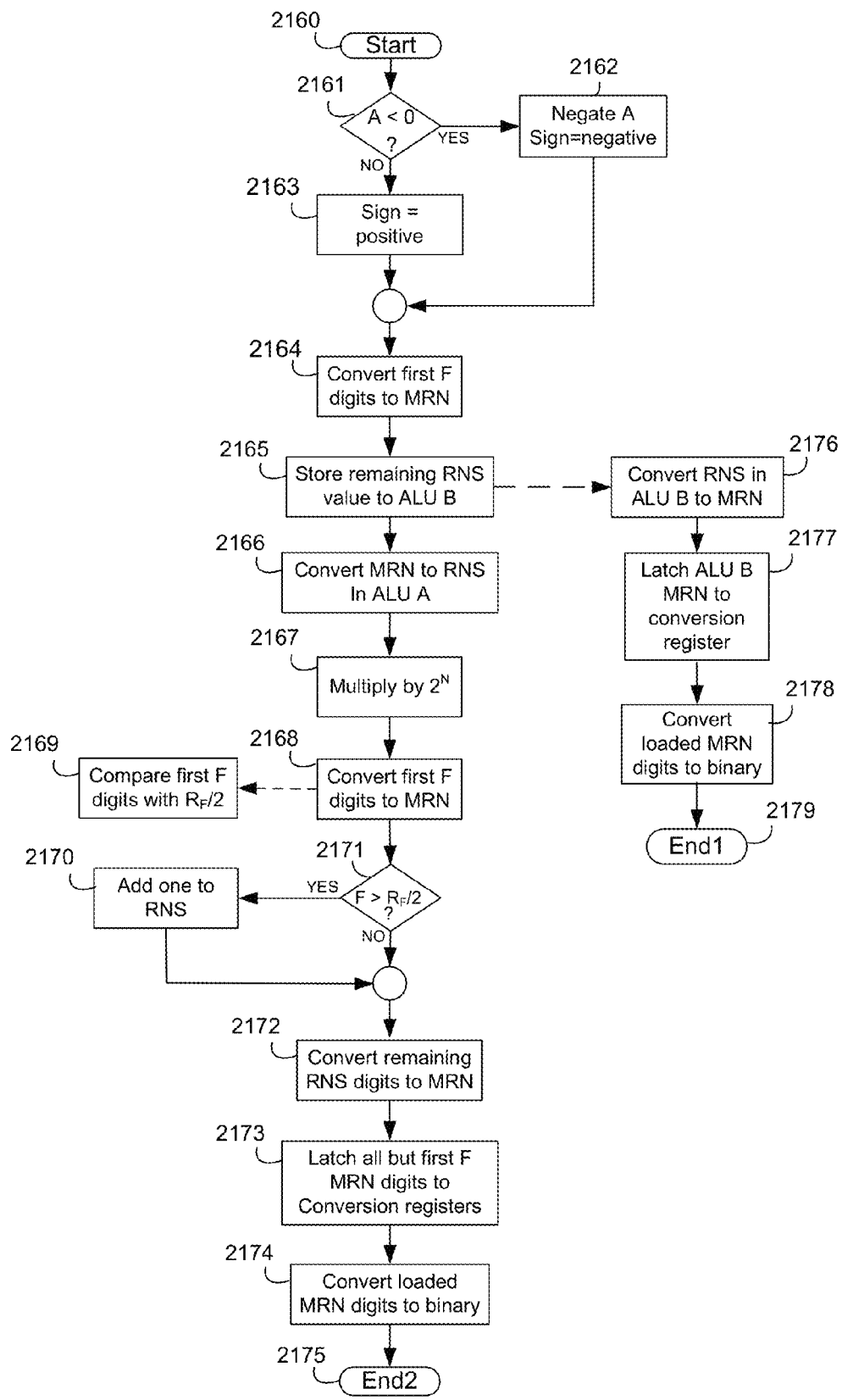
FIG. 21E is a flow diagram illustrating an exemplary fractional to binary conversion.

In FIG. 21E, a novel control method performs a conversion of fractional RNS to equivalent fractional binary using a modified mixed radix conversion procedure. FIG. 21E assumes an operand having both a fractional portion and a whole portion is converted. The particular variation of FIG. 21E handles positive value conversion, so the sign of the operand is checked in control decision 2161. If the operand is negative, the value is complemented, or negated, in control step 2162. The original sign, either positive or negative, is stored for later use. In this particular control flow, the operand is assumed to be sign extended in RNS.

In FIG. 21E, the fractional portion and whole portion of the RNS operand are separated. This process is represented in steps 2164 through 2166. During the MRN conversion of step 2164, the first F (fractional) digits are converted to mixed radix format. The mixed radix digits represents the fractional portion, and the remaining RNS value represents the whole digit portion. In the control step 2165, the remaining RNS value is transferred to another ALU, such as ALU B. The mixed radix digits generated in control step 2164 may reside on a LIFO, for example, and are recomposed into RNS in control step 2166.

At control step 2165, the control flow of FIG. 21E is shown to split into two sections. At the control step starting with 2176, a separate ALU may complete the conversion process of the whole portion of the value. At step 2166, another ALU may complete the conversion process of the fractional portion of the value. Alternatively, a single ALU may also be used to convert each fractional and whole partition of the RNS value into binary.

The process of converting the whole portion into binary is similar to the integer RNS to binary conversion process described in the figures of 21A and 21B. In FIG. 21E, the first control step 2176 starts the mixed radix conversion on the stored remaining RNS number using an apparatus similar to FIG. 21A. Next, in control step 2177, the mixed radix digit and modulus values are latched to digit shift register 2101 and modulus shift register 2100 respectively. The mixed radix equivalent of the remaining RNS value is converted to binary in the control step 2178 using an apparatus similar to FIG. 21B.

The process of converting the fractional RNS portion includes the process of scaling from the RNS fractional range to the binary fractional range. In FIG. 21E, the control step 2166 converts the equivalent fractional value stored in mixed radix format to RNS, using a control method similar to FIG. 8A. The fractional RNS portion is fully extended in step 2166. The fractional RNS value is multiplied by the binary fractional range $2^N$ 2167. The multiplication step of 2167 is integer type; the constant $2^N$ may be stored in any suitable means, such as register file 300.

In the step 2168 of FIG. 21E, the product of step 2167 is converted to mixed radix by a first F mixed radix digits. The initial F mixed radix digits are compared in sequence against half the fractional range to determine if a round up is to be performed. Afterwards, the initial F mixed radix digits (and their associated modulus values) may be discarded once a round up is determined.

The control step of 2169 indicates a parallel process of performing a round up determination, via a comparison against half the fractional range $R_F/2$. The comparison process is integrated into the mixed radix conversion process 2168 in one embodiment. Therefore, the mixed radix conversion 2168 may follow a pre-selected order of digit decomposition to facilitate both a conversion and comparison simultaneously. This novel feature was previously described in the section regarding constant compare registers, such as digit compare register 302b of FIG. 3E.

The determination of round up in step 2169, which may be processed in parallel to control step 2168, may influence control decision 2171. If a round up adjustment is needed, the remaining RNS value contained in the ALU is incremented by one unit 2170. The optionally adjusted remaining RNS number is converted to mixed radix in control step 2172. Using an apparatus similar to FIG. 21B, all but the first F least significant mixed radix digits are converted to binary, and in one embodiment is performed by latching all but the first F mixed radix digits and associated modulus values to the digit shift register 2101 and modulus shift register 2100 respectively 2173.

In control step 2174, the latched mixed radix values are converted to binary 2174 using an apparatus similar to FIG. 21B. The binary value generated in step 2174 represents a binary fractional quantity which is equal to, or approximately equal to, the original RNS fractional quantity. The process of concatenating the binary whole result of step 2178 with the binary fractional result of step 2174 is not shown, but can be accomplished using simple gating circuits.

In the one embodiment of the present invention, the conversion is performed on positive integers only. In this case, a sign bit is sent along with the converted result to indicate the sign of the number. In another or same embodiment, the RNS signed fractional value is converted to the equivalent two's complement (signed) binary fraction by emulating a two's complement arithmetic operation via the RNS ALU before conversion using the apparatus of FIG. 21B. In yet another embodiment of the present invention, if the converted result is negative, a special hardware unit performs a two's complement on the converted binary result as the conversion is taking place, least significant digit first.

Development of Rez-1

The methods and apparatus of the present invention may be formulated in many different ways. One such formulation is called Rez-1; details of Rez-1 are disclosed herein to further the understanding of the present invention. Rez-1 is designed as a research and scientific arithmetic logic unit which is capable of performing general purpose calculations using residue number arithmetic. The Rez-1 system is also designed to be scalable, allowing additional ALU digits to be added to the system.

In FIG. 22A the Rez-1 system is shown as a computer backplane 2202 with plug-in cards. The outer chassis, power supply, and Rez-1 control panel are not shown for clarity. The high-speed backplane 2202 supports a plurality of high density connectors, such as connector 2203, and also a plurality of plug-in cards, such as digit expansion card 2201, 2201b, 2201c and 2201d. Also supported is an RNS ALU control card 2200 which plugs into the backplane 2202.

Rez-1 RNS ALU Control Card

The RNS ALU control card 2200 may contain on-board memory for a specific number of digit ALUs; in addition, ALU digits may be expanded through the use of one or more digit group expansion card(s) 2201, 2201b, 2201c, 2201d. Different sized digit group cards may be designed and supported. For example, a digit group expansion card may support 32 RNS (dual) digit ALU's. Adding four such cards provides up to 128 RNS digits in addition to any digits supported on-board the RNS ALU controller card 2200. In this scenario, the Rez-1 system is a digit slice architecture allowing digit expansion in 32 digit groups.

Figure 22B:
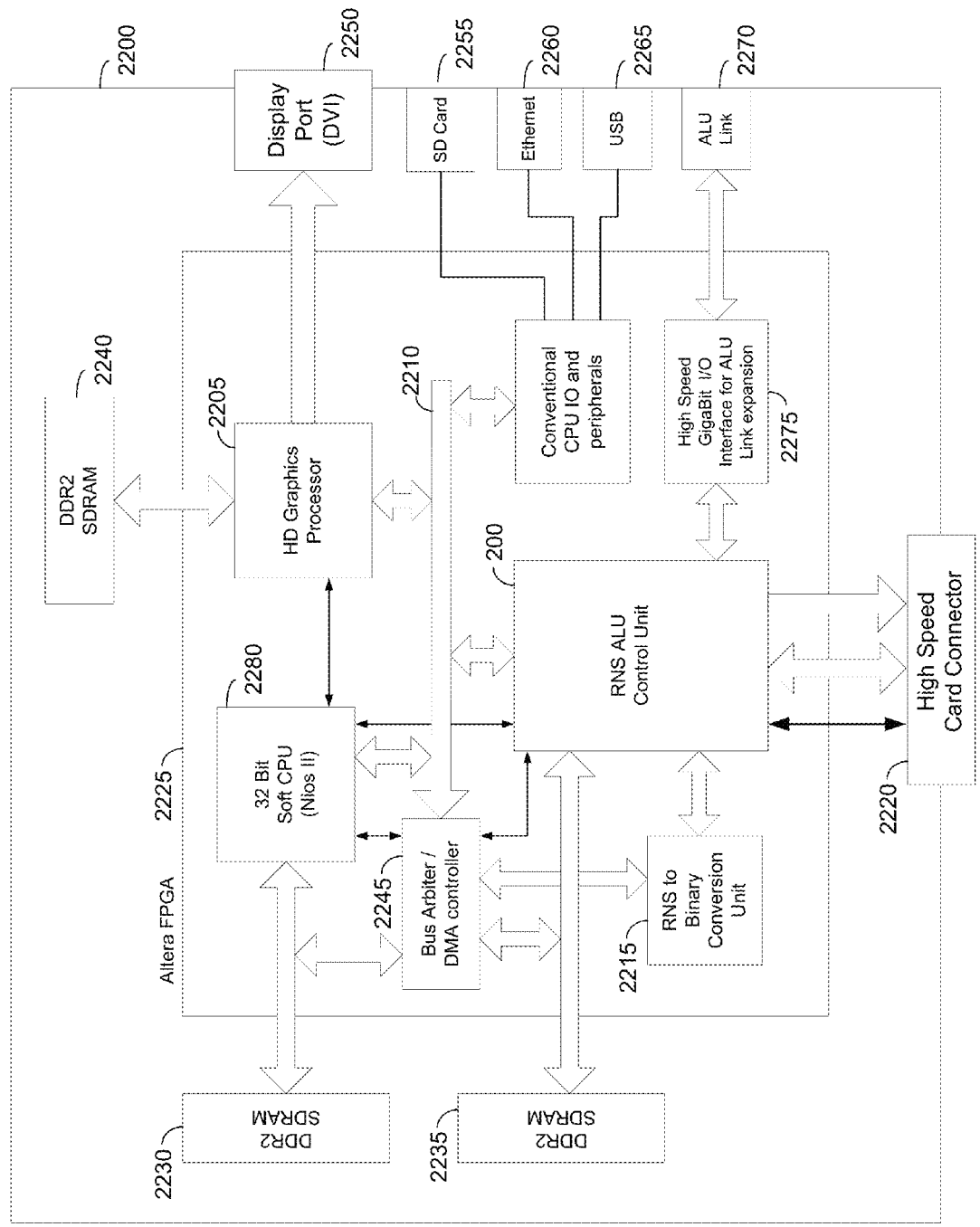
FIG. 22B is a block diagram illustrating an exemplary control card.

FIG. 22B illustrates certain specific details of the RNS ALU controller card 2200. The controller card 2200 is primarily constructed using a high density field programmable gate array (FPGA) 2225 coupled to several banks of SDRAM memory 2230, 2235, 2240. The FPGA 2225 is also coupled to a high speed, high density card connector 2220, which will communicate to other cards on the backplane 2202. FPGA 2225 is also connected to a series of peripheral and user interface connectors, such as a DVI display port 2250, SD card connector 2255, Ethernet port 2260, USB port 2265, and ALU Link port 2270 among others.

The use of FPGA's allows the RNS ALU to be easily altered and modified, as well as expanded and advanced. The FPGA provides significant electronic resources, referred to as fabric, used to integrate a host CPU 2280, DRAM memory controllers, and other high level peripheral components. In Rez-1, the controller card FPGA fabric is also used to provide an RNS ALU controller 200, and a hardware RNS to binary conversion unit 2215. A high performance controller card 2200 may be offered in more than one version; such versions may require one or more FPGA devices to accommodate all required structures.

In FIG. 22B, the RNS ALU controller card 2200 also integrates a conventional binary host CPU 2280, often referred to as a soft processor because it is implemented within an FPGA. For example, the FPGA used in Rez-1 is an Altera Cyclone IV series device, and the embedded soft CPU is the Altera NIOS-II 32 bit processor. The NIOS-II CPU executes software stored within SDRAM memory 2230. The binary CPU is used to drive common peripherals via an internal peripheral data bus 2210, such as a display processor 2205. For example, the host CPU can be programmed to plot the results of the RNS ALU on a high definition screen, through the integrated DVI display port 2250. The routines to perform peripheral service and control, as well as the routines to plot to the graphics screen are common and may be part of an existing standard, such as the Linux operating system with X-Windows GUI. Other types of operating systems and graphics systems may be used.

The FPGA 2225 fabric is used to provide an RNS ALU control block 200. The control block is interconnected via data bus to external SDRAM memory 2235. The external SDRAM memory 2235 may store RNS ALU instructions and data. A bus arbiter 2245 is used to coordinate transfers between the CPU data bus and the RNS ALU data buses. For example, the soft CPU 2280 may execute instructions from SDRAM 2230 while data is being transferred to the SDRAM memory 2230; the secondary transfer is performed using bus arbiter 2245 and a DMA channel performing a data move from RNS memory 2235.

The FPGA 2225 is also used to create an RNS to Binary hardware conversion unit 2215, consisting of structures similar to the mixed radix to binary conversion apparatus of FIG. 21B. The RNS to binary conversion unit is required to perform high speed conversion of the RNS ALU results to binary, for further processing by the host CPU 2280. For conversion of binary values to RNS values, a basic conversion unit as depicted by FIG. 19A is supported. Fractional binary values are converted to RNS using the integer divide method as opposed to dedicated scaling hardware, as depicted in FIG. 20A. Additional conversion cards (not shown) may also be supported. These cards provide additional hardware to perform such conversions, but are located off the main controller card 2200.

Rez-1 Digit Group Card

Figure 22C:
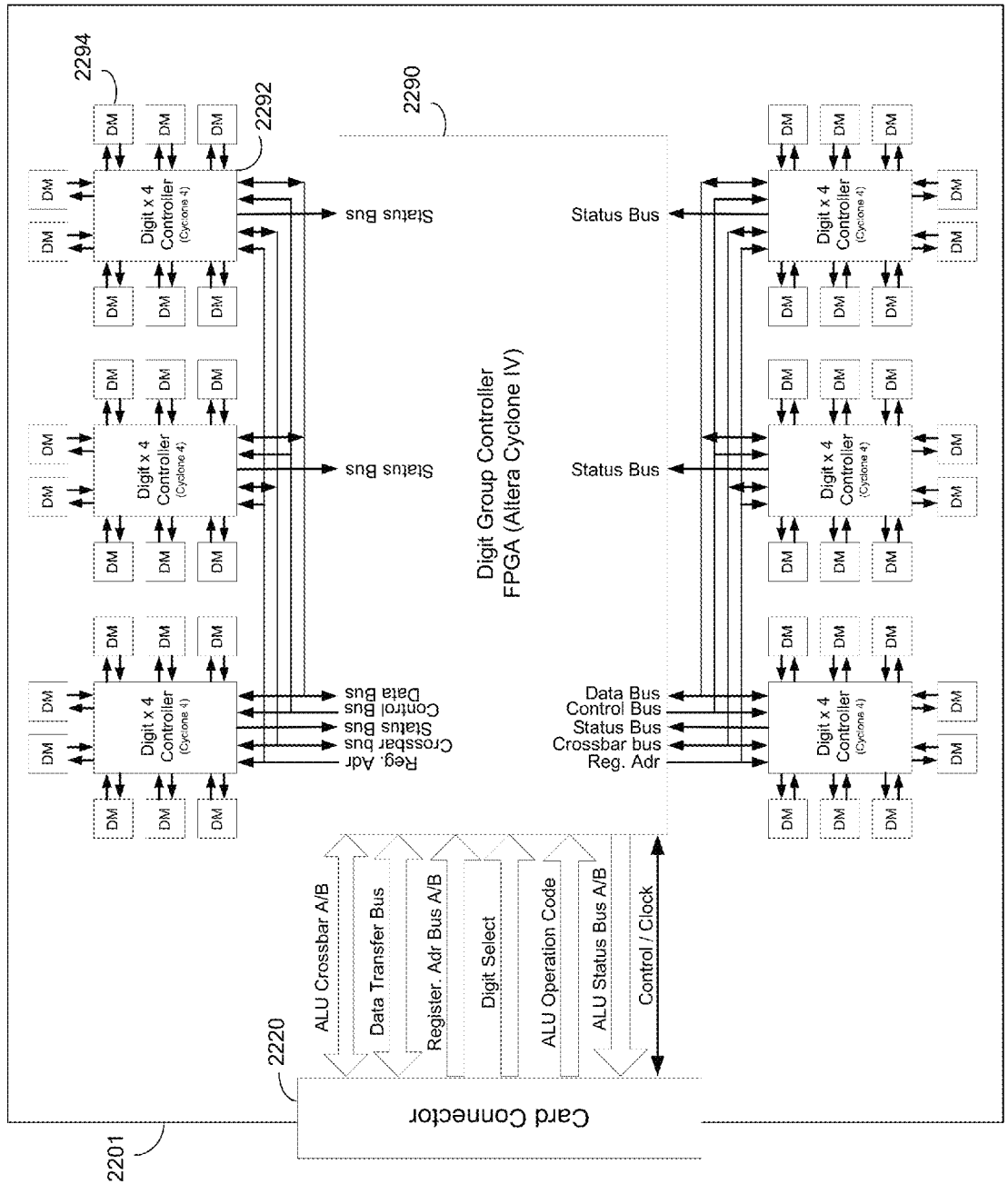
FIG. 22C is a block diagram illustrating an exemplary digit group card.

In FIG. 22C, a 24 digit expansion card 2201 block diagram is shown. The card expands the RNS ALU by another 24 RNS digits. The digit expansion card 2201 uses seven FPGA devices and 48 memory devices. The main FPGA device 2290 serves as a card digit controller and interfaces directly to the card connector 2220 and the high speed backplane bus 2202. The main FPGA 2290 controls six FPGA devices, such as device 2292, each FPGA device supporting 4 RNS digit ALUs. Each RNS ALU is provided two memory LUT ICs, labeled as digit memory DM, such as DM IC 2294. In one configuration, one DM LUT provides modulo (p) multiply LUT function, while the other provides a MODDIV LUT function. Addition and subtraction are performed in hardware using FPGA fabric in an approach similar to FIG. 3D. Therefore, a dual ALU architecture is supported, each ALU sharing a dual ported, fused arithmetic LUT, and each ALU sharing two common LUT memory ICs on alternate memory cycles.

Rez-1 Instruction Set Design

Developing and implementing a complete and practical ALU or CPU is a tedious and complex task. Aside from the core activities of designing and implementing hardware ALU and associated control circuitry is the task of designing an instruction set for the RNS ALU.

In Rez-1, the ability to perform complex arithmetic operations on very wide word data is the main strength of the RNS ALU. Performing general purpose activities, such as controlling I/O, or running graphical user interface algorithms is the task of the conventional 32 bit CPU 2280 shown in FIG. 22B.

Two instruction execution methodologies are provided for in the design of Rez-1. The simpler of the two is the addition of a special RNS ALU instruction set, added to the conventional binary CPU 2280 instruction set, to support control of the RNS ALU and its registers. The second method is to provide the RNS ALU with its own instruction execution unit, which allows the RNS ALU to execute instructions directly from SDRAM 2235 of FIG. 22B.

The second method of providing a separate instruction set is a superset of the RNS instruction set of the first method. Both methods require arithmetic processing instructions as well as arithmetic testing instructions. The main difference between the two is the implementation of separate branching and addressing modes for the second method. In the instructions to follow, it is assumed the instruction descriptions which follow may apply to both instruction and control methodologies of Rez-1.

Arithmetic Primitive Instructions

FIG. 22D illustrates a table of certain primitive instructions supported by an early version of Rez-1. Arithmetic primitives are forms of micro-code, since combinations of these primitive instructions make up a single, complete machine or assembly instruction, i.e., an instruction that may be used by an assembly programmer or a compiler, for instance.

In FIG. 22D, the first column lists the general category of the primitive instruction. For example, in the "Arithmetic primitives" category, the second instruction listed is a "SubD" instruction, which subtracts the value of the selected digit (Dig#) from the entire accumulator. This primitive is obviously useful for mixed radix conversion. Similarly, another arithmetic primitive, "ModdivM", divides the entire accumulator by the indicated digit modulus (Dig#). This primitive is also useful for mixed radix conversion. A high level mixed radix conversion instruction may contain a series of SubD and ModdivM primitive instructions.

In FIG. 22D, the next general category is the 'Power Digit Arithmetic primitives". These digit primitives operate on power based digits, and are included for completeness. In some embodiments, the need for separate power digit primitive instructions is eliminated by more general purpose operation within each digit function block, whether it is power based or not; however, some instructions for power based digits are still needed, as will be discussed later. The last primitive instruction listed in this category is the "ResPower" primitive instruction, which restores the power valid count to its normalized setting.

In the next category, "power Digit Arithmetic primitives (digit)", many power digit primitives have two operands, one is the selected digit position, the other is the intended power of the modulus. Some operands are not needed, as they are implicit. Primitives for the power based digit include many of the operations discussed for the power based digit, such as modulus truncation and decrementing the power of a modulus.

LIFO based primitives are illustrated in the following category of FIG. 22D. LIFO primitives may be operated in tandem with other primitives. For example, the act of subtracting a digit from the accumulator and pushing the digit value to the crossbar is facilitated by the SubPush instruction primitive. FIG. 22D also lists basic move and clear operations, needed to move data from one register to the accumulator, of from the accumulator to a particular register. The Move, Set and Clear instruction category also include the operations to set and clear skip flags associated to digits of the ALU.

More primitive to the instructions of FIG. 22D are the ALU operations listed in FIG. 22E. FIG. 22E is intended to describe some of the various control elements that may be under control of a primitive instruction, or standard ALU instruction. Many of these control operations may be performed simultaneously to create more complex operations, both for primitive instructions and high level instructions.

For example, in FIG. 22E in the category listed "LUT Select Function" are the four standard arithmetic LUT operations, ADD, SUBTRACT, MULTIPLY, and MODDIV. These operations are invoked to select the desired LUT function operation. In the category Digit Validation operations are the operations of setting and clearing skip digit flags. In the category of crossbar and selector operations are the various gating choices available to route operand data to the ALU LUT. In the Register File Read and Write Control category are the various operations allowing data to be selected from, or written to the register file 300. And finally, the last category, "Status Signals and flags", is test operations that return a result to the particular test inquiry. For example, a test if all RNS digits are zero can be made.

In FIG. 22E, an example of more typical assembly language type instructions are provided for the Rez-1 RNS ALU. The figure lists different instruction types, and the types of operands that are supported. For example, for the "Add" instruction of FIG. 22F, there are four combinations of operands that are valid. The Add instruction can handle adding an integer type to an integer type, a fixed fraction type to a similar fixed fraction type, a fixed fraction type to an integer type, and a sliding point type to a sliding point type (planned). Data types for other instructions are listed.

In FIG. 22E, instruction and operand types are shown, but the actual instruction mnemonics and data sources are not. Typical instruction mnemonics include an instruction designating the type of operand being handled, and a list of data source(s) and destination(s), such as a register source, and/or a memory location. In this way, the Rez-1 instruction set appears conventional in most respects.

In FIG. 22G, RNS ALU test instruction primitives are listed. These test primitives may be used to create higher level test and branch instructions (not shown). However, the test primitives provide insight into the functionality of the RNS ALU, and the similarities and differences that exist between it and a typical binary CPU. For example, the test primitives include a test to check if the accumulator is zero. This is also provided for in a typical binary CPU. One word based test instruction for the RNS ALU is a "AnyZero" test, which tests if any RNS digit is zero, this is unique to the RNS ALU, since the binary CPU generally has no need for such a primitive test. Some sign testing primitives are also unique, such as an instruction to test if the sign is valid.

It should be understood that many other instruction types and primitives may exist not disclosed herein. For example, there exist conversion instructions, and different forms of divide instructions. As noted earlier, there are branching instructions and addressing modes not contemplated herein. These subjects are well known to those familiar with binary CPU and architecture design.

Moreover, Rez-1 is based on re-programmable FPGA logic, which may be easily modified and reconfigured. It is anticipated that Rez-1 be advanced with more streamlined instructions sets as more research is complete. Additionally, Rez-1 is an extensible digit design, meaning additional digits may be added to the architecture to help perform problems requiring more resolution.

Rez-1 is the first general purpose RNS ALU of any kind; its instruction set is expected to evolve rapidly to meet the many needs of scientific and other number crunching applications.

Notes about Dual Accumulator Design:

The dual accumulator of the Rez-1 design is automatically handled by the high level instruction set provided to the user. This means the user need not concern themselves with the act of programming two ALU's. In Rez-1, some instructions, such as comparison, may use both ALU A and ALU B simultaneously, and automatically. In other cases, the RNS control unit 200 or other sub-controller decides when to take advantage of using both ALU's simultaneously. For example, the control unit may detect that two sequential instructions listed in the program may be operated in parallel without affecting the results. The Rez-1 ALU may elect to perform such optimization without user knowledge.

Theoretical Basics of RNS ALU Design

Selection of memory size and technology for digit memory DM 2294 affects the type of RNS ALU machine that may be built. Table 6 shows various memory requirements for a brute force LUT function approach for digit memory, such as DM 2294. The first column of Table 6 lists the operand width Q. This is an important measure, as it is generally the width of the crossbar bus 318, 319. Providing a specific width of Q bits of the operand dictates the largest prime modulus that may be represented, which in turn dictates the largest word size of RNS ALU, in terms of digits, that may be supported, which is shown in column 7 of Table 7.

TABLE 7

| Column 1 Operand width Q | Column 2 LUT address width | Column 3 LUT depth/Op | Column 4 Megabits (std) | Column 5 Memory technology | Column 6 Memory Speed | Column 7 Max. RNS digits |
|---|---|---|---|---|---|---|
| 8 bits | 16 bit LUT | 65,536 | 0.5 | 1M/4M SRAM | 18-100 Mhz | 54 |
| 9 bits | 18 bit LUT | 262,144 | 4 | 4M/8M/16M SRAM | 18-100 Mhz | 97 |
| 10 bits | 20 bit LUT | 1,048,576 | 16 | 16M/64M SRAM, PSRAM | 18-100 Mhz | 172 |
| 11 bits | 22 bit LUT | 4,194,304 | 64 | 64M/256M PSRAM, DDR | 166-250 Mhz | 309 |
| 12 bits | 24 bit LUT | 16,777,216 | 256 | 256M/1G DDR/DDR2 | 266-400 Mhz | 564 |
| 13 bits | 26 bit LUT | 67,108,864 | 1024 (1G) | 1G/2G/4G DDR3 | 533-933 Mhz | 1028 |
| 14 bits | 28 bit LUT | 268,435,456 | 4096 (4G) | 4G/8G DDR3 | 1066-1866 Mhz | 1900 |

TABLE 8

| Column 1 Operand width Q | Column 2 RNS digits | Column 3 Equivalent decimal digits | Column 4 Equivalent Binary Bits | Column 5 Fractional Decimal digits | Column 6 Fractional Binary Bits | Column 7 decimal/RNS digit ratio |
|---|---|---|---|---|---|---|
| 8 bits | 54 | 101 | 333 | 50 | 165 | 187% |
| 9 bits | 97 | 211 | 696 | 105 | 347 | 218% |
| 10 bits | 172 | 427 | 1409 | 213 | 703 | 248% |
| 11 bits | 309 | 862 | 2844 | 431 | 1422 | 279% |
| 12 bits | 564 | 1749 | 5771 | 874 | 2884 | 310% |
| 13 bits | 1028 | 3502 | 11556 | 1751 | 5778 | 310% |
| 14 bits | 1900 | 7059 | 23294 | 3529 | 11646 | 372% |

For example, an operand width of Q=8 bits provides a maximum RNS ALU of 54 digits. To accommodate a brute force LUT function, a LUT address width of 16 bits is required, so the amount of memory required is 64K bytes (maximum) per digit. If the operand size is allowed to occupy 9 bits, then an RNS ALU supporting up to 97 digits is possible. In this case, an eighteen bit LUT address requires 256K locations, each location storing a 9 bit value. It can be seen in Table 7 that as more digits are required, a larger LUT is required.

In Table 7 column 5, common memory technology sizes are listed in each row along with the maximum number of prime digits the LUT can support in column 6. For example, a 16 megabit static RAM chip is used in Rez-1 for the Digit Memory (DM) LUT, which allows for a maximum RNS ALU digit width of 172 digits. On the other hand, a one gigabit SDRAM IC can support an RNS ALU supporting up to 1900 digits. Curiously, the trend in memory technology has been that higher density comes with faster access speed. In previous sections, we have frequently assumed that memory LUT speed remains fixed, and looking at Table 7, column 6, this appears validated up to about 1900 RNS digits. Beyond this, memory LUT access speed will degrade as decoding circuitry is used to form larger memory arrays for supporting larger LUTs.

Table 8 shows the equivalent decimal digits for various ALU digit widths, i.e., number of RNS digits supported. For example, for a 54 digit RNS ALU of Q=8 bit wide operands (i.e., <255), the equivalent decimal digits is about 101. The equivalent number of binary bits is about 333 bits. In column 5 of Table 8, the number of equivalent fractional decimal digits is shown, which is approximately half of column 3, since the ALU must support a "squared" range for processing fractional values. For example, an RNS ALU of 54 digits supports a range of about 50 fractional decimal digits. The rages of table 8 are approximate, since actual ranges depend on specific digit groupings, and number of redundant and extended digits of the ALU.

Interestingly, the efficiency of the ALU range increases as the number of RNS digits increases, since digit modulus increases. In column 7 of Table 8, the decimal to RNS digit ratio is shown. At 54 RNS digits, the ratio is 187%, since equivalent decimal digits is about 101. However, at 97 RNS digits the number of equivalent decimal digits jumps to 211, more than twice that of 101; the decimal to RNS ratio at 97 RNS digits is increased to 218%. This increasing conversion efficiency is at the heart of better than linear run times for RNS fractional multiply versus the number of effective binary bits.

To keep costs down, and to maximize capability, the Rez-1 RNS ALU targets a maximum RNS ALU digit width of 172 RNS digits, with an operand width of Q=10 bits. The Rez-1 ALU will utilize high speed static RAM chips, such as 16 megabit SRAM with part number IS61WV102416BLL from ISSI. This part supports a 1 Megabyte×16 bit configuration SRAM operating at 10 ns access speed. This IC provides for 10 bit operands and operations using a brute force LUT technique. The part is available for less than $20 in small quantities at the time of this writing. A fully expanded Rez-1 will therefore be capable of operating on fractional values in the order of 700 bits wide, with a range and resolution of approximately $10^{213}$. The Rez-1 integer processing range is much greater, being approximately 427 decimal digits, or about 1400 bits wide.

It should be noted that future designs may be built around faster and larger digit memory IC's, such as 1 Gigabit DDR3 memory. Advanced digit group cards may be constructed using faster and denser memory, supporting more RNS digit ALU's per card. A one gigabit size memory IC is capable of supporting a single DM LUT for an RNS ALU of up to 1028 digits, allowing operation on binary fractions of over 5700 bits wide.

More efficient use of LUT memory can allow even greater size ALU's. For example, techniques exist to expand a single power digit modulus into a multiple power modulus without increasing the LUT depth. For example, digit ALU's supporting BCFR accumulator format may encode only the LUT requirements of a single power digit, thereby dramatically increasing the digit range to LUT depth ratio.

Another interesting memory technology is RLDRAM, which supports very short burst lengths and random access of values, which is an ideal memory requirement for the DUAL RNS ALU described herein. DDR3 memory may be used, but may waste memory clock cycles, since such memories are often burst oriented, and the RNS LUT is random access. Even so, the DDR3 memory technology is low cost, very high density, and can support reasonably fast random access memory cycles due to its high clock rate. It is possible that special RNS LUT memory be developed that fulfills the requirements for RNS ALU operation more precisely, and more efficiently.

Figure 23A:
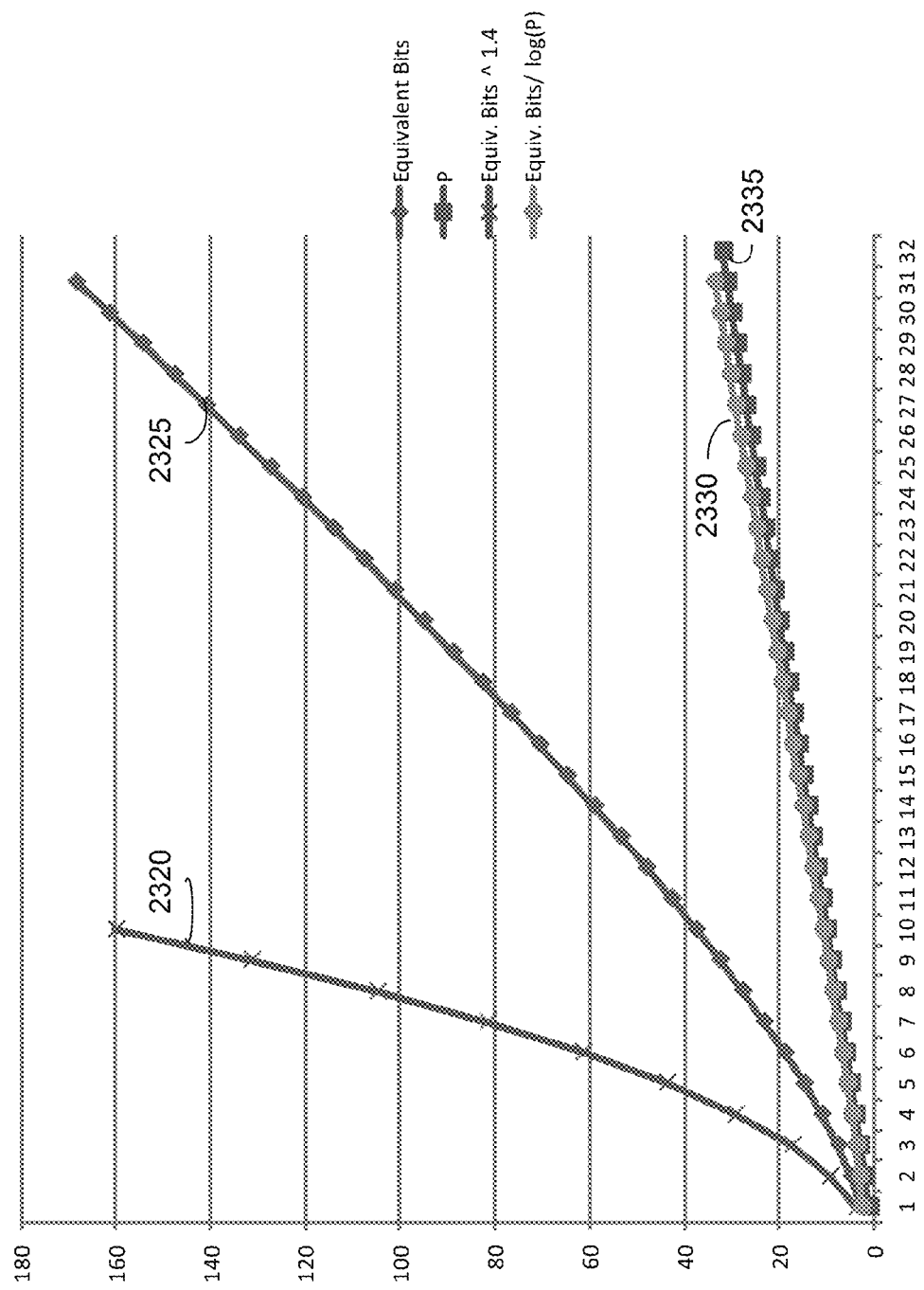
FIG. 23A is a graph illustrating theoretical execution time of an RNS ALU multiply versus a generalized linear time binary multiply.

In FIG. 23A, the relative growth of equivalent binary width versus RNS ALU digit width is provided. The RNS digit curve 2335 is a plot of the number of RNS digits. This curve is purposely drawn as a straight line of unity slope for comparison purposes. The equivalent binary bits for each RNS ALU digit width is given by curve 2325. It can be readily seen that the equivalent binary width for a given RNS ALU digit width grows rapidly with respect to the ALU digit width. That is, the equivalent binary bits is growing at a faster than linear rate with respect to the number of RNS digits. To approximate the P line, the equivalent binary width, (n), is divided by log(P) to form the curve 2330, which is a close fit over the interval of 32 RNS digits of the graph of FIG. 23A.

Since the RNS fractional multiply run time is proportional to the number of RNS digits, or curve 2335, and a linear binary multiplier run time is proportional to equivalent bits curve 2325, it can be seen in the graph of FIG. 23A the required clock cycles of the RNS multiplier is progressively less as the number of bits increases. In fact, we can estimate the order of run time (O(n)) of the fractional RNS multiply to be about n/log(P), where n is the effective binary width, and P equals the RNS ALU digit width. The effective run time of the RNS fractional multiply is compelling for applications requiring high performance, very wide word operation.

In further contrast, the curve of 2320 shows a best case software emulated approach, which quickly converges upward, beyond practicality, after only a few digits wide.

Figure 23B:
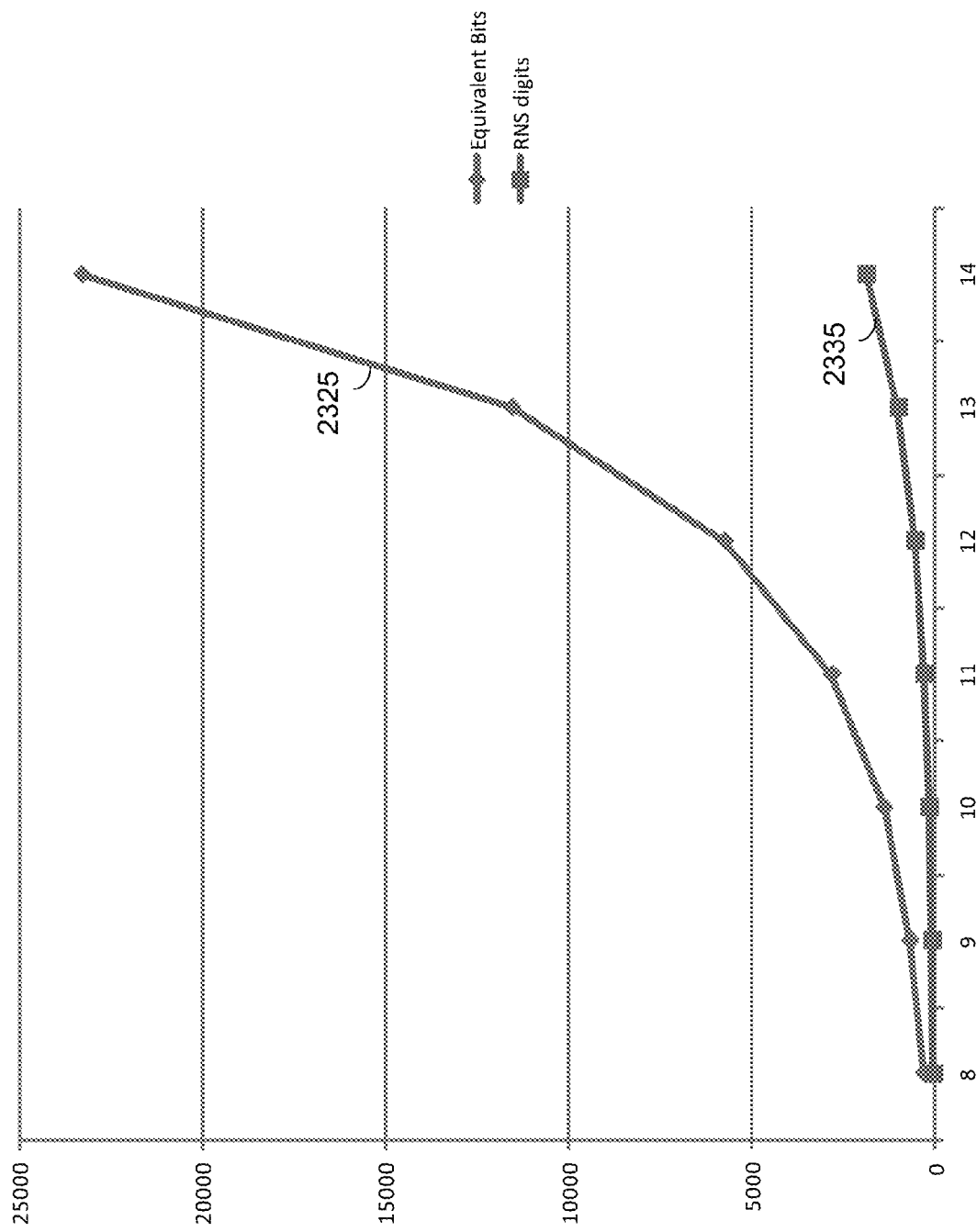
FIG. 23B is a graph illustrating the number of RNS digits versus the number of binary bits for each given range of numbers.
Figure 23C:
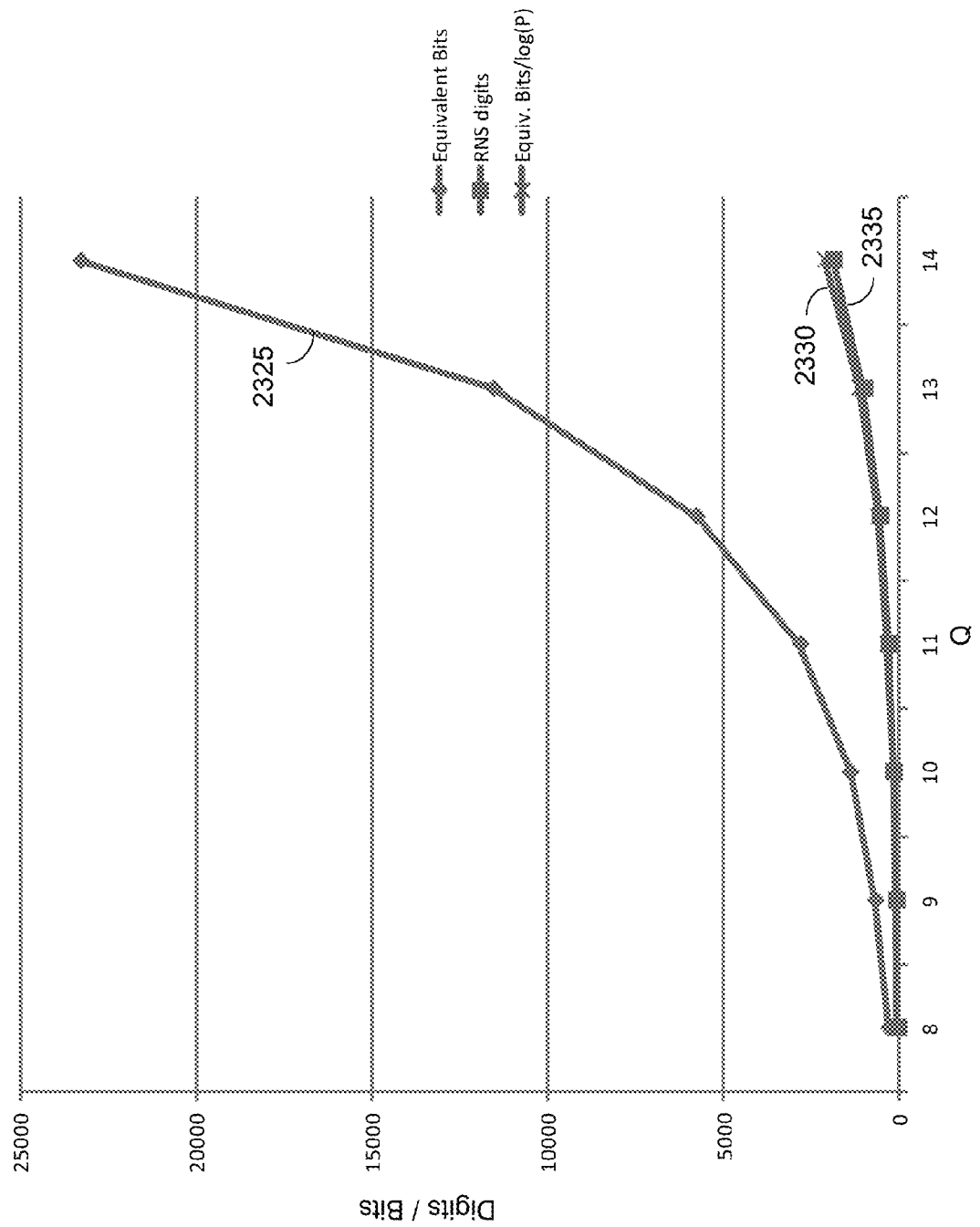
FIG. 23C is a graph illustrating the number of RNS digits versus the number of binary bits with the curve (n)/Log(P) super imposed.

In FIG. 23B, the maximum number of RNS digits is plotted alongside the number of equivalent bits as the operand width, Q, increases. Therefore, the x-axis of the graph of FIG. 23C represents an exponential increase of RNS digits as Q increases; for Q=8, P=54, and for Q=14, P=1900 according to Table 8. The number of RNS digits curve 2335 is plotted along the equivalent bits curve 2325; at each point Q along the curves, the equivalent number of binary bits 2325 is associated with a P digit RNS range 2335. It can be seen the equivalent bits curve 2325 grows faster than the number of RNS digits curve 2335. The graph of FIG. 23B again illustrates the advantage of an RNS ALU multiply over a linear binary multiply as the number of bits increases; In FIG. 23B, binary multiply execution is assumed linear, or proportional to bits, (n), while RNS multiply execution is proportional to P, the number of RNS digits.

In FIG. 23C, the equivalent number of bits divided by $\log_2(P)$ is plotted as curve 2330 and shown with the curves of FIG. 23B. Again, a very close fit is seen between the relation (n)/Log(P) 2330 and the value P 2335, over the wide range of data width (from 54 to 1900 digits wide). If we compare the order of run time of a binary multiplier that is linear with respect to the number of bits, n, to the order of run time of the RNS multiplier plotted as curve 2335, we get a close fit by curve 2330, implying the approximate relationship of run time of the RNS multiplier is approximately n/log(P). We can make this statement if LUT access time is constant, which for all memory technology types and speeds in Table 7 show is the case. (This argument neglects delay stages from interconnecting memory stages, but the delay increase factor may be assumed in the order of log(log(n)) or slower.)

This approximate relationship appears often in the analysis of Rez-1, and is given as:

$$P=n/\log_2(P) \quad \text{Eqn. 18}$$

Where,
P=number of RNS digits
n=number of effective bits of a P digit RNS range
$\log_2(x)$=logarithm of x, base two.

It is easy to doubt the merits of the RNS ALU, however, one should consider the following. Since the time to perform addition and subtraction is one or two clocks for the RNS ALU, and the time to multiply a fractional value by an integer value requires only one or two clocks, the overall speed advantage of the RNS ALU over the binary ALU can be significant. In comparison to bit oriented binary ALU's, the RNS ALU is faster for fractional multiply operation. Therefore every arithmetic operation is faster using the RNS ALU by significant margins. In the fairest comparison, binary multipliers which use semi-systolic structures, and binary digit groups of Q bits, may exhibit a similar order of run time as the RNS ALU multiplier; however, again, when it comes to addition, subtraction, and multiplication by an integer, the RNS ALU has significant advantages.

Binary addition and subtraction continues to present challenges for speed optimization as the number of bits (n) increases. Also, there is no real advantage of multiplying by an integer in the binary case, since binary multiplication is similar regardless if the value is fractional or integer.

To further argue the case of the Rez-1 computer, and the RNS ALU in general, consider the process of multiplying pairs of fractional numbers, and forming a sum of products. In RNS, it is possible to perform much of the calculation in an intermediate format; working in an intermediate format takes advantage of the fastest form of multiplication available, that is, direct integer multiplication in RNS. When the calculation and summing of all products is complete, the resulting intermediate value may be normalized using a number of cycles similar to a single multiplication. Therefore, the average execution time of each multiply is approximately the time for one multiplication divided by N, the number of products summed. The binary number system does have the equivalent of an intermediate format, however, there is nothing to gain by operating in it, since each operation still requires carry.

On the other hand, comparison in the binary system is more efficient than an RNS comparison, and therefore the types of algorithms executed on the RNS ALU should be programmed to reduce the number of comparisons. Likewise, the handling of signed values may also be less efficient in the RNS ALU, and therefore care must be placed on optimization of algorithms to reduce the need to explicitly sign extend values. The method of sign extending values as a secondary and parallel operation to primary operations such as multiplication is a novel method used by the Rez-1 RNS ALU. This novel method allows the RNS ALU to process signed values more efficiently, and reduces the need to perform sign extend operations in any algorithm processed with Rez-1.

In summary, the best problems for the Rez-1 RNS ALU are those requiring high accuracy and large data width, and consist of many calculations, repetitive or otherwise. In addition, it is desirable that applications not rely on excessive RNS comparison operations.

Notes Regarding Semi-Systolic Architecture Issues

Digital arithmetic structures employing high fan-out, such as the use of a crossbar bus, are often referred to as semi-systolic. These structures suffer from inherent signal delay due to high signal fan-out, i.e., a high number of signal destinations per signal source. It is often times advantageous to insert synchronizing steps into such architectures so as to reduce signal fan-out, and help synchronize and propagate signals from element to element. This strategy is possible with the RNS ALU of the present invention due to the highly parallel operation of the ALU.

The issue of inserting delay stages, and pipeline structures is an advanced topic, but may be described briefly for completeness. The data flow of each major operation of the RNS ALU is examined. Storage elements are inserted into the data flow at specific points, creating a requirement for an additional clock cycle. The storage elements are so installed so as to capitalize on the parallelism of the RNS ALU. For long operations, this process is efficient. For shorter operations, this process is more challenging.

In some ALU designs, operation that may require a single cycle in theory may require more than one cycle. However, this increase follows a slow progression as the number of digits increases. In one case, the value of log(n) is used to compensate the order of execution O(n)=((n)*log(n))/Log (P), which results in a function that is approximately linear over large changes in (n). In other words, the constant time of one clock cycle may become a constant time of two or three clock cycles. This is in comparison to digit by digit operation in binary, which must handle carry, so this is not generally a big problem.

However, for high performance designs, every clock cycle is important. Inserting storage elements into the data flow of the RNS ALU may be accomplished in a manner that utilizes the RNS ability to operate in parallel, and without carry. For example, one digit group may operate slightly out of synchronization of another digit group, and status signals from each staggered digit group may be re-synchronized at the control unit 200 to interpret the result of an ALU operation. This organization may be optimized to account for crossbar bus delays to all digit ALU's of the entire ALU. In one embodiment, a token type architecture is employed such that a particular digit group receives a token, and performs a series of "master" operations, while all other digit blocks serve as a slave, reacting to the values of the crossbar bus to process their digits.

For long RNS operations, such as conversions, each digit group is handed the token in turn. The digit group holding the token is a "master", as it contains a sub controller which begins to process the series of digits contained within the group. Each slave digit block reacts to the sequence of crossbar generated data and commands transmitted by the master digit group. Control unit 200 manages a plurality of de-synchronized digit blocks, by re-synchronizing staggered status signals into an overall status which may cause a digit group to abort sub-operations managed by localized digit block sub-controllers.

Notes Regarding Representational Accuracy

While many RNS systems of the prior art have primarily focused on the potential speed benefits of RNS addition, subtraction and multiplication, the ALU unit of the present invention focuses as much on its inherent precision. For example, when comparing basic binary fractions with basic RNS fractions, a key difference emerges. The number of "denominators" inherent in an RNS fractional representation is $2^P-1$, where P equals the number of RNS digits, or RNS factors. In comparison, a simple binary fraction supports N number of denominators, where N is the number of bits of the binary word.

For example, the fractions $\frac{1}{2}$, $\frac{1}{3}$, $\frac{1}{5}$, and $\frac{1}{7}$ are exactly represented by the RNS fractional representation supporting the modulus 2, 3, 5 and 7. On the other hand, the fractions $\frac{1}{2}$, $\frac{1}{4}$ and $\frac{1}{8}$ are exactly represented in the binary fractional system of three bits. But combinations of factors are also supported by the RNS fractional representations, such as: $\frac{1}{6}$, $\frac{1}{10}$, $\frac{1}{30}$, etc. In fact, for a fractional RNS number supporting the modulus $\{2, 3, 5, 7\}$, the following fractions are exactly represented: $\frac{1}{2}$, $\frac{1}{3}$, $\frac{1}{5}$, $\frac{1}{6}$, $\frac{1}{7}$, $\frac{1}{10}$, $\frac{1}{14}$, $\frac{1}{21}$, $\frac{1}{15}$, $\frac{1}{30}$, $\frac{1}{35}$, $\frac{1}{42}$, $\frac{1}{70}$, $\frac{1}{105}$, and $\frac{1}{210}$!

The difference in fractional representation is due to the factors present in the range of each number system. Binary representation supports a range equal to $2^N$, where N is the number of bits. Since the range is a power of two, only numbers that are a power of two divide evenly into the binary range. For natural RNS ranges, the range is equal to $2*3*5*7*\ldots*P$. The RNS range is divisible by many more multiples of factors, and this provides more "denominators" in the basic fractional representation. It is interesting to note that with the exception of the fraction $\frac{1}{2}$, fractions represented exactly by the binary system cannot be represented exactly by the natural RNS system. Likewise, fractions represented exactly in a natural RNS representation cannot be exactly represented by a binary fraction. In this respect, the simple natural RNS and binary fractional representation have opposing characteristics in terms of representing real fractions.

It would be advantageous if the characteristics of a fixed radix system (like binary), could be merged with the characteristics of a natural modulus RNS system. The method of the present invention includes a special modified embodiment which does exactly this, hereby called a "natural power RNS" system, or power RNS (PRNS) for short. The PRNS system of the present invention includes power based modulus in place of, and/or in addition to, the standard natural RNS system enclosed herein. Therefore, with the PRNS ALU, the properties of power based (fixed radix) fractional representation is combined with that of combination based RNS fractional representation.

For example, the following PRNS system having the modulus: $\{2*2*2, 3*3, 5, 7, 11, 13\}$ will support the first 15 fractions of the following progression exactly: $\frac{1}{2}$, $\frac{1}{3}$, $\frac{1}{4}$, $\frac{1}{5}$, $\frac{1}{6}$, $\frac{1}{7}$, $\frac{1}{8}$, $\frac{1}{9}$, $\frac{1}{10}$, $\frac{1}{11}$, $\frac{1}{12}$, $\frac{1}{13}$, $\frac{1}{14}$, and $\frac{1}{15}$. In this example, the number of RNS digits is P=6, and the maximum number of fractional denominators is also increased due to two power based modulus in this example, yielding $4*3*2^4-1=191$ total number combinations of unique factors of the power based residue number system. In comparison, for a simple fractional binary system, only fractions having a power of two in their denominator, such as $\frac{1}{2}$, $\frac{1}{4}$ and $\frac{1}{8}$, are exactly represented, regardless of word length.

Claims of high accuracy must still be verified by mathematical analysis. However, one argument for the high numerical accuracy of the RNS fractional representation is associated with the multiplication of fractional values by fractional constants, such as those listed above. The RNS fractional representation has the ability to exactly represent many low order fractions. In many calculations, such as iterative and series expansions, there is a need to multiply by common low order fractional constants, and there is less error if such low order constants are exactly represented.

The RNS system allows the user to precisely multiply by fractions such as $\frac{1}{3}$ and $\frac{1}{5}$, where such constants may be exactly represented in RNS. This provides for faster implementation of numerical routines, which may converge more accurately, and more quickly, in terms of the least significant bits of the result. This may be an advantage in the calculation of complex functions, such as fractional division, logarithms, square roots, and many others. For example, equation 14 illustrates an error function which can be minimized by exact calculation of common low order constants, i.e. which are often simple ratios of smaller numbers.

From a theoretical standpoint, as a full power based RNS number system is expanded to infinity, such that $Q \to \infty$, every real number being a ratio of any two integers can be represented exactly. For the binary number system, even as $n \to \infty$, the binary system will not be able to represent any fraction exactly, other than those numbers whose fraction's denominator is a power of two.

TABLE 9

| Column 1 Operand (digit) width Q | Column 2 RNS digits P | Column 3 Equivalent decimal digits - natural | Column 4 Equivalent decimal digits - power based | Column 5 Percentage Increase |
| --- | --- | --- | --- | --- |
| 8 bits | 54 | 101 | 108 | 6.93% |
| 9 bits | 97 | 211 | 223 | 5.69% |
| 10 bits | 172 | 427 | 444 | 3.98% |
| 11 bits | 309 | 862 | 886 | 2.78% |
| 12 bits | 564 | 1749 | 1786 | 2.12% |
| 13 bits | 1028 | 3502 | 3550 | 1.37% |
| 14 bits | 1900 | 7059 | 7125 | 0.93% |

TABLE 10

| Column 1 Operand width Q | Column 2 RNS digits P | Column 3 Digits treated as Power based | Column 4 Additional subdigits | Column 5 largest power digit modulus | Column 6 Natural RNS Denominators 2^(RNS digs/4) | Column 7 Full power based denominators | Column 8 Equiv. binary fraction bits | Column 9 Binary range/ denominator range |
|---|---|---|---|---|---|---|---|---|
| 8 bits  | 54   | 6  | 15 | 13  | 2^13  | 2^28  | 90   | 3.21  |
| 9 bits  | 97   | 8  | 19 | 19  | 2^24  | 2^43  | 185  | 4.30  |
| 10 bits | 172  | 11 | 25 | 31  | 2^43  | 2^68  | 369  | 5.43  |
| 11 bits | 309  | 14 | 30 | 43  | 2^77  | 2^107 | 736  | 6.88  |
| 12 bits | 564  | 18 | 39 | 61  | 2^141 | 2^180 | 1481 | 8.23  |
| 13 bits | 1028 | 24 | 49 | 89  | 2^257 | 2^306 | 2949 | 9.64  |
| 14 bits | 1900 | 31 | 60 | 127 | 2^475 | 2^535 | 5918 | 11.06 |

Table 9 shows a comparison of a natural RNS range and a full power based RNS range for various values of Q (i.e., Q limits the maximum number of RNS digits). Column 5 of Table 9 shows the percentage increase in range as a result of moving from a natural RNS system to a full power based RNS system. By full, it is meant the largest power of any digit must be represented, but within the bit width Q. It can be seen in column 5, for 54 RNS digits, going with a full power based digit system provides nearly 7% more range in terms of equivalent decimal digits. In other words, for the case of 54 digits, we obtain one hundred eight (108) decimal digits of range as opposed to one hundred one (101) equivalent decimal digits of range. Seven additional decimal digits results in a range that is up to ten million times larger.

As Q increases, the effective increase in equivalent decimal digits begins to drop. In column 5 of Table 9, the percentage increase in digits when moving from a natural to a power based system gets progressively less. In the case of Q=14, the equivalent decimal digits for the natural system is (7059) and the equivalent decimal digits for the power based system is (7125), resulting in less than a 1% increase in effective digit width. Therefore, in terms of expanding the range of the ALU while holding Q fixed, the use of a power based RNS system gets progressively less useful.

However, using a full power-based RNS (PRNS) number system has other advantages. One advantage of using a PRNS based RNS ALU is the increased number of denominators that result in the fractional representation. Table 10 illustrates some of these points. In column 3 of Table 10, the maximum number of digits that may support a power based modulus is listed. Also, in column 4, the total number of additional sub-digits is listed. (By "additional", we are indicating that the digit position itself is already counted, so that a squared modulus indicates the digit itself plus one additional sub-digit in this context.) Column 5 indicates the largest natural modulus that can be converted to a power based modulus given an operand width limit Q. For Rez-1, the operand width is 10 bits, therefore, the approximate number of denominators for a basic fractional representation is $2^{43}$ if a natural system is used, and approximately $2^{68}$ if a full PRNS system is used.

The formula for the number of denominators of a natural fractional RNS representation of F digits equals the number of n-tuple combinations of factors of the fractional RNS range, n ranging from one to F, and is given by:

$$D = 2^F - 1 \qquad \text{Eqn. 19}$$

Where F equals the number of digits reserved for the fractional range.

In terms of theoretical denominators of a natural RNS fractional representation, if we let F be the number of fractional digits, then using the relationship of equation 18, we can approximate the number of denominators D with respect to the fractional range $R_F$:

$$D = 2^{(F)} - 1 = 2^{(n/(\log(F)))} - 1 = 2^{(\log(2*3*5* \ldots *m)/\log(F))} = 2^{\log F(R)} \qquad \text{Eqn. 20}$$

Where,
D=number of fractional denominators
$R = R_F$ = fractional range = $2*3*5* \ldots *m_F$
F=number of fractional digits
And the function log( ) refers to $\log_2$( ) and log F( ) refers to $\log_F$( )

The formula used in Table 10 for number of denominators of a power based RNS ALU is:

$$D = 2^{(P/4+S)} \qquad \text{Eqn. 21}$$

D=number of fractional denominators
P=number of natural RNS digits
S=number of additional sub-digits
Where ¼ of the digits is reserved for the fractional portion of the representation.

In Table 10, we are assuming a basic fractional representation for Rez-1. Of the entire machine word, one quarter is reserved for the fractional range, another quarter of the machine word is reserved for the integer range, and the remaining half of the digits is the redundant range. (We are assuming an RNS system that carries redundant values in its fractional notation). The information in Table 10 is approximate, since we are assuming that each digit adds approximately the same amount of range.

One advantage of power based modulus is they occupy the least valued prime digits of the natural RNS sequence. Therefore, if using the first quarter RNS digits for the fractional range, and the number of power digits occupies the first digit positions (all within the first quarter of digits), then all power digits of the ALU are assigned to the fractional range. Rez-1 employs this type of representation by design; that is, all power based RNS modulus may be reserved for the fractional range of the fixed point or sliding point fractional number. Therefore, using power based modulus has a dramatic increase in the number of denominators supported by the fractional representation.

In Table 10, column 6 lists the number of possible denominators by indicating the number of binary bits required to represent that number. For example, if 54 digits are supported (Q=8), then the number of denominators supported using a natural RNS system is $2^{13}$, or 13 binary bits worth of range. For a 54 digit RNS ALU using a full power based digit ALU, the number of possible fractional denominators increases to $2^{28}$, which is 28 bits of range, as shown in column 7.

The number of denominators expressed as a ratio to the RNS range decreases as P, the number of RNS digits, increases. This is to be expected, since the base of the log function in equation 20 increases as the number of RNS digits increases. Also, from a number theory perspective, it is counter intuitive to believe the number of perfect denominators will track as a fixed ratio an increase in range. However, it is interesting to know the change in this ratio as the number of digits increases. The inverse can be plotted, that is, the ratio of binary range to the range of the number of denominators. This ratio tabulated in column 9 of Table 10 using the equivalent number of bits for the fractional range in column 8, and the number of bits to represent the number of denominators, which is the exponent value from column 7 of table 10. This ratio versus Q changes in a nearly linear fashion.

Figure 23D:
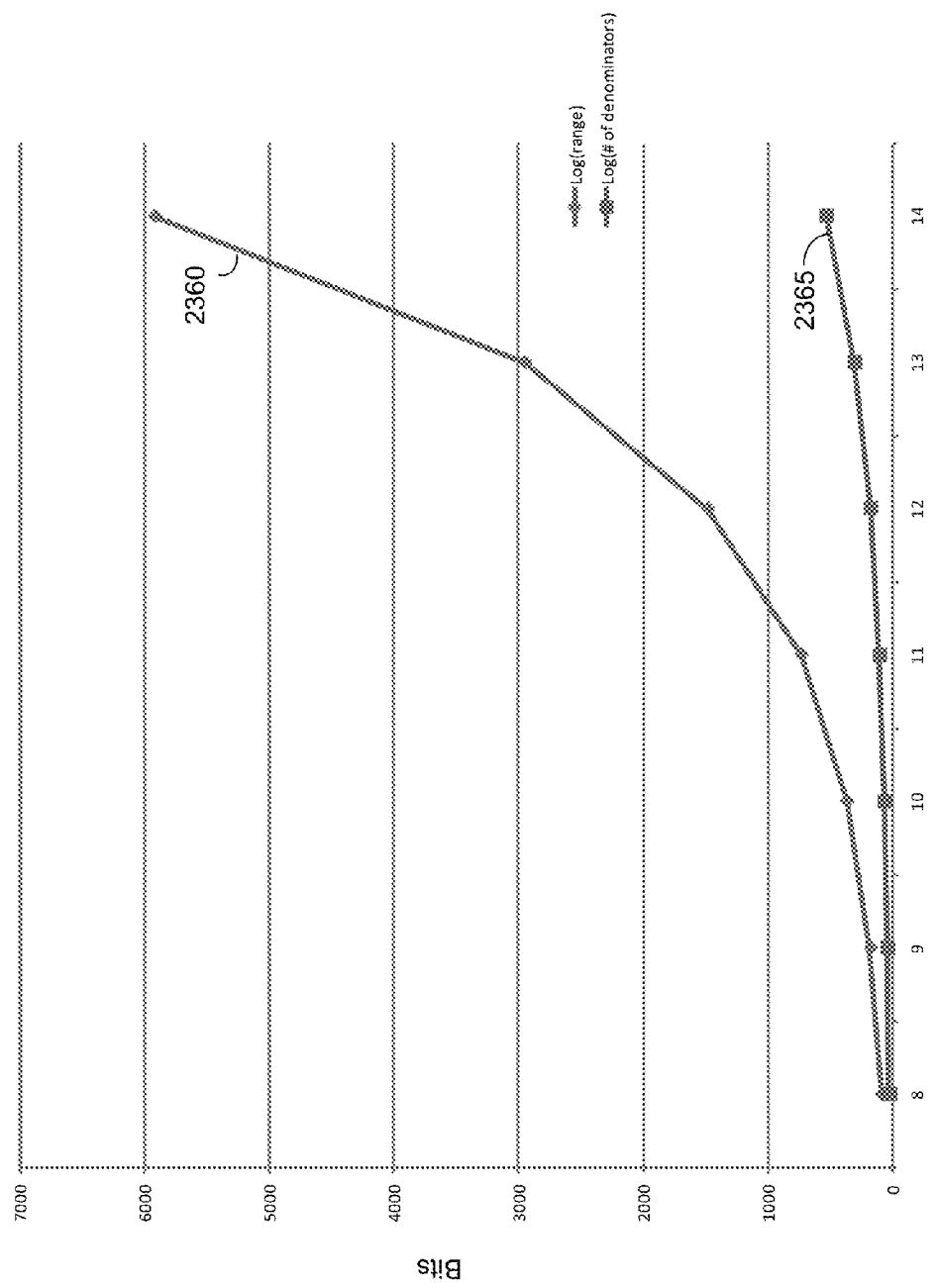
FIG. 23D is a graph illustrating the range in bits of an equivalent binary number versus the range in bits of the number of denominators of an RNS fractional representation.
Figure 23E:
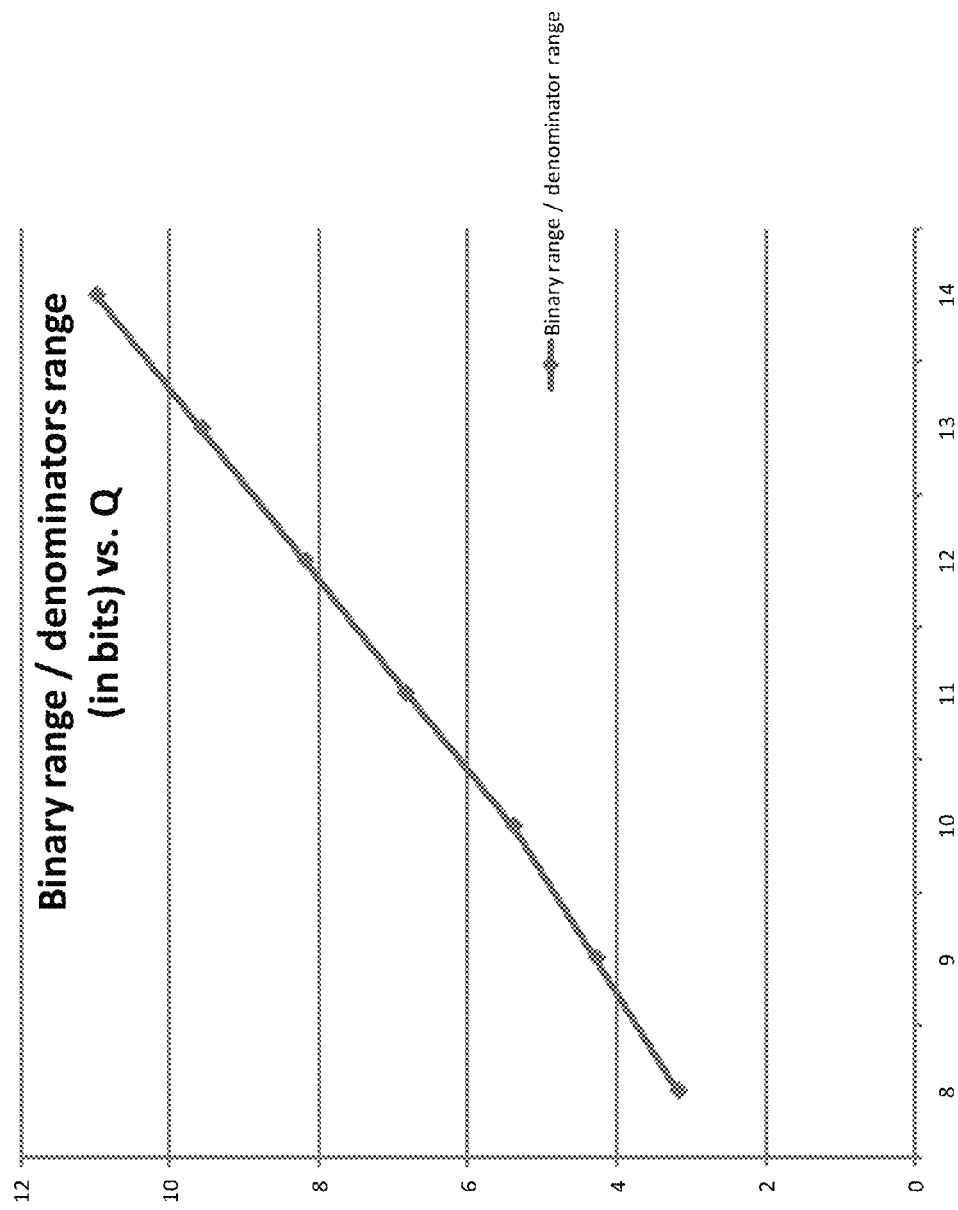
FIG. 23E is a graph illustrating the ratio of the range in bits of an equivalent binary number versus the range in bits of the number of denominators of an RNS fractional representation.

FIG. 23D plots the fractional range in bits versus the number of denominators in bits wide for each value Q of Table 10. Results are tabulated for the full power based ALU version. At Q=8 bits, the equivalent fractional range is about 90 bits. The number of denominators is a number about 28 bits wide. Therefore, the ratio in column 9 is 3.18. As the following rows of the Table 10 show, as Q increases, so does the ratio in column 9.

Specifically, the ratio of the logarithm of range to the logarithm of number of denominators increases by average about 1.33 per unit increase in Q. The FIG. 23D represents an extraordinary large number of denominators, even as the range increases. The number of RNS denominators is indeed much larger than the number of binary denominators in a binary fractional representation, and helps to illustrate why the RNS fractional representation may be more accurate in general.

In the case of Rez-1, the number of denominators for the fractional representation for is $2^{68}$, and the fractional range is approximately $2^{366}$; the ratio of the logarithm of range to logarithm of denominators is 5.39.

What is claimed is:

1. A residue number arithmetic logic unit that performs normalized fractional multiplication in residue number format comprising:
   a parallel array of digit processing units, wherein each of the digit processing units perform one or more modular arithmetic operations on one or more sets of operands simultaneously to generate one or more status conditions as a result;
   a status bus which transmits each of the one or more status conditions when the status condition is not a digit skip condition;
   a data bus configured to transmit one or more digit and modulus operands to and from each of the plurality of digit processing units;
   a LIFO register coupled to the data bus that stores and transmits mixed radix digits;
   one or more storage registers that transmit and receive fractional residue values from the parallel array of digit processing units;
   a fraction point position register configured to identify one or more digit modulus values as fractionally associated digits, wherein the product of the one or more digit modulus values define a fractional range in residue number format;
   a controller in communication with the parallel array of digit processing units, the LIFO register, the fraction point position register, the data bus, via control signal paths and the status bus, the controller configured to transmit one or more control signals to instruct one or more of the plurality of digit processing units to multiply a first fractional residue value to a second fractional residue value by:
      executing one or more first modular arithmetic operations comprising multiply the first fractional residue value to the second fractional residue value to create a non-normalized intermediate product in the residue number format;
      complementing the non-normalized intermediate product thereby creating a non-normalized product complement in residue format;
      converting the one or more fractionally associated digits to create one or more fractionally associated digits; and
      after conversion of the one or more fractionally associated digits, executing one or more second modular arithmetic operations comprising converting the non-normalized intermediate product and complement to a mixed radix number format;
   wherein the controller:
      compares the mixed radix product and mixed radix product complement;
      selects the mixed radix product if it is lesser than the complement, and to select the complement if lesser than the mixed radix product, thereby creating one or more selected mixed radix digits;
      stores each of the one or more selected mixed radix digits in the LIFO register when the mixed radix digit is not a fractionally associated digit, the one or more selected mixed radix digits forming a normalized mixed radix product in mixed radix format;
      retrieves the normalized mixed radix product from the LIFO register and converts the normalized mixed radix product to a residue number format, thereby creating a normalized residue product in the residue number format;
      complements the normalized residue product if the mixed radix product is greater than the complement; and
      increments the normalized residue product if the one or more fractionally associated mixed radix digits are greater than a predefined threshold, wherein a rounded normalized product in residue format is created as a result.

2. The residue number arithmetic logic unit of claim 1, wherein the controller is further configured to select the one or more commands prior to their transmission based on the output of one or more of the plurality of digit processing units.

3. The residue number arithmetic logic unit of claim 1 further comprising the ability to normalize an intermediate fractional product in residue number format, wherein the one or more second modular arithmetic operations comprise:
   converting the intermediate product to a mixed radix number format, comprising converting all fractionally associated digits first, thereby creating an intermediate mixed radix product, the intermediate mixed radix product representing an intermediate mixed radix result;
   truncating said intermediate mixed radix product by one or more digits, thereby creating a truncated mixed radix product, the truncated mixed radix product representing a mixed radix result, said one or more digits comprising all fractionally associated digits;
   wherein the normalized fractional product comprise the truncated mixed radix product after conversion to the residue number format.

4. The residue number arithmetic logic unit of claim 1 further comprising the ability to perform a multiply and accumulate of fractional values in reside number format by performing, one or more third modular arithmetic operations comprising:

multiplying a first fractional residue value to a second fractional residue value [representations in the residue number data] thereby creating a non-normalized intermediate product in residue number format;

scaling a third fractional residue value by on the fractional range, thereby creating a non-normalized scaled additive operand;

adding the non-normalized intermediate product to the scaled additive operand, thereby creating a non-normalized intermediate product and sum in residue format;

converting said non-normalized intermediate product and sum to mixed radix number format, comprising converting all fractionally associated digits first, thereby creating a non-normalized intermediate mixed radix product and sum; and truncating said intermediate mixed radix product and sum by one or more digits, said one or more digits comprising all fractionally associated digits, thereby creating a normalized mixed radix product and sum;

wherein the multiply and accumulate result comprise the normalized mixed radix product and sum after conversion to the residue number format.

5. The residue number arithmetic logic unit of claim 1 further comprising the ability to scale a divisor operand in fractional residue format to a value less than or equal to one by performing one or more third modular arithmetic operations comprising:

storing a copy of the divisor operand in residue format, thereby creating a divisor copy;

converting the divisor to a mixed radix number format comprising one or more mixed radix digits representing a divisor in mixed radix format;

wherein the controller unit measures the mixed radix divisor and selectively generates and transmits one or more control signals based on this measurement, comprising:
setting the fraction point position register to the position of the most significant mixed radix digit thereby creating a non-normal fraction point position; and
restoring the divisor copy;

wherein the arithmetic logic unit is responsive to a non-normal fraction point position, thereby creating a scaled, non-normalized residue divisor.

6. The arithmetic logic unit of claim 1 further comprising the ability to perform multiplication on pairs of fractional data in residue format and further sum the products thereby creating a product summation in fractional residue format by performing one or more third modular arithmetic operations comprising:

multiplying each pair of residue number data thereby creating a plurality of intermediate products in residue format;

summing the plurality of intermediate products, thereby creating an intermediate product sum in residue format;

converting the intermediate product sum to mixed radix format, thereby creating an intermediate mixed radix product sum; and truncating said intermediate mixed radix product sum by one or more digits, said one or more digits comprising all fractionally associated digits, thereby creating a normalized mixed radix product sum;

wherein the product summation result comprise the normalized mixed radix product sum after conversion to residue number format.

\* \* \* \* \*